US012745312B2

(12) United States Patent
Zhu et al.

(10) Patent No.: US 12,745,312 B2
(45) Date of Patent: Sep. 22, 2026

(54) METHOD AND APPARATUS FOR SIGNALING TCI STATES

(71) Applicant: Samsung Electronics Co., Ltd., Suwon-si (KR)

(72) Inventors: Dalin Zhu, Allen, TX (US); Emad Nader Farag, Flanders, NJ (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 429 days.

(21) Appl. No.: 18/459,124

(22) Filed: Aug. 31, 2023

(65) Prior Publication Data

US 2024/0090073 A1 Mar. 14, 2024

Related U.S. Application Data

(60) Provisional application No. 63/452,327, filed on Mar. 15, 2023, provisional application No. 63/421,016, (Continued)

(51) Int. Cl.
*H04W 76/27* (2018.01)
*H04W 72/04* (2023.01)
*H04W 72/56* (2023.01)

(52) U.S. Cl.
CPC .......... *H04W 76/27* (2018.02); *H04W 72/04* (2013.01); *H04W 72/56* (2023.01)

(58) Field of Classification Search
CPC ..... H04W 76/27; H04W 72/56; H04W 72/04; H04W 72/23; H04L 5/0053; H04L 5/0091;

(Continued)

(56) References Cited

U.S. PATENT DOCUMENTS

2021/0359745 A1 11/2021 Farag et al.
2022/0217695 A1* 7/2022 Liou .................. H04B 7/06952

(Continued)

FOREIGN PATENT DOCUMENTS

WO 2022152180 A1 7/2022
WO WO_2022/152180 A1 * 7/2022
WO WO_2023/168651 A1 * 9/2023

OTHER PUBLICATIONS

International Search Report and Written Opinion issued Nov. 28, 2023 regarding International Application No. PCT/KR2023/013574, 7 pages.
Huawei et al., "Discussion on unified TCI framework extension for multi-TRP", 3GPP TSG-RAN, WG1 Meeting #110, R1-2205879, Aug. 2022, 13 pages.
ZTE, "Enhancements on unified TCI framework extension for multi-TRP", 3GPP TSG RAN WG1 Meeting #110, R1-2205918, Aug. 2022, 11 pages.

(Continued)

*Primary Examiner* — Rushil P. Sampat

(57) ABSTRACT

Methods and apparatuses for signaling transmission configuration indication (TCI) states. A method performed by a user equipment (UE) includes receiving, in a first radio resource control (RRC) signaling, a list of TCI states including first and second groups of TCI states; receiving, in a medium access control (MAC) control element (CE), one or more sets of transmission configuration indication (TCI) states; and receiving, in a downlink control information (DCI), a TCI codepoint indicating a set of one or more first indicated TCI states or one or more second indicated TCI states. The method further includes identifying, based on the first RRC signaling, the first and second groups of TCI states; identifying, based on the TCI codepoint in the DCI, a set of one or more first and second applicable TCI states; and transmitting or receiving a signal based on an applicable TCI state from the identified set.

18 Claims, 15 Drawing Sheets

Related U.S. Application Data filed on Oct. 31, 2022, provisional application No. 63/418,864, filed on Oct. 24, 2022, provisional application No. 63/416,791, filed on Oct. 17, 2022, provisional application No. 63/415,887, filed on Oct. 13, 2022, provisional application No. 63/415,158, filed on Oct. 11, 2022, provisional application No. 63/411,464, filed on Sep. 29, 2022, provisional application No. 63/405,704, filed on Sep. 12, 2022.

(58) Field of Classification Search

CPC ... H04L 5/0023; H04L 5/0035; H04L 5/0094; H04B 7/06952

See application file for complete search history.

(56) References Cited

U.S. PATENT DOCUMENTS

2024/0040656 A1* 2/2024 Shao ..................... H04L 5/0098
2024/0048340 A1* 2/2024 Zhang .................... H04B 7/024
2024/0089943 A1* 3/2024 Yu ......................... H04L 1/1854
2024/0097863 A1* 3/2024 Shao ..................... H04L 5/0023

OTHER PUBLICATIONS

Spreadtrum Communications, "Discussion on unified TCI framework extension for multi-TRP", 3GPP TSG RAN WG1 #110, R1-2205981, Aug. 2022, 8 pages.

"3rd Generation Partnership Project; Technical Specification Group Radio Access Network; NR; Physical channels and modulation (Release 16)", 3GPP TS 38.211 V16.1.0, Mar. 2020, 130 pages.

"3rd Generation Partnership Project; Technical Specification Group Radio Access Network; NR; Multiplexing and channel coding (Release 16)", 3GPP TS 38.212 V16.1.0, Mar. 2020, 146 pages.

"3rd Generation Partnership Project; Technical Specification Group Radio Access Network; NR; Physical layer procedures for control (Release 16)" 3GPP TS 38.213 V16.1.0, Mar. 2020, 156 pages.

"3rd Generation Partnership Project; Technical Specification Group Radio Access Network; NR; Physical layer procedures for data (Release 16)", 3GPP TS 38.214 V16.1.0, Mar. 2020, 151 pages.

"5G; NR; Medium Access Control (MAC) protocol specification (3GPP TS 38.321 version 16.1.0 Release 16)", ETSI TS 138 321 V16.1.0, Jul. 2020, 153 pages.

"5G; NR; Radio Resource Control (RRC); Protocol specification (3GPP TS 38.331 version 16.1.0 Release 16)", ETSI TS 138 331 V16.1.0, Jul. 2020, 886 pages.

* cited by examiner

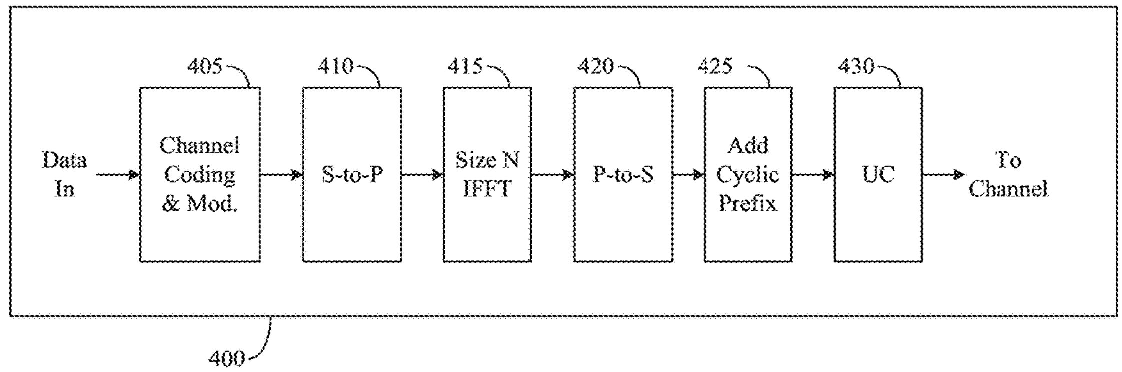
FIG. 4A
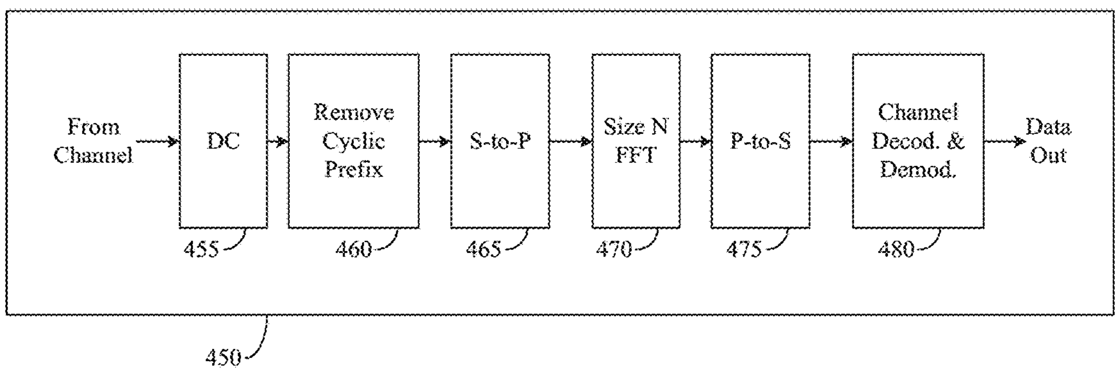
FIG. 4B
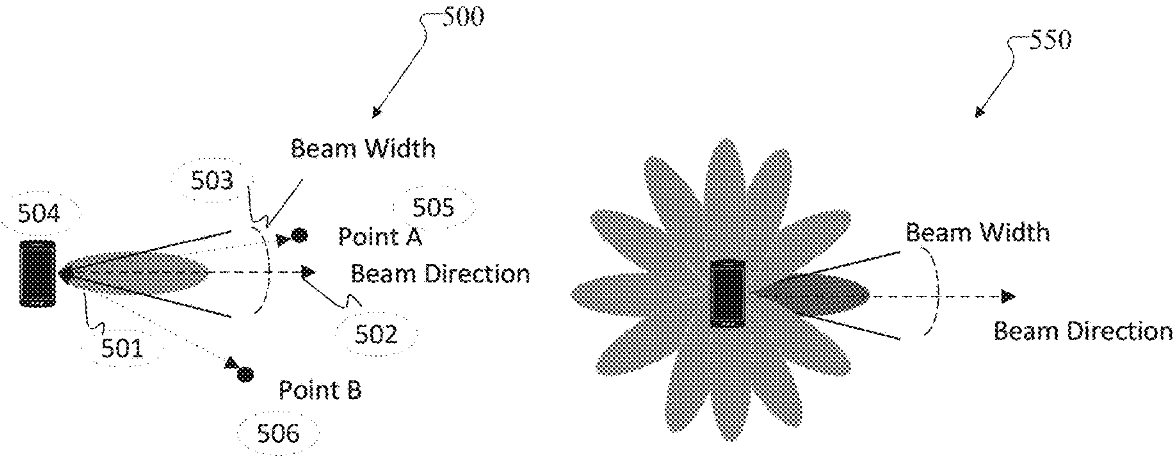
FIG. 5A
FIG. 5B

800

| | | | | | | | | |
|---|---|---|---|---|---|---|---|---|
| R | Serving Cell ID | | | | | DL BWP ID | | Oct 1 |
| R | R | R | R | R | R | UL BWP ID | | Oct 2 |
| $P_1$ | $P_2$ | $P_3$ | $P_4$ | $P_5$ | $P_6$ | $P_7$ | $P_8$ | Oct 3 |
| D/U | TCI state ID 1 | | | | | | | Oct 4 |
| D/U | TCI state ID 2 | | | | | | | Oct 5 |
| ... | | | | | | | | |
| D/U | TCI state ID N | | | | | | | Oct N+3 |

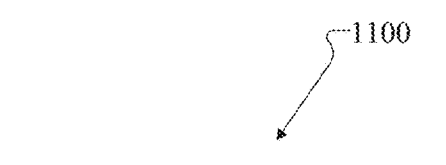
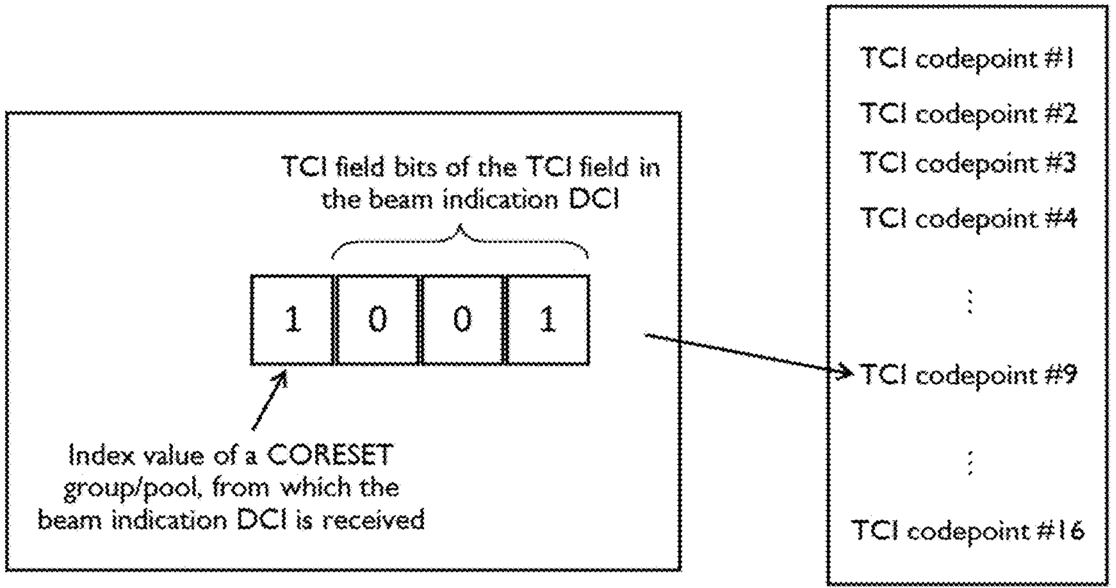
DCI field bits '1001' is used to indicate, e.g., TCI codepoint #9 from the MAC CE activated TCI codepoints, in the beam indication DCI
FIG. 11

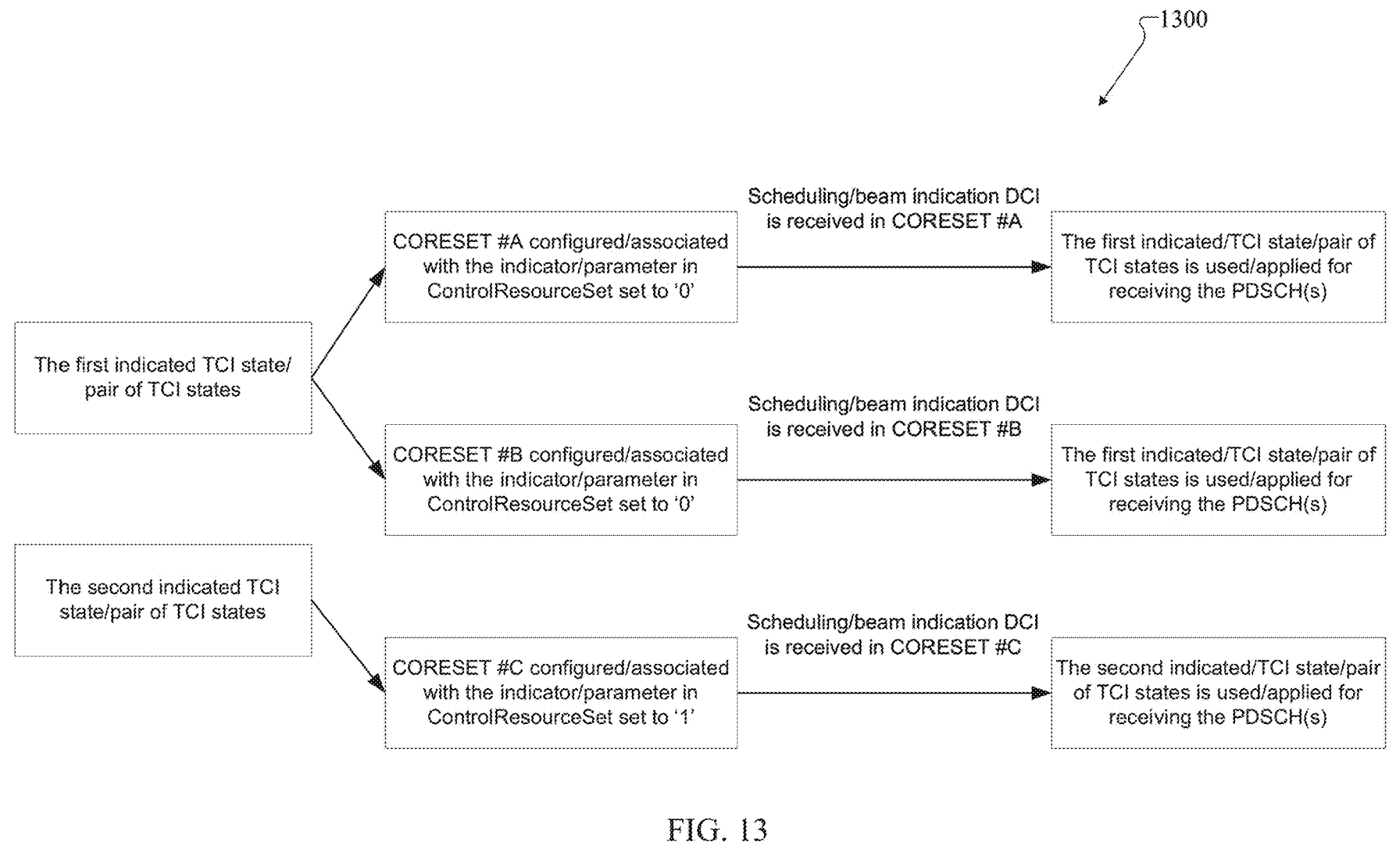

1300

The first indicated TCI state/pair of TCI states

The second indicated TCI state/pair of TCI states

CORESET #A configured/associated with the indicator/parameter in ControlResourceSet set to '0'

CORESET #B configured/associated with the indicator/parameter in ControlResourceSet set to '0'

CORESET #C configured/associated with the indicator/parameter in ControlResourceSet set to '1'

Scheduling/beam indication DCI is received in CORESET #A

Scheduling/beam indication DCI is received in CORESET #B

Scheduling/beam indication DCI is received in CORESET #C

The first indicated/TCI state/pair of TCI states is used/applied for receiving the PDSCH(s)

The first indicated/TCI state/pair of TCI states is used/applied for receiving the PDSCH(s)

The second indicated/TCI state/pair of TCI states is used/applied for receiving the PDSCH(s)

FIG. 13

METHOD AND APPARATUS FOR SIGNALING TCI STATES

CROSS-REFERENCE TO RELATED AND CLAIM OF PRIORITY

The present application claims priority under 35 U.S.C. § 119(e) to U.S. Provisional Patent Application No. 63/405,704 filed on Sep. 12, 2022; U.S. Provisional Patent Application No. 63/411,464 filed on Sep. 29, 2022; U.S. Provisional Patent Application No. 63/415,158 filed on Oct. 11, 2022; U.S. Provisional Patent Application No. 63/415,887 filed on Oct. 13, 2022; U.S. Provisional Patent Application No. 63/416,791 filed on Oct. 17, 2022; U.S. Provisional Patent Application No. 63/418,864 filed on Oct. 24, 2022; U.S. Provisional Patent Application No. 63/421,016 filed on Oct. 31, 2022; and U.S. Provisional Patent Application No. 63/452,327 filed on Mar. 15, 2023, which are hereby incorporated by reference in their entirety.

TECHNICAL FIELD

The present disclosure relates generally to wireless communication systems and, more specifically, the present disclosure relates to methods and apparatuses for signaling transmission configuration indication (TCI) states.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance. To meet the demand for wireless data traffic having increased since deployment of 4G communication systems, and to enable various vertical applications, 5G communication systems have been developed and are currently being deployed.

SUMMARY

The present disclosure relates to methods and apparatuses for signaling TCI states.

In an embodiment, a user equipment (UE) is provided. The UE includes a transceiver configured to receive, in a first radio resource control (RRC) signaling, a list of TCI states comprising first and second groups of TCI states; receive, in a medium access control (MAC) control element (CE), one or more sets of TCI states each set associated with a first indicator and mapped to a respective TCI codepoint of a TCI field in a downlink control information (DCI); and receive, in the DCI, a TCI codepoint indicating a set of one or more first indicated TCI states or one or more second indicated TCI states. The UE further includes a processor operably coupled with the transceiver. The processor is configured to identify, based on the first RRC signaling, the first and second groups of TCI states; and identify, based on the TCI codepoint in the DCI, a set of one or more first and second applicable TCI states. The transceiver is further configured to transmit or receive a signal based on an applicable TCI state from the identified set of one or more first and second applicable TCI states.

In another embodiment, a base station is provided. The base station includes a transceiver configured to transmit, in a first RRC signaling, a list of TCI states comprising first and second groups of TCI states; transmit, in a MAC CE, one or more sets of TCI states each set associated with a first indicator and mapped to a respective TCI codepoint of a TCI field in a DCI; and transmit, in the DCI, a TCI codepoint indicating a set of one or more first indicated TCI states or one or more second indicated TCI states. The base station further includes a processor operably coupled with the transceiver. The processor is configured to identify, based on the TCI codepoint in the DCI, a set of one or more first and second applicable TCI states. The transceiver is further configured to transmit or receive a signal based on an applicable TCI state from the identified set of one or more first and second applicable TCI states.

In yet another embodiment, a method performed by a UE is provided. The method includes receiving, in a first RRC signaling, a list of TCI states comprising first and second groups of TCI states; receiving, in a MAC CE, one or more sets of TCI states each set associated with a first indicator and mapped to a respective TCI codepoint of a TCI field in a DCI; and receiving, in the DCI, a TCI codepoint indicating a set of one or more first indicated TCI states or one or more second indicated TCI states. The method further includes identifying, based on the first RRC signaling, the first and second groups of TCI states; identifying, based on the TCI codepoint in the DCI, a set of one or more first and second applicable TCI states; and transmitting or receiving a signal based on an applicable TCI state from the identified set of one or more first and second applicable TCI states.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms “application” and “program” refer to one or more computer programs, software components, sets of instructions, procedures, functions, objects, classes, instances, related data, or a portion thereof adapted for implementation in a suitable computer readable program code. The phrase “computer readable program code” includes any type of computer code, including source code, object code, and executable code. The phrase “computer readable medium” includes any type of medium capable of being accessed by a computer, such as read only memory (ROM), random access memory (RAM), a hard disk drive, a compact disc (CD), a digital video disc (DVD), or any other type of memory. A “non-transitory” computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 4A and 4B illustrate an example of a wireless transmit and receive paths according to embodiments of the present disclosure;

FIG. 5A illustrates an example of a wireless system according to embodiments of the present disclosure;

FIG. 5B illustrates an example of a multi-beam operation according to embodiments of the present disclosure;

FIG. 11 illustrates an example of mapping TCI field bits in a beam indication DCI to TCI codepoints activated by a MAC CE according to embodiments of the present disclosure;

FIG. 13 illustrates an example flow diagram for determining which of the indicated TCI state(s) to use for physical downlink shared control channel (PDSCH) reception(s) according to embodiments of the present disclosure;

DETAILED DESCRIPTION

FIGS. 1-19, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, and to enable various vertical applications, 5G/NR communication systems have been developed and are currently being deployed. The 5G/NR communication system is implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G, or even later releases which may use terahertz (THz) bands.

The following documents and standards descriptions are hereby incorporated by reference into the present disclosure as if fully set forth herein: [1] 3GPP TS 38.211 v16.1.0, "NR; Physical channels and modulation;" [2] 3GPP TS 38.212 v16.1.0, "NR; Multiplexing and Channel coding;" [3] 3GPP TS 38.213 v16.1.0, "NR; Physical Layer Procedures for Control;" [4] 3GPP TS 38.214 v16.1.0, "NR; Physical Layer Procedures for Data;" [5] 3GPP TS 38.321 v16.1.0, "NR; Medium Access Control (MAC) protocol specification;" and [6] 3GPP TS 38.331 v16.1.0, "NR; Radio Resource Control (RRC) Protocol Specification."

Figure 1:
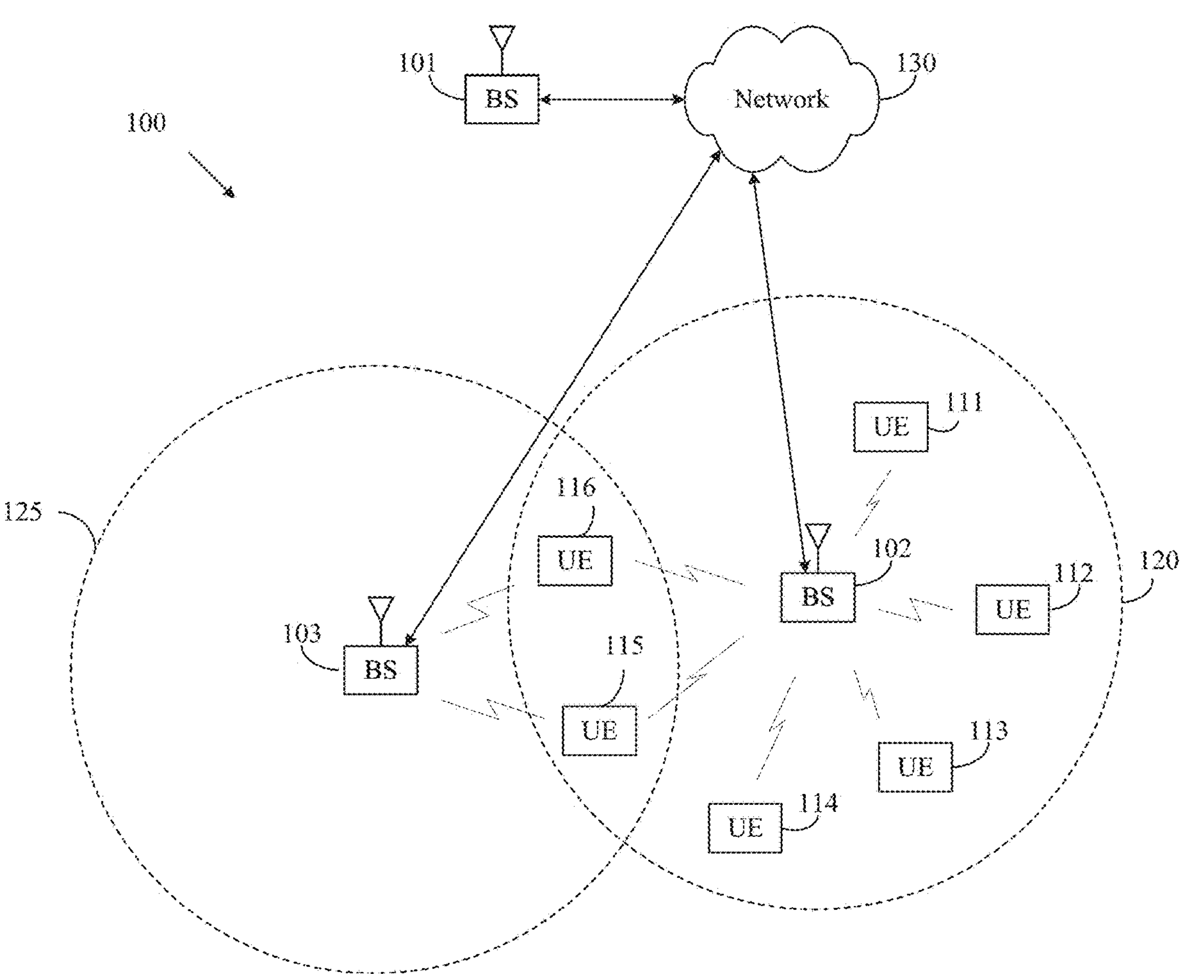
FIG. 1 illustrates an example wireless network according to embodiments of the present disclosure.
Figure 2:
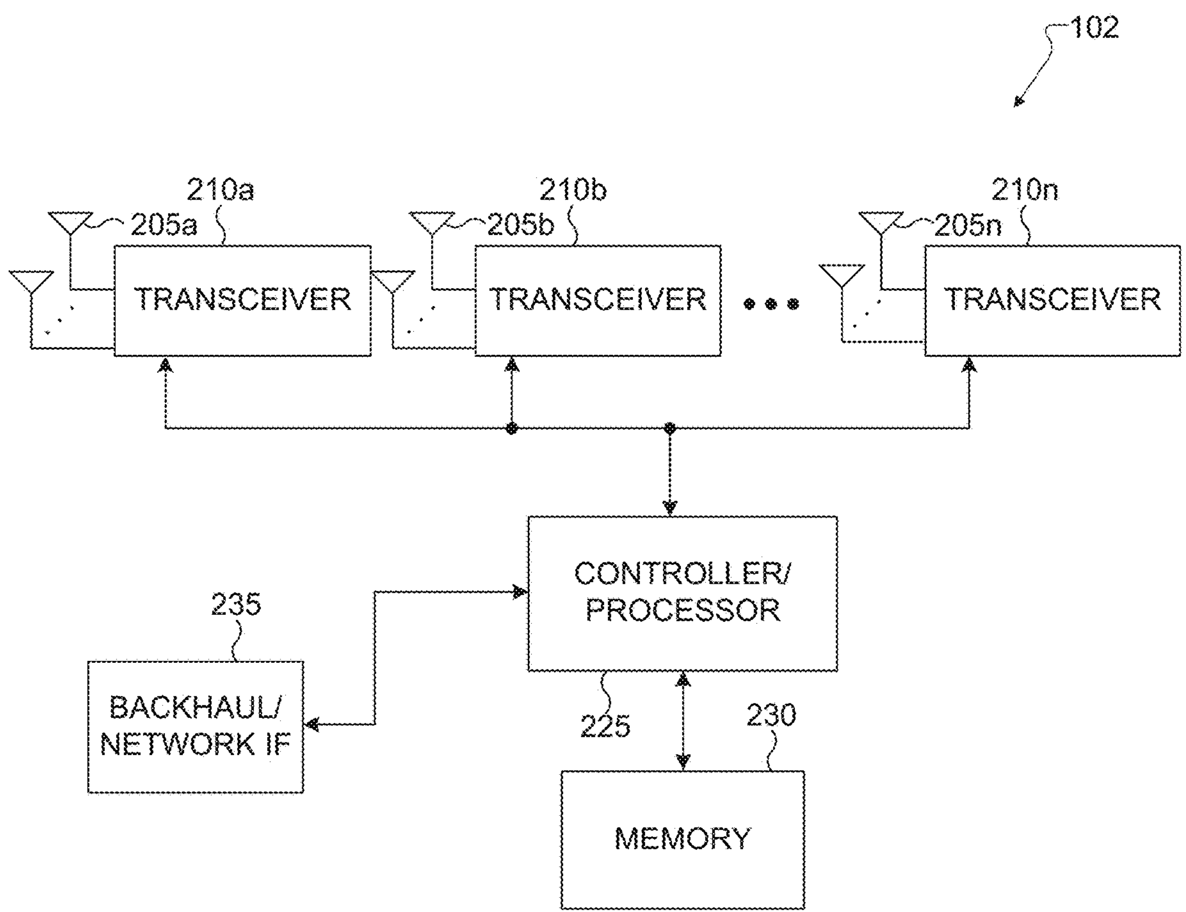
FIG. 2 illustrates an example gNodeB (gNB) according to embodiments of the present disclosure.
Figure 3:
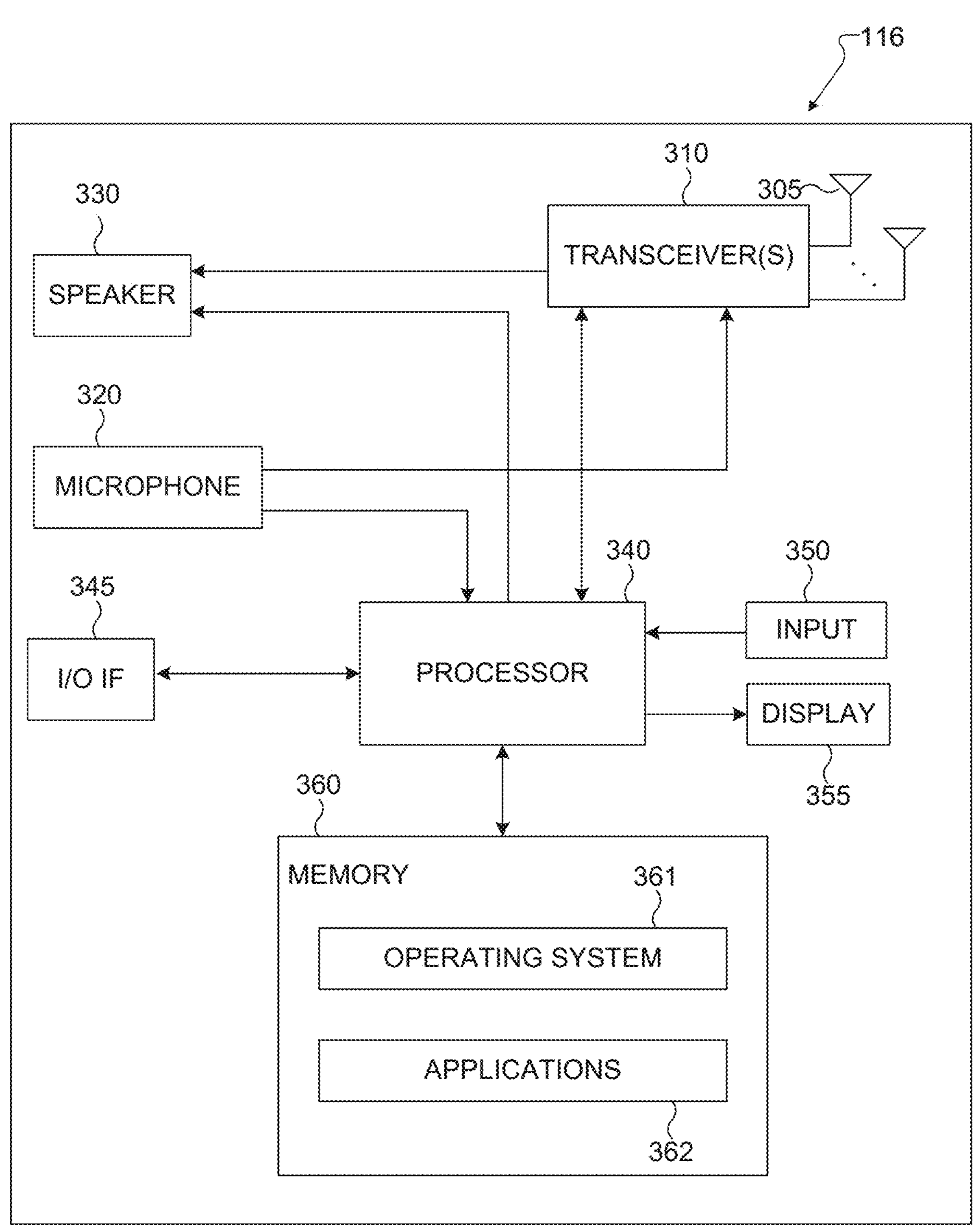
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to how different embodiments may be implemented. Different embodiments of the present disclosure may be implemented in any suitably arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

The dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for utilizing signaling of TCI states. In certain embodiments, one or more of the BSs 101-103 include circuitry, programing, or a combination thereof to support signaling of TCI states.

Although FIG. 1 illustrates one example of a wireless network, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming radio frequency (RF) signals, such as signals transmitted by UEs in the wireless network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of uplink (UL) channel signals and the transmission of downlink (DL) channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. As another example, the controller/processor 225 could support methods for signaling of TCI states. Any of a wide variety of other functions could be supported in the gNB 102 by the controller/processor 225.

The controller/processor 225 is also capable of executing programs and other processes resident in the memory 230, such as signaling of TCI states. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna(s) 305, an incoming RF signal transmitted by a gNB of the wireless network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. For example, the processor 340 may execute processes for utilizing signaling of TCI states as described in embodiments of the present disclosure. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes, for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

FIG. 4A and FIG. 4B illustrate an example of wireless transmit and receive paths 400 and 450, respectively, according to embodiments of the present disclosure. For example, a transmit path 400 may be described as being implemented in a gNB (such as gNB 102), while a receive path 450 may be described as being implemented in a UE (such as UE 116). However, it will be understood that the receive path 450 can be implemented in a gNB and that the transmit path 400 can be implemented in a UE. In some embodiments, the transmit path 400 is configured to support signaling of TCI states as described in embodiments of the present disclosure.

As illustrated in FIG. 4A, the transmit path 400 includes a channel coding and modulation block 205, a serial-to-parallel (S-to-P) block 410, a size N Inverse Fast Fourier Transform (IFFT) block 415, a parallel-to-serial (P-to-S) block 420, an add cyclic prefix block 425, and an up-converter (UC) 430. The receive path 250 includes a down-converter (DC) 455, a remove cyclic prefix block 460, a S-to-P block 465, a size N Fast Fourier Transform (FFT) block 470, a parallel-to-serial (P-to-S) block 475, and a channel decoding and demodulation block 480.

In the transmit path 400, the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to a RF frequency for transmission via a wireless channel. The signal may also be filtered at a baseband before conversion to the RF frequency.

As illustrated in FIG. 4B, the down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time-domain signals. The size N FFT block 470 performs an FFT algorithm to generate N parallel frequency-domain signals. The (P-to-S) block 475 converts the parallel frequency-domain signals to a sequence of modulated data symbols. The channel decoding and demodulation block 480 demodulates and decodes the modulated symbols to recover the original input data stream.

Each of the gNBs 101-103 may implement a transmit path 400 that is analogous to transmitting in the downlink to UEs 111-116 and may implement a receive path 450 that is analogous to receiving in the uplink from UEs 111-116. Similarly, each of UEs 111-116 may implement a transmit path 400 for transmitting in the uplink to gNBs 101-103 and may implement a receive path 450 for receiving in the downlink from gNBs 101-103.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 4A and 4B illustrate examples of wireless transmit and receive paths 400 and 450, respectively, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

As illustrated in FIG. 5A, in a wireless system 500, a beam 501 for a device 504 can be characterized by a beam direction 502 and a beam width 503. For example, the device 504 (or UE 116) transmits RF energy in a beam direction and within a beam width. The device 504 receives RF energy in a beam direction and within a beam width. As illustrated in FIG. 5A, a device at point A 505 can receive from and transmit to device 504 as Point A is within a beam width and direction of a beam from device 504. As illustrated in FIG. 5A, a device at point B 506 cannot receive from and transmit to device 504 as Point B 506 is outside a beam width and direction of a beam from device 504. While FIG. 5A, for illustrative purposes, shows a beam in 2-dimensions (2D), it should be apparent to those skilled in the art, that a beam can be in 3-dimensions (3D), where the beam direction and beam width are defined in space.

FIG. 5B illustrates an example of a multi-beam operation 550 according to embodiments of the present disclosure. For example, the multi-beam operation 550 can be utilized by UE 116 of FIG. 3. This example is for illustration only and other embodiments can be used without departing from the scope of the present disclosure.

In a wireless system, a device can transmit and/or receive on multiple beams. This is known as “multi-beam operation”. While FIG. 5B, for illustrative purposes, a beam is in 2D, it should be apparent to those skilled in the art, that a beam can be 3D, where a beam can be transmitted to or received from any direction in space.

Figure 6:
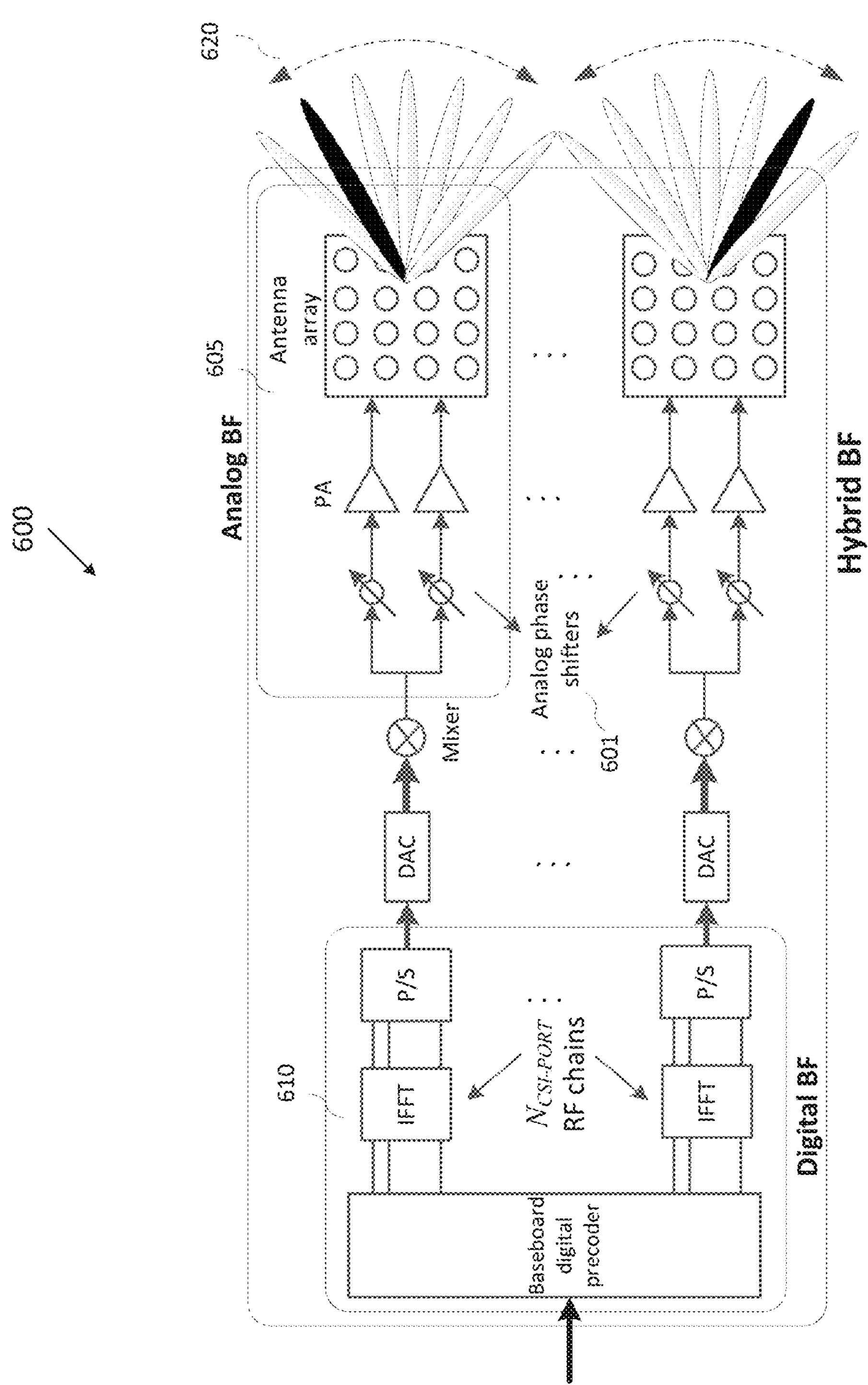
FIG. 6 illustrates an example of a transmitter structure for beamforming according to embodiments of the present disclosure.

FIG. 6 illustrates an example of a transmitter structure 600 for beamforming according to embodiments of the present disclosure. In certain embodiments, one or more of gNB 102 or UE 116 includes the transmitter structure 600. For example, one or more of antenna 205 and its associated systems or antenna 305 and its associated systems can be included in transmitter structure 600. This example is for illustration only and other embodiments can be used without departing from the scope of the present disclosure.

Accordingly, embodiments of the present disclosure recognize that Rel-14 LTE and Rel-15 NR support up to 32 channel state information reference signal (CSI-RS) antenna ports which enable an eNB or a gNB to be equipped with a large number of antenna elements (such as 64 or 128). A plurality of antenna elements can then be mapped onto one CSI-RS port. For mmWave bands, although a number of antenna elements can be larger for a given form factor, a number of CSI-RS ports, that can correspond to the number of digitally precoded ports, can be limited due to hardware constraints (such as the feasibility to install a large number of analog-to-digital converters (ADCs)/digital-to-analog converters (DACs) at mmWave frequencies) as illustrated in FIG. 6. Then, one CSI-RS port can be mapped onto a large number of antenna elements that can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or slots/subframes. The number of sub-arrays (equal to the number of RF chains) is the same as the number of CSI-RS ports $N_{CSI\text{-}PORT}$. A digital beamforming unit 610 performs a linear combination across $N_{CSI\text{-}PORT}$ analog beams to further increase a precoding gain. While analog beams are wideband (hence not frequency-selective), digital precoding can be varied across frequency sub-bands or resource blocks. Receiver operation can be conceived analogously.

Since the transmitter structure 600 of FIG. 6 utilizes multiple analog beams for transmission and reception (wherein one or a small number of analog beams are selected out of a large number, for instance, after a training duration that is occasionally or periodically performed), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting", respectively), and receiving a DL or UL transmission via a selection of a corresponding RX beam. The system of FIG. 6 is also applicable to higher frequency bands such as >52.6 GHz (also termed frequency range 4 or FR4). In this case, the system can employ only analog beams. Due to the O2 absorption loss around 60 GHz frequency (~10 dB additional loss per 100 m distance), a larger number and narrower analog beams (hence a larger number of radiators in the array) are needed to compensate for the additional path loss.

The text and figures are provided solely as examples to aid the reader in understanding the present disclosure. They are not intended and are not to be construed as limiting the scope of the present disclosure in any manner. Although certain embodiments and examples have been provided, it will be apparent to those skilled in the art based on the disclosures herein that changes in the embodiments and examples shown may be made without departing from the scope of the present disclosure. The transmitter structure 600 for beamforming is for illustration only and other embodiments can be used without departing from the scope of the present disclosure.

Figures 7, 8:
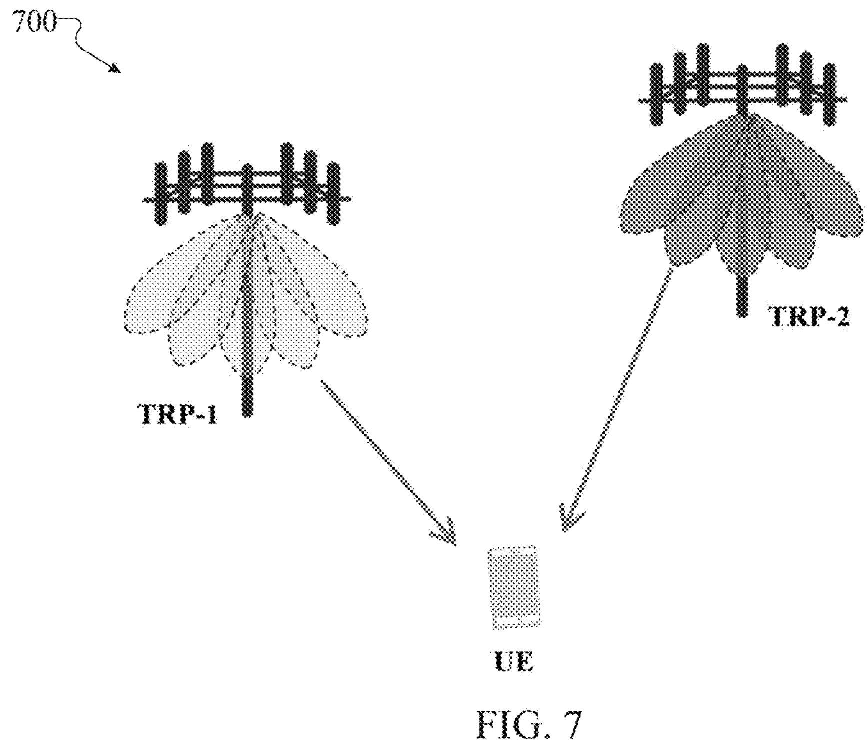
FIG. 7 illustrates an example of a multiple transmission and reception point (TRP) system according to embodiments of the present disclosure.
FIG. 8 illustrates an example of a unified TCI state activation/deactivation medium access control (MAC) control element (CE) according to embodiments of the present disclosure.

FIG. 7 illustrates an example of a multiple TRP system 700 according to embodiments of the present disclosure. For example, system 700 can be utilized by the gNB 102 of FIG. 2 and, more particularly, the multiple antennas 205*a*-205*n*. This example is for illustration only and other embodiments can be used without departing from the scope of the present disclosure.

With reference to FIG. 7, a UE could simultaneously receive from multiple physically non-co-located TRPs various channels/RSs such PDCCHs and/or PDSCHs using either a single receive (RX) panel or multiple RX panels. In the present disclosure, a RX panel could correspond to a set of RX antenna elements/ports at the UE, a set of measurement RS resources such as SRS resources, a spatial domain RX filter, etc. Further, a TRP in the multi-TRP system can represent a collection of measurement antenna ports, measurement RS resources, and/or control resource sets (CORESETs). For example, a TRP could be associated with one or more of:

A plurality of CSI-RS resources.

A plurality of CSI Reference Signal Resource Indicator (CRIs) (CSI-RS resource indices/indicators).

A measurement RS resource set, for example, a CSI-RS resource set along with its indicator.

A plurality of CORESETs associated with a CORESETPoolIndex.

A plurality of CORESETs associated with a TRP-specific index/indicator/identity.

A cell/TRP in an inter-cell system (e.g., an inter-cell multi-TRP system) could be a non-serving cell/TRP. In the present disclosure, the non-serving cell(s) or the non-serving cell TRP(s) could have/broadcast different physical cell IDs (PCIs) and/or other higher layer signaling index values from that of the serving cell or the serving cell TRP (i.e., the serving cell PCI).

In one example, the serving cell or the serving cell TRP could be associated with the serving cell ID (SCI) and/or the serving cell PCI. That is, in an inter-cell system, different cells/TRPs could broadcast different PCIs, and/or one or more cells/TRPs (referred to/defined as non-serving cells/TRPs in the present disclosure) could broadcast different PCIs from that of the serving cell/TRP (i.e., the serving cell PCI), and/or one or more cells/TRPs are not associated with valid SCI (e.g., provided by the higher layer parameter ServCellIndex). In the present disclosure, a non-serving cell PCI can also be referred to as an additional PCI, another PCI, or a different PCI (with respect to the serving cell PCI).

Embodiments of the present disclosure recognize that in Rel. 17, a unified transmission configuration indication (TCI) framework is specified for single-TRP operation, wherein a common beam could be indicated for all UE-dedicated control and/or data channels. To extend the Rel. 17 unified TCI framework to the multi-TRP operation, various design aspects such as means of signaling TCI state(s) in a downlink control information (DCI) format (e.g., DCI format 1_1 or 1_2 with or without DL assignment) to indicate beams for multiple TRPs need to be specified.

Embodiments of the present disclosure evaluate various design aspects related to DCI based beam/TCI state indication/update (with medium access control (MAC) control element (CE) based TCI state(s) activation, wherever applicable/needed) for multi-TRP operation. In particular, detailed methods of signaling one or more TCI states in DCI format 1_1 or 1_2 with or without DL assignment, and their association with different TRPs in a multi-TRP system, are specified/provided in the present disclosure. Throughout the present disclosure, a TCI state codepoint (e.g., in a DCI) is equivalent to/same as a TCI codepoint (e.g., in a DCI), and they can be used interchangeably. Furthermore, throughout the present disclosure, a TCI field (e.g., in a DCI) is equivalent to/same as a TCI state field (e.g., in a DCI), and they can be used interchangeably.

As described in U.S. patent application Ser. No. 17/584,239 filed Jan. 25, 2022 (the '239 Application), which is incorporated by reference into the present disclosure, a unified TCI framework could indicate/include N≥1 DL TCI states and/or M≥1 UL TCI states, wherein the indicated TCI state could be at least one of:

A DL TCI state and/or its corresponding/associated TCI state ID.

An UL TCI state and/or its corresponding/associated TCI state ID.

A joint DL and UL TCI state and/or its corresponding/associated TCI state ID.

Separate DL TCI state and UL TCI state and/or their corresponding/associated TCI state ID(s).

There could be various design options/channels to indicate to the UE 116 a beam (i.e., a TCI state) for the transmission/reception of a PDCCH or a PDSCH, as described the '239 Application.

In one example, a MAC CE could be used to indicate to the UE 116 a beam (i.e., a TCI state and/or a TCI state ID) for the transmission/reception of a PDCCH or a PDSCH.

In another example, a DCI could be used to indicate to the UE 116 a beam (i.e., a TCI state and/or a TCI state ID) for the transmission/reception of a PDCCH or a PDSCH.

For example, a DL related DCI (e.g., DCI format 1_0, DCI format 1_1, or DCI format 1_2) could be used to indicate to the UE 116 a beam (i.e., a TCI state and/or a TCI state ID) for the transmission/reception of a PDCCH or a PDSCH, wherein the DL related DCI may or may not include a DL assignment.

For another example, an UL related DCI (e.g., DCI format 0_0, DCI format 0_1, DCI format 0_2) could be used to indicate to the UE 116 a beam (i.e., a TCI state and/or a TCI state ID) for the transmission/reception of a PDCCH or a PDSCH, wherein the UL related DCI may or may not include an UL scheduling grant.

Yet for another example, a custom/purpose designed DCI format could be used to indicate to the UE 116 a beam (i.e., a TCI state and/or a TCI state ID) for the transmission/reception of a PDCCH or a PDSCH.

Embodiments of the present disclosure recognize that Rel-17 introduced the unified TCI framework, where a unified or master or main TCI state is signaled to the UE 116. The unified or master or main TCI state can be one of:

In case of joint TCI state indication, wherein a same beam is used for DL and UL channels, a joint TCI state that can be used at least for UE-dedicated DL channels and UE-dedicated UL channels.

In case of a separate TCI state indication, wherein different beams are used for DL and UL channels, a DL TCI state can be used at least for UE-dedicated DL channels.

In case of a separate TCI state indication, wherein different beams are used for DL and UL channels, a UL TCI state can be used at least for UE-dedicated UL channels.

The unified (master or main) TCI state is a TCI state of UE-dedicated reception on PDSCH/PDCCH or dynamic-grant/configured-grant based physical uplink shared channel (PUSCH) and all dedicated physical uplink control channel (PUCCH) resources.

As discussed herein, a UE could be provided by the network 130, e.g., via MAC CE or DCI (e.g., DCI format 1_1 or 1_2 with or without DL assignment) based signaling via higher layer parameters such as:

DLorJointTCIState or UL-TCIState.

M>1 joint DL and UL TCI states.

M>1 separate UL TCI states.

a first combination of M>1 joint DL and UL TCI states and separate UL TCI states or N>1 separate DL TCI states.

a second combination of N>1 joint DL and UL TCI states and separate DL TCI states.

a third combination of N>1 joint DL and UL TCI states. separate DL TCI states and separate UL Rel. 17 unified TCI for UE-dedicated reception on PDSCH/PDCCH.

dynamic-grant/configured-grant based PUSCH and all dedicated PUCCH resources.

Throughout the present disclosure, the term "configuration" or "higher layer configuration" and variations thereof (such as "configured" and so on) could be used to refer to one or more of: a system information signaling such as by a MIB or a SIB (such as SIB1), a common or cell-specific higher layer/RRC signaling, or a dedicated or UE specific or bandwidth part (BWP)-specific higher layer/RRC signaling.

The UE 116 can be configured with a list of up to M TCI-State configurations within the higher layer parameter PDSCH-Config to decode PDSCH according to a detected PDCCH with DCI intended for the UE 116 and the given serving cell, where M depends on the UE 116 capability maxNumberConfiguredTCIstatesPerCC. Each TCI-State contains parameters for configuring a quasi co-location (QCL) relationship between one or two downlink reference signals and the DM-RS ports of the PDSCH, the DM-RS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:

'typeA': {Doppler shift, Doppler spread, average delay, delay spread}.

'typeB': {Doppler shift, Doppler spread}.

'typeC': {Doppler shift, average delay}.

'typeD': {Spatial Rx parameter}.

The UE 116 can be configured with a list of up to 128 DLorJointTCIState configurations within the higher layer parameter PDSCH-Config for providing a reference signal for the quasi co-location for DM-RS of PDSCH and DM-RS of PDCCH in a component carrier (CC), for CSI-RS, and to provide a reference, if applicable, for determining UL TX spatial filter for dynamic-grant and configured-grant based PUSCH and PUCCH resource in a CC and SRS.

If the DLorJointTCIState or UL-TCIState configurations are absent in a BWP of the CC, the UE 116 can apply the DLorJointTCIState or UL-TCIState configurations from a reference BWP of a reference CC. The UE 116 is not expected to be configured with TCI-State, SpatialRelationInfo, or PUCCH-SpatialRelationInfo except SpatialRelationInfoPos in a CC in a band if the UE 116 is configured with DLorJointTCIState or UL-TCIState in any CC in the same band. The UE 116 can assume that when the UE 116 is configured with TCI-State in any CC in the CC list configured by simultaneousTCI-UpdateList1-r16, simultaneousTCI-UpdateList2-r16, simultaneousSpatial-UpdatedList1-r16, or simultaneousSpatial-UpdatedList2-r16, the UE 116 is not configured with DLorJointTCIState or UL-TCIState in any CC within the same band in the CC list.

The UE 116 receives an activation command, as described in document and standard [5], used to map up to 8 TCI states and/or pairs of TCI states with one TCI state for DL channels/signals and one TCI state for UL channels/signals to the codepoints of the DCI field 'Transmission Configuration Indication' for one or a set of CCs/DL BWPs, and if applicable, for one or a set of CCs/UL BWPs. When a set of TCI state IDs are activated for a set of CCs/DL BWPs and, if applicable for a set of CCs/UL BWPs where the applicable list of CCs is determined by the indicated CC in the activation command, the same set of TCI state IDs are applied for all DL and/or UL BWPs in the indicated CCs.

FIG. 8 illustrates an example of a unified TCI state activation/deactivation MAC CE 800 according to embodiments of the present disclosure. For example, MAC CE 800 can be received by the gNB 102 in FIG. 2 and, more particularly, by the transceivers 210*a*-210*n*. This example is for illustration only and other embodiments can be used without departing from the scope of the present disclosure.

The Unified TCI States Activation/Deactivation MAC CE is identified by a MAC sub header with extended logical channel ID (eLCID) as specified in document and standard [5]. It has a variable size including the following fields:

Serving Cell ID: This field indicates the identity of the Serving Cell for which the MAC CE applies. The length of the field is 5 bits. If the indicated Serving Cell is configured as part of a simultaneousU-TCI-UpdateList1, simultaneousU-TCI-UpdateList2, simultaneousU-TCI-UpdateList3, or simultaneousU-TCI-UpdateList4 as specified in document and standard [6], this MAC CE applies to all the Serving Cells in the set simultaneousU-TCI-UpdateList1, simultaneousU-TCI-UpdateList2, simultaneousU-TCI-UpdateList3, or simultaneousU-TCI-UpdateList4, respectively;

DL BWP ID: This field indicates a DL BWP for which the MAC CE applies as the codepoint of the DCI bandwidth part indicator field as specified in document and standard [2]. The length of the BWP ID field is 2 bits;

UL BWP ID: This field indicates a UL BWP for which the MAC CE applies as the codepoint of the DCI bandwidth part indicator field as specified in document and standard [2]. The length of the BWP ID field is 2 bits;

$P_i$: This field indicates whether each TCI codepoint has multiple TCI states or single TCI state. If $P_i$ field is set to 1, it indicates that $i^{th}$ TCI codepoint includes the DL TCI state and the UL TCI state. If $P_i$ field is set to 0, it indicates that $i^{th}$ TCI codepoint includes only the DL TCI state or the UL TCI state;

D/U: This field indicates whether the TCI state ID in the same octet is for joint/downlink or uplink TCI state. If this field is set to 1, the TCI state ID in the same octet is for joint/downlink. If this field is set to 0, the TCI state ID in the same octet is for uplink;

TCI state ID: This field indicates the TCI state identified by TCI-StateId as specified in document and standard [6]. If D/U is set to 1, 7-bits length TCI state ID i.e. TCI-StateId as specified in document and standard [6] is used. If D/U is set to 0, the most significant bit of TCI state ID is regarded as the reserved bit and a remainder 6 bits indicate the UL-TCIState-Id as specified in document and standard [6]. The maximum number of activated TCI states is 16;

R: Reserved bit set to 0.

The CellGroupConfig information element (IE) is used to configure a master cell group (MCG) or secondary cell group (SCG). A cell group comprises one MAC entity, a set of logical channels with associated radio link control (RLC) entities, a primary cell (SpCell), and one or more secondary cells (SCells).

Herein is the CellGroupConfig information element:

```
-- ASN1START
-- TAG-CELLGROUPCONFIG-START
-- Configuration of one Cell-Group:
CellGroupConfig ::=                    SEQUENCE {
  cellGroupId                          CellGroupId,
  rlc-BearerToAddModList                 SEQUENCE (SIZE(1..maxLC-ID)) OF RLC-BearerConfig
OPTIONAL, -- Need N
  rlc-BearerToReleaseList                SEQUENCE (SIZE(1..maxLC-ID)) OF LogicalChannelIdentity
OPTIONAL, -- Need N
  mac-CellGroupConfig                    MAC-CellGroupConfig                  OPTIONAL,
-- Need M
  physicalCellGroupConfig                PhysicalCellGroupConfig
OPTIONAL, -- Need M
  spCellConfig                         SpCellConfig                         OPTIONAL, -- Need
M
  sCellToAddModList                      SEQUENCE (SIZE (1..maxNrofSCells)) OF SCellConfig
OPTIONAL, -- Need N
  sCellToReleaseList                    SEQUENCE (SIZE (1..maxNrofSCells)) OF SCellIndex
OPTIONAL, -- Need N
  ...,
  [[
  reportUplinkTxDirectCurrent              ENUMERATED {true}                 OPTIONAL
-- Cond BWP-Reconfig
  ]],
  [[
  bap-Address-r16                       BIT STRING (SIZE (10))               OPTIONAL, -
- Need M
  bh-RLC-ChannelToAddModList-r16      SEQUENCE (SIZE(1..maxBH-RLC-ChannelID-r16)) OF
BH-RLC-ChannelConfig-r16 OPTIONAL, -- Need N
  bh-RLC-ChannelToReleaseList-r16             SEQUENCE (SIZE(1..maxBH-RLC-ChannelID-r16)) OF BH-
RLC-ChannelID-r16   OPTIONAL, -- Need N
  f1c-TransferPath-r16                  ENUMERATED {lte, nr, both}
```

-continued

```
OPTIONAL, -- Need M
  simultaneousTCI-UpdateList1-r16                    SEQUENCE (SIZE (1..maxNrofServingCellsTCI-r16)) OF
ServCellIndex      OPTIONAL, -- Need R
  simultaneousTCI-UpdateList2-r16                    SEQUENCE (SIZE (1..maxNrofServingCellsTCI-r16)) OF
ServCellIndex   OPTIONAL, -- Need R
  simultaneousSpatial-UpdatedList1-r16                SEQUENCE (SIZE (1..maxNrofServingCellsTCI-r16)) OF
ServCellIndex   OPTIONAL, -- Need R
  simultaneousSpatial-UpdatedList2-r16                SEQUENCE (SIZE (1..maxNrofServingCellsTCI-r16)) OF
ServCellIndex   OPTIONAL, -- Need R
  uplinkTxSwitchingOption-r16                       ENUMERATED {switchedUL, dualUL}
OPTIONAL, -- Need R
  uplinkTxSwitchingPowerBoosting-r16                  ENUMERATED {enabled}
OPTIONAL -- Need R
  ]],
  [[
  reportUplinkTxDirectCurrentTwoCarrier-r16 ENUMERATED {true}
OPTIONAL -- Need N
  ]],
  [[
  f1c-TransferPathNRDC-r17                          ENUMERATED {mcg, scg, both}
OPTIONAL, -- Need M
  uplinkTxSwitching-2T-Mode-r17                      ENUMERATED {enabled}
OPTIONAL, -- Cond 2Tx
  uplinkTxSwitching-DualUL-TxState-r17                 ENUMERATED {oneT, twoT}
OPTIONAL, -- Cond 2Tx
  uu-RelayRLC-ChannelToAddModList-r17                  SEQUENCE (SIZE(1..maxUu-RelayRLC-ChannelID-r17))
OF Uu-RelayRLC-ChannelConfig-r17
                                                              OPTIONAL, -- Need N
  uu-RelayRLC-ChannelToReleaseList-r17                SEQUENCE (SIZE(1..maxUu-RelayRLC-ChannelID-r17))
OF Uu-RelayRLC-ChannelID-r17
                                                              OPTIONAL, -- Need N
  simultaneousU-TCI-UpdateList1-r17                   SEQUENCE (SIZE (1..maxNrofServingCellsTCI-r16)) OF
ServCellIndex   OPTIONAL, -- Need R
  simultaneousU-TCI-UpdateList2-r17                   SEQUENCE (SIZE (1..maxNrofServingCellsTCI-r16)) OF
ServCellIndex   OPTIONAL, -- Need R
  simultaneousU-TCI-UpdateList3-r17                   SEQUENCE (SIZE (1..maxNrofServingCellsTCI-r16)) OF
ServCellIndex   OPTIONAL, -- Need R
  simultaneousU-TCI-UpdateList4-r17                   SEQUENCE (SIZE (1..maxNrofServingCellsTCI-r16)) OF
ServCellIndex   OPTIONAL, -- Need R
  rlc-BearerToReleaseListExt-r17                    SEQUENCE (SIZE(1..maxLC-ID)) OF
LogicalChannelIdentityExt-r17                  OPTIONAL, -- Need N
  iab-ResourceConfigToAddModList-r17 SEQUENCE (SIZE(1..maxNrofIABResourceConfig-r17)) OF
IAB-ResourceConfig-r17   OPTIONAL, -- Need N
  iab-ResourceConfigToReleaseList-r17 SEQUENCE (SIZE(1..maxNrofIABResourceConfig-r17)) OF IAB-
ResourceConfigID-r17 OPTIONAL -- Need N
  ]]
}
```

Lists of serving cells that can be updated simultaneously for TCI relation with a MAC CE are simultaneousTCI-UpdateList1 and simultaneousTCI-UpdateList2. The simultaneousTCI-UpdateList1 and simultaneousTCI-UpdateList2 shall not contain the same serving cells. The network 130 should not configure serving cells that are configured with a BWP with two different values for the coresetPoolIndex in these lists.

Lists of serving cells for which the Unified TCI States Activation/Deactivation MAC CE applies simultaneously are simultaneousU-TCI-UpdateList1, simultaneousU-TCI-UpdateList2, simultaneousU-TCI-UpdateList3, and simultaneousU-TCI-UpdateList4, as specified in document and standard [5]. The different lists shall not contain the same serving cells. Network only configures in these lists serving cells that are configured with unifiedtci-StateType.

When the bwp-id or cell for QCL-TypeA/D source RS in a QCL-Info of the TCI state configured with DLorJointTCIState is not configured, the UE 116 assumes that QCL-TypeA/D source RS is configured in the CC/DL BWP where TCI state applies.

When tci-PresentInDCI is set as 'enabled' or tci-PresentDCI-1-2 is configured for the CORESET, the UE 116 with activated DLorJointTCIState or UL-TCIState receives DCI format 1_1/1_2 providing indicated DLorJointTCIState or UL-TCIState for a CC or all CCs in the same CC list configured by simultaneousTCI-UpdateList1-r17, simultaneousTCI-UpdateList2-r17, simultaneousTCI-UpdateList3-r17, and/or simultaneousTCI-UpdateList4-r17. The DCI format 1_1/1_2 can be with or without, if applicable, DL assignment. If the DCI format 1_1/1_2/ is without DL assignment, the UE 116 can assume the following:

- CS-RNTI is used to scramble the CRC for the DCI
- The values of the following DCI fields are set as follows:
  - RV=all '1's
  - MCS=all '1's
  - NDI=0
  - Set to all '0's for FDRA Type 0, all '1's for FDRA Type 1, or all '0's for dynamicSwitch (same as in document and standard [3])

After a UE receives an initial higher layer configuration of more than one DLorJoint-TCIState and before application of an indicated TCI state from the configured TCI states, the UE 116 assumes that DM-RS of PDSCH and DM-RS of PDCCH and the CSI-RS applying the indicated TCI state are quasi co-located with the SS/PBCH block the UE 116 identified during the initial access procedure.

After a UE receives an initial higher layer configuration of more than one DLorJoint-TCIState or UL-TCIState and before application of an indicated TCI state from the configured TCI states, the UE 116 assumes that the UL TX spatial filter, if applicable, for dynamic-grant and configured-grant based PUSCH and PUCCH, and for SRS applying the indicated TCI state, is the same as that for a PUSCH transmission scheduled by a random access response (RAR) UL grant during the initial access procedure.

After a UE receives a higher layer configuration of more than one DLorJoint-TCIState as part of a Reconfiguration with sync procedure as described in document and standard [6] and before applying an indicated TCI state from the configured TCI states, the UE 116 assumes that DM-RS of PDSCH and DM-RS of PDCCH, and the CSI-RS applying the indicated TCI state are quasi co-located with the SS/PBCH block or the CSI-RS resource the UE 116 identified during the random access procedure initiated by the reconfiguration with sync procedure as described in document and standard [6].

After a UE receives a higher layer configuration of more than one DLorJoint-TCIState or UL-TCIState as part of a Reconfiguration with sync procedure as described in document and standard [6] and before applying an indicated TCI state from the configured TCI states, the UE 116 assumes that the UL TX spatial filter, if applicable, for dynamic-grant and configured-grant based PUSCH and PUCCH, and for SRS applying the indicated TCI state, is the same as that for a PUSCH transmission scheduled by a RAR UL grant during random access procedure initiated by the Reconfiguration with sync procedure as described in document and standard [6].

If a UE receives a higher layer configuration of a single DLorJoint-TCIState that can be used as an indicated TCI state, the UE 116 obtains the QCL assumptions from the configured TCI state for DM-RS of PDSCH, DM-RS of PDCCH, and the CSI-RS applying the indicated TCI state.

If a UE receives a higher layer configuration of a single DLorJoint-TCIState or UL-TCIState, that can be used as an indicated TCI state, the UE 116 determines an UL TX spatial filter, if applicable, from the configured TCI state for dynamic-grant, configured-grant based PUSCH and PUCCH, and SRS applying the indicated TCI state.

When the UE 116 would transmit the last symbol of a PUCCH with HARQ-ACK information corresponding to the DCI carrying the TCI State indication and without DL assignment or corresponding to the PDSCH scheduling by the DCI carrying the TCI State indication, and if the indicated TCI State is different from the previously indicated one, the indicated DLorJointTCIState or UL-TCIstate should be applied starting from the first slot that is at least BeamAppTime_r17 symbols after the last symbol of the PUCCH. The first slot and the BeamAppTime_r17 symbols are both determined on the carrier with the smallest SCS among the carrier(s) applying the beam indication.

If a UE is configured with pdsch-TimeDomainAllocationListForMultiPDSCH-r17 in which one or more rows contain multiple SLIVs for PDSCH on a DL BWP of a serving cell, and the UE 116 is receiving a DCI carrying the TCI-State indication and without DL assignment, the UE 116 does not expect that the number of indicated SLIVs in the row of the pdsch-TimeDomainAllocationListForMultiPDSCH-r17 by the DCI is more than one.

If the UE 116 is configured with NumberOfAdditionalPCI and with PDCCH-Config that contains two different values of coresetPoolIndex in ControlResourceSet, the UE 116 receives an activation command for CORESET associated with each coresetPoolIndex, as described in document and standard [5] used to map up to 8 TCI states to the codepoints of the DCI field 'Transmission Configuration Indication' in one CC/DL BWP. When a set of TCI state IDs are activated for a coresetPoolIndex, the activated TCI states corresponding to one coresetPoolIndex can be associated with one physical cell ID and activated TCI states corresponding to another coresetPoolIndex can be associated with another physical cell ID.

When a UE supports two TCI states in a codepoint of the DCI field 'Transmission Configuration Indication' the UE 116 may receive an activation command, as described in document and standard [5], the activation command is used to map up to 8 combinations of one or two TCI states to the codepoints of the DCI field 'Transmission Configuration Indication'. The UE 116 is not expected to receive more than 8 TCI states in the activation command.

When the DCI field 'Transmission Configuration Indication' is present in DCI format 1_2 and when the number of codepoints S in the DCI field 'Transmission Configuration Indication' of DCI format 1_2 is smaller than the number of TCI codepoints that are activated by the activation command, as described in document and standard [5], only the first S activated codepoints are applied for DCI format 1_2.

When the UE 116 would transmit a PUCCH with HARQ-ACK information in slot n corresponding to the PDSCH carrying the activation command, the indicated mapping between TCI states and codepoints of the DCI field 'Transmission Configuration Indication' should be applied starting from the first slot that is after $$\text{slot } n+3N_{slot}^{subframe,\mu}+\frac{2^{\mu}}{2^{\mu_{K_{mac}}}}\cdot k_{mac}$$

where m is the SCS configuration for the PUCCH and $\mu_{K_{mac}}$ is the subcarrier spacing configuration for $k_{mac}$ with a value of 0 for frequency range 1. $k_{mac}$ is provided by K-Mac or $k_{mac}=0$ if K-Mac is not provided. If tci-PresentInDCI is set to 'enabled' or tci-PresentDCI-1-2 is configured for the CORESET scheduling the PDSCH, and the time offset between the reception of the DL DCI and the corresponding PDSCH is equal to or greater than timeDurationForQCL if applicable, after a UE receives an initial higher layer configuration of TCI states and before reception of the activation command, the UE 116 may assume that the DM-RS ports of PDSCH of a serving cell are quasi co-located with the SS/PBCH block determined in the initial access procedure with respect to qcl-Type set to 'typeA', and when applicable, also with respect to qcl-Type set to 'typeD'.

If a UE is configured with the higher layer parameter tci-PresentInDCI that is set as 'enabled' for the CORESET scheduling a PDSCH, the UE 116 assumes that the TCI field is present in the DCI format 1_1 of the PDCCH transmitted on the CORESET. If a UE is configured with the higher layer parameter tci-PresentDCI-1-2 for the CORESET scheduling the PDSCH, the UE 116 assumes that the TCI field with a DCI field size indicated by tci-PresentDCI-1-2 is present in the DCI format 1_2 of the PDCCH transmitted on the CORESET. If the PDSCH is scheduled by a DCI format not having the TCI field present, and the time offset between the reception of the DL DCI and the corresponding PDSCH of a serving cell is equal to or greater than a threshold timeDurationForQCL if applicable, where the threshold is based on reported UE capability [13, TS 38.306] for determining PDSCH antenna port quasi co-location, the UE 116 assumes that the TCI state or the QCL assumption for the PDSCH is identical to the TCI state or QCL assumption whichever is applied for the CORESET used for the PDCCH transmission within the active BWP of the serving cell.

When a UE is configured with both sfnSchemePdcch and sfnSchemePdsch scheduled by DCI format 1_0 or by DCI format 1_1/1_2 and if the time offset between the reception of the DL DCI and the corresponding PDSCH of a serving cell is equal to or greater than a threshold timeDurationForQCL if applicable:

If the UE 116 supports DCI scheduling without the TCI field, the UE 116 assumes that the TCI state(s) or the QCL assumption(s) for the PDSCH is identical to the TCI state(s) or QCL assumption(s) whichever is applied for the CORESET used for the reception of the DL DCI within the active BWP of the serving cell regardless of the number of active TCI states of the CORESET. If the UE 116 does not support dynamic switching between SFN PDSCH and non-SFN PDSCH, the UE 116 should be activated with the CORESET with two TCI states.

Else, if the UE 116 does not support DCI scheduling without the TCI field, the UE 116 shall expect the TCI field present when scheduled by DCI format 1_1/1_2.

When a UE is configured with sfnSchemePdsch and sfnSchemePdcch is not configured, when scheduled by DCI format 1_1/1_2, if the time offset between the reception of the DL DCI and the corresponding PDSCH of a serving cell is equal to or greater than a threshold timeDurationForQCL if applicable, the UE 116 shall expect TCI field present.

For PDSCH scheduled by DCI format 1_0, 1_1, 1_2, when a UE is configured with sfnSchemePdcch set to 'sfnSchemeA' and sfnSchemePdsch is not configured and there is no TCI codepoint with two TCI states in the activation command, and if the time offset between the reception of the DL DCI and the corresponding PDSCH is equal or larger than the threshold timeDurationForQCL if applicable and the CORESET which schedules the PDSCH is indicated with two TCI states, the UE 116 assumes that the TCI state or the QCL assumption for the PDSCH is identical to the first TCI state or QCL assumption which is applied for the CORESET used for the PDCCH transmission within the active BWP of the serving cell.

If a PDSCH is scheduled by a DCI format having the TCI field present, and the TCI field in DCI in the scheduling component carrier points to the activated TCI states in the scheduled component carrier or DL BWP, the UE 116 shall use the TCI-State according to the value of the 'Transmission Configuration Indication' field in the detected PDCCH with DCI for determining PDSCH antenna port quasi co-location. The UE 116 may assume that the DM-RS ports of PDSCH of a serving cell are quasi co-located with the RS(s) in the TCI state with respect to the QCL type parameter(s) given by the indicated TCI state if the time offset between the reception of the DL DCI and the corresponding PDSCH is equal to or greater than a threshold timeDurationForQCL, where the threshold is based on reported UE capability [13, TS 38.306]. For a single slot PDSCH, the indicated TCI state(s) should be based on the activated TCI states in the slot with the scheduled PDSCH. For a multi-slot PDSCH or the UE 116 is configured with higher layer parameter pdsch-TimeDomainAllocationListForMultiPDSCH-r17, the indicated TCI state(s) should be based on the activated TCI states in the first slot with the scheduled PDSCH(s). The UE 116 shall expect the activated TCI states to be the same across the slots with the scheduled PDSCH(s). When the UE 116 is configured with CORESET associated with a search space set for cross-carrier scheduling and the UE 116 is not configured with enableDefaultBeamForCCS, the UE 116 expects tci-PresentInDCI is set as 'enabled' or tci-PresentDCI-1-2 is configured for the CORESET. If one or more of the TCI states configured for the serving cell scheduled by the search space set contains qcl-Type set to 'typeD', the UE 116 expects the time offset between the reception of the detected PDCCH in the search space set and a corresponding PDSCH is larger than or equal to the threshold timeDurationForQCL.

Independent of the configuration of tci-PresentInDCI and tci-PresentDCI-1-2 in RRC connected mode, if the offset between the reception of the DL DCI and the corresponding PDSCH is less than the threshold timeDurationForQCL and at least one configured TCI state for the serving cell of scheduled PDSCH contains qcl-Type set to 'typeD':

The UE 116 may assume that the DM-RS ports of PDSCH(s) of a serving cell are quasi co-located with the RS(s) with respect to the QCL parameter(s) used for PDCCH quasi co-location indication of the CORESET associated with a monitored search space with the lowest controlResourceSetId in the latest slot in which one or more CORESETs within the active BWP of the serving cell are monitored by the UE 116. In this case, if the qcl-Type is set to 'typeD' of the PDSCH DM-RS is different from that of the PDCCH DM-RS with which they overlap in at least one symbol, the UE 116 is expected to prioritize the reception of PDCCH associated with that CORESET. This also applies to the intra-band CA case (when PDSCH and the CORESET are in different component carriers).

If a UE is configured with enableDefaultTCI-StatePerCoresetPoolIndex and the UE 116 is configured by higher layer parameter PDCCH-Config that contains two different values of coresetPoolIndex in different ControlResourceSets, the UE 116 may assume that the DM-RS ports of PDSCH(s) of a serving cell are quasi co-located with the RS(s) with respect to the QCL parameter(s) used for PDCCH quasi co-location indication of the CORESET associated with a monitored search space with the lowest controlResourceSetId in the latest slot in which one or more CORESETs within the active BWP of the serving cell are monitored by the UE 116. In this case, if the qcl-Type is set to 'typeD' of the PDSCH DM-RS is different from that of the PDCCH DM-RS with which they overlap in at least one symbol, the UE 116 is expected to prioritize the reception of PDCCH associated with that CORESET. This also applies to the intra-band CA case (when PDSCH and the CORESET are in different component carriers).

If a UE is configured with enable TwoDefaultTCI-States and at least one TCI codepoint indicates two TCI states, the UE 116 may assume that the DM-RS ports of PDSCH or PDSCH transmission occasions of a serving cell are quasi co-located with the RS(s) with respect to the QCL parameter(s) associated with the TCI states corresponding to the lowest codepoint among the TCI codepoints containing two different TCI states. When the UE 116 is configured by higher layer parameter repetitionScheme set to 'tdmSchemeA' or is configured with higher layer parameter repetitionNumber, and the offset between the reception of the DL DCI and the first PDSCH transmission occasion is less than the threshold timeDurationForQCL, the mapping of the TCI states to PDSCH transmission occasions is determined according to document and standard [4] by replacing the indicated TCI states with the TCI states corresponding to the lowest codepoint among the TCI codepoints containing two different TCI states based on the activated TCI states in the slot with the first PDSCH transmission occasion. In this case, if the 'QCL-TypeD' in both TCI states corresponding to the lowest codepoint among the TCI codepoints containing two different TCI states is different from that of the PDCCH DM-RS with which they overlap in at least one symbol, the UE 116 is expected to prioritize the reception of PDCCH associated with that CORESET. This also applies to the intra-band CA case (when PDSCH and the CORESET are in different component carriers)

If a UE is not configured with sfnSchemePdsch, the UE 116 is configured with sfnSchemePdcch set to 'sfnSchemeA', and there is no TCI codepoint with two TCI states in the activation command and the CORESET with the lowest ID in the latest slot is indicated with two TCI states, the UE 116 may assume that the DM-RS ports of PDSCH of a serving cell are quasi co-located with the RS(s) with respect to the QCL parameter(s) associated with the first TCI state of two TCI states indicated for the CORESET.

In all cases herein, if none of configured TCI states for the serving cell of scheduled PDSCH is configured with qcl-Type set to 'typeD', the UE 116 shall obtain the other QCL assumptions from the indicated TCI state(s) for its scheduled PDSCH irrespective of the time offset between the reception of the DL DCI and the corresponding PDSCH.

If the PDCCH carrying the scheduling DCI is received on one component carrier, and a PDSCH scheduled by that DCI is on another component carrier:

The timeDurationForQCL is determined based on the subcarrier spacing of the scheduled PDSCH. If $\mu_{PDCCH}<\mu_{PDSCH}$ an additional timing delay $$d\frac{2^{\mu_{PDSCH}}}{2^{\mu_{PDCCH}}}$$

is added to the timeDurationForQCL, where d is defined in 5.2.1.5.1a-1 in document and standard [4], otherwise, d is zero;

When the UE 116 is configured with enableDefaultBeamForCCS, if the offset between the reception of the DL DCI and the corresponding PDSCH is less than the threshold timeDurationForQCL, or if the DL DCI does not have the TCI field present, the UE 116 obtains its QCL assumption for the scheduled PDSCH from the activated TCI state with the lowest ID applicable to PDSCH in the active BWP of the scheduled cell.

A UE that has indicated a capability beamCorrespondenceWithoutUL-BeamSweeping set to '1', as described in [18, TS 38.822], can determine a spatial domain filter to be used while performing the applicable channel access procedures described in document and standard [3] to transmit a UL transmission on the channel as follows.

If UE is indicated with a scheduling request indicator (SRI) corresponding to the UL transmission, the UE 116 may use a spatial domain filter that is the same as the spatial domain transmission filter associated with the indicated SRI.

if UE is configured with TCI-State configurations with DLorJointTCIState or UL-TCIState, the UE 116 may use a spatial domain transmit filter that is the same as the spatial domain receive filter the UE 116 may use to receive the DL reference signal associated with the indicated TCI state.

When the PDCCH reception includes two PDCCH from two respective search space sets, as described in document and standard [3], to determine the time offset between the reception of the DL DCI and the corresponding PDSCH, the PDCCH candidate that ends later in time is used. When the PDCCH reception includes two PDCCH candidates from two respective search space sets, as described in document and standard [3], for the configuration of tci-PresentInDCI or tci-PresentDCI-1-2, the UE 116 expects the same configuration in the first and second CORESETs associated with the two PDCCH candidates; and if the PDSCH is scheduled by a DCI format not having the TCI field present and if the scheduling offset is equal to or larger than timeDurationForQCL, if applicable, PDSCH QCL assumption is based on the CORESET with lower ID among the first and second CORESETs associated with the two PDCCH candidates.

For a periodic CSI-RS resource in an NZP-CSI-RS-ResourceSet configured with higher layer parameter trs-Info, the UE 116 shall expect that a TCI-State indicates one of the following quasi co-location type(s):

'typeC' with an SS/PBCH block and, when applicable, 'typeD' with the same SS/PBCH block.

'typeC' with an SS/PBCH block and, when applicable, 'typeD' with a CSI-RS resource in an NZP-CSI-RS-ResourceSet configured with higher layer parameter repetition.

For periodic/semi-persistent CSI-RS, the UE 116 can assume that the indicated DLorJointTCIState is not applied.

For an aperiodic CSI-RS resource in an NZP-CSI-RS-ResourceSet configured with higher layer parameter trs-Info, the UE 116 shall expect that a TCI-State indicates qcl-Type set to 'typeA' with a periodic CSI-RS resource in a NZP-CSI-RS-ResourceSet configured with higher layer parameter trs-Info and, when applicable, qcl-Type set to 'typeD' with the same periodic CSI-RS resource.

For a CSI-RS resource in an NZP-CSI-RS-ResourceSet configured without higher layer parameter trs-Info and without the higher layer parameter repetition, the UE 116 shall expect that a TCI-State indicates one of the following quasi co-location type(s):

'typeA' with a CSI-RS resource in a NZP-CSI-RS-ResourceSet configured with higher layer parameter trs-Info and, when applicable, 'typeD' with the same CSI-RS resource.

'typeA' with a CSI-RS resource in a NZP-CSI-RS-ResourceSet configured with higher layer parameter trs-Info and, when applicable, 'typeD' with an SS/PBCH block.

'typeA' with a CSI-RS resource in a NZP-CSI-RS-ResourceSet configured with higher layer parameter trs-Info and, when applicable, 'typeD' with a CSI-RS resource in a NZP-CSI-RS-ResourceSet configured with higher layer parameter repetition.

'typeB' with a CSI-RS resource in a NZP-CSI-RS-ResourceSet configured with higher layer parameter trs-Info when 'typeD' is not applicable.

For a CSI-RS resource in an NZP-CSI-RS-ResourceSet configured with higher layer parameter repetition, the UE 116 shall expect that a TCI-State indicates one of the following quasi co-location type(s):

'typeA' with a CSI-RS resource in a NZP-CSI-RS-ResourceSet configured with higher layer parameter trs-Info and, when applicable, 'typeD' with the same CSI-RS resource.

'typeA' with a CSI-RS resource in a NZP-CSI-RS-ResourceSet configured with higher layer parameter trs-Info and, when applicable, 'typeD' with a CSI-RS resource in a NZP-CSI-RS-ResourceSet configured with higher layer parameter repetition.

- 'typeC' with an SS/PBCH block and, when applicable, 'typeD' with the same SS/PBCH block, the reference RS may additionally be an SS/PBCH block having a PCI different from the PCI of the serving cell. The UE 116 can assume center frequency, SCS, SFN offset are the same for SS/PBCH block from the serving cell and SS/PBCH block having a PCI different from the serving cell.

For the DM-RS of PDCCH, the UE 116 shall expect that a TCI-State or DLorJointTCIState except an indicated DLorJointTCIState indicates one of the following quasi co-location type(s):

- 'typeA' with a CSI-RS resource in a NZP-CSI-RS-ResourceSet configured with higher layer parameter trs-Info and, when applicable, 'typeD' with the same CSI-RS resource.
- 'typeA' with a CSI-RS resource in a NZP-CSI-RS-ResourceSet configured with higher layer parameter trs-Info and, when applicable, 'typeD' with a CSI-RS resource in an NZP-CSI-RS-ResourceSet configured with higher layer parameter repetition.
- 'typeA' with a CSI-RS resource in a NZP-CSI-RS-ResourceSet configured without higher layer parameter trs-Info and without higher layer parameter repetition and, when applicable, 'typeD' with the same CSI-RS resource.

When a UE is configured with sfnSchemePdcch set to 'sfnSchemeA', and CORESET is activated with two TCI states, the UE 116 shall assume that the DM-RS port(s) of the PDCCH in the CORESET is quasi co-located with the DL RSs of the two TCI states. When a UE is configured with sfnSchemePdcch set to 'sfnSchemeB', and a CORESET is activated with two TCI states, the UE 116 shall assume that the DM-RS port(s) of the PDCCH is quasi co-located with the DL RSs of the two TCI states except for quasi co-location parameters {Doppler shift, Doppler spread} of the second indicated TCI state.

For the DM-RS of PDSCH, the UE 116 shall expect that a TCI-State or DLorJointTCIState except an indicated DLorJointTCIState indicates one of the following quasi co-location type(s):

- 'typeA' with a CSI-RS resource in a NZP-CSI-RS-ResourceSet configured with higher layer parameter trs-Info and, when applicable, 'typeD' with the same CSI-RS resource.
- 'typeA' with a CSI-RS resource in a NZP-CSI-RS-ResourceSet configured with higher layer parameter trs-Info and, when applicable, 'typeD' with a CSI-RS resource in an NZP-CSI-RS-ResourceSet configured with higher layer parameter repetition.
- 'typeA' with a CSI-RS resource in a NZP-CSI-RS-ResourceSet configured without higher layer parameter trs-Info and without higher layer parameter repetition and, when applicable, 'typeD' with the same CSI-RS resource.

For the DM-RS of PDCCH, the UE 116 shall expect that an indicated DLorJointTCIState indicates one of the following quasi co-location type(s):

- 'typeA' with a CSI-RS resource in a NZP-CSI-RS-ResourceSet configured with higher layer parameter trs-Info and, when applicable, 'typeD' with the same CSI-RS resource.
- 'typeA' with a CSI-RS resource in a NZP-CSI-RS-ResourceSet configured with higher layer parameter trs-Info and, when applicable, 'typeD' with a CSI-RS resource in an NZP-CSI-RS-ResourceSet configured with higher layer parameter repetition.

For the DM-RS of PDSCH, the UE 116 shall expect that an indicated DLorJointTCIState indicates one of the following quasi co-location type(s) if the UE 116 is configured TCI-State(s) with tci-StateId_r17:

- 'typeA' with a CSI-RS resource in a NZP-CSI-RS-ResourceSet configured with higher layer parameter trs-Info and, when applicable, 'typeD' with the same CSI-RS resource.
- 'typeA' with a CSI-RS resource in a NZP-CSI-RS-ResourceSet configured with higher layer parameter trs-Info and, when applicable, 'typeD' with a CSI-RS resource in an NZP-CSI-RS-ResourceSet configured with higher layer parameter repetition.

When a UE is configured with sfnSchemePdsch set to 'sfnSchemeA' and the UE 116 is indicated with two TCI states in a codepoint of the DCI field 'Transmission Configuration Indication' in a DCI scheduling a PDSCH, the UE 116 shall assume that the DM-RS port(s) of the PDSCH is quasi co-located with the DL RSs of the two TCI states. When a UE is configured with sfnSchemePdsch set to 'sfnSchemeB' and the UE 116 is indicated with two TCI states in a codepoint of the DCI field 'Transmission Configuration Indication' in a DCI scheduling a PDSCH, the UE 116 shall assume that the DM-RS port(s) of the PDSCH is quasi co-located with the DL RSs of the two TCI states except for quasi co-location parameters {Doppler shift, Doppler spread} of the second indicated TCI state.

In the present disclosure, a UE could be a higher layer configured by the network 130 M>1 or N>1 pools of TCI states or TCI state identities (IDs). As aforementioned, here, a TCI state could correspond to a separate DL TCI state provided by DLorJointTCIState, a separate UL TCI state provided by UL-TCIState, or a joint DL and UL TCI state provided by DLorJointTCIState. Each of the higher layers configured M>1 or N>1 pools of TCI states/TCI state IDs could be associated with an entity ID. In the present disclosure, the entity ID could correspond to at least one of: a PCI value, a PCI index pointing to an entry/PCI in a list of PCI that are higher layer configured to the UE 116, a value of CORESETPoolIndex, a value of CORESETGroupIndex, a TRP ID, a TRP-specific higher layer signaling index, a CORESET ID, a resource ID/index, a resource set ID/index, etc. In the present disclosure, the UE 116 could be a higher layer configured by the network 130 a list of entity IDs, a list of PCIs, or a set of PCI indexes with each PCI index pointing to an entry/PCI in the list of PCIs that are higher layer configured to the UE 116.

In one example, the first pool of TCI states/TCI state IDs could be associated with the lowest PCI value, the first PCI value in the higher layer configured list of PCIs, the lowest PCI index, the first PCI index in the set of PCI indexes, or the PCI index pointing to the lowest PCI value in the higher layer configured list of PCIs. The second pool of TCI states/TCI state IDs could be associated with the second lowest PCI value, the second PCI value in the higher layer configured list of PCIs, the second lowest PCI index, the second PCI index in the set of PCI indexes or the PCI index pointing to the second lowest PCI value in the higher layer configured list of PCIs, and so on. The last pool of TCI states/TCI state IDs could be associated with the highest PCI value or the last PCI value in the higher layer configured list of PCIs, the highest PCI index, the last PCI index in the set of PCI indexes, or the PCI index pointing to the highest PCI value in the higher layer configured list of PCIs. Equivalently, the m-th (or n-th) pool of TCI states/TCI state IDs could be associated with the m-th (or n-th) lowest (or highest) PCI value, the m-th (or n-th) PCI value in the higher layer configured list of PCIs, the m-th (or n-th) lowest (or highest) PCI index, the first PCI index in the set of PCI indexes, or the PCI index pointing to the m-th (or n-th) lowest (or highest) PCI value in the higher layer configured list of PCIs, where $m \in \{1, \ldots, M\}$ and $n \in \{1, \ldots, N\}$. For M=2 (or N=2), the first (or second) pool of TCI states/TCI state IDs could be associated with the serving cell PCI/PCI index, the lowest PCI value, the first PCI value in the higher layer configured list of PCIs, the lowest PCI index, the first PCI index in the set of PCI indexes, or the PCI index pointing to the lowest PCI value in the higher layer configured list of PCIs. The second (or first) pool of TCI states/TCI state IDs could be associated with a PCI/PCI index other than the serving cell PCI/PCI index, the highest PCI value, the last PCI value in the higher layer configured list of PCIs, the highest PCI index or the last PCI index in the set of PCI indexes, or the PCI index pointing to the highest PCI value in the higher layer configured list of PCIs.

In another example, if the UE 116 is provided in PDCCH-Config with two values of CORESETPoolIndex (i.e., 0 and 1), for M=2 (or N=2), the first (or second) pool of TCI states/TCI state IDs could be associated with value 0 of CORESETPoolIndex or CORESETPoolIndex value associated with the serving cell PCI/PCI index, the lowest PCI value, the first PCI value in the higher layer configured list of PCIs, the lowest PCI index, the first PCI index in the set of PCI indexes, or the PCI index pointing to the lowest PCI value in the higher layer configured list of PCIs. The second (or first) pool of TCI states/TCI state IDs could be associated with value 1 of CORESETPoolIndex or CORESETPoolIndex value associated with a PCI/PCI index other than the serving cell PCI/PCI index, the highest PCI value, the last PCI value in the higher layer configured list of PCIs, the highest PCI index, the last PCI index in the set of PCI indexes, or the PCI index pointing to the highest PCI value in the higher layer configured list of PCIs.

In yet another example, each of the M>1 (or N>1) pools of TCI states/TCI state IDs could be configured to the UE 116 via a separate higher layer parameter. That is, the UE 116 could be configured by the network 130 M>1 (or N>1) separate higher layer parameters each configuring/indicating a pool of TCI states/TCI state IDs. Furthermore, the higher layer parameter that configures a pool of TCI states/TCI state IDs could also include/indicate an entity ID as described herein. For this case, a pool of TCI states/TCI state IDs, and an entity ID are associated if the pool of TCI states/TCI state IDs, and the entity ID are configured/indicated via the same higher layer parameter.

In addition, when the UE 116 is higher layer configured by the network 130 M>1 or N>1 pools of TCI states or TCI state IDs where each TCI state configured therein corresponds to a separate DL TCI state provided by DLorJointTCIState, a separate UL TCI state provided by UL-TCIState, or a joint DL and UL TCI state provided by DLorJointTCIState:

In one example, for the m-th (or n-th) pool of TCI states/TCI state IDs comprising K(m) (or K(n)) TCI states/TCI state IDs where $m \in \{1, \ldots, M\}$ and $n \in \{1, \ldots, N\}$, the TCI state IDs in the m-th (or n-th) pool of TCI states/TCI state IDs or the TCI states in the m-th (or n-th) pool of TCI states/TCI state IDs are indexed according to 0, . . . , K(m)−1 (or K(n)−1) or 1, . . . , K(m) (or K(n)).

For example, for M=2 (or N=2), the first pool of TCI states/TCI state IDs could comprise K1 (e.g., 64) TCI states/TCI state IDs, and the second pool of TCI states/TCI state IDs could comprise K2 (e.g., 64) TCI states/TCI state IDs. For this example, the TCI state IDs in the first pool of TCI states/TCI state IDs or the TCI states in the first pool of TCI states/TCI state IDs could be indexed according to 0, . . . , K1−1 (e.g., 0, . . . , 63) or 1, . . . , K1 (e.g., 1, . . . , 64). The TCI state IDs in the second pool of TCI states/TCI state IDs or the TCI states in the second pool of TCI states/TCI state IDs could be indexed according to 0, . . . , K2−1 (e.g., 0, . . . , 63) or 1, . . . , K2 (e.g., 1, . . . , 64).

In another example, the m-th (or n-th) pool of TCI states/TCI state IDs could comprise K(m) (or K(n)) TCI states/TCI state IDs where $m \in \{1, \ldots, M\}$ and $n \in \{1, \ldots, N\}$. For this case, the TCI state IDs in the m-th (or n-th) pool of TCI states/TCI state IDs or the TCI states in the m-th (or n-th) pool of TCI states/TCI state IDs are indexed according to $$\sum_{i=1}^{m-1} K(i) \left(\text{or } \sum_{j=1}^{n-1} K(j)\right), \ldots, \sum_{i=1}^{m-1} K(i) + K(m) - 1 \left(\text{or } \sum_{j=1}^{n-1} K(j) + K(n) - 1\right) \text{ or } \sum_{i=1}^{m-1} K(i) + 1 \left(\text{or } \sum_{j=1}^{n-1} K(j) + 1\right), \ldots, \sum_{i=1}^{m-1} K(i) + K(m) \left(\text{or } \sum_{j=1}^{n-1} K(j) + K(n)\right),$$

$$\text{where } \sum_{i=1}^{0} K(i) = 0 \left(\text{or} \sum_{j=1}^{n-1} K(j) = 0\right).$$

For example, for M=2 (or N=2), the first pool of TCI states/TCI state IDs could comprise K1 (e.g., 64) TCI states/TCI state IDs. The second pool of TCI states/TCI state IDs could comprise K2 (e.g., 64) TCI states/TCI state IDs. For this example, the TCI state IDs in the first pool of TCI states/TCI state IDs or the TCI states in the first pool of TCI states/TCI state IDs could be indexed according to 0, . . . , K1−1 (e.g., 0, . . . , 63) or 1, . . . , K1 (e.g., 1, . . . , 64), and the TCI state IDs in the second pool of TCI states/TCI state IDs or the TCI states in the second pool of TCI states/TCI state IDs could be indexed according to K1, . . . , K1+K2−1 (e.g., 64, . . . , 127) or K1+1, . . . , K1+K2 (e.g., 65, . . . , 128).

Alternatively, the UE 116 could be a higher layer configured by the network 130 a single pool of TCI states or TCI state IDs. As aforementioned, here, a TCI state could correspond to a separate DL TCI state provided by DLorJointTCIState, a separate UL TCI state provided by UL-TCIState, or a joint DL and UL TCI state provided by DLorJointTCIState. A TCI state or TCI state ID configured in the pool of TCI states/TCI state IDs could be associated with an entity ID. In the present disclosure, the entity ID could correspond to at least one of: a PCI value, a PCI index pointing to an entry/PCI in a list of PCI that are higher layer configured to the UE 116, a value of CORESETPoolIndex, a value of CORESETGroupIndex, a TRP ID, a TRP-specific higher layer signaling index, a CORESET ID, a resource ID/index, a resource set ID/index, etc. Furthermore, one or more of the TCI states or TCI state IDs configured in the pool of TCI states/TCI state IDs could be associated with the same entity ID and different TCI states, or TCI state IDs configured in the pool of TCI states/TCI state IDs could be associated with different entity IDs. In the present disclosure, the TCI states or TCI state IDs in the pool of TCI states/TCI state IDs could be divided/partitioned into M>1 (or N>1) TCI state groups each comprising one or more TCI states/TCI state IDs. The TCI states or TCI state IDs in the same TCI state group are associated with the same entity ID.

In one example, the m-th (or n-th) TCI state group could comprise K(m) (or K(n)) TCI states/TCI state IDs where m∈{1, . . . , M} and n∈{1, . . . , N}. For this case, the TCI state IDs in the m-th (or n-th) TCI state group or the TCI states in the m-th (or n-th) TCI state group are indexed according to $$\sum_{i=1}^{m-1} K(i) \left(\text{or} \sum_{j=1}^{n-1} K(j)\right), \ldots, \sum_{i=1}^{m-1} K(i) + K(m) - 1 \left(\text{or } \sum_{j=1}^{n-1} K(j) + K(n) - 1\right) \text{ or } \sum_{i=1}^{m-1} K(i) + 1 \left(\text{or } \sum_{j=1}^{n-1} K(j) + 1\right), \ldots, \sum_{i=1}^{m-1} K(i) + K(m) \left(\text{or } \sum_{j=1}^{n-1} K(j) + K(n)\right), \text{ where } \sum_{i=1}^{0} K(i) = 0 \left(\text{or } \sum_{j=1}^{n-1} K(j) = 0\right).$$

For example, for M=2 (or N=2), the first TCI state group could comprise K1 (e.g., 32) TCI states/TCI state IDs in the pool of TCI states/TCI state IDs and the second TCI state group could comprise K2 (e.g., 32) TCI states/TCI state IDs in the pool of TCI states/TCI state IDs. For this example, the TCI state IDs in the first TCI state group or the TCI states in the first TCI state group could be indexed according to 0, . . . , K1−1 (e.g., 0, . . . , 31) or 1, . . . , K1 (e.g., 1, . . . , 32), and the TCI state IDs in the second TCI state group or the TCI states in the second TCI state group could be indexed according to K1, . . . , K1+K2−1 (e.g., 32, . . . , 63) or K1+1, . . . , K1+K2 (e.g., 33, . . . , 65). For this example, the UE 116 could be configured by the network 130, e.g., via higher layer RRC signaling, the number of TCI states/TCI state IDs (e.g., K(m) or K(n) with m∈ {1, . . . , M} and n∈{1, . . . , N}) in each of the TCI state groups (e.g., the m-th or the n-th TCI state group with m∈{1, . . . , M} and n∈{1, . . . , N}) configured in the pool of TCI states/TCI state IDs.

In another example, the UE 116 could be configured by the network 130 M>1 (or N>1) parameters (e.g., higher layer RRC parameters), each associated with/corresponding to/configured for a TCI state group. Each parameter could include/indicate one or more TCI states/TCI state IDs. For this case, the TCI state group associated with the parameter could comprise the one or more TCI states/TCI state IDs configured in the parameter.

In the present disclosure, the UE 116 could be a higher layer configured by the network 130 a list of entity IDs, a list of PCIs, or a set of PCI indexes with each PCI index pointing to an entry/PCI in the list of PCIs that are higher layer configured to the UE 116.

In one example, the first TCI state group could be associated with the lowest PCI value, the first PCI value in the higher layer configured list of PCIs, the lowest PCI index, the first PCI index in the set of PCI indexes, or the PCI index pointing to the lowest PCI value in the higher layer configured list of PCIs. the second TCI state group could be associated with the second lowest PCI value, the second PCI value in the higher layer configured list of PCIs, the second lowest PCI index, the second PCI index in the set of PCI indexes, or the PCI index pointing to the second lowest PCI value in the higher layer configured list of PCIs, and so on. The last TCI state group could be associated with the highest PCI value, the last PCI value in the higher layer configured list of PCIs, the highest PCI index, the last PCI index in the set of PCI indexes, or the PCI index pointing to the highest PCI value in the higher layer configured list of PCIs. Equivalently, the m-th (or n-th) TCI state group could be associated with the m-th (or n-th) lowest (or highest) PCI value, the m-th (or n-th) PCI value in the higher layer configured list of PCIs, the m-th (or n-th) lowest (or highest) PCI index, the first PCI index in the set of PCI indexes, or the PCI index pointing to the m-th (or n-th) lowest (or highest) PCI value in the higher layer configured list of PCIs, where m∈{1, . . . , M} and n∈{1, . . . , N}. For M=2 (or N=2), the first (or second) TCI state group could be associated with the serving cell PCI/PCI index, the lowest PCI value, the first PCI value in the higher layer configured list of PCIs, the lowest PCI index, the first PCI index in the set of PCI indexes, or the PCI index pointing to the lowest PCI value in the higher layer configured list of PCIs. The second (or first) TCI state group could be associated with a PCI/PCI index other than the serving cell PCI/PCI index, the highest PCI value, the last PCI value in the higher layer configured list of PCIs, the highest PCI index, the last PCI index in the set of PCI indexes, or the PCI index pointing to the highest PCI value in the higher layer configured list of PCIs.

In another example, if the UE 116 is provided in PDCCH-Config two values of CORESETPoolIndex (i.e., 0 and 1), for M=2 (or N=2), the first (or second) TCI state group could be associated with value 0 of CORESETPoolIndex or CORESETPoolIndex value associated with the serving cell PCI/PCI index, the lowest PCI value, the first PCI value in the higher layer configured list of PCIs, the lowest PCI index, the first PCI index in the set of PCI indexes or the PCI index pointing to the lowest PCI value in the higher layer configured list of PCIs. The second (or first) TCI state group could be associated with value 1 of CORESETPoolIndex or CORESETPoolIndex value associated with a PCI/PCI index other than the serving cell PCI/PCI index, the highest PCI value, the last PCI value in the higher layer configured list of PCIs, the highest PCI index, the last PCI index in the set of PCI indexes or the PCI index pointing to the highest PCI value in the higher layer configured list of PCIs.

In yet another example, the (higher layer) parameter discussed in one or more examples herein that indicate one or more TCI states/TCI state IDs for a TCI state group could also include/indicate an entity ID as described herein. For this case, a TCI state group and an entity ID are associated if the TCI state group and the entity ID are associated with the same (higher layer) parameter specified in one or more examples described herein.

The UE 116 could receive from the network 130 one or more MAC CE subselection/activation commands that activate one or more TCI states/TCI state IDs from the one or more TCI state pools (specified in one or more examples described herein) or the one or more TCI state groups (specified in one or more examples described herein) used to map up to Nc≥1 (e.g., 8, 16, 32 or 64) TCI state codepoints in a DCI format. For instance, the UE 116 could receive from the network 130 a MAC CE subselection/activation command—e.g., a unified TCI state activation/deactivation for UE specific PDSCH MAC CE—, activating one or more TCI states/TCI state IDs from the one or more TCI state pools (specified in one or more examples described herein) or the one or more TCI state groups (specified in one or more examples described herein) used to map up to 8 (i.e., with the same maximum number of TCI codepoints as that in Rel-16/17) or 16 (i.e., with an increased maximum number of TCI codepoints in contrast to that in Rel-16/17) TCI state codepoints in a DCI format (e.g., DCI format 1_1 or 1_2 with or without DL assignment). That is, if up to 16 TCI state codepoints activated by the MAC CE could be mapped to a TCI field in a DCI format (e.g., 1_1 or 1_2 with or without DL assignment), the maximum number of the TCI field bits is 4, which is (one bit) larger than the maximum number of TCI field bits specified in Rel-16/17 (i.e., 3), where up to 8

TCI state codepoints activated by the MAC CE could be mapped to a TCI field in a DCI (e.g., 1_1 or 1_2 with or without DL assignment).

In one example, for M=2 (or N=2), the UE 116 could receive from the network 130 a MAC CE subselection/activation command activating a set of Nc≥1 (e.g., 8, 16, 32, or 64) TCI state codepoints mapped to a TCI field in a DCI. For instance, the UE 116 could receive from the network 130 a MAC CE subselection/activation command—e.g., a unified TCI state activation/deactivation for UE specific PDSCH MAC CE—, activating a set of 8 (the corresponding number of TCI field bits is 3) or 16 (the corresponding number of TCI field bits is 4) TCI state codepoints mapped to a TCI field in a DCI. In the present disclosure, the UE 116 could be a higher layer configured by the network 130 a list of entity IDs, a list of PCIs, or a set of PCI indexes with each PCI index pointing to an entry/PCI in the list of PCIs that are higher layer configured to the UE 116.

For example, a codepoint could correspond to a TCI state, wherein the TCI state could be a separate DL TCI state provided by DLorJointTCIState, a separate UL TCI state provided by UL-TCIState, or a joint DL and UL TCI state provided by DLorJointTCIState.

Yet for another example, a codepoint could correspond to a pair of two TCI states, wherein the first TCI state in the pair could be a separate DL TCI state provided by DLorJointTCIState, a separate UL TCI state provided by UL-TCIState or a joint DL and UL TCI state provided by DLorJointTCIState. The second TCI state in the pair could be a separate DL TCI state provided by DLorJointTCIState, a separate UL TCI state provided by UL-TCIState, or a joint DL and UL TCI state provided by DLorJointTCIState. For instance, one TCI state in the pair could be for DL channels/signals, and the other TCI state in the pair could be for UL channels/signals.

Yet for another example, a codepoint could correspond to a first TCI state and a second TCI state. For this case, the first TCI state could be a separate DL TCI state provided by DLorJointTCIState, a separate UL TCI state provided by UL-TCIState or a joint DL, and UL TCI state provided by DLorJointTCIState. The second TCI state could be a separate DL TCI state provided by DLorJointTCIState, a separate UL TCI state provided by UL-TCIState or a joint DL, and UL TCI state provided by DLorJointTCIState. Furthermore, the first TCI state could be activated/selected by the MAC CE from the first (or second) TCI state pool (specified in one or more examples described herein) or the first (or second) TCI state group (specified in one or more examples described herein). The second TCI state could be activated/selected by the MAC CE from the second (or first) TCI state pool (specified in one or more examples described herein) or the second (or first) TCI state group (specified in one or more examples described herein).

Yet for another example, a codepoint could correspond to a first TCI state and a second TCI state. For this case, the first TCI state could be a separate DL TCI state provided by DLorJointTCIState, a separate UL TCI state provided by UL-TCIState or a joint DL, and UL TCI state provided by DLorJointTCIState. The second TCI state could be a separate DL TCI state provided by DLorJointTCIState, a separate UL TCI state provided by UL-TCIState or a joint DL, and UL TCI state provided by DLorJointTCIState. Furthermore, the first (or second) TCI state could be associated with the entity ID associated with the serving cell PCI/PCI index, the lowest entity ID or the first entity ID in the higher layer configured list of entity IDs. The second (or first) TCI state could be associated with the entity ID associated with a PCI/PCI index other than the serving cell PCI/PCI index or the highest entity ID value or the last entity ID value in the higher layer configured list of entity IDs. Alternatively, the first (or second) TCI state could be associated with the serving cell PCI/PCI index, the lowest PCI value or the first PCI value in the higher layer configured list of PCIs, the lowest PCI index or the first PCI index in the set of PCI indexes, or the PCI index pointing to the lowest PCI value in the higher layer configured list of PCIs, The second (or first) TCI state could be associated with a PCI/PCI index other than the serving cell PCI/PCI index, the highest PCI value, the last PCI value in the higher layer configured list of PCIs, the highest PCI index, the last PCI index in the set of PCI indexes or the PCI index pointing to the highest PCI value in the higher layer configured list of PCIs.

Yet for another example, a codepoint could correspond to a first TCI state and a second TCI state. For this case, the first TCI state could be a separate DL TCI state provided by DLorJointTCIState, a separate UL TCI state provided by UL-TCIState or a joint DL, and UL TCI state provided by DLorJointTCIState. The second TCI state could be a separate DL TCI state provided by DLorJointTCIState, a separate UL TCI state provided by UL-TCIState or a joint DL, and UL TCI state provided by DLorJointTCIState. Furthermore, if the UE 116 is provided in PDCCH-Config with two values of CORESETPoolIndex (i.e., 0 and 1), the first (or second) TCI state could be associated with value 0 of CORESETPoolIndex or CORESETPoolIndex value associated with the serving cell PCI/PCI index, the lowest PCI value, the first PCI value in the higher layer configured list of PCIs, the lowest PCI index, the first PCI index in the set of PCI indexes or the PCI index pointing to the lowest PCI value in the higher layer configured list of PCIs. The second (or first) TCI state could be associated with value 1 of CORESETPoolIndex or CORESETPoolIndex value associated with a PCI/PCI index other than the serving cell PCI/PCI index, the highest PCI value, the last PCI value in the higher layer configured list of PCIs, the highest PCI index, the last PCI index in the set of PCI indexes or the PCI index pointing to the highest PCI value in the higher layer configured list of PCIs.

Yet for another example, a codepoint could correspond to two pairs of TCI states with each pair comprising two TCI states. The first TCI state in the first pair could be a separate DL TCI state provided by DLorJointTCIState, a separate UL TCI state provided by UL-TCIState or a joint DL, and UL TCI state provided by DLorJointTCIState. The second TCI state in the first pair could be a separate DL TCI state provided by DLorJointTCIState, a separate UL TCI state provided by UL-TCIState or a joint DL, and UL TCI state provided by DLorJointTCIState. For instance, one TCI state in the first pair could be for DL channels/signals, and the other TCI state in the first pair could be for UL channels/signals. Similarly, the first TCI state in the second pair could be a separate DL TCI state provided by DLorJointTCIState, a separate UL TCI state provided by UL-TCIState or a joint DL and UL TCI state provided by DLorJointTCIState, and the second TCI state in the second pair could be a separate DL TCI state provided by DLorJointTCIState, a separate UL TCI state provided by UL-TCIState or a joint DL and UL TCI state provided by DLorJointTCIState. For instance, one TCI state in the second pair could be for DL channels/signals, and the other TCI state in the second pair could be for UL channels/signals. Furthermore, the first and second TCI states in the first pair could be activated/selected by the MAC CE from the first (or second) TCI state pool (specified in one or more examples described herein) or the first (or second) TCI state group (specified in one or more examples described herein), and the first and second TCI states in the second pair could be activated/selected by the MAC CE from the second (or first) TCI state pool (specified in one or more examples described herein) or the second (or first) TCI state group (specified in one or more examples described herein).

Yet for another example, a codepoint could correspond to two pairs of TCI states with each pair comprising two TCI states. The first TCI state in the first pair could be a separate DL TCI state provided by DLorJointTCIState, a separate UL TCI state provided by UL-TCIState or a joint DL and UL TCI state provided by DLorJointTCIState, and the second TCI state in the first pair could be a separate DL TCI state provided by DLorJointTCIState, a separate UL TCI state provided by UL-TCIState or a joint DL and UL TCI state provided by DLorJointTCIState. For instance, one TCI state in the first pair could be for DL channels/signals, and the other TCI state in the first pair could be for UL channels/signals. Similarly, the first TCI state in the second pair could be a separate DL TCI state provided by DLorJointTCIState, a separate UL TCI state provided by UL-TCIState or a joint DL and UL TCI state provided by DLorJointTCIState, and the second TCI state in the second pair could be a separate DL TCI state provided by DLorJointTCIState, a separate UL TCI state provided by UL-TCIState or a joint DL and UL TCI state provided by DLorJointTCIState. For instance, one TCI state in the second pair could be for DL channels/signals, and the other TCI state in the second pair could be for UL channels/signals. Furthermore, the first and second TCI states in the first (or second) pair could be associated with the entity ID associated with the serving cell PCI/PCI index, the lowest entity ID value, or the first entity ID value in the higher layer configured list of entity IDs. The first and second TCI states in the second (or first) pair could be associated with the entity ID associated with a PCI/PCI index other than the serving cell PCI/PCI index, the highest entity ID value, or the last entity ID value in the higher layer configured list of entity IDs. Alternatively, the first and second TCI states in the first (or second) pair could be associated with the serving cell PCI/PCI index, the lowest PCI value, the first PCI value in the higher layer configured list of PCIs, the lowest PCI index, the first PCI index in the set of PCI indexes or the PCI index pointing to the lowest PCI value in the higher layer configured list of PCIs. The first and second TCI states in the second (or first) pair could be associated with a PCI/PCI index other than the serving cell PCI/PCI index, the highest PCI value, the last PCI value in the higher layer configured list of PCIs, the highest PCI index, the last PCI index in the set of PCI indexes or the PCI index pointing to the highest PCI value in the higher layer configured list of PCIs.

Yet for another example, a codepoint could correspond to two pairs of TCI states with each pair comprising two TCI states. The first TCI state in the first pair could be a separate DL TCI state provided by DLorJointTCIState, a separate UL TCI state provided by UL-TCIState or a joint DL and UL TCI state provided by DLorJointTCIState, and the second TCI state in the first pair could be a separate DL TCI state provided by DLorJointTCIState, a separate UL TCI state provided by UL-TCIState or a joint DL and UL TCI state provided by DLorJointTCIState. For instance, one TCI state in the first pair could be for DL channels/signals, and the other TCI state in the first pair could be for UL channels/signals. Similarly, the first TCI state in the second pair could be a separate DL TCI state provided by DLorJointTCIState, a separate UL TCI state provided by UL-TCIState or a joint DL and UL TCI state provided by DLorJointTCIState, and the second TCI state in the second pair could be a separate DL TCI state provided by DLorJointTCIState, a separate UL TCI state provided by UL-TCIState or a joint DL and UL TCI state provided by DLorJointTCIState. For instance, one TCI state in the second pair could be for DL channels/signals, and the other TCI state in the second pair could be for UL channels/signals. Furthermore, if the UE 116 is provided in PDCCH-Config two values of CORESETPoolIndex (i.e., 0 and 1), the first and second TCI states in the first (or second) pair could be associated with value 0 of CORESETPoolIndex or CORESETPoolIndex value associated with the serving cell PCI/PCI index, the lowest PCI value, the first PCI value in the higher layer configured list of PCIs, the lowest PCI index, the first PCI index in the set of PCI indexes or the PCI index pointing to the lowest PCI value in the higher layer configured list of PCIs. The first and second TCI states in the second (or first) pair could be associated with value 1 of CORESETPoolIndex or CORESETPoolIndex value associated with a PCI/PCI index other than the serving cell PCI/PCI index, the highest PCI value, the last PCI value in the higher layer configured list of PCIs, the highest PCI index, the last PCI index in the set of PCI indexes or the PCI index pointing to the highest PCI value in the higher layer configured list of PCIs.

In another example for M=2 (or N=2), the UE 116 could receive from the network 130 a MAC CE subselection/activation command activating two sets of TCI state codepoints mapped to one or more TCI fields in one or more DCIs (e.g., format 1_1 or 1_2 with or without DL assignment). For this case, the first set could contain (up to) Nc1≥1 (e.g., 8, 16, 32, or 64) TCI state codepoints, and the second set could contain (up to) Nc2≥1 (e.g., 8, 16, 32, or 64) TCI state codepoints. The first set of TCI state codepoints or the second set of TCI state codepoints could contain or correspond to or be associated with/to an entity ID. Here, the entity ID could correspond to at least one of: a one-bit indicator/set index with '0' (or '1') indicating the first set of TCI state codepoints and '1' (or '0') indicating the second set of TCI state codepoints, a PCI value, a PCI index pointing to an entry/PCI in a list of PCI that are higher layer configured to the UE 116, a value of CORESETPoolIndex, a value of CORESETGroupIndex, a TRP ID, a TRP-specific higher layer signaling index, a CORESET ID, a resource ID/index, a resource set ID/index, etc.

For another example, the UE 116 could receive from the network 130 a first MAC CE subselection/activation command activating a first set of (up to) Nc1≥1 (e.g., 8, 16, 32, or 64) TCI state codepoints mapped to one or more TCI fields in one or more DCIs (e.g., format 1_1 or 1_2 with or without DL assignment), and a second MAC CE subselection/activation command activating a second set of Nc2≥1 (e.g., 8, 16, 32 or 64) TCI state codepoints mapped to one or more TCI fields in one or more DCIs (e.g., format 1_1 or 1_2 with or without DL assignment). The first MAC CE subselection/activation command or the second MAC CE subselection/activation command could contain or correspond to or be associated to/with an entity ID. Here, the entity ID could correspond to at least one of: a one-bit indicator/MAC CE command index with '0' (or '1') indicating the first MAC CE activation command and '1' (or '0') indicating the second MAC CE activation command, a PCI value, a PCI index pointing to an entry/PCI in a list of PCI that are higher layer configured to the UE 116, a value of CORESETPoolIndex, a value of CORESETGroupIndex, a TRP ID, a TRP-specific higher layer signaling index, a CORESET ID, a resource ID/index, a resource set ID/index, etc.

Yet for another example, the UE 116 could receive from the network 130 a MAC CE subselection/activation command activating a superset of Mc≥1 (e.g., 8, 16, 32, or 64) TCI state codepoints mapped to one or more TCI fields in one or more DCIs (e.g., format 1_1 or 1_2 with or without DL assignment). The superset of Mc TCI state codepoints can be partitioned/divided into a first set of Nc1≥1 (e.g., 8, 16, 32, or 64) TCI state codepoints mapped to one or more TCI fields in one or more DCIs (e.g., format 1_1 or 1_2 with or without DL assignment), and a second set of Nc2≥1 (e.g., 8, 16, 32 or 64) TCI state codepoints mapped to one or more TCI fields in one or more DCIs (e.g., format 1_1 or 1_2 with or without DL assignment), with Mc=Nc1+Nc2. The UE 116 could be indicated by the network 130 the values of Nc1 or Nc2 via higher layer RRC signaling or MAC CE command or dynamic DCI based signaling.

A codepoint in the first or second set of TCI state codepoints (discussed in one or more examples herein) could be determined according to one or more examples herein.

For example, a codepoint in the first set of codepoints or the second set of codepoints could correspond to a TCI state, wherein the TCI state could be a separate DL TCI state provided by DLorJointTCIState, a separate UL TCI state provided by UL-TCIState or a joint DL and UL TCI state provided by DLorJointTCIState.

For another example, a codepoint in the first set of codepoints or the second set of codepoints could correspond to a pair of two TCI states, wherein the first TCI state in the pair could be a separate DL TCI state provided by DLorJointTCIState, a separate UL TCI state provided by UL-TCIState or a joint DL and UL TCI state provided by DLorJointTCIState, and the second TCI state in the pair could be a separate DL TCI state provided by DLorJointTCIState, a separate UL TCI state provided by UL-TCIState or a joint DL and UL TCI state provided by DLorJointTCIState. For instance, one TCI state in the pair could be for DL channels/signals, and the other TCI state in the pair could be for UL channels/signals.

Yet for another example, a codepoint in the first (or second) set of codepoints could correspond to a first TCI state and a second TCI state. For this case, the first TCI state could be a separate DL TCI state provided by DLorJointTCIState, a separate UL TCI state provided by UL-TCIState or a joint DL and UL TCI state provided by DLorJointTCIState, and the second TCI state could be a separate DL TCI state provided by DLorJointTCIState, a separate UL TCI state provided by UL-TCIState or a joint DL and UL TCI state provided by DLorJointTCIState. Furthermore, the first TCI state could be activated/selected by the corresponding MAC CE from the first (or second) TCI state pool (specified in one or more examples described herein) or the first (or second) TCI state group (specified in one or more examples described herein), and the second TCI state could be activated/selected by the corresponding MAC CE from the second (or first) TCI state pool (specified in one or more examples described herein) or the second (or first) TCI state group (specified in one or more examples described herein).

Yet for another example, a codepoint in the first (or second) set of codepoints could correspond to a first TCI state and a second TCI state. For this case, the first TCI state could be a separate DL TCI state provided by DLorJointTCIState, a separate UL TCI state provided by UL-TCIState or a joint DL and UL TCI state provided by DLorJointTCIState, and the second TCI state could be a separate DL TCI state provided by DLorJointTCIState, a separate UL TCI state provided by UL-TCIState or a joint DL and UL TCI state provided by DLorJointTCIState. Furthermore, the first (or second) TCI state could be associated with the entity ID associated with the serving cell PCI/PCI index, the lowest entity ID, or the first entity ID in the higher layer configured list of entity ID. The second (or first) TCI state could be associated with the entity ID associated with a PCI/PCI index other than the serving cell PCI/PCI index, the highest entity ID value, or the last entity ID value in the higher layer configured list of entity IDs. Alternatively, the first (or second) TCI state could be associated with the serving cell PCI/PCI index, the lowest PCI value, the first PCI value in the higher layer configured list of PCIs, the lowest PCI index, the first PCI index in the set of PCI indexes or the PCI index pointing to the lowest PCI value in the higher layer configured list of PCIs. The second (or first) TCI state could be associated with a PCI/PCI index other than the serving cell PCI/PCI index, the highest PCI value, the last PCI value in the higher layer configured list of PCIs, the highest PCI index, the last PCI index in the set of PCI indexes or the PCI index pointing to the highest PCI value in the higher layer configured list of PCIs.

Yet for another example, a codepoint in the first (or second) set of codepoints could correspond to a first TCI state and a second TCI state. For this case, the first TCI state could be a separate DL TCI state provided by DLorJointTCIState, a separate UL TCI state provided by UL-TCIState or a joint DL and UL TCI state provided by DLorJointTCIState, and the second TCI state could be a separate DL TCI state provided by DLorJointTCIState, a separate UL TCI state provided by UL-TCIState or a joint DL and UL TCI state provided by DLorJointTCIState. Furthermore, if the UE 116 is provided in PDCCH-Config two values of CORESETPoolIndex (i.e., 0 and 1), the first (or second) TCI state could be associated with value 0 of CORESETPoolIndex or CORESETPoolIndex value associated with the serving cell PCI/PCI index or the lowest PCI value or the first PCI value in the higher layer configured list of PCIs or the lowest PCI index or the first PCI index in the set of PCI indexes or the PCI index pointing to the lowest PCI value in the higher layer configured list of PCIs, and the second (or first) TCI state could be associated with value 1 of CORESETPoolIndex or CORESETPoolIndex value associated with a PCI/PCI index other than the serving cell PCI/PCI index or the highest PCI value or the last PCI value in the higher layer configured list of PCIs or the highest PCI index or the last PCI index in the set of PCI indexes or the PCI index pointing to the highest PCI value in the higher layer configured list of PCIs.

Yet for another example, a codepoint in the first (or second) set of codepoints could correspond to two pairs of TCI states with each pair comprising two TCI states. The first TCI state in the first pair could be a separate DL TCI state provided by DLorJointTCIState, a separate UL TCI state provided by UL-TCIState or a joint DL and UL TCI state provided by DLorJointTCIState, and the second TCI state in the first pair could be a separate DL TCI state provided by DLorJointTCIState, a separate UL TCI state provided by UL-TCIState or a joint DL and UL TCI state provided by DLorJointTCIState. For instance, one TCI state in the first pair could be for DL channels/signals, and the other TCI state in the first pair could be for UL channels/signals. Similarly, the first TCI state in the second pair could be a separate DL TCI state provided by DLorJointTCIState, a separate UL TCI state provided by UL-TCIState or a joint DL and UL TCI state provided by DLorJointTCIState, and the second TCI state in the second pair could be a separate DL TCI state provided by DLorJointTCIState, a separate UL TCI state provided by UL-TCIState or a joint DL and UL TCI state provided by DLorJointTCIState. For instance, one TCI state in the second pair could be for DL channels/signals, and the other TCI state in the second pair could be for UL channels/signals. Furthermore, the first and second TCI states in the first pair could be activated/selected by the corresponding MAC CE from the first (or second) TCI state pool (specified in one or more examples described herein) or the first (or second) TCI state group (specified in one or more examples described herein), and the first and second TCI states in the second pair could be activated/selected by the corresponding MAC CE from the second (or first) TCI state pool (specified in one or more examples described herein) or the second (or first) TCI state group (specified in one or more examples described herein).

Yet for another example, a codepoint in the first (or second) set of codepoints could correspond to two pairs of TCI states with each pair comprising two TCI states. The first TCI state in the first pair could be a separate DL TCI state provided by DLorJointTCIState, a separate UL TCI state provided by UL-TCIState or a joint DL and UL TCI state provided by DLorJointTCIState, and the second TCI state in the first pair could be a separate DL TCI state provided by DLorJointTCIState, a separate UL TCI state provided by UL-TCIState or a joint DL and UL TCI state provided by DLorJointTCIState. For instance, one TCI state in the first pair could be for DL channels/signals, and the other TCI state in the first pair could be for UL channels/signals. Similarly, the first TCI state in the second pair could be a separate DL TCI state provided by DLorJointTCIState, a separate UL TCI state provided by UL-TCIState or a joint DL and UL TCI state provided by DLorJointTCIState, and the second TCI state in the second pair could be a separate DL TCI state provided by DLorJointTCIState, a separate UL TCI state provided by UL-TCIState or a joint DL and UL TCI state provided by DLorJointTCIState. For instance, one TCI state in the second pair could be for DL channels/signals, and the other TCI state in the second pair could be for UL channels/signals. Furthermore, the first and second TCI states in the first (or second) pair could be associated with the entity ID associated with the serving cell PCI/PCI index, the lowest entity ID value, or the first entity ID value in the higher layer configured list of entity IDs. The first and second TCI states in the second (or first) pair could be associated with the entity ID associated with a PCI/PCI index other than the serving cell PCI/PCI index, the highest entity ID value, or the last entity ID value in the higher layer configured list of entity IDs. Alternatively, the first and second TCI states in the first (or second) pair could be associated with the serving cell PCI/PCI index, the lowest PCI value, the first PCI value in the higher layer configured list of PCIs, the lowest PCI index, the first PCI index in the set of PCI indexes or the PCI index pointing to the lowest PCI value in the higher layer configured list of PCIs. The first and second TCI states in the second (or first) pair could be associated with a PCI/PCI index other than the serving cell PCI/PCI index, the highest PCI value, or the last PCI value in the higher layer configured list of PCIs, the highest PCI index, the last PCI index in the set of PCI indexes or the PCI index pointing to the highest PCI value in the higher layer configured list of PCIs.

Yet for another example, a codepoint in the first (or second) set of codepoints could correspond to two pairs of TCI states with each pair comprising two TCI states. The first TCI state in the first pair could be a separate DL TCI state provided by DLorJointTCIState, a separate UL TCI state provided by UL-TCIState or a joint DL and UL TCI state provided by DLorJointTCIState, and the second TCI state in the first pair could be a separate DL TCI state provided by DLorJointTCIState, a separate UL TCI state provided by UL-TCIState or a joint DL and UL TCI state provided by DLorJointTCIState. For instance, one TCI state in the first pair could be for DL channels/signals, and the other TCI state in the first pair could be for UL channels/signals. Similarly, the first TCI state in the second pair could be a separate DL TCI state provided by DLorJointTCIState, a separate UL TCI state provided by UL-TCIState or a joint DL and UL TCI state provided by DLorJointTCIState, and the second TCI state in the second pair could be a separate DL TCI state provided by DLorJointTCIState, a separate UL TCI state provided by UL-TCIState or a joint DL and UL TCI state provided by DLorJointTCIState. For instance, one TCI state in the second pair could be for DL channels/signals, and the other TCI state in the second pair could be for UL channels/signals. Furthermore, if the UE 116 is provided in PDCCH-Config two values of CORESET-PoolIndex (i.e., 0 and 1), the first and second TCI states in the first (or second) pair could be associated with value 0 of CORESETPoolIndex or CORESETPoolIndex value associated with the serving cell PCI/PCI index, the lowest PCI value, the first PCI value in the higher layer configured list of PCIs, the lowest PCI index or the first PCI index in the set of PCI indexes or the PCI index pointing to the lowest PCI value in the higher layer configured list of PCIs. The first and second TCI states in the second (or first) pair could be associated with value 1 of CORESETPoolIndex or CORESETPoolIndex value associated with a PCI/PCI index other than the serving cell PCI/PCI index, the highest PCI value, the last PCI value in the higher layer configured list of PCIs, the highest PCI index, the last PCI index in the set of PCI indexes or the PCI index pointing to the highest PCI value in the higher layer configured list of PCIs.

Yet for another example, a codepoint in the first (or second) set of codepoints could correspond to a first TCI state and a first pair of TCI states comprising two TCI states. For this case, the first TCI state could be a separate DL TCI state provided by DLorJointTCIState, a separate UL TCI state provided by UL-TCIState, or a joint DL and UL TCI state provided by DLorJointTCIState. Furthermore, the first TCI state could be activated/selected by the MAC CE from the first (or second) TCI state pool (specified in one or more examples described herein) or the first (or second) TCI state group (specified in one or more examples described herein). In addition, the first TCI state in the first pair could be a separate DL TCI state provided by DLorJointTCIState, a separate UL TCI state provided by UL-TCIState or a joint DL and UL TCI state provided by DLorJointTCIState, and the second TCI state in the first pair could be a separate DL TCI state provided by DLorJointTCIState, a separate UL TCI state provided by UL-TCIState or a joint DL and UL TCI state provided by DLorJointTCIState. For instance, one TCI state in the first pair could be for DL channels/signals, and the other TCI state in the first pair could be for UL channels/signals. Furthermore, the first and second TCI states in the first pair could be activated/selected by the MAC CE from the first (or second) TCI state pool (specified in one or more examples described herein) or the first (or second) TCI state group (specified in one or more examples described herein).

Yet for another example, a codepoint in the first (or second) set of codepoints could correspond to a first TCI state and a first pair of TCI states comprising two TCI states. For this case, the first TCI state could be a separate DL TCI state provided by DLorJointTCIState, a separate UL TCI state provided by UL-TCIState, or a joint DL and UL TCI state provided by DLorJointTCIState. Furthermore, the first TCI state could be associated with the entity ID associated with the serving cell PCI/PCI index, the lowest entity ID, the first entity ID in the higher layer configured list of entity IDs, the entity ID associated with a PCI/PCI index other than the serving cell PCI/PCI index or the highest entity ID value or the last entity ID value in the higher layer configured list of entity IDs. Alternatively, the first TCI state could be associated with the serving cell PCI/PCI index, the lowest PCI value, the first PCI value in the higher layer configured list of PCIs, the lowest PCI index, the first PCI index in the set of PCI indexes, the PCI index pointing to the lowest PCI value in the higher layer configured list of PCIs, a PCI/PCI index other than the serving cell PCI/PCI index, the highest PCI value, the last PCI value in the higher layer configured list of PCIs, the highest PCI index, the last PCI index in the set of PCI indexes or the PCI index pointing to the highest PCI value in the higher layer configured list of PCIs. In addition, the first TCI state in the first pair could be a separate DL TCI state provided by DLorJointTCIState, a separate UL TCI state provided by UL-TCIState or a joint DL and UL TCI state provided by DLorJointTCIState, and the second TCI state in the first pair could be a separate DL TCI state provided by DLorJointTCIState, a separate UL TCI state provided by UL-TCIState or a joint DL and UL TCI state provided by DLorJointTCIState. For instance, one TCI state in the first pair could be for DL channels/signals, and the other TCI state in the first pair could be for UL channels/signals. Furthermore, the first and second TCI states in the first pair could be associated with the entity ID associated with the serving cell PCI/PCI index, the lowest entity ID value, the first entity ID value in the higher layer configured list of entity IDs, the entity ID associated with a PCI/PCI index other than the serving cell PCI/PCI index, the highest entity ID value or the last entity ID value in the higher layer configured list of entity IDs. Alternatively, the first and second TCI states in the first pair could be associated with the serving cell PCI/PCI index, the lowest PCI value, the first PCI value in the higher layer configured list of PCIs, the lowest PCI index, the first PCI index in the set of PCI indexes, the PCI index pointing to the lowest PCI value in the higher layer configured list of PCIs, a PCI/PCI index other than the serving cell PCI/PCI index, the highest PCI value, the last PCI value in the higher layer configured list of PCIs, the highest PCI index, the last PCI index in the set of PCI indexes or the PCI index pointing to the highest PCI value in the higher layer configured list of PCIs.

Yet for another example, a codepoint in the first (or second) set of codepoints could correspond to a first TCI state and a first pair of TCI states comprising two TCI states. For this case, the first TCI state could be a separate DL TCI state provided by DLorJointTCIState, a separate UL TCI state provided by UL-TCIState, or a joint DL and UL TCI state provided by DLorJointTCIState. Furthermore, if the UE 116 is provided in PDCCH-Config two values of CORESETPoolIndex (i.e., 0 and 1), the first TCI state could be associated with value 0 of CORESETPoolIndex or CORESETPoolIndex value associated with the serving cell PCI/PCI index, the lowest PCI value, the first PCI value in the higher layer configured list of PCIs, the lowest PCI index, the first PCI index in the set of PCI indexes, the PCI index pointing to the lowest PCI value in the higher layer configured list of PCIs, value 1 of CORESETPoolIndex or CORESETPoolIndex value associated with a PCI/PCI index other than the serving cell PCI/PCI index, the highest PCI value, the last PCI value in the higher layer configured list of PCIs, the highest PCI index, the last PCI index in the set of PCI indexes or the PCI index pointing to the highest PCI value in the higher layer configured list of PCIs. In addition, the first TCI state in the first pair could be a separate DL TCI state provided by DLorJointTCIState, a separate UL TCI state provided by UL-TCIState or a joint DL and UL TCI state provided by DLorJointTCIState, and the second TCI state in the first pair could be a separate DL TCI state provided by DLorJointTCIState, a separate UL TCI state provided by UL-TCIState or a joint DL and UL TCI state provided by DLorJointTCIState. For instance, one TCI state in the first pair could be for DL channels/signals, and the other TCI state in the first pair could be for UL channels/signals. Furthermore, if the UE 116 is provided in PDCCH-Config two values of CORESETPoolIndex (i.e., 0 and 1), the first and second TCI states in the first pair could be associated with value 0 of CORESETPoolIndex or CORESETPoolIndex value associated with the serving cell PCI/PCI index, the lowest PCI value, the first PCI value in the higher layer configured list of PCIs, the lowest PCI index, the first PCI index in the set of PCI indexes, the PCI index pointing to the lowest PCI value in the higher layer configured list of PCIs, value 1 of CORESETPoolIndex or CORESETPoolIndex value associated with a PCI/PCI index other than the serving cell PCI/PCI index, the highest PCI value or the last PCI value in the higher layer configured list of PCIs, the highest PCI index, the last PCI index in the set of PCI indexes or the PCI index pointing to the highest PCI value in the higher layer configured list of PCIs.

According to the discussions/descriptions herein, (1) each of the one or more TCI state codepoints in the first or second sets of TCI state codepoints could correspond to M=2 or N=2 (joint DL and UL or DL-only or UL-only) TCI states (following one or more examples described herein), (2) each of the one or more TCI state codepoints in the first or second sets of TCI state codepoints could correspond to M=2 (or N=2) pairs of two (separate DL and UL) TCI states (following one or more examples described herein), or (3) each of the one or more TCI state codepoints in the first or second sets of TCI state codepoints could correspond to a (joint DL and UL or DL-only or UL-only) TCI state and a pair of two (separate DL and UL) TCI states (following one or more examples described herein).

In the present disclosure, the UE 116 could be a higher layer configured by the network 130 a list of entity IDs, a list of PCIs, or a set of PCI indexes with each PCI index pointing to an entry/PCI in the list of PCIs that are higher layer configured to the UE 116.

For example, the TCI states indicated by the first set of TCI state codepoints could be activated/selected by the MAC CE from the first (or second) TCI state pool (specified in one or more examples described herein) or the first (or second) TCI state group (specified in one or more examples described herein), and the TCI states indicated by the second set of TCI state codepoints could be activated/selected by the MAC CE from the second (or first) TCI state pool (specified in one or more examples described herein) or the second (or first) TCI state group (specified in one or more examples described herein).

For another example, the TCI states indicated by the first (or second) set of TCI state codepoints could be associated with the entity ID associated with the serving cell PCI/PCI index, the lowest entity ID value, or the first entity ID value in the higher layer configured list of entity IDs. The TCI states indicated by the second (or first) set of TCI state codepoints could be associated with the entity ID associated with a PCI/PCI index other than the serving cell PCI/PCI index or the highest entity ID value or the last entity ID value in the higher layer configured list of entity IDs. Alternatively, the TCI states indicated by the first (or second) set of TCI state codepoints could be associated with the serving cell PCI/PCI index, the lowest PCI value, the first PCI value in the higher layer configured list of PCIs, the lowest PCI index or the first PCI index in the set of PCI indexes or the PCI index pointing to the lowest PCI value in the higher layer configured list of PCIs. The TCI states indicated by the second (or first) set of TCI state codepoints could be associated with a PCI/PCI index other than the serving cell PCI/PCI index, the highest PCI value, or the last PCI value in the higher layer configured list of PCIs, the highest PCI index, the last PCI index in the set of PCI indexes or the PCI index pointing to the highest PCI value in the higher layer configured list of PCIs.

Yet for another example, if the UE 116 is provided in PDCCH-Config two values of CORESETPoolIndex (i.e., 0 and 1), the TCI states indicated by the first (or second) set of TCI state codepoints could be associated with value 0 of CORESETPoolIndex or CORESETPoolIndex value associated with the serving cell PCI/PCI index, the lowest PCI value, the first PCI value in the higher layer configured list of PCIs, the lowest PCI index, the first PCI index in the set of PCI indexes or the PCI index pointing to the lowest PCI value in the higher layer configured list of PCIs. The TCI states indicated by the second (or first) set of TCI state codepoints could be associated with value 1 of CORESETPoolIndex or CORESETPoolIndex value associated with a PCI/PCI index other than the serving cell PCI/PCI index, the highest PCI value, the last PCI value in the higher layer configured list of PCIs, the highest PCI index, the last PCI index in the set of PCI indexes or the PCI index pointing to the highest PCI value in the higher layer configured list of PCIs.

Yet for another example, the first MAC CE subselection/activation command could include/indicate a first entity ID, and the second MAC CE subselection/activation command could include/indicate a second entity ID. In the present disclosure, the first entity ID or the second entity ID could correspond to at least one of: a PCI value, a PCI index pointing to an entry/PCI in a list of PCI that are higher layer configured to the UE 116, a value of CORESETPoolIndex, a value of CORESETGroupIndex, a TRP ID, a TRP-specific higher layer signaling index, a CORESET ID, a resource ID/index, a resource set ID/index, etc. For this case, the TCI states indicated by the first set of TCI state codepoints activated/selected by the first MAC CE subselection/activation command could be associated with the first entity ID, and the TCI states indicated by the second set of TCI state codepoints activated/selected by the second MAC CE subselection/activation command could be associated with the second entity ID.

In one embodiment, one or more bits of the (existing) 'Transmission Configuration Indication' (TCI) field in the beam indication DCI (e.g., DCI format 1_1 or 1_2 with or without DL assignment) could be used to indicate a TCI codepoint (and; therefore, the TCI state(s) indicated therein) from one or more of the Nc≥1 (e.g., 8, 16, 32 or 64) TCI state codepoints activated by the MAC CE according to one or more examples described herein, or from the first and/or second set of TCI state codepoints activated by the MAC CE according to one or more examples described herein (and; therefore, the examples specified therein). Throughout the present disclosure, unless otherwise specified, the first bit of a DCI field is equivalent to the least significant bit (LSB) of the DCI field, and so on, and the last bit of a DCI field is equivalent to the most significant bit (MSB) of the DCI field; or, the first bit of a DCI field is equivalent to the MSB of the DCI field, and so on, and the last bit of a DCI field is equivalent to the LSB of the DCI field.

In one example, when the beam indication DCI is with DL assignment, the beam indication DCI is without DL assignment (wherein the beam indication DCI could be DCI format 1_1 or 1_2), the number of TCI state codepoints Nc activated by the MAC CE, the number of TCI state codepoints Nc1 in the first set of TCI codepoints activated by the MAC CE, the number of TCI state codepoints Nc2 in the second set of TCI codepoints activated by the MAC CE or the (total) number of TCI state codepoints Nc1+Nc2 in the first and second sets of TCI codepoints activated by the MAC CE is smaller/lower (or larger/greater) than a threshold or the UE 116 is explicitly indicated/configured/provided by the network 130, e.g., via higher layer RRC signaling and/or MAC CE command and/or dynamic DCI based layer 1 (L1) signaling that, the first (or the last) Mc≥1 TCI field bits (e.g., out of the total/maximum Mtot indicated TCI field bits) are used to indicate a TCI codepoint (and; therefore, the corresponding TCI state(s) indicated therein) determined/selected from one or more of the Nc≥1 (e.g., 8, 16, 32 or 64) TCI state codepoints activated by the MAC CE according to one or more examples described herein, or from the first and/or second set of TCI state codepoints activated by the MAC CE according to one or more examples described herein (and; therefore, the examples specified therein), while the last (or the first) (Mtot−Mc) TCI field bits (e.g., out of the total/maximum Mtot indicated TCI field bits) could be used/repurposed to indicate mapping/association between the indicated TCI states and channels/signals from different TRPs, TCI state type(s)—i.e., joint and/or separate—of the indicated TCI states, etc., where 1≤Mc≤Mtot, and Mtot represents the total/maximum number of TCI field bits. For instance, for Mtot=4, when the beam indication DCI is with DL assignment, the beam indication DCI is without DL assignment (wherein the beam indication DCI could be DCI format 1_1 or 1_2), the number of TCI state codepoints Nc activated by the MAC CE, the number of TCI state codepoints Nc1 in the first set of TCI codepoints activated by the MAC CE, the number of TCI state codepoints Nc2 in the second set of TCI codepoints activated by the MAC CE, the (total) number of TCI state codepoints Nc1+Nc2 in the first and second sets of TCI codepoints activated by the MAC CE is smaller/lower (or larger/greater) than a threshold or the UE 116 is explicitly indicated/configured/provided by the network 130, e.g., via higher layer RRC signaling and/or MAC CE command and/or dynamic DCI based L1 signaling that, the first (or the last) Mc (e.g., Mc=3) TCI field bits are used to indicate the TCI codepoint, while the last (or the first) TCI field bit could be used/repurposed to signal other indications/configurations.

For example, the last (or the first) TCI field bit could be used/repurposed to indicate mapping/association between the indicated TCI states and target channels/signals from different TRPs. For instance, if the last (or the first) TCI field bit is set to '0' (or '1'), the first TCI state/pair of TCI states indicated by the TCI codepoint of the TCI field (e.g., by the first (or the last) Mc=3 TCI field bits) could be used/applied for receiving PDCCH, PDSCH, CSI-RS and/or transmitting PUCCH, PUSCH, SRS from/to one or more of the TRPs. If the last (or the first) TCI field bit is set to '1' (or '0'), the second TCI state/pair of TCI states indicated by the TCI codepoint of the TCI field (e.g., by the first (or the last) Mc=3 TCI field bits) could be used/applied for receiving PDCCH, PDSCH, CSI-RS and/or transmitting PUCCH, PUSCH, SRS from/to one or more of the TRPs. Optionally, if the last (or the first) TCI field bit is set to '0' (or '1'), the first TCI state/pair of TCI states indicated by the TCI codepoint of the TCI field (e.g., by the first (or the last) Mc=3 TCI field bits) could be used/applied for receiving a first PDCCH, a first PDSCH, a first CSI-RS and/or transmitting a first PUCCH, a first PUSCH, a first SRS from/to one or more of the TRPs. The second TCI state/pair of TCI states indicated by the TCI codepoint of the TCI field (e.g., by the first (or the last) Mc=3 TCI field bits) could be used/applied for receiving a second PDCCH, a second PDSCH, a second CSI-RS and/or transmitting a second PUCCH, a second PUSCH, a second SRS from/to one or more of the TRPs. If the last (or the first) TCI field bit is set to '1' (or '0'), the first TCI state/pair of TCI states indicated by the TCI codepoint of the TCI field (e.g., by the first (or the last) Mc=3 TCI field bits) could be used/applied for receiving the second PDCCH, the second PDSCH, the second CSI-RS and/or transmitting the second PUCCH, the second PUSCH, the second SRS from/to one or more of the TRPs, and the second TCI state/pair of TCI states indicated by the TCI codepoint of the TCI field (e.g., by the first (or the last) Mc=3 TCI field bits) could be used/applied for receiving the first PDCCH, the first PDSCH, the first CSI-RS and/or transmitting the first PUCCH, the first PUSCH, the first SRS from/to one or more of the TRPs.

For another example, the last (or the first) TCI field bit could be used/repurposed to indicate the TCI state type(s)—e.g., joint and/or separate—for the indicated TCI state(s). For instance, if the last (or the first) TCI field bit is set to '0' (or '1'), the TCI state type for the TCI state(s) indicated by the TCI codepoint of the TCI field (e.g., by the first (or the last) Mc=3 TCI field bits) could be joint. If the last (or the first) TCI field bit is set to '1' (or '0'), the TCI state type for the TCI state(s) indicated by the TCI codepoint of the TCI field (e.g., by the first (or the last) Mc=3 TCI field bits) could be separate. Alternatively, if the last (or the first) TCI field bit is set to '0' (or '1'), the TCI state type for the first TCI state/pair of TCI states indicated by the TCI codepoint of the TCI field (e.g., by the first (or the last) Mc=3 TCI field bits) could be joint, and the second TCI state/pair of TCI states indicated by the TCI codepoint of the TCI field (e.g., by the first (or the last) Mc=3 TCI field bits) could be separate. If the last (or the first) TCI field bit is set to '1' (or '0'), the TCI state type for the first TCI state/pair of TCI states indicated by the TCI codepoint of the TCI field (e.g., by the first (or the last) Mc=3 TCI field bits) could be separate, and the second TCI state/pair of TCI states indicated by the TCI codepoint of the TCI field (e.g., by the first (or the last) Mc=3 TCI field bits) could be joint.

Alternatively, the last (or the first) two TCI field bits could be used/repurposed to signal indications/configurations other than the TCI state codepoint (and; therefore, the corresponding TCI state(s) indicated therein).

For example, the last (or the first) two TCI field bits could be used/repurposed to indicate mapping/association between the indicated TCI states and target channels/signals from different TRPs. For instance, if the last (or the first) two TCI field bits are set to '00' (or '01', '10' or '11'), the first TCI state/pair of TCI states indicated by the TCI codepoint of the TCI field (e.g., by the first (or the last) Mc=3 TCI field bits) could be used/applied for receiving PDCCH, PDSCH, CSI-RS and/or transmitting PUCCH, PUSCH, SRS from/to one or more of the TRPs. If the last (or the first) two TCI field bits are set to '01' (or '00', '10' or '11'), the second TCI state/pair of TCI states indicated by the TCI codepoint of the TCI field (e.g., by the first (or the last) Mc=3 TCI field bits) could be used/applied for receiving PDCCH, PDSCH, CSI-RS and/or transmitting PUCCH, PUSCH, SRS from/to one or more of the TRPs. If the last (or the first) two TCI field bits are set to '10' (or '00', '01' or '11'), the first TCI state/pair of TCI states indicated by the TCI codepoint of the TCI field (e.g., by the first (or the last) Mc=3 TCI field bits) could be used/applied for receiving a first PDCCH, a first PDSCH, a first CSI-RS and/or transmitting a first PUCCH, a first PUSCH, a first SRS from/to one or more of the TRPs. The second TCI state/pair of TCI states indicated by the TCI codepoint of the TCI field (e.g., by the first (or the last) Mc=3 TCI field bits) could be used/applied for receiving a second PDCCH, a second PDSCH, a second CSI-RS and/or transmitting a second PUCCH, a second PUSCH, a second SRS from/to one or more of the TRPs. If the last (or the first) two TCI field bits are set to '11' (or '00', '01' or '11'), the first TCI state/pair of TCI states indicated by the TCI codepoint of the TCI field (e.g., by the first (or the last) Mc=3 TCI field bits) could be used/applied for receiving the second PDCCH, the second PDSCH, the second CSI-RS and/or transmitting the second PUCCH, the second PUSCH, the second SRS from/to one or more of the TRPs. The second TCI state/pair of TCI states indicated by the TCI codepoint of the TCI field (e.g., by the first (or the last) Mc=3 TCI field bits) could be used/applied for receiving the first PDCCH, the first PDSCH, the first CSI-RS and/or transmitting the first PUCCH, the first PUSCH, the first SRS from/to one or more of the TRPs.

For another example, the last (or the first) two TCI field bits could be used/repurposed to indicate the TCI state type(s)—e.g., joint and/or separate—for the indicated TCI state(s). For instance, if the last (or the first) two TCI field bits are set to '00' (or '01', '10', or '11'), the TCI state type for the TCI state(s) indicated by the TCI codepoint of the TCI field (e.g., by the first (or the last) Mc=3 TCI field bits) could be joint. If the last (or the first) two TCI field bits are set to '01' (or '00', '10' or '11'), the TCI state type for the TCI state(s) indicated by the TCI codepoint of the TCI field (e.g., by the first (or the last) Mc=3 TCI field bits) could be separate. If the last (or the first) two TCI field bits are set to '10' (or '00', '01' or '11'), the TCI state type for the first TCI state/pair of TCI states indicated by the TCI codepoint of the TCI field (e.g., by the first (or the last) Mc=3 TCI field bits) could be joint. The second TCI state/pair of TCI states indicated by the TCI codepoint of the TCI field (e.g., by the first (or the last) Mc=3 TCI field bits) could be separate. If the last (or the first) two TCI field bits are set to '11' (or '00', '01' or '10'), the TCI state type for the first TCI state/pair of TCI states indicated by the TCI codepoint of the TCI field (e.g., by the first (or the last) Mc=3 TCI field bits) could be separate. The second TCI state/pair of TCI states indicated by the TCI codepoint of the TCI field (e.g., by the first (or the last) Mc=3 TCI field bits) could be joint.

One or more of the TCI field bits could be used/repurposed to signal other indications/configurations than those specified in one or more examples described herein.

In another example, the UE 116 could be indicated/configured/provided by the network 130, e.g., via higher layer RRC signaling/parameter and/or MAC CE command and/or dynamic DCI based L1 signaling, (which) one or more of the TCI field bits that could be used to indicate a TCI codepoint (and; therefore, the corresponding TCI state(s) indicated therein) determined/selected from one or more of the Nc≥1 (e.g., 8, 16, 32 or 64) TCI state codepoints activated by the MAC CE according to one or more examples described herein, from the first and/or second set of TCI state codepoints activated by the MAC CE according to one or more examples described herein (and; therefore, the examples specified therein), or (which) one or more of the TCI field bits that could be used to signal indication(s)/configuration(s) other than the TCI codepoint following one or more examples described herein.

For example, the UE 116 could be indicated/configured/provided by the network 130, e.g., via higher layer RRC signaling/parameter and/or MAC CE command and/or dynamic DCI based L1 signaling, (which) one or more of the TCI field bits that could be used to indicate a TCI codepoint (and; therefore, the corresponding TCI state(s) indicated therein) determined/selected from one or more of the Nc≥1 (e.g., 8, 16, 32 or 64) TCI state codepoints activated by the MAC CE according to one or more examples described herein, or from the first and/or second set of TCI state codepoints activated by the MAC CE according to one or more examples described herein (and; therefore, the examples specified therein). For this case, the rest of the TCI field bits (other than the indicated one or more of the TCI field bits) could be used to signal indication(s)/configuration(s) other than the TCI codepoint following those specified herein (according to one or more examples described herein).

For example, the UE 116 could be indicated/configured/provided by the network 130, e.g., via higher layer RRC signaling/parameter and/or MAC CE command and/or dynamic DCI based L1 signaling, the number of the one or more of the TCI field bits, e.g., denoted by Mc (e.g., out of the total/maximum Mtot indicated TCI field bits) used to indicate the TCI codepoint, where 1≤Mc≤Mtot, and Mtot represents the total/maximum number of TCI field bits. For this case, the first (or the last) Mc TCI field bits (e.g., out of the total/maximum Mtot indicated TCI field bits) or the m-th, (m+1)-th, . . . , (m+Mc−1)-th TCI field bits (e.g., out of the total/maximum Mtot indicated TCI field bits) could be used to indicate the TCI codepoint (and; therefore, the corresponding TCI state(s) indicated therein), where m∈{1, . . . , Mtot}. Here the value of m could be determined according to: (1) fixed in the system specifications, e.g., m=1, or (2) configured/indicated/provided to the UE 116 by the network 130, e.g., via higher layer RRC signaling and/or MAC CE command and/or dynamic DCI based signaling.

For another example, the UE 116 could be indicated/configured/provided by the network 130, e.g., via higher layer RRC signaling/parameter and/or MAC CE command and/or dynamic DCI based L1 signaling, a bitmap of length Mtot, with each bit position/entry in the bitmap corresponding to a TCI field bit. For this case, if a bit position/entry of the bitmap is set to '1' (or '0'), the TCI field bit corresponding/associated to the bit position/entry could be used to indicate the TCI codepoint.

Yet for another example, the UE 116 could be indicated/configured/provided by the network 130, e.g., via higher layer RRC signaling/parameter and/or MAC CE command and/or dynamic DCI based L1 signaling, a set of TCI field bit positions or indexes of TCI field bits. For this case, the TCI field bits corresponding/associated with the indicated/configured/provided TCI field bit positions or indexes of TCI field bits could be used to indicate the TCI codepoint (and; therefore, the corresponding TCI state(s) indicated therein). That is, when the beam indication DCI is with DL assignment, the beam indication DCI is without DL assignment (wherein the beam indication DCI could be DCI format 1_1 or 1_2), the number of TCI state codepoints Nc activated by the MAC CE, the number of TCI state codepoints Nc1 in the first set of TCI codepoints activated by the MAC CE, the number of TCI state codepoints Nc2 in the second set of TCI codepoints activated by the MAC CE, the (total) number of TCI state codepoints Nc1+Nc2 in the first and second sets of TCI codepoints activated by the MAC CE is smaller/lower (or larger/greater) than a threshold or the UE 116 is explicitly indicated/configured/provided by the network 130, e.g., via higher layer RRC signaling and/or MAC CE command and/or dynamic DCI based L1 signaling, e.g., the number of the one or more of the TCI field bits (e.g., out of the total/maximum indicated TCI field bits) used to indicate the TCI codepoint, the bitmap indicating the one or more of the TCI field bits (e.g., out of the total/maximum indicated TCI field bits) used to indicate the TCI codepoint, the set of TCI field bit positions/indexes of TCI field bits indicating the one or more of the TCI field bits (e.g., out of the total/maximum indicated TCI field bits) used to indicate the TCI codepoint as discussed/described herein or the indicated one or more of the TCI field bits could be used to indicate a TCI codepoint (and; therefore, the corresponding TCI state(s) indicated therein) determined/selected from one or more of the Nc≥1 (e.g., 8, 16, 32 or 64) TCI state codepoints activated by the MAC CE according one or more examples described herein or from the first and/or second set of TCI state codepoints activated by the MAC CE according one or more examples described herein.

For another example, the UE 116 could be indicated/configured/provided by the network 130, e.g., via higher layer RRC signaling/parameter and/or MAC CE command and/or dynamic DCI based L1 signaling, (which) one or more of the TCI field bits that could be used to signal indication(s)/configuration(s) other than the TCI codepoint following those specified herein (according to one or more examples described herein). For this case, the rest of the TCI field bits could be used to indicate a TCI codepoint (and; therefore, the corresponding TCI state(s) indicated therein) determined/selected from one or more of the Nc≥1 (e.g., 8, 16, 32 or 64) TCI state codepoints activated by the MAC CE according to one or more examples described herein, or from the first and/or second set of TCI state codepoints activated by the MAC CE according to one or more examples described herein (and; therefore, the examples specified therein).

For example, the UE 116 could be indicated/configured/provided by the network 130, e.g., via higher layer RRC signaling/parameter and/or MAC CE command and/or dynamic DCI based L1 signaling, the number of the one or more of the TCI field bits, e.g., denoted by Mc' (e.g., out of the total/maximum Mtot indicated TCI field bits), used to signal indication(s)/configuration(s) other than the TCI codepoint following one or more examples described herein, where 1≤Mc'≤Mtot, and Mtot represents the total/maximum number of TCI field bits. For this case, the first (or the last) Mc' TCI field bits (e.g., out of the total/maximum Mtot indicated TCI field bits) or the m-th, (m+1)-th, . . . , (m+Mc'−1)-th TCI field bits (e.g., out of the total/maximum Mtot indicated TCI field bits) could be used to signal indication(s)/configuration(s) other than the TCI codepoint following one or more examples described herein, where m∈{1, . . . , Mtot}. Here the value of m could be determined according to: (1) fixed in the system specifications, e.g., m=1, or (2) configured/indicated/provided to the UE 116 by the network 130, e.g., via higher layer RRC signaling and/or MAC CE command and/or dynamic DCI based signaling.

For another example, the UE 116 could be indicated/configured/provided by the network 130, e.g., via higher layer RRC signaling/parameter and/or MAC CE command and/or dynamic DCI based L1 signaling, a bitmap of length Mtot, with each bit position/entry in the bitmap corresponding to a TCI field bit. For this case, if a bit position/entry of the bitmap is set to '1' (or '0'), the TCI field bit corresponding/associated to the bit position/entry could be used to signal indication(s)/configuration(s) other than the TCI codepoint following one or more examples described herein.

Yet for another example, the UE 116 could be indicated/configured/provided by the network 130, e.g., via higher layer RRC signaling/parameter and/or MAC CE command and/or dynamic DCI based L1 signaling, a set of TCI field bit positions or indexes of TCI field bits. For this case, the TCI field bits corresponding/associated to the indicated/configured/provided TCI field bit positions or indexes of TCI field bits could be used to signal indication(s)/configuration(s) other than the TCI codepoint following one or more examples described herein. That is, when the beam indication DCI is with DL assignment, the beam indication DCI is without DL assignment (wherein the beam indication DCI could be DCI format 1_1 or 1_2), the number of TCI state codepoints Nc activated by the MAC CE, the number of TCI state codepoints Nc1 in the first set of TCI codepoints activated by the MAC CE, the number of TCI state codepoints Nc2 in the second set of TCI codepoints activated by the MAC CE, the (total) number of TCI state codepoints Nc1+Nc2 in the first and second sets of TCI codepoints activated by the MAC CE is smaller/lower (or larger/greater) than a threshold or the UE 116 is explicitly indicated/configured/provided by the network 130, e.g., via higher layer RRC signaling and/or MAC CE command and/or dynamic DCI based L1 signaling, e.g., the number of the one or more TCI field bits (e.g., out of the total/maximum indicated TCI field bits) used to signal indication(s)/configuration(s) other than the TCI codepoint, the bitmap indicating the one or more of the TCI field bits (e.g., out of the total/maximum indicated TCI field bits) used to signal indication(s)/configuration(s) other than the TCI codepoint or the set of TCI field bit positions/indexes of TCI field bits indicating the one or more of the TCI field bits (e.g., out of the total/maximum indicated TCI field bits) used to signal indication(s)/configuration(s) other than the TCI codepoint as discussed/described herein, the indicated one or more of the TCI field bits could be used to signal indication(s)/configuration(s) other than the TCI codepoint following one or more examples described herein.

In yet another example, the UE 116 could be indicated/configured/provided by the network 130, e.g., via higher layer RRC signaling/parameter and/or MAC CE command and/or dynamic DCI based L1 signaling, an indicator to indicate whether all or part of the indicated TCI field bits are used to indicate a TCI codepoint (and; therefore, the corresponding TCI state(s) indicated therein) selected/determined from one or more of the Nc≥1 (e.g., 8, 16, 32 or 64) TCI state codepoints activated by the MAC CE according to one or more examples described herein, or from the first and/or second set of TCI state codepoints activated by the MAC CE according to one or more examples described herein (and; therefore, the examples specified therein). For instance, the indicator could be a one-bit indicator. If the one-bit indicator is set to '0' (or '1'), all the indicated TCI field bits (e.g., the total/maximum Mtot indicated TCI field bits) could be used to indicate the TCI codepoint. If the one-bit indicator is set to '1' (or '0'), one or more of the indicated TCI field bits (e.g., out of the total/maximum indicated TCI field bits) could be used to indicate the TCI codepoint following one or more examples described herein, and one or more of the indicated TCI field bits (e.g., out of the total/maximum indicated TCI field bits) could be used to signal indication (s)/configuration(s) other than the TCI codepoint following one or more examples described herein. As discussed herein, the (one-bit) indicator could be indicated/provided/configured/introduced in a DCI, e.g., DCI format 1_1 or 1_2 with or without DL assignment.

For example, a new DCI field could be introduced in the corresponding DCI format to indicate/configure/provide the (one-bit) indicator. The new DCI field, and; therefore, the corresponding (one-bit) indicator, could be dedicated/used for indicating whether all or part of the indicated TCI field bits are used for indicating the TCI codepoint as discussed herein.

For another example, one or more existing DCI fields (e.g., a one-bit DCI field such as NDI field) in a DCI format (e.g., in DCI format 1_1 or 1_2 with or without DL PDSCH assignment/scheduling or in DCI format 0_1/0_2) could be repurposed/used to indicate/configure/provide the (one-bit) indicator.

Yet for another example, one or more DCI field bits/codepoints of one or more existing DCI fields (e.g., the first/last bit of an existing DCI field such as the BWP indicator field) in a DCI format (e.g., in DCI format 1_1 or 1_2 with or without DL PDSCH assignment/scheduling or in DCI format 0_1/0_2) could be repurposed/used to indicate/configure/provide the (one-bit) indicator.

In yet another example, when the beam indication DCI is with DL assignment, the beam indication DCI is without DL assignment (wherein the beam indication DCI could be DCI format 1_1 or 1_2), the number of TCI state codepoints Nc activated by the MAC CE, the number of TCI state codepoints Nc1 in the first set of TCI codepoints activated by the MAC CE, the number of TCI state codepoints Nc2 in the second set of TCI codepoints activated by the MAC CE or the (total) number of TCI state codepoints Nc1+Nc2 in the first and second sets of TCI codepoints activated by the MAC CE is smaller/lower (or larger/greater) than a threshold, the total/maximum number of TCI field bits (of the TCI field in the beam indication DCI) is Mtot1>1; otherwise, the total/maximum number of TCI field bits (of the TCI field in the beam indication DCI) is Mtot2≥1. Here, (1) Mtot1=Mtot2, e.g., Mtot1=Mtot2=3 (i.e., the corresponding total/maximum number of TCI field bits of the TCI field in the beam indication DCI is 3) or Mtot1=Mtot2=4 (i.e., the corresponding total/maximum number of TCI field bits of the TCI field in the beam indication DCI is 4), (2) Mtot1>Mtot2, e.g., Mtot1=4 (i.e., the corresponding total/maximum number of TCI field bits of the TCI field in the beam indication DCI is 4) and Mtot2=3 (i.e., the corresponding total/maximum number of TCI field bits of the TCI field in the beam indication DCI is 3), or (3) Mtot1<Mtot2, e.g., Mtot1=3 (i.e., the corresponding total/maximum number of TCI field bits of the TCI field in the beam indication DCI is 3) and Mtot2=4 (i.e., the corresponding total/maximum number of TCI field bits of the TCI field in the beam indication DCI is 4).

In yet another example, the UE 116 could be indicated/configured/provided by the network 130, e.g., via higher layer RRC signaling and/or MAC CE command and/or dynamic DCI based L1 signaling, an indicator to indicate the total/maximum number of TCI field bits of the TCI field in the beam indication DCI. For instance, the indicator could be a one-bit indicator. If the one-bit indicator is set to '0' (or '1'), the total/maximum number of TCI field bits (of the TCI field in the beam indication DCI) is Mtot1≥1; otherwise, i.e., if the one-bit indicator is set to '1' (or '0'), the total/maximum number of TCI field bits (of the TCI field in the beam indication DCI) is Mtot2≥1. Here, (1) Mtot1=Mtot2, e.g., Mtot1=Mtot2=3 (i.e., the corresponding total/maximum number of TCI field bits of the TCI field in the beam indication DCI is 3) or Mtot1=Mtot2=4 (i.e., the corresponding total/maximum number of TCI field bits of the TCI field in the beam indication DCI is 4), (2) Mtot1>Mtot2, e.g., Mtot1=4 (i.e., the corresponding total/maximum number of TCI field bits of the TCI field in the beam indication DCI is 4) and Mtot2=3 (i.e., the corresponding total/maximum number of TCI field bits of the TCI field in the beam indication DCI is 3), or (3) Mtot1<Mtot2, e.g., Mtot1=3 (i.e., the corresponding total/maximum number of TCI field bits of the TCI field in the beam indication DCI is 3) and Mtot2=4 (i.e., the corresponding total/maximum number of TCI field bits of the TCI field in the beam indication DCI is 4).

For example, a new DCI field could be introduced in the corresponding DCI format to indicate/configure/provide the (one-bit) indicator. The new DCI field, and; therefore, the corresponding (one-bit) indicator, could be dedicated/used for indicating the total/maximum number of TCI field bits of the TCI field in the beam indication DCI.

For another example, one or more existing DCI fields (e.g., a one-bit DCI field such as NDI field) in a DCI format (e.g., in DCI format 1_1 or 1_2 with or without DL PDSCH assignment/scheduling or in DCI format 0_1/0_2) could be repurposed/used to indicate/configure/provide the (one-bit) indicator.

Yet for another example, one or more DCI field bits/codepoints of one or more existing DCI fields (e.g., the first/last bit of an existing DCI field such as the BWP indicator field) in a DCI format (e.g., in DCI format 1_1 or 1_2 with or without DL PDSCH assignment/scheduling or in DCI format 0_1/0_2) could be repurposed/used to indicate/configure/provide the (one-bit) indicator.

In yet another example, the UE 116 could be provided/configured/indicated by the network 130, e.g., in higher layer parameter PDCCH-Config/PDSCH-Config, multiple (e.g., Q≥1) values of CORESET group/pool index. For Q=2, the value(s) of the CORESET group index (e.g., denoted by CORESETGroupIndex) or the CORESET pool index (e.g., denoted by CORESETPoolIndex) could be either 0 or 1. For Q=4, the value(s) of the CORESET group index (e.g., denoted by CORESETGroupIndex) or the CORESET pool index (e.g., denoted by CORESETPoolIndex) could be '00', '01', '10' or '11'. The value(s) of the CORESET group index (e.g., denoted by CORESETGroupIndex) or the CORESET pool index (e.g., denoted by CORESETPoolIndex) could be provided/indicated/configured in higher layer parameter ControlResourceSet that indicates/provides/configures parameters/settings for a CORESET. For this case, different control resource sets (CORESETs) could be in the same CORESET group if the CORESETs are configured/associated with a same value of CORESET group index (CORESETGroupIndex). Furthermore, different control resource sets (CORESETs) could be in the same CORESET pool if the CORESETs are configured/associated with a same value of CORESET pool index (CORESETPoolIndex). For Q=2, For example, when/if the beam indication DCI (e.g., DCI format 1_1 or 1_2 with or without DL assignment) is received in a CORESET configured/associated with value 0 (or 1) of CORESETGroupIndex/CORESETPoolIndex, all the indicated TCI field bits (e.g., the total/maximum Mtot indicated TCI field bits) could be used to indicate the TCI codepoint. When/if the beam indication DCI (e.g., DCI format 1_1 or 1_2 with or without DL assignment) is received in a CORESET configured/associated with value 1 (or 0), one or more of the indicated TCI field bits (e.g., out of the total/maximum indicated TCI field bits) could be used to indicate the TCI codepoint following one or more examples described herein. One or more of the indicated TCI field bits (e.g., out of the total/maximum indicated TCI field bits) could be used to signal indication(s)/configuration(s) other than the TCI codepoint following one or more examples described herein.

Figure 9:
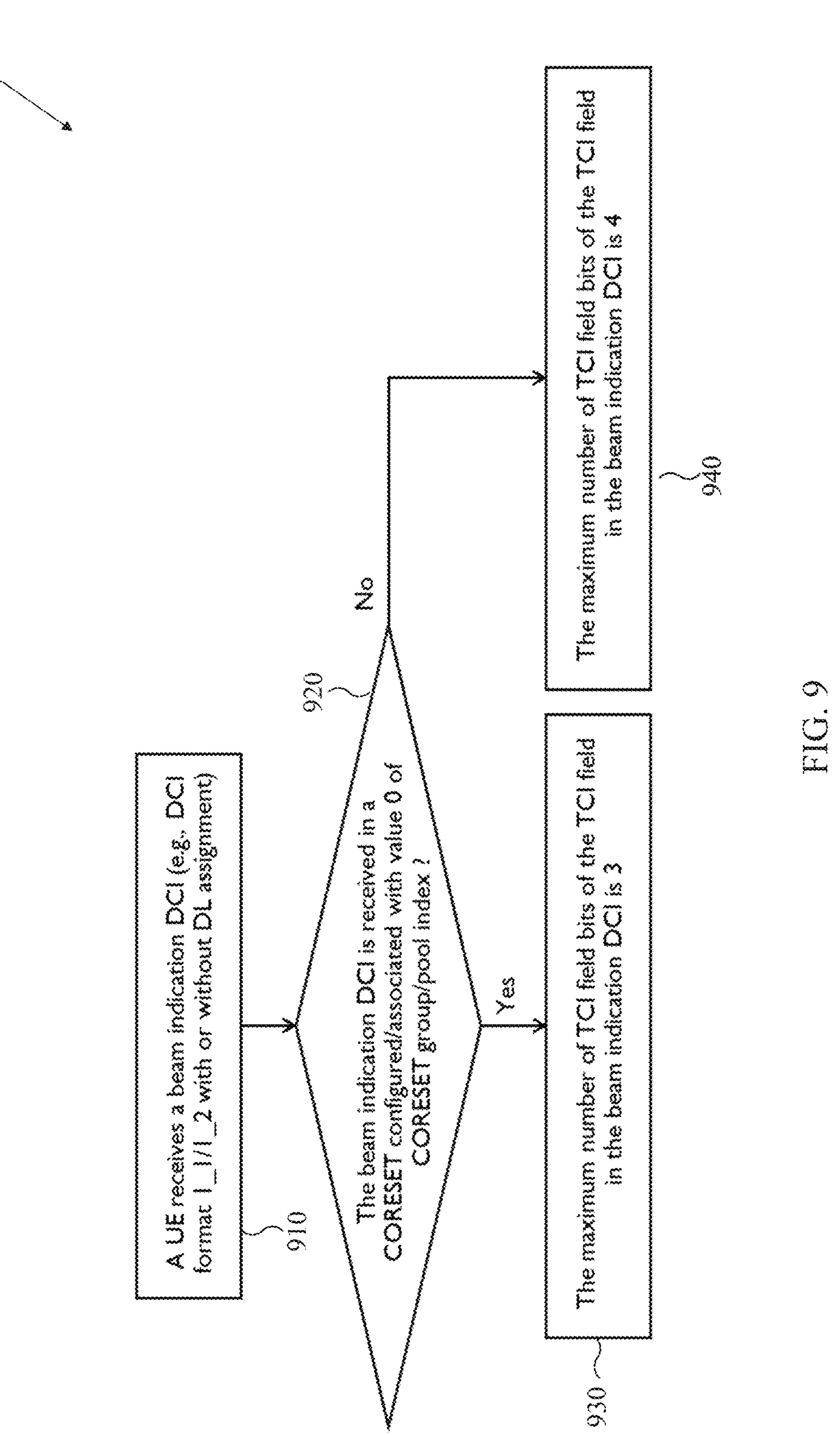
FIG. 9 illustrates a flowchart of an example UE procedure for determining the maximum number of TCI field bits according to embodiments of the present disclosure.

FIG. 9 illustrates a flowchart of an example UE procedure 900 for determining the maximum number of TCI field bits according to embodiments of the present disclosure. For example, procedure 900 can be performed by any of the UEs 111-116 and, more particularly, by processor 340. This example is for illustration only and other embodiments can be used without departing from the scope of the present disclosure.

The procedure begins in step 910, a UE receives a beam indication DCI 9eg., DCI format 1_1 or 1_2 with or without DL assignment). In step 920, the beam indication DCI may be received in a CORESET configurated/associated with a value of 0 of the CORESET group/pool index. If the value is 0, in step 930, the maximum number of TCI field bits of the TCI field in the beam indication DCI is 3. If the value is not 0, in step 940, the maximum number of TCI field bits of the TCI field in the beam indication DCI is 4.

For another example, when/if the beam indication DCI (e.g., DCI format 1_1 or 1_2 with or without DL assignment) is received in a CORESET configured/associated with value 0 (or 1) of CORESETGroupIndex/CORESETPoolIndex, the total/maximum number of TCI field bits (of the TCI field in the beam indication DCI) is Mtot1≥1; otherwise, i.e., when/if the beam indication DCI (e.g., DCI format 1_1 or 1_2 with or without DL assignment) is received in a CORESET configured/associated with value 1 (or 0) of CORESETGroupIndex/CORESETPoolIndex, the total/maximum number of TCI field bits (of the TCI field in the beam indication DCI) is Mtot2≥1. Here, (1) Mtot1=Mtot2, e.g., Mtot1=Mtot2=3 (i.e., the corresponding total/maximum number of TCI field bits of the TCI field in the beam indication DCI is 3) or Mtot1=Mtot2=4 (i.e., the corresponding total/maximum number of TCI field bits of the TCI field in the beam indication DCI is 4), (2) Mtot1>Mtot2, e.g., Mtot1=4 (i.e., the corresponding total/maximum number of TCI field bits of the TCI field in the beam indication DCI is 4) and Mtot2=3 (i.e., the corresponding total/maximum number of TCI field bits of the TCI field in the beam indication DCI is 3), or (3) Mtot1<Mtot2, e.g., Mtot1=3 (i.e., the corresponding total/maximum number of TCI field bits of the TCI field in the beam indication DCI is 3) and Mtot2=4 (i.e., the corresponding total/maximum number of TCI field bits of the TCI field in the beam indication DCI is 4).

Yet for another example, when/if the beam indication DCI (e.g., DCI format 1_1 or 1_2 with or without DL assignment) is received in a CORESET configured/associated with value 0 (or 1) of CORESETGroupIndex/CORESETPoolIndex, a first set of one or more TCI field bits (out of the total/maximum TCI field bits of the TCI field in the beam indication DCI) could be used to indicate a TCI codepoint (and; therefore, the corresponding TCI state(s) indicated therein) determined/selected from one or more of the Nc≥1 (e.g., 8, 16, 32 or 64) TCI state codepoints activated by the MAC CE according one or more examples herein, from the first and/or second set of TCI state codepoints activated by the MAC CE according to one or more examples described herein, and a second set of one or more TCI field bits (out of the total/maximum TCI field bits of the TCI field in the beam indication DCI) could be used to signal indication(s)/configuration(s) other than the TCI codepoint following one or more examples described herein. When/if the beam indication DCI (e.g., DCI format 1_1 or 1_2 with or without DL assignment) is received in a CORESET configured/associated with value 1 (or 0) of CORESETGroupIndex/CORESETPoolIndex, a third set of one or more TCI field bits (out of the total/maximum TCI field bits of the TCI field in the beam indication DCI) could be used to indicate a TCI codepoint (and; therefore, the corresponding TCI state(s) indicated therein) determined/selected from one or more of the Nc≥1 (e.g., 8, 16, 32 or 64) TCI state codepoints activated by the MAC CE according to one or more examples described herein or from the first and/or second set of TCI state codepoints activated by the MAC CE according to one or more examples described herein, and a fourth set of one or more TCI field bits (out of the total/maximum TCI field bits of the TCI field in the beam indication DCI) could be used to signal indication(s)/configuration(s) other than the TCI codepoint following those specified herein (such as those in one or more examples described herein). Here, the first set of TCI field bit(s), the second set of TCI field bit(s), the third set of TCI field bit(s), and/or the fourth set of TCI field bit(s) could be the same or different, and one or more of them could be determined according to those specified herein (one or more examples described herein).

Yet for another example, the index value(s) of CORESET group/pool, in which the beam indication DCI is received, could be used to indicate mapping/association between the indicated TCI states and target channels/signals from different TRPs. For instance, when/if the beam indication DCI (e.g., DCI format 1_1 or 1_2 with or without DL assignment) is received in a CORESET configured/associated with value 0 (or 1) of CORESETGroupIndex/CORESETPoolIndex, the first TCI state/pair of TCI states indicated by the TCI codepoint of the TCI field (e.g., by the first (or the last) Mc=3 TCI field bits out of the total/maximum Mtot=4 TCI field bits of the TCI field in the beam indication DCI) could be used/applied for receiving PDCCH, PDSCH, CSI-RS and/or transmitting PUCCH, PUSCH, SRS from/to one or more of the TRPs. When/if the beam indication DCI (e.g., DCI format 1_1 or 1_2 with or without DL assignment) is received in a CORESET configured/associated with value 1 (or 0) of CORESETGroupIndex/CORESETPoolIndex, the second TCI state/pair of TCI states indicated by the TCI codepoint of the TCI field (e.g., by the first (or the last) Mc=3 TCI field bits out of the total/maximum Mtot=4 TCI field bits of the TCI field in the beam indication DCI) could be used/applied for receiving PDCCH, PDSCH, CSI-RS and/or transmitting PUCCH, PUSCH, SRS from/to one or more of the TRPs. Optionally, when/if the beam indication DCI (e.g., DCI format 1_1 or 1_2 with or without DL assignment) is received in a CORESET configured/associated with value 0 (or 1) of CORESETGroupIndex/CORESETPoolIndex, the first TCI state/pair of TCI states indicated by the TCI codepoint of the TCI field (e.g., by the first (or the last) Mc=3 TCI field bits out of the total/maximum Mtot=4 TCI field bits of the TCI field in the beam indication DCI) could be used/applied for receiving a first PDCCH, a first PDSCH, a first CSI-RS and/or transmitting a first PUCCH, a first PUSCH, a first SRS from/to one or more of the TRPs. The second TCI state/pair of TCI states indicated by the TCI codepoint of the TCI field (e.g., by the first (or the last) Mc=3 TCI field bits out of the total/maximum Mtot=4 TCI field bits of the TCI field in the beam indication DCI) could be used/applied for receiving a second PDCCH, a second PDSCH, a second CSI-RS and/or transmitting a second PUCCH, a second PUSCH, and/or a second SRS from/to one or more of the TRPs. When/if the beam indication DCI (e.g., DCI format 1_1 or 1_2 with or without DL assignment) is received in a CORESET configured/associated with value 1 (or 0) of CORESETGroupIndex/CORESETPoolIndex, the first TCI state/pair of TCI states indicated by the TCI codepoint of the TCI field (e.g., by the first (or the last) Mc=3 TCI field bits out of the total/maximum Mtot=4 TCI field bits of the TCI field in the beam indication DCI) could be used/applied for receiving the second PDCCH, the second PDSCH, the second CSI-RS and/or transmitting the second PUCCH, the second PUSCH, the second SRS from/to one or more of the TRPs, and the second TCI state/pair of TCI states indicated by the TCI codepoint of the TCI field (e.g., by the first (or the last) Mc=3 TCI field bits out of the total/maximum Mtot=4 TCI field bits of the TCI field in the beam indication DCI) could be used/applied for receiving the first PDCCH, the first PDSCH, the first CSI-RS and/or transmitting the first PUCCH, the first PUSCH, and/or the first SRS from/to one or more of the TRPs.

Yet for another example, the index value(s) of CORESET group/pool, in which the beam indication DCI is received, could be used to indicate the TCI state type(s)—e.g., joint and/or separate—for the indicated TCI state(s). For instance, when/if the beam indication DCI (e.g., DCI format 1_1 or 1_2 with or without DL assignment) is received in a CORESET configured/associated with value 0 (or 1) of CORESETGroupIndex/CORESETPoolIndex, the TCI state type for the TCI state(s) indicated by the TCI codepoint of the TCI field (e.g., by the first (or the last) Mc=3 TCI field bits out of the total/maximum Mtot=4 TCI field bits of the TCI field in the beam indication DCI) could be joint. When/if the beam indication DCI (e.g., DCI format 1_1 or 1_2 with or without DL assignment) is received in a CORESET configured/associated with value 1 (or 0) of CORESETGroupIndex/CORESETPoolIndex, the TCI state type for the TCI state(s) indicated by the TCI codepoint of the TCI field (e.g., by the first (or the last) Mc=3 TCI field bits out of the total/maximum Mtot=4 TCI field bits of the TCI field in the beam indication DCI) could be separate. Alternatively, when/if the beam indication DCI (e.g., DCI format 1_1 or 1_2 with or without DL assignment) is received in a CORESET configured/associated with value 0 (or 1) of CORESETGroupIndex/CORESETPoolIndex, the TCI state type for the first TCI state/pair of TCI states indicated by the TCI codepoint of the TCI field (e.g., by the first (or the last) Mc=3 TCI field bits out of the total/maximum Mtot=4 TCI field bits of the TCI field in the beam indication DCI) could be joint. The second TCI state/pair of TCI states indicated by the TCI codepoint of the TCI field (e.g., by the first (or the last) Mc=3 TCI field bits out of the total/maximum Mtot=4 TCI field bits of the TCI field in the beam indication DCI) could be separate. When/if the beam indication DCI (e.g., DCI format 1_1 or 1_2 with or without DL assignment) is received in a CORESET configured/associated with value 1 (or 0) of CORESETGroupIndex/CORESETPoolIndex, the TCI state type for the first TCI state/pair of TCI states indicated by the TCI codepoint of the TCI field (e.g., by the first (or the last) Mc=3 TCI field bits out of the total/maximum Mtot=4 TCI field bits of the TCI field in the beam indication DCI) could be separate. The second TCI state/pair of TCI states indicated by the TCI codepoint of the TCI field (e.g., by the first (or the last) Mc=3 TCI field bits out of the total/maximum Mtot=4 TCI field bits of the TCI field in the beam indication DCI) could be joint.

For example, for Q=4, the index value(s) of CORESET group/pool, in which the beam indication DCI is received, could be used to indicate mapping/association between the indicated TCI states and target channels/signals from different TRPs. For instance, when/if the beam indication DCI (e.g., DCI format 1_1 or 1_2 with or without DL assignment) is received in a CORESET configured/associated with value '00' (or '01', '10' or '11') of CORESETGroupIndex/CORESETPoolIndex, the first TCI state/pair of TCI states indicated by the TCI codepoint of the TCI field (e.g., by the first (or the last) Mc=3 TCI field bits out of the total/maximum Mtot=4 TCI field bits of the TCI field in the beam indication DCI) could be used/applied for receiving PDCCH, PDSCH, CSI-RS and/or transmitting PUCCH, PUSCH, SRS from/to one or more of the TRPs. When/if the beam indication DCI (e.g., DCI format 1_1 or 1_2 with or without DL assignment) is received in a CORESET configured/associated with value '01' (or '00', '10' or '11') of CORESETGroupIndex/CORESETPoolIndex, the second TCI state/pair of TCI states indicated by the TCI codepoint of the TCI field (e.g., by the first (or the last) Mc=3 TCI field bits out of the total/maximum Mtot=4 TCI field bits of the TCI field in the beam indication DCI) could be used/applied for receiving PDCCH, PDSCH, CSI-RS and/or transmitting PUCCH, PUSCH, SRS from/to one or more of the TRPs. When/if the beam indication DCI (e.g., DCI format 1_1 or 1_2 with or without DL assignment) is received in a CORESET configured/associated with value '10' (or '00', '01' or '11') of CORESETGroupIndex/CORESETPoolIndex, the first TCI state/pair of TCI states indicated by the TCI codepoint of the TCI field (e.g., by the first (or the last) Mc=3 TCI field bits out of the total/maximum Mtot=4 TCI field bits of the TCI field in the beam indication DCI) could be used/applied for receiving a first PDCCH, a first PDSCH, a first CSI-RS and/or transmitting a first PUCCH, a first PUSCH, a first SRS from/to one or more of the TRPs. The second TCI state/pair of TCI states indicated by the TCI codepoint of the TCI field (e.g., by the first (or the last) Mc=3 TCI field bits out of the total/maximum Mtot=4 TCI field bits of the TCI field in the beam indication DCI) could be used/applied for receiving a second PDCCH, a second PDSCH, a second CSI-RS and/or transmitting a second PUCCH, a second PUSCH, a second SRS from/to one or more of the TRPs. When/if the beam indication DCI (e.g., DCI format 1_1 or 1_2 with or without DL assignment) is received in a CORESET configured/associated with value '11' (or '00', '01' or '10') of CORESETGroupIndex/CORESETPoolIndex, the first TCI state/pair of TCI states indicated by the TCI codepoint of the TCI field (e.g., by the first (or the last) Mc=3 TCI field bits out of the total/maximum Mtot=4 TCI field bits of the TCI field in the beam indication DCI) could be used/applied for receiving the second PDCCH, the second PDSCH, the second CSI-RS and/or transmitting the second PUCCH, the second PUSCH, the second SRS from/to one or more of the TRPs. The second TCI state/pair of TCI states indicated by the TCI codepoint of the TCI field (e.g., by the first (or the last) Mc=3 TCI field bits out of the total/maximum Mtot=4 TCI field bits of the TCI field in the beam indication DCI) could be used/applied for receiving the first PDCCH, the first PDSCH, the first CSI-RS and/or transmitting the first PUCCH, the first PUSCH, the first SRS from/to one or more of the TRPs.

For another example, the index value(s) of CORESET group/pool, in which the beam indication DCI is received, could be used to indicate the TCI state type(s)—e.g., joint and/or separate—for the indicated TCI state(s). For instance, when/if the beam indication DCI (e.g., DCI format 1_1 or 1_2 with or without DL assignment) is received in a CORESET configured/associated with value '00' (or '01', '10' or '11') of CORESETGroupIndex/CORESETPoolIndex, the TCI state type for the TCI state(s) indicated by the TCI codepoint of the TCI field (e.g., by the first (or the last) Mc=3 TCI field bits out of the total/maximum Mtot=4 TCI field bits of the TCI field in the beam indication DCI) could be joint. When/if the beam indication DCI (e.g., DCI format 1_1 or 1_2 with or without DL assignment) is received in a CORESET configured/associated with value '01' (or '00', '10' or '11') of CORESETGroupIndex/CORESETPoolIndex, the TCI state type for the TCI state(s) indicated by the TCI codepoint of the TCI field (e.g., by the first (or the last) Mc=3 TCI field bits out of the total/maximum Mtot=4 TCI field bits of the TCI field in the beam indication DCI) could be separate. When/if the beam indication DCI (e.g., DCI format 1_1 or 1_2 with or without DL assignment) is received in a CORESET configured/associated with value '10' (or '00', '01' or '11') of CORESETGroupIndex/CORESETPoolIndex, the TCI state type for the first TCI state/pair of TCI states indicated by the TCI codepoint of the TCI field (e.g., by the first (or the last) Mc=3 TCI field bits out of the total/maximum Mtot=4 TCI field bits of the TCI field in the beam indication DCI) could be joint. The second TCI state/pair of TCI states indicated by the TCI codepoint of the TCI field (e.g., by the first (or the last) Mc=3 TCI field bits out of the total/maximum Mtot=4 TCI field bits of the TCI field in the beam indication DCI) could be separate. When/if the beam indication DCI (e.g., DCI format 1_1 or 1_2 with or without DL assignment) is received in a CORESET configured/associated with value '11' (or '00', '01' or '10') of CORESETGroupIndex/CORESETPoolIndex, the TCI state type for the first TCI state/pair of TCI states indicated by the TCI codepoint of the TCI field (e.g., by the first (or the last) Mc=3 TCI field bits out of the total/maximum Mtot=4 TCI field bits of the TCI field in the beam indication DCI) could be separate. The second TCI state/pair of TCI states indicated by the TCI codepoint of the TCI field (e.g., by the first (or the last) Mc=3 TCI field bits out of the total/maximum Mtot=4 TCI field bits of the TCI field in the beam indication DCI) could be joint.

In one or more examples described herein, the threshold could be (1) fixed, e.g., 8, 16, 32, or 64, or (2) configured by the network 130 via higher layer RRC signaling or/and MAC CE command or/and DCI based signaling.

In another embodiment, one or more bits of the (existing) 'Transmission Configuration Indication' (TCI) field in the beam indication DCI (e.g., DCI format 1_1 or 1_2 with or without DL assignment) or one or more bits of one or more (existing/reserved) DCI fields other than the TCI field in a DCI (e.g., a beam indication DCI 1_1 or 1_2 with or without DL assignment) could be used/repurposed to indicate from which set(s) of TCI state codepoints (e.g., the first and/or second sets of TCI state codepoints discussed herein) the indicated TCI codepoint (and; therefore, the corresponding TCI state(s) indicated therein) in the beam indication DCI (e.g., DCI format 1_1 or 1_2 with or without DL assignment) could be selected/determined. Alternatively, one or more (new) DCI fields could be introduced in a DCI (e.g., a beam indication DCI 1_1/1_2 with or without DL assignment), and used to indicate from which set(s) of TCI state codepoints (e.g., the first and/or second sets of TCI state codepoints discussed herein) the indicated TCI codepoint (and; therefore, the corresponding TCI state(s) indicated therein) in the beam indication DCI (e.g., DCI format 1_1 or 1_2 with or without DL assignment) could be selected/determined. Throughout the present disclosure, unless otherwise specified, the first bit of a DCI field is equivalent to the least significant bit (LSB) of the DCI field, and so on, and the last bit of a DCI field is equivalent to the most significant bit (MSB) of the DCI field; or, the first bit of a DCI field is equivalent to the MSB of the DCI field, and so on, and the last bit of a DCI field is equivalent to the LSB of the DCI field.

In one example, when the beam indication DCI is with DL assignment, the beam indication DCI is without DL assignment (wherein the beam indication DCI could be DCI format 1_1 or 12), the number of TCI state codepoints Nc activated by the MAC CE, the number of TCI state codepoints Nc1 in the first set of TCI codepoints activated by the MAC CE, the number of TCI state codepoints Nc2 in the second set of TCI codepoints activated by the MAC CE, the (total) number of TCI state codepoints Nc1+Nc2 in the first and second sets of TCI codepoints activated by the MAC CE is smaller/lower (or larger/greater) than a threshold or the UE 116 is explicitly indicated/configured/provided by the network 130, e.g., via higher layer RRC signaling and/or MAC CE command and/or dynamic DCI based L1 signaling that, the first (or the last) Mc≥1 TCI field bits (e.g., out of the total/maximum Mtot indicated TCI field bits) are used to indicate a TCI codepoint (and; therefore, the corresponding TCI state(s) indicated therein) determined/selected from one or more of the Nc≥1 (e.g., 8, 16, 32 or 64) TCI state codepoints activated by the MAC CE according one or more examples described herein, or from the first and/or second set of TCI state codepoints activated by the MAC CE according to one or more examples described herein, while the last (or the first) (Mtot-Mc) TCI field bits (e.g., out of the total/maximum Mtot indicated TCI field bits) could be used/repurposed to indicate from which set(s) of TCI codepoints (e.g., the first or second sets of TCI codepoints specified herein) the indicated TCI codepoint (and; therefore, the TCI state(s) indicated therein) in the beam indication DCI (e.g., DCI format 1_1 or 1_2 with or without DL assignment) is selected/determined, where 1≥Mc≥Mtot, and Mtot represents the total/maximum number of TCI field bits. For instance, for Mtot=4, when the beam indication DCI is with DL assignment, the beam indication DCI is without DL assignment (wherein the beam indication DCI could be DCI format 1_1 or 1_2), the number of TCI state codepoints Nc activated by the MAC CE, the number of TCI state codepoints Nc1 in the first set of TCI codepoints activated by the MAC CE, the number of TCI state codepoints Nc2 in the second set of TCI codepoints activated by the MAC CE, the (total) number of TCI state codepoints Nc1+Nc2 in the first and second sets of TCI codepoints activated by the MAC CE is smaller/lower (or larger/greater) than a threshold or the UE 116 is explicitly indicated/configured/provided by the network 130, e.g., via higher layer RRC signaling and/or MAC CE command and/or dynamic DCI based L1 signaling that, the first (or the last) Mc (e.g., Mc=3) TCI field bits are used to indicate the TCI codepoint, while the last (or the first) TCI field bit could be used/repurposed to indicate from which set(s) of TCI codepoints (e.g., the first or second sets of TCI codepoints specified herein) the indicated TCI codepoint (and; therefore, the TCI state(s) indicated therein) in the beam indication DCI (e.g., DCI format 1_1 or 1_2 with or without DL assignment) is selected/determined.

For example, when/if the last (or the first) TCI field bit is set to '0', the TCI codepoint, e.g., indicated by all or the first (or the last) Mc (e.g., Mc=3) TCI field bits of the TCI field, could be determined/selected from the first set of TCI codepoints activated by the MAC CE according to those specified herein. When/if the last (or the first) TCI field bit is set to '1', the TCI codepoint, e.g., indicated by all or the first (or the last) Mc (e.g., Mc=3) TCI field bits of the TCI field, could be determined/selected from the second set of TCI codepoints activated by the MAC CE according to those specified herein.

For another example, when/if the last (or the first) TCI field bit is set to '1', the TCI codepoint, e.g., indicated by all or the first (or the last) Mc (e.g., Mc=3) TCI field bits of the TCI field, could be determined/selected from the first set of TCI codepoints activated by the MAC CE according to those specified herein. When/if the last (or the first) TCI field bit is set to '0', the TCI codepoint, e.g., indicated by all or the first (or the last) Mc (e.g., Mc=3) TCI field bits of the TCI field, could be determined/selected from the second set of TCI codepoints activated by the MAC CE according to those specified herein.

Alternatively, the last (or the first) two TCI field bits could be used/repurposed to indicate from which set(s) of TCI codepoints (e.g., the first and/or second sets of TCI codepoints specified herein) the indicated TCI codepoint (and; therefore, the TCI state(s) indicated therein) in the beam indication DCI (e.g., DCI format 1_1 or 1_2 with or without DL assignment) is selected/determined.

For example, when/if the last (or the first) two TCI field bits are set to '00' (or '01', '10' or '11'), the TCI codepoint, e.g., indicated by all or the first (or the last) Mc (e.g., Mc=3) TCI field bits of the TCI field, could be determined/selected from the first set of TCI codepoints activated by the MAC CE according to those specified herein. When/if the last (or the first) two TCI field bits are set to '01' (or '00', '10' or '11'), the TCI codepoint, e.g., indicated by all or the first (or the last) Mc (e.g., Mc=3) TCI field bits of the TCI field, could be determined/selected from the second set of TCI codepoints activated by the MAC CE according to those specified herein. When/if the last (or the first) two TCI field bits are set to '10' (or '01', '10' or '11'), the TCI codepoint, e.g., indicated by all or the first (or the last) Mc (e.g., Mc=3) TCI field bits of the TCI field, could be determined/selected from both the first and second sets of TCI codepoints activated by the MAC CE according to those specified herein. When/if the last (or the first) two TCI field bits are set to '11' (or '00', '01' or '10'), the TCI codepoint, e.g., indicated by all or the first (or the last) Mc (e.g., Mc=3) TCI field bits of the TCI field, could be determined/selected from both the first and second sets of TCI codepoints activated by the MAC CE according to those specified herein.

In another example, the UE 116 could be indicated/configured/provided by the network 130, e.g., via higher layer RRC signaling/parameter and/or MAC CE command and/or dynamic DCI based L1 signaling, (which) one or more of the TCI field bits that could be used to indicate a TCI codepoint (and; therefore, the corresponding TCI state(s) indicated therein) determined/selected from one or more of the Nc≥1 (e.g., 8, 16, 32 or 64) TCI state codepoints activated by the MAC CE according to one or more examples described herein, from the first and/or second set of TCI state codepoints activated by the MAC CE according to one or more examples described herein, or (which) one or more of the TCI field bits that could be used to indicate from which set(s) of TCI state codepoints (e.g., the first and/or second sets of TCI state codepoints discussed herein) the indicated TCI codepoint (and; therefore, the corresponding TCI state(s) indicated therein) in the beam indication DCI (e.g., DCI format 1_1 or 1_2 with or without DL assignment) could be selected/determined.

For example, the UE 116 could be indicated/configured/provided by the network 130, e.g., via higher layer RRC signaling/parameter and/or MAC CE command and/or dynamic DCI based L1 signaling, (which) one or more of the TCI field bits that could be used to indicate a TCI codepoint (and; therefore, the corresponding TCI state(s) indicated therein) determined/selected from one or more of the Nc≥1 (e.g., 8, 16, 32 or 64) TCI state codepoints activated by the MAC CE according to one or more examples described herein or from the first and/or second set of TCI state codepoints activated by the MAC CE according to one or more examples described herein. For this case, the rest of the TCI field bits (other than the indicated one or more of the TCI field bits) could be used to indicate from which set(s) of TCI state codepoints (e.g., the first and/or second sets of TCI state codepoints discussed herein) the indicated TCI codepoint (and; therefore, the corresponding TCI state(s) indicated therein) in the beam indication DCI (e.g., DCI format 1_1 or 1_2 with or without DL assignment) could be selected/determined following one or more examples described herein.

For another example, the UE 116 could be indicated/configured/provided by the network 130, e.g., via higher layer RRC signaling/parameter and/or MAC CE command and/or dynamic DCI based L1 signaling, (which) one or more of the TCI field bits that could be used to indicate from which set(s) of TCI state codepoints (e.g., the first and/or second sets of TCI state codepoints discussed herein) the indicated TCI codepoint (and; therefore, the corresponding TCI state(s) indicated therein) in the beam indication DCI (e.g., DCI format 1_1 or 1_2 with or without DL assignment) could be selected/determined following one or more examples described herein. For this case, the rest of the TCI field bits could be used to indicate a TCI codepoint (and; therefore, the corresponding TCI state(s) indicated therein) determined/selected from one or more of the Nc≥1 (e.g., 8, 16, 32 or 64) TCI state codepoints activated by the MAC CE according to one or more examples described herein or from the first and/or second set of TCI state codepoints activated by the MAC CE according to one or more examples described herein.

For example, the UE 116 could be indicated/configured/provided by the network 130, e.g., via higher layer RRC signaling/parameter and/or MAC CE command and/or dynamic DCI based L1 signaling, the number of the one or more of the TCI field bits, e.g., denoted by Mc" (e.g., out of the total/maximum Mtot indicated TCI field bits), used to indicate from which set(s) of TCI state codepoints (e.g., the first and/or second sets of TCI state codepoints discussed herein) the indicated TCI codepoint (and; therefore, the corresponding TCI state(s) indicated therein) in the beam indication DCI (e.g., DCI format 1_1 or 1_2 with or without DL assignment) could be selected/determined, where 1≤Mc"≤Mtot, and Mtot represents the total/maximum number of TCI field bits. For this case, the first (or the last) Mc" TCI field bits (e.g., out of the total/maximum Mtot indicated TCI field bits) or the m-th, (m+1)-th, . . . , (m+Mc"−1)-th TCI field bits (e.g., out of the total/maximum Mtot indicated TCI field bits) could be used to indicate from which set(s) of TCI state codepoints (e.g., the first and/or second sets of TCI state codepoints discussed herein) the indicated TCI codepoint (and; therefore, the corresponding TCI state(s) indicated therein) in the beam indication DCI (e.g., DCI format 1_1 or 1_2 with or without DL assignment) could be selected/determined following one or more examples described herein, where m∈{1, . . . , Mtot}. Here the value of m could be determined according to: (1) fixed in the system specifications, e.g., m=1, or (2) configured/indicated/provided to the UE 116 by the network 130, e.g., via higher layer RRC signaling and/or MAC CE command and/or dynamic DCI based signaling.

For another example, the UE 116 could be indicated/configured/provided by the network 130, e.g., via higher layer RRC signaling/parameter and/or MAC CE command and/or dynamic DCI based L1 signaling, a bitmap of length Mtot, with each bit position/entry in the bitmap corresponding to a TCI field bit. For this case, if a bit position/entry of the bitmap is set to '1' (or '0'), the TCI field bit corresponding/associated to the bit position/entry could be used to indicate from which set(s) of TCI state codepoints (e.g., the first and/or second sets of TCI state codepoints discussed herein) the indicated TCI codepoint (and; therefore, the corresponding TCI state(s) indicated therein) in the beam indication DCI (e.g., DCI format 1_1 or 1_2 with or without DL assignment) could be selected/determined following one or more examples described herein.

Yet for another example, the UE 116 could be indicated/configured/provided by the network 130, e.g., via higher layer RRC signaling/parameter and/or MAC CE command and/or dynamic DCI based L1 signaling, a set of TCI field bit positions or indexes of TCI field bits. For this case, the TCI field bits corresponding/associated to the indicated/configured/provided TCI field bit positions or indexes of TCI field bits could be used to indicate from which set(s) of TCI state codepoints (e.g., the first and/or second sets of TCI state codepoints discussed herein) the indicated TCI codepoint (and; therefore, the corresponding TCI state(s) indicated therein) in the beam indication DCI (e.g., DCI format 1_1 or 1_2 with or without DL assignment) could be selected/determined following one or more examples described herein. That is, when the beam indication DCI is with DL assignment, the beam indication DCI is without DL assignment (wherein the beam indication DCI could be DCI format 11 or 12), the number of TCI state codepoints Nc activated by the MAC CE, the number of TCI state codepoints Nc1 in the first set of TCI codepoints activated by the MAC CE, the number of TCI state codepoints Nc2 in the second set of TCI codepoints activated by the MAC CE, the (total) number of TCI state codepoints Nc1+Nc2 in the first and second sets of TCI codepoints activated by the MAC CE is smaller/lower (or larger/greater) than a threshold or the UE 116 is explicitly indicated/configured/provided by the network 130, e.g., via higher layer RRC signaling and/or MAC CE command and/or dynamic DCI based L1 signaling, e.g., the number of the one or more of the TCI field bits (e.g., out of the total/maximum indicated TCI field bits) used to indicate from which set(s) of TCI state codepoints the indicated TCI codepoint in the beam indication DCI is selected/determined, the bitmap indicating the one or more of the TCI field bits (e.g., out of the total/maximum indicated TCI field bits) used to indicate from which set(s) of TCI state codepoints the indicated TCI codepoint in the beam indication DCI could be selected/determined or the set of TCI field bit positions/indexes of TCI field bits indicating the one or more of the TCI field bits (e.g., out of the total/maximum indicated TCI field bits) used to indicate from which set(s) of TCI state codepoints the indicated TCI codepoint in the beam indication DCI could be selected/determined as discussed/described herein, the indicated one or more of the TCI field bits could be used to indicate from which set(s) of TCI state codepoints (e.g., the first and/or second sets of TCI state codepoints discussed herein) the indicated TCI codepoint (and; therefore, the corresponding TCI state(s) indicated therein) in the beam indication DCI (e.g., DCI format 1_1 or 1_2 with or without DL assignment) could be selected/determined following those specified herein (e.g., following one or more examples described herein).

In the present disclosure, for a TCI field in the beam indication DCI (e.g., DCI format 1_1 or 1_2 with or without DL assignment), one or more of the TCI field bits of the TCI field could be used to indicate a TCI codepoint (and; therefore, the corresponding TCI state(s) indicated therein) determined/selected from one or more of the Nc≥1 (e.g., 8, 16, 32 or 64) TCI state codepoints activated by the MAC CE according one or more examples described herein, from the first and/or second set of TCI state codepoints activated by the MAC CE according to one or more examples described herein, and/or one or more of the TCI field bits of the TCI field could be used/repurposed to signal indication(s)/configuration(s) other than the TCI codepoint following one or more examples described herein, and/or one or more of the TCI field bits of the TCI field could be used/repurposed to indicate from which set(s) of TCI codepoints (e.g., the first or second sets of TCI codepoints specified herein) the indicated TCI codepoint (and; therefore, the TCI state(s) indicated therein) in the beam indication DCI (e.g., DCI format 1_1 or 1_2 with or without DL assignment) is selected/determined following one or more examples described herein.

In yet another example, the UE 116 could be indicated/configured/provided by the network 130, e.g., via higher layer RRC signaling/parameter and/or MAC CE command and/or dynamic DCI based L1 signaling, an indicator to indicate whether all or part of the indicated TCI field bits are used to indicate a TCI codepoint (and; therefore, the corresponding TCI state(s) indicated therein) selected/determined from one or more of the Nc≥1 (e.g., 8, 16, 32 or 64) TCI state codepoints activated by the MAC CE according to one or more examples described herein or from the first and/or second set of TCI state codepoints activated by the MAC CE according to one or more examples described herein. For instance, the indicator could be a one-bit indicator. If the one-bit indicator is set to '0' (or '1'), all the indicated TCI field bits (e.g., the total/maximum Mtot indicated TCI field bits) could be used to indicate the TCI codepoint. If the one-bit indicator is set to '1' (or '0'), one or more of the indicated TCI field bits (e.g., out of the total/maximum indicated TCI field bits) could be used to indicate the TCI codepoint following one or more examples described herein, and one or more of the indicated TCI field bits (e.g., out of the total/maximum indicated TCI field bits) could be used to indicate from which set(s) of TCI state codepoints (e.g., the first and/or second sets of TCI state codepoints discussed herein) the indicated TCI codepoint (and; therefore, the corresponding TCI state(s) indicated therein) in the beam indication DCI (e.g., DCI format 1_1 or 1_2 with or without DL assignment) could be selected/determined following one or more examples described herein. As discussed herein, the (one-bit) indicator could be indicated/provided/configured/introduced in a DCI, e.g., DCI format 1_1 or 1_2 with or without DL assignment.

For example, a new DCI field could be introduced in the corresponding DCI format to indicate/configure/provide the (one-bit) indicator. The new DCI field, and; therefore, the corresponding (one-bit) indicator, could be dedicated/used for indicating whether all or part of the indicated TCI field bits are used for indicating the TCI codepoint as discussed herein.

For another example, one or more existing DCI fields (e.g., a one-bit DCI field such as NDI field) in a DCI format (e.g., in DCI format 1_1 or 1_2 with or without DL PDSCH assignment/scheduling or in DCI format 0_1/0_2) could be repurposed/used to indicate/configure/provide the (one-bit) indicator in one or more examples described herein.

Yet for another example, one or more DCI field bits/codepoints of one or more existing DCI fields (e.g., the first/last bit of an existing DCI field such as the BWP indicator field) in a DCI format (e.g., in DCI format 1_1 or 1_2 with or without DL PDSCH assignment/scheduling or in DCI format 0_1/0_2) could be repurposed/used to indicate/configure/provide the (one-bit) indicator as in one or more examples described herein In yet another example, the UE 116 could be provided/configured/indicated by the network 130, e.g., in higher layer parameter PDCCH-Config/PDSCH-Config, multiple (e.g., Q≥1) values of CORESET group/pool index. For Q=2, the value(s) of the CORESET group index (e.g., denoted by CORESETGroupIndex) or the CORESET pool index (e.g., denoted by CORESETPoolIndex) could be either 0 or 1. For Q=4, the value(s) of the CORESET group index (e.g., denoted by CORESETGroupIndex) or the CORESET pool index (e.g., denoted by CORESETPoolIndex) could be '00', '01', '10' or '11'. The value(s) of the CORESET group index (e.g., denoted by CORESETGroupIndex) or the CORESET pool index (e.g., denoted by CORESETPoolIndex) could be provided/indicated/configured in higher layer parameter ControlResourceSet that indicates/provides/configures parameters/settings for a CORESET. For this case, different control resource sets (CORESETs) could be in the same CORESET group if the CORESETs are configured/associated with a same value of CORESET group index (CORESETGroupIndex). Furthermore, different control resource sets (CORESETs) could be in the same CORESET pool if the CORESETs are configured/associated with a same value of CORESET pool index (CORESETPoolIndex).

For example, for Q=2, when/if the beam indication DCI (e.g., DCI format 1_1 or 1_2 with or without DL assignment) is received in a CORESET configured/associated with value 0 (or 1) of CORESETGroupIndex/CORESETPoolIndex, all the indicated TCI field bits (e.g., the total/maximum Mtot indicated TCI field bits) could be used to indicate the TCI codepoint. When/if the beam indication DCI (e.g., DCI format 1_1 or 1_2 with or without DL assignment) is received in a CORESET configured/associated with value 1 (or 0), one or more of the indicated TCI field bits (e.g., out of the total/maximum indicated TCI field bits) could be used to indicate the TCI codepoint following one or more examples described herein. One or more of the indicated TCI field bits (e.g., out of the total/maximum indicated TCI field bits) could be used to indicate from which set(s) of TCI state codepoints (e.g., the first and/or second sets of TCI state codepoints discussed herein) the indicated TCI codepoint (and; therefore, the corresponding TCI state(s) indicated therein) in the beam indication DCI (e.g., DCI format 1_1 or 1_2 with or without DL assignment) could be selected/determined following one or more examples described herein.

For another example, for Q=2, when/if the beam indication DCI (e.g., DCI format 1_1 or 1_2 with or without DL assignment) is received in a CORESET configured/associated with value 0 (or 1) of CORESETGroupIndex/CORESETPoolIndex, a first set of one or more TCI field bits (out of the total/maximum TCI field bits of the TCI field in the beam indication DCI) could be used to indicate a TCI codepoint (and; therefore, the corresponding TCI state(s) indicated therein) determined/selected from one or more of the Nc≥1 (e.g., 8, 16, 32 or 64) TCI state codepoints activated by the MAC CE according to one or more examples described herein, or from the first and/or second set of TCI state codepoints activated by the MAC CE according to one or more examples described herein. A second set of one or more TCI field bits (out of the total/maximum TCI field bits of the TCI field in the beam indication DCI) could be used to indicate from which set(s) of TCI state codepoints (e.g., the first and/or second sets of TCI state codepoints discussed herein) the indicated TCI codepoint (and; therefore, the corresponding TCI state(s) indicated therein) in the beam indication DCI (e.g., DCI format 1_1 or 1_2 with or without DL assignment) could be selected/determined following one or more examples described herein. When/if the beam indication DCI (e.g., DCI format 1_1 or 1_2 with or without DL assignment) is received in a CORESET configured/associated with value 1 (or 0) of CORESETGroupIndex/CORESETPoolIndex, a third set of one or more TCI field bits (out of the total/maximum TCI field bits of the TCI field in the beam indication DCI) could be used to indicate a TCI codepoint (and; therefore, the corresponding TCI state(s) indicated therein) determined/selected from one or more of the Nc≥1 (e.g., 8, 16, 32 or 64) TCI state codepoints activated by the MAC CE according to one or more examples described herein, or from the first and/or second set of TCI state codepoints activated by the MAC CE according to one or more examples described herein. A fourth set of one or more TCI field bits (out of the total/maximum TCI field bits of the TCI field in the beam indication DCI) could be used to indicate from which set(s) of TCI state codepoints (e.g., the first and/or second sets of TCI state codepoints discussed herein) the indicated TCI codepoint (and; therefore, the corresponding TCI state(s) indicated therein) in the beam indication DCI (e.g., DCI format 1_1 or 1_2 with or without DL assignment) could be selected/determined following one or more examples described herein. Here, the first set of TCI field bit(s), the second set of TCI field bit(s), the third set of TCI field bit(s), and/or the fourth set of TCI field bit(s) could be the same or different, and one or more of them could be determined according to one or more examples described herein.

Figure 10:
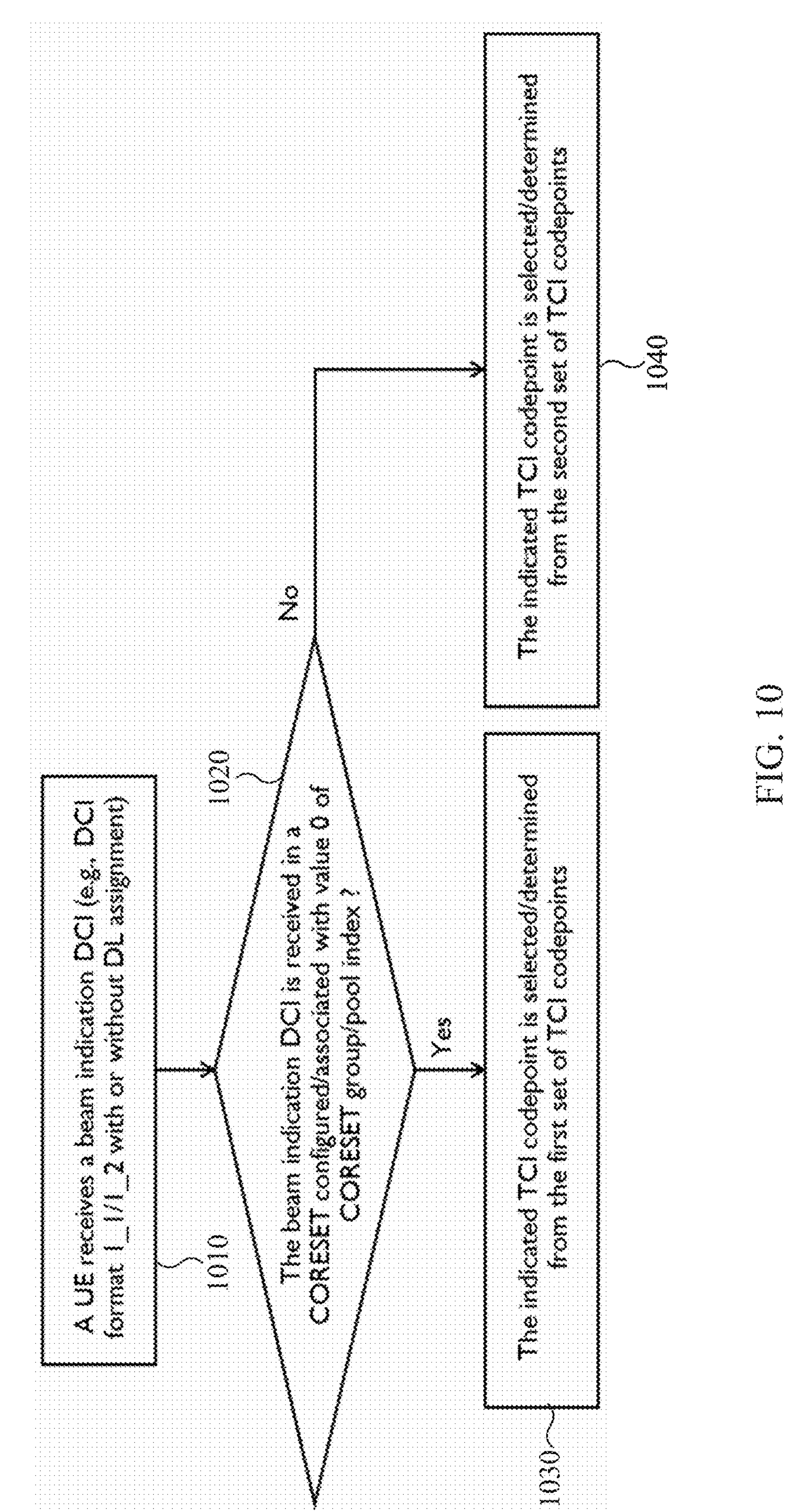
FIG. 10 illustrates a flowchart of an example UE procedure for determining the set(s) of TCI codepoints from which the indicated TCI codepoint is selected/determined according to embodiments of the present disclosure.

FIG. 10 illustrates a flowchart of an example UE procedure 1000 for determining the set(s) of TCI codepoints from which the indicated TCI codepoint is selected/determined according to embodiments of the present disclosure. For example, procedure 1000 can be performed by any of the UEs 111-116 and, more particularly, the processor 340. This example is for illustration only and other embodiments can be used without departing from the scope of the present disclosure.

The procedure begins with step 1010, a UE receives a beam indication DCI (e.g., DCI format 1_1 or 1_2 with or without DL assignment). In step 1020, the beam indication DCI can be received in a CORESET configured/associated with a (possible) value of 0 of the CORESET group/pool index. If so, in step 1030, the indicated TCI codepoint is then selected/determined from the first set of TCI codepoints. Otherwise, in step 1040, the indicated TCI codepoint is then selected/determined from the second set of TCI codepoints.

Yet for another example, for Q=2, when/if the beam indication DCI (e.g., DCI format 1_1 or 1_2 with or without DL assignment) is received in a CORESET configured/associated with value 0 (or 1) of CORESETGroupIndex/CORESETPoolIndex, the TCI codepoint, e.g., indicated by all or the first (or the last) Mc (e.g., Mc=3) TCI field bits of the TCI field, could be determined/selected from the first set of TCI codepoints activated by the MAC CE according to one or more examples described herein. When/if the beam indication DCI (e.g., DCI format 1_1 or 1_2 with or without DL assignment) is received in a CORESET configured/associated with value 1 (or 0), the TCI codepoint, e.g., indicated by all or the first (or the last) Mc (e.g., Mc=3) TCI field bits of the TCI field, could be determined/selected from the second set of TCI codepoints activated by the MAC CE according to one or more examples described herein.

Yet for another example, for Q=4, when/if the beam indication DCI (e.g., DCI format 1_1 or 1_2 with or without DL assignment) is received in a CORESET configured/associated with value '00' (or '01', '10' or '11') of CORESETGroupIndex/CORESETPoolIndex, the TCI codepoint, e.g., indicated by all or the first (or the last) Mc (e.g., Mc=3) TCI field bits of the TCI field, could be determined/selected from the first set of TCI codepoints activated by the MAC CE according to one or more examples described herein. When/if the beam indication DCI (e.g., DCI format 1_1 or 1_2 with or without DL assignment) is received in a CORESET configured/associated with value '01' (or '00', '10' or '11'), the TCI codepoint, e.g., indicated by all or the first (or the last) Mc (e.g., Mc=3) TCI field bits of the TCI field, could be determined/selected from the second set of TCI codepoints activated by the MAC CE according to one or more examples described herein. When/if the beam indication DCI (e.g., DCI format 1_1 or 1_2 with or without DL assignment) is received in a CORESET configured/associated with value '10' (or '00', '01' or '11'), the TCI codepoint, e.g., indicated by all or the first (or the last) Mc (e.g., Mc=3) TCI field bits of the TCI field, could be determined/selected from both the first and second sets of TCI codepoints activated by the MAC CE according to one or more examples described herein. When/if the beam indication DCI (e.g., DCI format 1_1 or 1_2 with or without DL assignment) is received in a CORESET configured/associated with value '11' (or '00', '01' or '10'), the TCI codepoint, e.g., indicated by all or the first (or the last) Mc (e.g., Mc=3) TCI field bits of the TCI field, could be determined/selected from both the first and second sets of TCI codepoints activated by the MAC CE according to one or more examples described herein.

In yet another example, the UE 116 could receive from the network 130, e.g., via higher layer RRC signaling and/or MAC CE command and/or dynamic DCI based L1 signaling, an indicator to indicate from which set(s) of TCI state codepoints (e.g., the first and/or second sets of TCI state codepoints discussed herein) the indicated TCI codepoint (and; therefore, the corresponding TCI state(s) indicated therein) in the beam indication DCI (e.g., DCI format 1_1 or 1_2 with or without DL assignment) could be selected/determined following those specified herein (e.g., following one or more examples described herein).

For example, the indicator could be a one-bit (flag) indicator. For this case, when/if the one-bit (flag) indicator is set to '0' (or '1'), all the indicated TCI field bits (e.g., the total/maximum Mtot indicated TCI field bits) could be used to indicate the TCI codepoint. When/if the one-bit (flag) indicator is set to '1' (or '0'), one or more of the indicated TCI field bits (e.g., out of the total/maximum indicated TCI field bits) could be used to indicate the TCI codepoint following one or more examples described herein. One or more of the indicated TCI field bits (e.g., out of the total/maximum indicated TCI field bits) could be used to indicate from which set(s) of TCI state codepoints (e.g., the first and/or second sets of TCI state codepoints discussed herein) the indicated TCI codepoint (and; therefore, the corresponding TCI state(s) indicated therein) in the beam indication DCI (e.g., DCI format 1_1 or 1_2 with or without DL assignment) could be selected/determined following one or more examples described herein.

For another example, the indicator could be a one-bit (flag) indicator. For this case, when/if the one-bit (flag) indicator is set to '0' (or '1'), a first set of one or more TCI field bits (out of the total/maximum TCI field bits of the TCI field in the beam indication DCI) could be used to indicate a TCI codepoint (and; therefore, the corresponding TCI state(s) indicated therein) determined/selected from one or more of the Nc≥1 (e.g., 8, 16, 32 or 64) TCI state codepoints activated by the MAC CE according to one or more examples described herein, or from the first and/or second set of TCI state codepoints activated by the MAC CE according to one or more examples described herein. A second set of one or more TCI field bits (out of the total/maximum TCI field bits of the TCI field in the beam indication DCI) could be used to indicate from which set(s) of TCI state codepoints (e.g., the first and/or second sets of TCI state codepoints discussed herein) the indicated TCI codepoint (and; therefore, the corresponding TCI state(s) indicated therein) in the beam indication DCI (e.g., DCI format 1_1 or 1_2 with or without DL assignment) could be selected/determined following one or more examples described herein. When/if the one-bit (flag) indicator is set to '1' (or '0'), a third set of one or more TCI field bits (out of the total/maximum TCI field bits of the TCI field in the beam indication DCI) could be used to indicate a TCI codepoint (and; therefore, the corresponding TCI state(s) indicated therein) determined/selected from one or more of the Nc≥1 (e.g., 8, 16, 32 or 64) TCI state codepoints activated by the MAC CE according to one or more examples described herein, or from the first and/or second set of TCI state codepoints activated by the MAC CE according to one or more examples described herein. A fourth set of one or more TCI field bits (out of the total/maximum TCI field bits of the TCI field in the beam indication DCI) could be used to indicate from which set(s) of TCI state codepoints (e.g., the first and/or second sets of TCI state codepoints discussed herein) the indicated TCI codepoint (and; therefore, the corresponding TCI state(s) indicated therein) in the beam indication DCI (e.g., DCI format 1_1 or 1_2 with or without DL assignment) could be selected/determined following one or more examples described herein. Here, the first set of TCI field bit(s), the second set of TCI field bit(s), the third set of TCI field bit(s), and/or the fourth set of TCI field bit(s) could be the same or different, and one or more of them could be determined according to one or more examples described herein.

Yet for another example, the indicator could be a one-bit (flag) indicator. For this case, when/if the one-bit (flag) indicator is set to '0' (or '1'), the TCI codepoint, e.g., indicated by all or the first (or the last) Mc (e.g., Mc=3) TCI field bits of the TCI field, could be determined/selected from the first set of TCI codepoints activated by the MAC CE according to one or more examples described herein. When/if the one-bit (flag) indicator is set to '1' (or '0'), the TCI codepoint, e.g., indicated by all or the first (or the last) Mc (e.g., Mc=3) TCI field bits of the TCI field, could be determined/selected from the second set of TCI codepoints activated by the MAC CE according to one or more examples described herein.

Yet for another example, the indicator could be a 2-bit indicator. For this case, when/if the 2-bit indicator is set to '00' (or '01', '10' or '11'), the TCI codepoint, e.g., indicated by all or the first (or the last) Mc (e.g., Mc=3) TCI field bits of the TCI field, could be determined/selected from the first set of TCI codepoints activated by the MAC CE according to one or more examples described herein. When/if the 2-bit indicator is set to '01' (or '00', '10' or '11'), the TCI codepoint, e.g., indicated by all or the first (or the last) Mc (e.g., Mc=3) TCI field bits of the TCI field, could be determined/selected from the second set of TCI codepoints activated by the MAC CE according to one or more examples described herein. When/if the 2-bit indicator is set to '10' (or '00', '01' or '11'), the TCI codepoint, e.g., indicated by all or the first (or the last) Mc (e.g., Mc=3) TCI field bits of the TCI field, could be determined/selected from both the first and second sets of TCI codepoints activated by the MAC CE according to one or more examples described herein. When/if the 2-bit indicator is set to '11' (or '00', '01' or '10'), the TCI codepoint, e.g., indicated by all or the first (or the last) Mc (e.g., Mc=3) TCI field bits of the TCI field, could be determined/selected from both the first and second sets of TCI codepoints activated by the MAC CE according to one or more examples described herein.

As discussed herein, the indicator could be indicated/provided/configured/introduced in a DCI, e.g., in a beam indication DCI 1_1 or 1_2 with or without DL assignment.

For example, a new DCI field could be introduced in the corresponding DCI format to indicate/configure/provide the indicator. The new DCI field and; therefore, the corresponding indicator, could be dedicated/used to indicate from which set(s) of TCI state codepoints (e.g., the first and/or second sets of TCI state codepoints discussed herein) the indicated TCI codepoint (and; therefore, the corresponding TCI state(s) indicated therein) in the beam indication DCI (e.g., DCI format 1_1 or 1_2 with or without DL assignment) could be selected/determined following one or more examples described herein.

For another example, one or more existing DCI fields (e.g., a one-bit DCI field such as NDI field or a 2-bit DCI field) in a DCI format (e.g., in DCI format 1_1 or 1_2 with or without DL PDSCH assignment/scheduling or in DCI format 0_1/0_2) could be repurposed/used to indicate/configure/provide the indicator in one or more examples described herein.

Yet for another example, one or more DCI field bits/codepoints of one or more existing DCI fields (e.g., the first/last bit of an existing DCI field such as the BWP indicator field) in a DCI format (e.g., in DCI format 1_1 or 1_2 with or without DL PDSCH assignment/scheduling or in DCI format 0_1/0_2) could be repurposed/used to indicate/configure/provide the indicator in one or more examples described herein.

In yet another embodiment, one or more bits of one or more (existing/reserved) DCI fields other than the TCI field in a DCI (e.g., a beam indication DCI 1_1 or 1_2 with or without DL assignment) could be used/repurposed—together with one or more of the TCI field bits of the TCI field in the beam indication DCI—to indicate a TCI codepoint, selected/determined from the first and/or second sets of TCI codepoints activated by the MAC CE according to one or more examples described herein. Alternatively, one or more (new) DCI fields could be introduced in a DCI (e.g., a beam indication DCI 1_1/1_2 with or without DL assignment), and used—together with one or more of the TCI field bits of the TCI field in the beam indication DCI—to indicate a TCI codepoint, selected/determined from the first and/or second sets of TCI codepoints activated by the MAC CE according to one or more examples described herein. Throughout the present disclosure, unless otherwise specified, the first bit of a DCI field is equivalent to the least significant bit (LSB) of the DCI field, and so on. The last bit of a DCI field is equivalent to the most significant bit (MSB) of the DCI field or the first bit of a DCI field is equivalent to the MSB of the DCI field, and so on. The last bit of a DCI field is equivalent to the LSB of the DCI field.

In one example, the UE 116 could be provided/configured/indicated by the network 130, e.g., in higher layer parameter PDCCH-Config/PDSCH-Config, multiple (e.g., Q≥1) values of CORESET group/pool index. For Q=2, the value(s) of the CORESET group index (e.g., denoted by CORESETGroupIndex) or the CORESET pool index (e.g., denoted by CORESETPoolIndex) could be either 0 or 1. For Q=4, the value(s) of the CORESET group index (e.g., denoted by CORESETGroupIndex) or the CORESET pool index (e.g., denoted by CORESETPoolIndex) could be '00', '01', '10' or '11'. The value(s) of the CORESET group index (e.g., denoted by CORESETGroupIndex) or the CORESET pool index (e.g., denoted by CORESETPoolIndex) could be provided/indicated/configured in higher layer parameter ControlResourceSet that indicates/provides/configures parameters/settings for a CORESET. For this case, different control resource sets (CORESETs) could be in the same CORESET group if the CORESETs are configured/associated with a same value of CORESET group index (CORESETGroupIndex). Furthermore, different control resource sets (CORESETs) could be in the same CORESET pool if the CORESETs are configured/associated with a same value of CORESET pool index (CORESETPoolIndex).

For example, the index value(s) of CORESET group/pool, in which the beam indication DCI is received, could be used—together with one or more of the TCI field bits of the TCI field in the beam indication DCI—to indicate a TCI codepoint, selected/determined from the first and/or second sets of TCI codepoints activated by the MAC CE according to one or more examples described herein.

In one example (e.g., for Q=2), the DCI field bits in the beam indication DCI used to indicate/provide the TCI codepoint (and; therefore, the TCI state(s) indicated therein) selected/determined from the first and/or second sets of TCI codepoints activated by the MAC CE, according to one or more examples described herein, could include/contain/comprise the CORESET group/pool index value as the LSB and the TCI field bit(s) of the TCI field in the beam indication DCI. For instance, when/if the beam indication DCI (e.g., DCI format 1_1 or 1_2 with or without DL assignment) is received in a CORESET configured/associated with value 0 of CORESETGroupIndex/CORESETPoolIndex and the TCI field bits of the TCI field in the beam indication DCI are '001', the DCI field bits used to indicate the TCI codepoint (and; therefore, the TCI state(s) indicated therein) could be '0010'. When/if the beam indication DCI (e.g., DCI format 1_1 or 1_2 with or without DL assignment) is received in a CORESET configured/associated with value 1 of CORESETGroupIndex/CORESETPoolIndex and the TCI field bits of the TCI field in the beam indication DCI are '001', the DCI field bits used to indicate the TCI codepoint (and; therefore, the TCI state(s) indicated therein) could be '0011'.

In another example (e.g., for Q=2), the DCI field bits in the beam indication DCI used to indicate/provide the TCI codepoint (and; therefore, the TCI state(s) indicated therein) selected/determined from the first and/or second sets of TCI codepoints activated by the MAC CE, according to one or more examples described herein, could include/contain/comprise the CORESET group/pool index value as the MSB and the TCI field bit(s) of the TCI field in the beam indication DCI. For instance, when/if the beam indication DCI (e.g., DCI format 1_1 or 1_2 with or without DL assignment) is received in a CORESET configured/associated with value 0 of CORESETGroupIndex/CORESETPoolIndex and the TCI field bits of the TCI field in the beam indication DCI are '001', the DCI field bits used to indicate the TCI codepoint (and; therefore, the TCI state(s) indicated therein) could be '0001'. When/if the beam indication DCI (e.g., DCI format 1_1 or 1_2 with or without DL assignment) is received in a CORESET configured/associated with value 1 of CORESETGroupIndex/CORESETPoolIndex and the TCI field bits of the TCI field in the beam indication DCI are '001', the DCI field bits used to indicate the TCI codepoint (and; therefore, the TCI state(s) indicated therein) could be '1001'.

FIG. 11 illustrates an example of mapping TCI field bits in a beam indication DCI to TCI codepoints activated by a MAC CE 1100 according to embodiments of the present disclosure. For example, DCI 1100 can be transmitted by gNB 102 of FIG. 2 and, more particularly, by processor 225, to any of the UEs 111-116. This example is for illustration only and other embodiments can be used without departing from the scope of the present disclosure.

For example, using both the index value(s) of CORESET group/pool, in which the beam indication DCI is received, and the TCI field bits to indicate a TCI codepoint in the beam indication DCI is provided. In this example, the DCI field bits used to indicate the TCI codepoint comprises/includes/contains the index value of a CORESET group/pool, from which the beam indication DCI is received, as the MSB, and the TCI field bits as the LSBs.

For another example, the index value(s) of CORESET group/pool, in which the beam indication DCI is received, could be used—together with one or more of the TCI field bits of the TCI field in the beam indication DCI—to indicate a TCI codepoint, selected/determined from the first and/or second sets of TCI codepoints activated by the MAC CE according to one or more examples described herein.

In one example (e.g., for Q=4), the DCI field bits in the beam indication DCI used to indicate/provide the TCI codepoint (and; therefore, the TCI state(s) indicated therein) selected/determined from the first and/or second sets of TCI codepoints activated by the MAC CE, according to one or more examples described herein, could include/contain/comprise the CORESET group/pool index values as the LSBs and the TCI field bit(s) of the TCI field in the beam indication DCI. For instance, when/if the beam indication DCI (e.g., DCI format 1_1 or 1_2 with or without DL assignment) is received in a CORESET configured/associated with value 0 or equivalently '00' of CORESETGroupIndex/CORESETPoolIndex and the TCI field bits of the TCI field in the beam indication DCI are '001', the DCI field bits used to indicate the TCI codepoint (and; therefore, the TCI state(s) indicated therein) could be '00100'. When/if the beam indication DCI (e.g., DCI format 1_1 or 1_2 with or without DL assignment) is received in a CORESET configured/associated with value 1 or equivalently '01' of CORESETGroupIndex/CORESETPoolIndex and the TCI field bits of the TCI field in the beam indication DCI are '001', the DCI field bits used to indicate the TCI codepoint (and; therefore, the TCI state(s) indicated therein) could be '00101'. When/if the beam indication DCI (e.g., DCI format 1_1 or 1_2 with or without DL assignment) is received in a CORESET configured/associated with value 2 or equivalently '10' of CORESETGroupIndex/CORESETPoolIndex and the TCI field bits of the TCI field in the beam indication DCI are '001', the DCI field bits used to indicate the TCI codepoint (and; therefore, the TCI state(s) indicated therein) could be '00110'. When/if the beam indication DCI (e.g., DCI format 1_1 or 1_2 with or without DL assignment) is received in a CORESET configured/associated with value 3 or equivalently '11' of CORESETGroupIndex/CORESETPoolIndex and the TCI field bits of the TCI field in the beam indication DCI are '001', the DCI field bits used to indicate the TCI codepoint (and; therefore, the TCI state(s) indicated therein) could be '00111'.

In another example, the DCI field bits in the beam indication DCI used to indicate/provide the TCI codepoint (and; therefore, the TCI state(s) indicated therein) selected/determined from the first and/or second sets of TCI codepoints activated by the MAC CE, according to one or more examples described herein, could include/contain/comprise the CORESET group/pool index value as the MSBs and the TCI field bit(s) of the TCI field in the beam indication DCI. For instance, when/if the beam indication DCI (e.g., DCI format 1_1 or 1_2 with or without DL assignment) is received in a CORESET configured/associated with value 0 or equivalently '00' of CORESETGroupIndex/CORESETPoolIndex and the TCI field bits of the TCI field in the beam indication DCI are '001', the DCI field bits used to indicate the TCI codepoint (and; therefore, the TCI state(s) indicated therein) could be '00001'. When/if the beam indication DCI (e.g., DCI format 1_1 or 1_2 with or without DL assignment) is received in a CORESET configured/associated with value 1 or equivalently '01' of CORESETGroupIndex/CORESETPoolIndex and the TCI field bits of the TCI field in the beam indication DCI are '001', the DCI field bits used to indicate the TCI codepoint (and; therefore, the TCI state(s) indicated therein) could be '01001'. When/if the beam indication DCI (e.g., DCI format 1_1 or 1_2 with or without DL assignment) is received in a CORESET configured/associated with value 2 or equivalently '10' of CORESETGroupIndex/CORESETPoolIndex and the TCI field bits of the TCI field in the beam indication DCI are '001', the DCI field bits used to indicate the TCI codepoint (and; therefore, the TCI state(s) indicated therein) could be '10001'. When/if the beam indication DCI (e.g., DCI format 1_1 or 1_2 with or without DL assignment) is received in a CORESET configured/associated with value 3 or equivalently '11' of CORESETGroupIndex/CORESETPoolIndex and the TCI field bits of the TCI field in the beam indication DCI are '001', the DCI field bits used to indicate the TCI codepoint (and; therefore, the TCI state(s) indicated therein) could be '11001'.

In another example, the DCI field bits in the beam indication DCI used to indicate/provide the TCI codepoint (and; therefore, the TCI state(s) indicated therein) selected/determined from the first and/or second sets of TCI codepoints activated by the MAC CE, according to one or more examples described herein, could include/contain/comprise one or more bits of one or more (existing/reserved) DCI fields other than the TCI field in the beam indication DCI (e.g., as either the LSB(s) or the MSB(s)) and the TCI field bit(s) of the TCI field in the beam indication DCI.

For example, the DCI field bits in the beam indication DCI used to indicate/provide the TCI codepoint (and; therefore, the TCI state(s) indicated therein) selected/determined from the first and/or second sets of TCI codepoints activated by the MAC CE, according to one or more examples described herein, could include/contain/comprise one bit of a (existing/reserved) DCI field other than the TCI field in the beam indication DCI (e.g., the first/last bit of the BWP indicator or the 1-bit NDI field) repurposed for beam indication and the TCI field bit(s) of the TCI field in the beam indication DCI.

In one example, the repurposed one DCI field bit could be the LSB. For this case, when/if the repurposed one DCI field bit is set to '0' (or '1') and the TCI field bits of the TCI field in the beam indication DCI is '001', the DCI field bits used to indicate the TCI codepoint (and; therefore, the TCI state(s) indicated therein) could be '0010' (or '0011').

In another example, the repurposed one DCI field bit could be the MSB. For this case, when/if the repurposed one DCI field bit is set to '0' (or '1') and the TCI field bits of the TCI field in the beam indication DCI is '001', the DCI field bits used to indicate the TCI codepoint (and; therefore, the TCI state(s) indicated therein) could be '0001' (or '1001').

For another example, the DCI field bits in the beam indication DCI used to indicate/provide the TCI codepoint (and; therefore, the TCI state(s) indicated therein) selected/determined from the first and/or second sets of TCI codepoints activated by the MAC CE, according to one or more examples described herein, could include/contain/comprise two bits of a (existing/reserved) DCI field other than the TCI field in the beam indication DCI (e.g., the first/last two bits of the BWP indicator) repurposed for beam indication and the TCI field bit(s) of the TCI field in the beam indication DCI.

In one example, the repurposed two DCI field bits could be the LSBs. For this case, when/if the repurposed two DCI field bits are set to '00' or '01' or '10' or '11' and the TCI field bits of the TCI field in the beam indication DCI is '001', the DCI field bits used to indicate the TCI codepoint (and; therefore, the TCI state(s) indicated therein) could be '00001' or '01001' or '10001' or '11001' respectively.

In another example, the repurposed two DCI field bits could be the MSBs. For this case, when/if the repurposed two DCI field bits are set to '00' or '01' or '10' or '11' and the TCI field bits of the TCI field in the beam indication DCI is '001', the DCI field bits used to indicate the TCI codepoint (and; therefore, the TCI state(s) indicated therein) could be '00100' or '00101' or '00110' or '00111' respectively.

In yet another example, one or more (new) DCI fields—other than the TCI field in the beam indication DCI—could be introduced in a DCI (e.g., beam indication DCI 1_1/1_2 with or without DL assignment) used/dedicated for beam/TCI state indication. For instance, the new DCI field could be denoted by 'Additional TCI field bits' field in a DCI (e.g., in DCI format 1_0/1_1/1_2 or 0_0/0_1/0_2). Here, the DCI field bits in the beam indication DCI used to indicate/provide the TCI codepoint (and; therefore, the TCI state(s) indicated therein) selected/determined from the first and/or second sets of TCI codepoints activated by the MAC CE, according to one or more examples described herein, could include/contain/comprise one or more bits of the one or more new DCI fields in the beam indication DCI (e.g., as either the LSB(s) or the MSB(s)) and the TCI field bit(s) of the TCI field in the beam indication DCI.

For example, the DCI field bits in the beam indication DCI used to indicate/provide the TCI codepoint (and; therefore, the TCI state(s) indicated therein) selected/determined from the first and/or second sets of TCI codepoints activated by the MAC CE, according to one or more examples described herein, could include/contain/comprise a new one-bit DCI field introduced in the beam indication DCI (e.g., a one-bit 'Additional TCI field bits' field) for beam indication and the TCI field bit(s) of the TCI field in the beam indication DCI.

In one example, the new one-bit DCI field could be the LSB. For this case, when/if the new one-bit DCI field or the new DCI field bit is set to '0' (or '1') and the TCI field bits of the TCI field in the beam indication DCI is '001', the DCI field bits used to indicate the TCI codepoint (and; therefore, the TCI state(s) indicated therein) could be '0010' (or '0011').

In another example, the new one-bit DCI field could be the MSB. For this case, when/if the new one-bit DCI field or the new one DCI field bit is set to '0' (or '1') and the TCI field bits of the TCI field in the beam indication DCI is '001', the DCI field bits used to indicate the TCI codepoint (and; therefore, the TCI state(s) indicated therein) could be '0001' (or '1001').

For another example, the DCI field bits in the beam indication DCI used to indicate/provide the TCI codepoint (and; therefore, the TCI state(s) indicated therein) selected/determined from the first and/or second sets of TCI codepoints activated by the MAC CE, according to one or more examples described herein, could include/contain/comprise a new two-bit DCI field introduced in the beam indication DCI (e.g., a 2-bit 'Additional TCI field bits' field) for beam indication and the TCI field bit(s) of the TCI field in the beam indication DCI.

In one example, the new 2-bit DCI field (bits) could be the LSBs. For this case, when/if the new two-bit DCI field or the new two DCI field bits are set to '00' or '01' or '10' or '11' and the TCI field bits of the TCI field in the beam indication DCI is '001', the DCI field bits used to indicate the TCI codepoint (and; therefore, the TCI state(s) indicated therein) could be '00001' or '01001' or '10001' or '11001' respectively.

In another example, the new 2-bit DCI field (bits) could be the MSBs. For this case, when/if the new 2-bit DCI field or the new two DCI field bits are set to '00' or '01' or '10' or '11' and the TCI field bits of the TCI field in the beam indication DCI is '001', the DCI field bits used to indicate the TCI codepoint (and; therefore, the TCI state(s) indicated therein) could be '00100' or '00101' or '00110' or '00111' respectively.

The described examples herein can be generalized/extended to when more than four CORESET group/pool index values are configured/provided/indicated for various designs herein, when more than two bits of the (existing) DCI field(s) in a DCI format are repurposed for various designs herein, or when more than two bits of one or more new DCI fields are introduced in a DCI format for various designs herein.

As discussed/described herein, one or more bits of one or more (existing/reserved) DCI fields in a DCI (e.g., DCI format 1_1 or 1_2 with or without DL assignment or DCI format 0_1 or 0_2) could be used/repurposed to: (i) indicate mapping/association between the indicated TCI states and channels/signals from different TRPs following one or more examples described herein, (ii) indicate the TCI state type(s)—e.g., joint and/or separate—for the indicated TCI state(s) following one or more examples described herein, (iii) indicate whether all or part of the indicated TCI field bits are used to indicate a TCI codepoint (and; therefore, the corresponding TCI state(s) indicated therein), (iv) indicate the total/maximum number of TCI field bits of the TCI field in the beam indication DCI, (v) indicate from which set(s) of TCI state codepoints (e.g., the first and/or second sets of TCI state codepoints discussed herein) the indicated TCI codepoint (and; therefore, the corresponding TCI state(s) indicated therein) in the beam indication DCI (e.g., DCI format 1_1 or 1_2 with or without DL assignment) could be selected/determined, (vi) indicate a TCI codepoint (e.g., together/jointly with one or more of the TCI field bits of the TCI field in the beam indication DCI), etc.

Equivalently, throughout the rest of the present disclosure, the one or more reserved DCI field bits discussed herein are allocated to a target indicator or one or more target indicator states, which could be used to: (i) indicate mapping/association between the indicated TCI states and channels/signals from different TRPs following those specified herein (e.g., following one or more examples described herein, (ii) indicate the TCI state type(s)—e.g., joint and/or separate—for the indicated TCI state(s) following one or more examples described herein, (iii) indicate whether all or part of the indicated TCI field bits are used to indicate a TCI codepoint (and; therefore, the corresponding TCI state(s) indicated therein), (iv) indicate the total/maximum number of TCI field bits of the TCI field in the beam indication DCI, (v) indicate from which set(s) of TCI state codepoints (e.g., the first and/or second sets of TCI state codepoints discussed herein) the indicated TCI codepoint (and; therefore, the corresponding TCI state(s) indicated therein) in the beam indication DCI (e.g., DCI format 1_1 or 1_2 with or without DL assignment) could be selected/determined, (vi) indicate a TCI codepoint (e.g., together/jointly with one or more of the TCI field bits of the TCI field in the beam indication DCI), etc.

Various means of repurposing one or more bits of one or more (existing/reserved) DCI fields in a DCI and various means of allocating the reserved DCI field bits to the target indicator are discussed herein.

In one example, when DCI format 1_1 is used for beam indication without DL assignment:

CS-RNTI is used to scramble the CRC for the DCI

The fields of the DCI format are configured according to TABLE 1 or TABLE 2 herein.

TABLE 1 an example of DCI format 1_1 used for beam indication without DL assignment

| Field | Description |
|---|---|
| Identifier for DCI formats | Value 1 to indicate DL DCI format |
| Carrier indicator | Described in document and standard [3] |
| Bandwidth part indicator | Number of DL BWP excluding initial DL BWP |
| Frequency-domain resource assignment | Set to all '0's for FDRA Type 0, all '1's for FDRA Type 1, or all '0's for dynamicSwitch (same as in Table 10.2-4 of TS38.213) |
| Time-domain resource assignment | Described in document and standard [4]. Index to determine slot offset and slot-length indicator value (SLIV) |
| VRB-to-PRB mapping | Reserved. Size is 0 or 1 bit |
| PRB bundling size indicator | Reserved. Size is 0 or 1 bit |
| Rate matching indicator | Reserved. Size is 0, 1, 2 bits |

TABLE 1-continued an example of DCI format 1_1 used for beam indication without DL assignment

| Field | Description |
|---|---|
| ZP CSI-RS trigger | Reserved. Size 0, 1, or 2 bits |
| For TB1: Modulation and coding scheme | all '1's |
| For TB1: New data indicator | 0 |
| For TB1: Redundancy version | All '1's |
| For TB2: Modulation and coding scheme | Reserved. Size is 5 bits, if maxNrofCode WordsScheduledByDCI equals 2 |
| For TB2: New data indicator | Reserved. Size is 1 bit, if maxNrofCodeWordsScheduledByDCI equals 2 |
| For TB2: Redundancy version | Reserved. Size is 2 bits, if maxNrofCodeWordsScheduledByDCI equals 2 |
| HARQ process number | Reserved. Size is 4 bits |
| Downlink assignment index (DAI) | 2 bits total DAI, if more than one serving cell with dynamic codebook configured. 2 bits counter DAI, if dynamic codebook is configured. |
| TPC command for scheduled PUCCH | See document and standard [3] |
| PUCCH resource indicator | See document and standard [3] |
| PDSCH-to-HARQ feedback timing indicator | See document and standard [3] |
| One-shot HARQ-ACK request | Reserved. Size is 0 or 1 bit |
| PDSCH group index | Reserved. Size is 0 or 1 bit |
| New feedback indicator | Reserved. Size is 0, 1 or 2 bits |
| Number of requested PDSCH group(s) | Reserved. Size is 0 or 1 bit |
| Antenna ports | Reserved. Size is 4 to 6 bits |
| Transmission configuration indication | 0 bit if higher layer parameter tci-PresentInDCI is not enabled; otherwise 3 bits. Used to indicate the TCI state. |
| SRS request | Reserved. Size is 2 bits |
| SRS offset indicator | Reserved. Size is 0, 1, or 2 bits |
| CBG transmission information | Reserved. Size is 0, 2, 4, 6, or 8 bits. |
| CBG flushing out information | Reserved. Size is 0 or 1 bit. |
| DMRS sequence initialization | Reserved. Size is 1 bit. |
| Priority indicator | Reserved. Size is 0 or 1 bit. |
| ChannelAccess-Cpext | Reserved. Size is 0, 1, 2, 3, or 4 bits. |
| Minimum applicable scheduling offset indicator | Reserved. Size is 0 or 1 bit. |
| Scell dormancy indication | Reserved. Size is 0 to 5 bits. |

TABLE 2

An example of DCI format 1_1 used for beam indication without DL assignment

| Field | Description |
|---|---|
| Identifier for DCI formats | Value 1 to indicate DL DCI format |
| Carrier indicator | Described in document and standard [3] |
| Bandwidth part indicator | Number of DL BWP excluding initial DL BWP |
| Frequency-domain resource assignment | Set to all '0's for FDRA Type 0, all '1's for FDRA Type 1, or all '0's for dynamicSwitch (same as in document and standard [3]) |
| Time-domain resource assignment | Described in document and standard [4]. Index to determine slot offset and slot-length indicator value (SLIV) |
| VRB-to-PRB mapping | Reserved. Size is 0 or 1 bit |
| PRB bundling size indicator | Reserved. Size is 0 or 1 bit |
| Rate matching indicator | Reserved. Size is 0, 1, 2 bits |
| ZP CSI-RS trigger | Reserved. Size 0, 1, or 2 bits |
| For TB1: Modulation and coding scheme | all '1's |
| For TB1: New data indicator | 0 |
| For TB1: Redundancy version | All '1's |
| For TB2: Modulation and coding scheme | all '1's |
| For TB2: New data indicator | 0 |
| For TB2: Redundancy version | All '1's |
| HARQ process number | Reserved. Size is 4 bits |
| Downlink assignment index (DAI) | 2 bits total DAI, if more than one serving cell with dynamic codebook configured. 2 bits counter DAI, if dynamic codebook is configured. |
| TPC command for scheduled PUCCH | See document and standard [3] |
| PUCCH resource indicator | See document and standard [3] |

TABLE 2-continued

An example of DCI format 1_1 used for beam indication without DL assignment

| Field | Description |
|---|---|
| PDSCH-to-HARQ feedback timing indicator | See document and standard [3] |
| One-shot HARQ-ACK request | Reserved. Size is 0 or 1 bit |
| PDSCH group index | Reserved. Size is 0 or 1 bit |
| New feedback indicator | Reserved. Size is 0, 1, or 2 bits |
| Number of requested PDSCH group(s) | Reserved. Size is 0 or 1 bit |
| Antenna ports | Reserved. Size is 4 to 6 bits |
| Transmission configuration indication | 0 bit if higher layer parameter tci-PresentInDCI is not enabled; otherwise 3 bits. Used to indicate the TCI state. |
| SRS request | Reserved. Size is 2 bits |
| SRS offset indicator | Reserved. Size is 0, 1, or 2 bits |
| CBG transmission information | Reserved. Size is 0, 2, 4, 6, or 8 bits. |
| CBG flushing out information | Reserved. Size is 0 or 1 bit. |
| DMRS sequence initialization | Reserved. Size is 1 bit. |
| Priority indicator | Reserved. Size is 0 or 1 bit. |
| ChannelAccess-Cpext | Reserved. Size is 0, 1, 2, 3, or 4 bits. |
| Minimum applicable scheduling offset indicator | Reserved. Size is 0 or 1 bit. |
| Scell dormancy indication | Reserved. Size is 0 to 5 bits. |

According to document and standard [2], each DCI field is mapped in the order in which it appears in the description including the zero padding, if any, with the first field mapped to the lowest order information bit $a_0$ of the DCI format, and each successive field is mapped to higher order information bits. The most significant bit of each field is mapped to the lowest order information bit for that field, e.g., the most significant bit of the first field is mapped to $a_0$.

One or more bits of the DCI fields that are reserved can be repurposed for various design aspects such as those described/specified in (i), (ii), (iii), (iv), (v), (vi) discussed herein. Throughout the rest of the present disclosure, unless otherwise specified, the DCI fields that are repurposed for various design aspects such as those described/specified in (i), (ii), (iii), (iv), (v), (vi) discussed herein can also be referred to as DCI fields for beam indication or beam indication DCI fields.

In one example, H fields are used for indicating the target indicator. The beam indication DCI fields are h=0, . . . H−1. The size of each beam indication DCI field is $b_h$.

In one example, all beam indication DCI fields have the same size, i.e., $b_h$=b for h=0, . . . , H−1.

In one example, the TCI field is used to indicate a target indicator state, e.g., the TCI state or TCI state code point, for h=0. The size of the remaining beam indication DCI fields is $$\sum_{h=1}^{H-1} b_h \text{ or } (H-1)b.$$

For example, the bits corresponding to the reserved fields are repurposed for the indication of the target indicator states h=1, . . . , H−1, starting from one of: (1) The first (according to the order in which it appears in the DCI format description in document and standard [2]) reserved field in the DCI format, then the second reserved field, and so on until all target indicator states, e.g., all TCI states or TCI state code points, have been allocated to reserved bits or (2) the last (according to the order in which it appears in the DCI format description in document and standard [2]) reserved field in the DCI format, then the second from last reserved field, and so on, until all target indicator states, e.g., all TCI states or TCI state code points, have been allocated to reserved bits.

In one example, when the bits of a reserved field are repurposed, at least partially, for target indicator states such as TCI states or TCI state code points, the bits are repurposed starting with the least significant bit of the field.

In one example, when the bits of a reserved field are repurposed, at least partially, for target indicator states such as TCI states or TCI state code points, the bits are repurposed starting with the most significant bit of the field.

In one example, the mapping of target indicator states such as TCI states or TCI state code points starts with h=1, then h=2, . . . and starts with the MSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=H−1, then h=H−2, . . . h=1 And starts with the MSB of each TCI state field, to the repurposed bits for indicating the target indicator starting with one of (1) the lowest order repurposed bit or (2) the highest order repurposed bit.

In one example, the mapping of target indicator states such as TCI states or TCI state code points starts with h=1, then h=2, . . . . And starts with the LSB of each TCI state field, to the repurposed bits for indicating the target indicator starting with one of (1) the lowest order repurposed bit or (2) the highest order repurposed bit.

In one example, the mapping of target indicator states such as TCI states or TCI state code points starts with h=H−1, then h=H−2, . . . h=1 And starts with the LSB of each TCI state field, to the repurposed bits for indicating the target indicator starting with one of (1) the lowest order repurposed bit or (2) the highest order repurposed bit.

For another example, the bits corresponding to reserved fields with a fixed bit size, that doesn't depend on RRC configuration, are repurposed for the indication of the target indicator or the target indicator states h=1, . . . , H−1, starting from one of: (1) The first (according to the order in which it appears in the DCI format description in document and standard [2]) reserved field with a fixed size in the DCI format, then the second reserved field with a fixed size, and so on until all target indicator states such as TCI states or TCI state codepoints have been allocated to reserved bits or (2) the last (according to the order in which it appears in the DCI format description in document and standard [2]) reserved field with a fixed size in the DCI format, then the second from last reserved field with a fixed size, and so on until all target indicator states such as TCI states or TCI state code points have been allocated to reserved bits. Examples of fields with fixed size include:

HARQ process number with size 4 bits

SRS request with size 2 bits

Demodulation reference signal (DMRS) sequence initiation with size 1 bit.

In one example, when the bits of a reserved field are repurposed, at least partially, for target indicator states such as TCI states or TCI state code points, the bits are repurposed starting with the least significant bit of the field.

In one example, when the bits of a reserved field are repurposed, at least partially, for target indicator states such as TCI states or TCI state code points, the bits are repurposed starting with the most significant bit of the field.

In one example, the mapping of target indicator states such as TCI states or TCI state code points starts with h=1, then h=2, . . . . And starts with the MSB of each TCI state field, to the repurposed bits for indicating the target indicator starting with one of (1) the lowest order repurposed bit or (2) the highest order repurposed bit.

In one example, the mapping of target indicator states such as TCI states or TCI state code points starts with h=H−1, then h=H−2, . . . h=1 and starts with the MSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=1, then h=2, . . . and starts with the LSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=H−1, then h=H−2, . . . h=1 and starts with the LSB of each TCI state field to the repurposed bits for indicating the target indicator starting with one of (1) the lowest order repurposed bit or (2) the highest order repurposed bit.

Yet for another example, the bits corresponding to reserved fields with a minimum bit size greater than 0, that doesn't depend on RRC configuration, are repurposed for the indication of the target indicator or target indicator states such as TCI states or TCI state code points h=1, . . . , H−1, starting from one of: (1) The first (according to the order in which it appears in the DCI format description in document and standard [2]) reserved field with a minimum size greater than 0 in the DCI format, then the second reserved field with a minimum size greater than 0, and so on until all target indicator states such as TCI states or TCI state code points have been allocated to reserved bits or (2) the last (according to the order in which it appears in the DCI format description in document and standard [2]) reserved field with a minimum size greater than 0 in the DCI format, then the second from last reserved field with a minimum size greater than 0, and so on until all target indicator states such as TCI states or TCI state code points have been allocated to reserved bits. Examples of fields with a minimum size greater than 0 include:

HARQ process number with size 4 bits

SRS request with size 2 bits

Antenna port with a minimum size of 4 bits. In one example only the bits corresponding to the minimum size can be repurposed (e.g., 4 bits). In another example, all the bits of the field depending on the RRC configuration can be repurposed.

DMRS sequence initiation with size 1 bit

In one example, when the bits of a reserved field are repurposed, at least partially, for target indicator states such as TCI states or TCI state code points, the bits are repurposed starting with the least significant bit of the field.

In one example, when the bits of a reserved field are repurposed, at least partially, for target indicator states such as TCI states or TCI state code points, the bits are repurposed starting with the most significant bit of the field.

In one example, the mapping of target indicator states such as TCI states or TCI state code points starts with h=1, then h=2, . . . and starts with the MSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=H−1, then h=H−2, . . . h=1 and starts with the MSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=1, then h=2, . . . and starts with the LSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=H−1, then h=H−2, . . . h=1 And starts with the LSB of each TCI state field to the repurposed bits for indicating the target indicator starting with one of (1) the lowest order repurposed bit or (2) the highest order repurposed bit.

Yet for another example, if there are not enough bits to convey all the target indicator states such as TCI states or TCI state codepoints, RRC configures additional fields in the DCI format or increases the size of the fields of the DCI format starting from one of: (1) The first (according to the order in which it appears in DCI format description in document and standard [2]) reserved field in the DCI format, then the second reserved field, and so on until enough bits are available to allocate all target indicator states such as TCI states or TCI state code points to reserved bits or (2) the last (according to the order in which it appears in DCI format description in document and standard [2]) reserved field in the DCI format, then the second from last reserved field, and so on until enough bits are available to allocate all target indicator states such as TCI states or TCI state code points to reserved bits.

In one example, existing RRC parameters are used to configure the fields.

In another example, new RRC parameter(s) are introduced for the configuration of the fields, wherein the configured fields are applicable to both DCI with DL assignment and DCI without DL assignment; however, these fields might not be used in the DCI with DL assignment.

In one example, when the bits of a reserved field are repurposed, at least partially, for target indicator states such as TCI states or TCI state code points, the bits are repurposed starting with the least significant bit of the field.

In one example, when the bits of a reserved field are repurposed, at least partially, for target indicator states such as TCI states or TCI state code points, the bits are repurposed starting with the most significant bit of the field.

In one example, the mapping of target indicator states such as TCI states or TCI state code points starts with h=1, then h=2, . . . and starts with the MSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=H−1, then h=H−2, . . . h=1 and starts with the MSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=1, then h=2, . . . and starts with the LSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=H−1, then h=H−2, . . . h=1 and starts with the LSB of each TCI state field to the repurposed bits for indicating the target indicator starting with one of (1) the lowest order repurposed bit or (2) the highest order repurposed bit.

Yet for another example, if there are not enough bits to convey all the target indicator states such as TCI states or TCI state codepoints, it would be up to the network 130 implementation to configure reserved DCI fields with a sufficient number of bits to convey the target indicator states such as TCI states or TCI state code points.

In one example, when the bits of a reserved field are repurposed, at least partially, for target indicator states such as TCI states or TCI state code points, the bits are repurposed starting with the least significant bit of the field.

In one example, when the bits of a reserved field are repurposed, at least partially, for target indicator states such as TCI states or TCI state code points, the bits are repurposed starting with the most significant bit of the field.

In one example, the mapping of target indicator states such as TCI states or TCI state code points starts with h=1, then h=2, . . . and starts with the MSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=H−1, then h=H−2, . . . h=1 And starts with the MSB of each TCI state field, to the repurposed bits for indicating the target indicator starting with one of (1) the lowest order repurposed bit or (2) the highest order repurposed bit.

In one example, the mapping of target indicator states such as TCI states or TCI state code points starts with h=1, then h=2, . . . and starts with the LSB of each TCI state field, to the repurposed bits for indicating the target indicator starting with one of (1) the lowest order repurposed bit or (2) the highest order repurposed bit.

In one example, the mapping of target indicator states such as TCI states or TCI state code points starts with h=H−1, then h=H−2, . . . h=1 and starts with the LSB of each TCI state field to the repurposed bits for indicating the target indicator starting with one of (1) the lowest order repurposed bit or (2) the highest order repurposed bit.

Yet for another example, if there is one additional DCI field to indicate the target indicator, i.e., H=2, the "HARQ process number" (HPN) field number (4-bits) is used to convey the target indicator. If the additional DCI field is 3-bits:

- the additional DCI field is mapped to the 3 MSBs of the HPN field.
- the additional DCI field is mapped to the 3 LSBs of the HPN field.

If the additional DCI field is 4-bits, all 4-bits of the HPN are used for the target indicator/target indicator state(s).

In one example, the size of the target indicator states such as TCI states or TCI state code points is $$\sum_{h=1}^{H-0} b_h \text{ or } Hb.$$

For example, the bits corresponding to the reserved fields are repurposed for the indication of the target indicator states such as TCI states or TCI state code points h=0, . . . , H−1, starting from one of: (1) The first (according to the order in which it appears in the DCI format description in document and standard [2]) reserved field in the DCI format, then the second reserved field, and so on until all target indicator states such as TCI states or TCI state code points have been allocated to reserved bits or (2) the last (according to the order in which it appears in the DCI format description in document and standard [2]) reserved field in the DCI format, then the second from last reserved field, and so on until all target indicator states such as TCI states or TCI state code points have been allocated to reserved bits.

In one example, when the bits of a reserved field are repurposed, at least partially, for target indicator states such as TCI states or TCI state code points, the bits are repurposed starting with the least significant bit of the field.

In one example, when the bits of a reserved field are repurposed, at least partially, for target indicator states such as TCI states or TCI state code points, the bits are repurposed starting with the most significant bit of the field.

In one example, the mapping of target indicator states such as TCI states or TCI state code points starts with h=0, then h=1, . . . and starts with the MSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=H−1, then h=H−2, . . . h=0 and starts with the MSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=0, then h=1, . . . and starts with the LSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=H−1, then h=H−2, . . . h=0 and starts with the LSB of each TCI state field to the repurposed bits for indicating the target indicator starting with one of (1) the lowest order repurposed bit or (2) the highest order repurposed bit.

For another example, the bits corresponding to reserved fields with a fixed bit size, that doesn't depend on RRC configuration, are repurposed for the indication of the target indicator states such as TCI states or TCI state code points h=0, . . . , H−1, starting from one of: (1) The first (according to the order in which it appears in the DCI format description in document and standard [2]) reserved field with a fixed size in the DCI format, then the second reserved field with a fixed size, and so on until all target indicator states such as TCI states or TCI state code points have been allocated to reserved bits or (2) the last (according to the order in which it appears in the DCI format description in document and standard [2]) reserved field with a fixed size in the DCI format, then the second from last reserved field with a fixed size, and so on until all target indicator states such as TCI states or TCI state code points have been allocated to reserved bits. Examples of fields with fixed size include:

- HARQ process number with size 4 bits
- In one example, transmission configuration indication with size 3 bits is included. In one example, transmission configuration indication is not included.
- SRS request with size 2 bits
- DMRS sequence initiation with size 1 bit.

In one example, when the bits of a reserved field are repurposed, at least partially, for target indicator states such as TCI states or TCI state code points, the bits are repurposed starting with the least significant bit of the field.

In one example, when the bits of a reserved field are repurposed, at least partially, for target indicator states such as TCI states or TCI state code points, the bits are repurposed starting with the most significant bit of the field.

In one example, the mapping of target indicator states such as TCI states or TCI state code points starts with h=0, then h=1, . . . and starts with the MSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=H−1, then h=H−2, . . . h=0 and starts with the MSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=0, then h=1, . . . and starts with the LSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=H−1, then h=H−2, . . . h=0 and starts with the LSB of each TCI state field to the repurposed bits for indicating the target indicator starting with one of (1) the lowest order repurposed bit or (2) the highest order repurposed bit.

Yet for another example, the bits corresponding to reserved fields with a minimum bit size greater than 0, that doesn't depend on RRC configuration, are repurposed for the indication of the target indicator states such as TCI states or TCI state code points h=0, . . . , H−1, starting from one of: (1) The first (according to the order in which it appears in the DCI format description in 38.212) reserved field with a minimum size greater than 0 in the DCI format, then the second reserved field with a minimum size greater than 0, and so on until all target indicator states such as TCI states or TCI state code points have been allocated to reserved bits or (2) the last (according to the order in which it appears in the DCI format description in 38.212) reserved field with a minimum size greater than 0 in the DCI format, then the second from last reserved field with a minimum size greater than 0, and so on until all target indicator states such as TCI states or TCI state code points have been allocated to reserved bits. Examples of fields with a minimum size greater than 0 include:

- HARQ process number with size 4 bits
- SRS request with size 2 bits
- In one example, transmission configuration indication with size 3 bits is included. In one example, transmission configuration indication is not included.
- Antenna port with a minimum size of 4 bits. In one example only the bits corresponding to the minimum size can be repurposed (e.g., 4 bits). In another example, all the bits of the field depending on the RRC configuration can be repurposed.
- DMRS sequence initiation with size 1 bit.

In one example, when the bits of a reserved field are repurposed, at least partially, for target indicator states such as TCI states or TCI state code points, the bits are repurposed starting with the least significant bit of the field.

In one example, when the bits of a reserved field are repurposed, at least partially, for target indicator states such as TCI states or TCI state code points, the bits are repurposed starting with the most significant bit of the field.

In one example, the mapping of target indicator states such as TCI states or TCI state code points starts with h=0, then h=1, . . . and starts with the MSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=H−1, then h=H−2, . . . h=0 and starts with the MSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=0, then h=1, . . . and starts with the LSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=H−1, then h=H−2, . . . h=0 and starts with the LSB of each TCI state field, to the repurposed bits for indicating the target indicator starting with one of (1) the lowest order repurposed bit or (2) the highest order repurposed bit.

Yet for another example, if there are not enough bits to convey all the target indicator states such as TCI states or TCI state codepoints, RRC configures additional fields in the DCI format, or increases the size of the fields of the DCI format, starting from one of: (1) The first (according to the order in which it appears in the DCI format description in document and standard [2]) reserved field in the DCI format, then the second reserved field, and so on until enough bits are available to allocate all target indicator states such as TCI states or TCI state code points to reserved bits or (2) the last (according to the order in which it appears in the DCI format description in 38.212) reserved field in the DCI format, then the second from last reserved field, and so on until enough bits are available to allocate all target indicator states such as TCI states or TCI state code points to reserved bits.

In one example, existing RRC parameters are used to configure the fields.

In another example, new RRC parameter(s) are introduced for the configuration of the fields, wherein the configured fields are applicable to both DCI with DL assignment and DCI without DL assignment; however, these fields might not be used in the DCI with DL assignment.

In one example, when the bits of a reserved field are repurposed, at least partially, for target indicator states such as TCI states or TCI state code points, the bits are repurposed starting with the least significant bit of the field.

In one example, when the bits of a reserved field are repurposed, at least partially, for target indicator states such as TCI states or TCI state code points, the bits are repurposed starting with the most significant bit of the field.

In one example, the mapping of target indicator states such as TCI states or TCI state code points starts with h=0, then h=1, . . . and starts with the MSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=H−1, then h=H−2, . . . h=0 and starts with the MSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=0, then h=1, . . . and starts with the LSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=H−1, then h=H−2, . . . h=0 and starts with the LSB of each TCI state field, to the repurposed bits for indicating the target indicator starting with one of (1) the lowest order repurposed bit or (2) the highest order repurposed bit.

Yet for another example, if there are not enough bits to convey all the target indicator states such as TCI states or TCI state codepoints it would be up to the network 130 implementation to configure reserved DCI fields with a sufficient number of bits to convey the target indicator states such as TCI states or TCI state code points.

In one example, when the bits of a reserved field are repurposed, at least partially, for target indicator states such as TCI states or TCI state code points, the bits are repurposed starting with the least significant bit of the field.

In one example, when the bits of a reserved field are repurposed, at least partially, for target indicator states such as TCI states or TCI state code points, the bits are repurposed starting with the most significant bit of the field.

In one example, the mapping of target indicator states such as TCI states or TCI state code points starts with h=0, then h=1, . . . and starts with the MSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=H−1, then h=H−2, . . . h=0 and starts with the MSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=0, then h=1, . . . and starts with the LSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=H−1, then h=H−2, . . . h=0 and starts with the LSB of each TCI state field to the repurposed bits for indicating the target indicator starting with one of (1) the lowest order repurposed bit or (2) the highest order repurposed bit.

Yet for another example, if there is one additional DCI field to indicate the target indicator, i.e., H=2:

- The "transmission configuration indication" (TCI) field is used to convey one target indicator state such as one TCI state (e.g., the first target indicator state such as the first TCI state).
- The "HARQ process number" (HPN) field number (4-bits) is used to convey the other target indicator state(s) such as the other TCI state(s) (e.g., the second target indicator state such as the second TCI state).

In one example, if the additional DCI field is 3-bits, the additional DCI field is mapped to the 3 MSBs of the HPN field.

In another example, the additional DCI field is mapped to the 3 LSBs of the HPN field.

If the additional DCI field is 4-bits, all 4-bits of the HPN are used for the target indicator/target indicator state(s).

In an alternative example, the first target indicator state, such as the first TCI state, is conveyed by the HPN field and the second target indicator state, such as the second TCI state, is conveyed by the additional DCI field.

In one example, when DCI format 1_2 is used for beam indication without DL assignment:

- CS-RNTI is used to scramble the CRC for the DCI.
- The fields of the DCI format are configured according to TABLE 3.

TABLE 3

An example of DCI format 1_2 used for beam indication without DL assignment

| Field | Description |
|---|---|
| Identifier for DCI formats | Value 1 to indicate DL DCI format |
| Carrier indicator | Described in document and standard 3[ ] |
| Bandwidth part indicator | Number of DL BWP excluding initial DL BWP |
| Frequency-domain resource assignment | Set to all '0's for FDRA Type 0, all '1's for FDRA Type 1, or all '0's for dynamicSwitch (same as in document and standard [3]) |
| Time-domain resource assignment | Described in document and standard [4]. Index to determine slot offset and slot-length indicator value (SLIV) |
| VRB-to-PRB mapping | Reserved. Size is 0 or 1 bit |
| PRB bundling size indicator | Reserved. Size is 0 or 1 bit |
| Rate matching indicator | Reserved. Size 0, 1, or 2 bits |
| ZP CSI-RS trigger | Reserved. Size 0, 1, or 2 bits |

TABLE 3-continued

An example of DCI format 1_2 used for beam indication without DL assignment

| Field | Description |
|---|---|
| Modulation and coding scheme | all '1's |
| New data indicator | 0 |
| Redundancy version | all '1's |
| HARQ process number | Reserved. Size 0 to 4 bits |
| Downlink assignment index | Size 0, 1, 2, or 4 bits. |
| TPC command for scheduled PUCCH | See document and standard [3] |
| Second TPC command for scheduled PUCCH | Reserved. Size is 0 or 2 bits |
| PUCCH resource indicator | See document and standard [3] |
| PDSCH-to-HARQ feedback timing indicator | See document and standard [3] |
| Antenna ports | Reserved. Size is 0, or 4 to 6 bits |
| Transmission configuration indication | 0 bit if higher layer parameter tci-PresentDCI-1-2 is not configured; otherwise 1,2 or 3 bits. Used to indicate the TCI state. |
| SRS request | Reserved. Size is 0, to 3 bits |
| SRS offset indicator | Reserved. Size is 0, 1, or 2 bits |
| DMRS sequence initialization | Reserved. Size is 0, or 1 bit |
| Priority indicator | Reserved. Size is 0 or 1 bit. |

As described in document and standard [2], each field is mapped in the order in which it appears in the description including the zero padding if any, with the first field mapped to the lowest order information bit $a_0$ of the DCI format and each successive field mapped to higher order information bits. The most significant bit of each field is mapped to the lowest order information bit for that field, e.g., the most significant bit of the first field is mapped to $a_0$.

One or more bits of the DCI fields that are reserved can be repurposed for various design aspects such as those described/specified in (i), (ii), (iii), (iv), (v), (vi) discussed herein. Throughout the rest of the present disclosure, unless otherwise specified, the DCI fields that are repurposed for various design aspects such as those described/specified in (i), (ii), (iii), (iv), (v), (vi) discussed herein can also be referred to as DCI fields for beam indication or beam indication DCI fields.

In one example, H fields are used for indicating the target indicator. The beam indication DCI fields are h=0, . . . H−1. The size of each beam indication DCI field is $b_h$. In one example, all beam indication DCI fields have the same size, i.e., $b_h$=b for h=0, . . . , H−1.

In one example, TCI field is used to indicate the target indicator state such as the TCI state or TCI state code point for h=0. The size of remaining target indicator states such as TCI states or TCI state code points is $$\sum_{h=1}^{H-1} b_h \text{ or } (H-1)b.$$

Note that, according to Table 3, the fields reserved in a DCI format 1_2 without DL assignment can have a minimum size of 0. In this case, if there aren't enough reserved fields configured to convey the target indicator states such as TCI states or TCI state code points, additional reserved fields can be configured and/or existing fields can be configured to have a larger bit-width.

For example, the bits corresponding to the reserved fields are repurposed for the indication of the target indicator states such as TCI states or TCI state code points h=1, . . . , H−1, starting from one of: (1) The first (according to the order in which it appears in the DCI format description in document and standard [2]) reserved field in the DCI format, then the second reserved field, and so on until all target indicator states such as TCI states or TCI state code points have been allocated to reserved bits or (2) the last (according to the order in which it appears in the DCI format description in document and standard [2]) reserved field in the DCI format, then the second from last reserved field, and so on until all target indicator states such as TCI states or TCI state code points have been allocated to reserved bits.

In one example, when the bits of a reserved field are repurposed, at least partially, for target indicator states such as TCI states or TCI state code points, the bits are repurposed starting with the least significant bit of the field.

In one example, when the bits of a reserved field are repurposed, at least partially, for target indicator states such as TCI states or TCI state code points, the bits are repurposed starting with the most significant bit of the field.

In one example, the mapping of target indicator states such as TCI states or TCI state code points starts with h=1, then h=2, . . . and starts with the MSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=H−1, then h=H−2, . . . h=1 and starts with the MSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=1, then h=2, . . . and starts with the LSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=H−1, then h=H−2, . . . h=1 and starts with the LSB of each TCI state field to the repurposed bits for indicating the target indicator starting with one of (1) the lowest order repurposed bit or (2) the highest order repurposed bit.

For another example, if there are not enough bits to convey all the target indicator states such as TCI states or TCI state codepoints, RRC configures additional fields in the DCI format, or increases the size of the fields of the DCI format, starting from one of: (1) The first (according to the order in which it appears in DCI format description in document and standard [2]) reserved field in the DCI format, then the second reserved field, and so on until enough bits are available to allocate all target indicator states such as TCI states or TCI state code points to reserved bits or (2) the last (according to the order in which it appears in DCI format description in document and standard [2]) reserved field in the DCI format, then the second from last reserved field, and so on until enough bits are available to allocate all target indicator states such as TCI states or TCI state code points to reserved bits.

In one example, existing RRC parameters are used to configure the fields.

In another example, new RRC parameter(s) are introduced for the configuration of the fields, wherein the configured fields are applicable to both DCI with DL assignment and DCI without DL assignment; however, these fields might not be used in the DCI with DL assignment.

In one example, when the bits of a reserved field are repurposed, at least partially, for target indicator states such as TCI states or TCI state code points, the bits are repurposed starting with the least significant bit of the field.

In one example, when the bits of a reserved field are repurposed, at least partially, for target indicator states such as TCI states or TCI state code points, the bits are repurposed starting with the most significant bit of the field.

In one example, the mapping of target indicator states such as TCI states or TCI state code points starts with h=1, then h=2, . . . and starts with the MSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=H−1, then h=H−2, . . . h=1 and starts with the MSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=1, then h=2, . . . and starts with the LSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=H−1, then h=H−2, . . . h=1 and starts with the LSB of each TCI state field to the repurposed bits for indicating the target indicator starting with one of (1) the lowest order repurposed bit or (2) the highest order repurposed bit.

Yet for another example, if there are not enough bits to convey all the target indicator states such as TCI states or TCI state codepoints, it would be up to the network 130 implementation to configure reserved DCI fields with a sufficient number of bits to convey the target indicator states such as TCI states or TCI state code points.

In one example, when the bits of a reserved field are repurposed, at least partially, for target indicator states such as TCI states or TCI state code points, the bits are repurposed starting with the least significant bit of the field.

In one example, when the bits of a reserved field are repurposed, at least partially, for target indicator states such as TCI states or TCI state code points, the bits are repurposed starting with the most significant bit of the field.

In one example, the mapping of target indicator states such as TCI states or TCI state code points starts with h=1, then h=2, . . . and starts with the MSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=H−1, then h=H−2, . . . h=1 and starts with the MSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=1, then h=2, . . . and starts with the LSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=H−1, then h=H−2, . . . h=1 and starts with the LSB of each TCI state field to the repurposed bits for indicating the target indicator starting with one of (1) the lowest order repurposed bit or (2) the highest order repurposed bit.

Yet for another example, if there is one additional DCI field to indicate the target indicator, i.e., H=2, the "HARQ process number" (HPN) field number (0 to 4-bits) is used to convey the target indicator. The HPN is configured with at least enough bits to convey the target indicator.

In one example, existing RRC parameters are used to configure the size of HPN to be sufficient for indicating the target indicator (if not already sufficient).

In another example, new RRC parameter(s) are introduced for the configuration of the HPN field to have sufficient size for indicating the target indicator (if not already sufficient), wherein the additional configured bits in the HPN are applicable to both DCI with DL assignment and DCI without DL assignment; however, these additional bits might not be used in the DCI with DL assignment. The additional bits may be one of: (1) MSB bits of the HPN field, (2) LSB bits of the HPN field. If the TCI field is m-bits and the HPN field is n-bits, wherein n≥m:

- In one example, the additional DCI field is mapped to the m MSBs of the HPN field.
- In another example, the additional DCI field is mapped to the m LSBs of the HPN field.
- If the TCI field is n-bits, all n-bits of the HPN are used for indicating the target indicator.

In one example, the size of the target indicator states such as TCI states or TCI state code points is $$\sum_{h=1}^{H-0} b_h \text{ or } Hb.$$

Note that, according to Table 3, the fields reserved in a DCI format 1_2 without DL assignment can have a minimum size of 0. In this case, if there aren't enough reserved fields configured to convey the target indicator states such as TCI states or TCI state code points. Additional reserved fields can be configured and/or existing fields can be configured to have a larger bit-width.

For example, the bits corresponding to the reserved fields are repurposed for the indication of the target indicator states such as TCI states or TCI state code points h=0, . . . , H−1, starting from one of: (1) The first (according to the order in which it appears in the DCI format description in document and standard [2]) reserved field in the DCI format, then the second reserved field, and so on until all target indicator states such as TCI states or TCI state code points have been allocated to reserved bits or (2) the last (according to the order in which it appears in the DCI format description in document and standard [2]) reserved field in the DCI format, then the second from last reserved field, and so on until all target indicator states such as TCI states or TCI state code points have been allocated to reserved bits.

In one example, when the bits of a reserved field are repurposed, at least partially, for target indicator states such as TCI states or TCI state code points, the bits are repurposed starting with the least significant bit of the field.

In one example, when the bits of a reserved field are repurposed, at least partially, for target indicator states such as TCI states or TCI state code points, the bits are repurposed starting with the most significant bit of the field.

In one example, the mapping of target indicator states such as TCI states or TCI state code points starts with h=0, then h=1, . . . and starts with the MSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=H−1, then h=H−2, . . . h=0 and starts with the MSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=0, then h=1, . . . and starts with the LSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=H−1, then h=H−2, . . . h=0 and starts with the LSB of each TCI state field to the repurposed bits for indicating the target indicator starting with one of (1) the lowest order repurposed bit or (2) the highest order repurposed bit.

For another example, if there are not enough bits to convey all the target indicator states such as TCI states or TCI state codepoints, RRC configures additional fields in the DCI format, or increases the size of the fields of the DCI format, starting from one of: (1) The first (according to the order in which it appears in the DCI format description in document and standard [2]) reserved field in the DCI format, then the second reserved field, and so on until enough bits are available to allocate all target indicator states such as TCI states or TCI state code points to reserved bits or (2) the last (according to the order in which it appears in the DCI format description in document and standard [2]) reserved field in the DCI format, then the second from last reserved field, and so on until enough bits are available to allocate all target indicator states such as TCI states or TCI state code points to reserved bits.

In one example, existing RRC parameters are used to configure the fields.

In another example, new RRC parameter(s) are introduced for the configuration of the fields, wherein the configured fields are applicable to both DCI with DL assignment and DCI without DL assignment; however, these fields might not be used in the DCI with DL assignment.

In one example, when the bits of a reserved field are repurposed, at least partially, for target indicator states such as TCI states or TCI state code points, the bits are repurposed starting with the least significant bit of the field.

In one example, when the bits of a reserved field are repurposed, at least partially, for target indicator states such as TCI states or TCI state code points, the bits are repurposed starting with the most significant bit of the field.

In one example, the mapping of target indicator states such as TCI states or TCI state code points starts with h=0, then h=1, . . . and starts with the MSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=H−1, then h=H−2, . . . h=0 and starts with the MSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=0, then h=1, . . . and starts with the LSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=H−1, then h=H−2, . . . h=0 and starts with the LSB of each TCI state field to the repurposed bits for indicating the target indicator starting with one of (1) the lowest order repurposed bit or (2) the highest order repurposed bit.

Yet for another example, if there are not enough bits to convey all the target indicator states such as TCI states or TCI state codepoints, it would be up to the network 130 implementation to configure reserved DCI fields with a sufficient number of bits to convey the target indicator states such as TCI states or TCI state code points.

In one example, when the bits of a reserved field are repurposed, at least partially, for target indicator states such as TCI states or TCI state code points, the bits are repurposed starting with the least significant bit of the field.

In one example, when the bits of a reserved field are repurposed, at least partially, for target indicator states such as TCI states or TCI state code points, the bits are repurposed starting with the most significant bit of the field.

In one example, the mapping of target indicator states such as TCI states or TCI state code points starts with h=0, then h=1, . . . and starts with the MSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=H−1, then h=H−2, . . . h=0 and starts with the MSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=0, then h=1, . . . and starts with the LSB of each TCI state field to the repurposed bits for indicating the target indicator starting with one of (1) the lowest order repurposed bit or (2) the highest order repurposed bit.

In one example, the mapping of target indicator states such as TCI states or TCI state code points starts with h=H−1, then h=H−2, . . . h=0 and starts with the LSB of each TCI state field to the repurposed bits for indicating the target indicator starting with one of (1) the lowest order repurposed bit or (2) the highest order repurposed bit.

Yet for another example, if there is one additional DCI field for indicating the target indicator, i.e., H=2:

The "transmission configuration indication" (TCI) field is used to convey one target indicator state such as one TCI state (e.g., the first target indicator state such as the first TCI state).

The "HARQ process number" (HPN) field number (0 to 4-bits) is used to convey the other target indicator state(s) such as the other TCI state(s) (e.g., the second target indicator state such as the second TCI state). The HPN is configured with at least enough bits to convey the target indicator. In one example, existing RRC parameters are used to configure the size of HPN to be sufficient for indicating the target indicator (if not already sufficient). In another example, new RRC parameter(s) are introduced for the configuration of the HPN field to have sufficient size for indicating the target indicator (if not already sufficient), wherein the additional configured bits in the HPN are applicable to both DCI with DL assignment and DCI without DL assignment; however, these additional bits might not be used in the DCI with DL assignment. The additional bits may be one of: (1) MSB bits of the HPN field, (2) LSB bits of the HPN field. If the TCI field is m-bits and the HPN field is n-bits, wherein n≥m:

In one example, the additional DCI field is mapped to the m MSBs of the HPN field.

In another example, the additional DCI field is mapped to the m LSBs of the HPN field.

If the TCI state field is n-bits, all n-bits of the HPN are used for indicating the target indicator.

In an alternative example, the first target indicator state, such as the first TCI state, is conveyed by the HPN field and the second target indicator state, such as the second TCI state, is conveyed by the TCI field.

The UE 116 could apply/follow one or more examples described herein if one or more of the following conditions are achieved/satisfied:

when the beam indication DCI is with DL assignment (wherein the beam indication DCI could be DCI format 1_1 or 1_2).

when the beam indication DCI is without DL assignment (wherein the beam indication DCI could be DCI format 1_1 or 1_2).

when the number of TCI state codepoints Nc activated by the MAC CE is smaller/lower (or larger/greater) than a threshold.

when the number of TCI state codepoints Nc1 in the first set of TCI codepoints activated by the MAC CE is smaller/lower (or larger/greater) than a threshold.

when the number of TCI state codepoints Nc2 in the second set of TCI codepoints activated by the MAC CE is smaller/lower (or larger/greater) than a threshold.

when the (total) number of TCI state codepoints Nc1+Nc2 in the first and second sets of TCI codepoints activated by the MAC CE is smaller/lower (or larger/greater) than a threshold.

when the UE 116 is explicitly indicated/configured/provided by the network 130, e.g., via higher layer RRC signaling and/or MAC CE command and/or dynamic DCI based L1 signaling, to do so.

In the one or more examples described herein, the threshold could be (1) fixed, e.g., 8, 16, 32, or 64, or (2) configured by the network 130 via higher layer RRC signaling or/and MAC CE command or/and DCI based signaling.

A cell/TRP could be a non-serving cell/TRP. In the present disclosure, the non-serving cell(s), or the non-serving cell TRP(s) could have/broadcast different physical cell IDs (PCIs) and/or other higher layer signaling index values from that of the serving cell or the serving cell TRP (i.e., the serving cell PCI).

In one example, the serving cell or the serving cell TRP could be associated with the serving cell ID (SCI) and/or the serving cell PCI. That is, for the inter-cell operation evaluated in the present disclosure, different cells/TRPs could broadcast different PCIs, and/or one or more cells/TRPs (referred to/defined as non-serving cells/TRPs in the present disclosure) could broadcast different PCIs from that of the serving cell/TRP (i.e., the serving cell PCI), and/or one or more cells/TRPs are not associated with valid SCI (e.g., provided by the higher layer parameter ServCellIndex). In the present disclosure, a non-serving cell PCI can also be referred to as an additional PCI, another PCI, or a different PCI (with respect to the serving cell PCI).

The UE 116 could be configured by the network 130 with one or more TCI states, which indicate the QCL information/assumptions for one or more RSs/channels such as PDCCHs and/or PDSCHs. The TCI state update/indication for PDCCH and/or PDSCH can also be referred to as beam indication. For instance, for data transmissions on the shared channel (such as the physical downlink shared channel in NR, i.e. PDSCH), the corresponding beam indication procedure under the 3GPP Rel. 15/16 TCI framework can be summarized as follows. A UE can be first higher layer configured by the network 130 (e.g., via high layer RRC signaling) a set/pool of TCI states. The UE 116 could then receive from the network 130 a MAC CE command activating one or more TCI states from the set/pool of RRC configured TCI states. The UE 116 could be indicated by the network 130 via dynamic DCI signaling that one or more of the MAC CE activated TCI states are active for the reception of the PDSCH(s).

Under the Rel. 17 unified TCI framework, wherein a UE could be provided by the network one or more separate/joint DL or UL TCI state for various DL or UL channels/signals, various design aspects related to beam indication for control resource sets (CORESETs), PDSCH, PUSCH, PUCCH, CSI-RS and/or SRS need to be specified.

Embodiments of the present disclosure evaluate various design aspects/enhancements related to beam indication for CORESETs/PDCCHs, PDSCH, PUCCH, PUSCH, CSI-RS, and/or SRS in a multi-TRP system or an inter-cell system wherein at least a PCI different from the serving cell PCI is deployed under the Rel. 17 unified TCI framework.

Throughout the present disclosure, the joint (e.g., provided by DLorJoint-TCIState), separate DL (e.g., provided by DLorJoint-TCIState), and/or separate UL (e.g., provided by UL-TCIState) TCI states described/discussed herein could also be referred to as unified TCI states, common TCI states, main TCI states, etc. Furthermore, an indicator/parameter set to '1' (or '0' or '00' or '01' or '10' or '11') could also correspond to or be equivalent to the indicator/parameter set to 'enabled', and an indicator/parameter set to '0' (or '1' or '00' or '01' or '10' or '11') could also correspond to or be equivalent to the indicator/parameter set to 'disabled'. In addition, throughout the present disclosure, the following two operations are equivalent: (1) a UE uses/applies a TCI state to receive a channel/signal and (2) the UE 116 assumes the DM-RS antenna port(s) of the channel/signal is quasi co-located with the RS(s) in the RS set(s) provided/indicated/configured in the TCI state. Also, a PDSCH can be a scheduled PDSCH (e.g., by the corresponding scheduling DCI) or a configured PDSCH. In addition, throughout the present disclosure, a TCI state can be a joint TCI state (e.g., provided by DLorJoint-TCIState), a separate DL TCI state (e.g., provided by DLorJoint-TCIState), or a separate UL TCI state (e.g., provided by UL-TCIState), and a pair of TCI states can be a pair of joint (e.g., provided by DLorJoint-TCIState) and/or separate DL (e.g., provided by DLorJoint-TCIState) and/or separate UL (e.g., provided by DLorJoint-TCIState) TCI states. In addition, throughout the present disclosure, "before an application time" could correspond to "less than or equal to an application time" and "after an application time" could correspond to "greater than or equal to an application time".

As discussed herein, a UE could receive a MAC CE activation command, e.g., Unified TCI states activation/deactivation MAC CE command, used to map up to Ncp≥1 (e.g., Ncp=8 or Ncp=16) TCI codepoints of a TCI field in a beam indication DCI (e.g., DCI format 1_1/1_2 with or without DL assignment), wherein a TCI codepoint could contain/comprise/include one or more, e.g., N≥1 or M≥1 (e.g., N=2 or M=2), TCI states or pairs of TCI states, and a TCI state could correspond to a joint TCI state provided by DLorJointTCIState, a separate DL TCI state provided by DLorJointTCIState, or a separate UL TCI state provided by UL-TCIState.

In one embodiment, the UE 116 could be provided/indicated/configured by the network 130, in a higher layer parameter, e.g., ControlResourceSet for a CORESET, an indicator/parameter to inform the UE 116 of the association between the indicated TCI state(s) and the PDCCH reception(s), wherein different CORESETs configured with the same indicator/parameter could be in a same CORESET group.

In one example, for N=2 or M=2, the UE 116 could apply/use the first (or second) indicated TCI state/pair of TCI states to monitor PDCCH candidate(s) received in CORESET(s) associated/configured with the indicator/parameter in the corresponding ControlResourceSet set to '0' (or, equivalently, the UE 116 could assume that the DM-RS antenna port(s) of the PDCCH received in CORESET(s) associated/configured with the indicator/parameter in the corresponding ControlResourceSet set to '0' is quasi co-located with the RS(s) in the RS set(s) provided/indicated/configured in the first (or second) indicated TCI state/pair of TCI states). The UE 116 could apply/use the second (or first) indicated TCI state/pair of TCI states to monitor PDCCH candidate(s) received in CORESET(s) associated/configured with the indicator/parameter in the corresponding ControlResourceSet set to '1' (or, equivalently, the UE 116 could assume that the DM-RS antenna port(s) of the PDCCH received in CORESET(s) associated/configured with the indicator/parameter in the corresponding ControlResourceSet set to '1' is quasi co-located with the RS(s) in the RS set(s) provided/indicated/configured in the second (or first) indicated TCI state/pair of TCI states).

In another example, for N=2 or M=2, the UE 116 could apply/use the first indicated TCI state/pair of TCI states to monitor first PDCCH candidate(s) received in CORESET(s) associated/configured with the indicator/parameter in the corresponding ControlResourceSet set to '0' (or '1') and the second indicated TCI state/pair of TCI states to monitor second PDCCH candidate(s) received in CORESET(s) associated/configured with the indicator/parameter in the corresponding ControlResourceSet set to '0' (or '1'). The UE 116 could apply/use the second indicated TCI state/pair of TCI states to monitor first PDCCH candidate(s) received in CORESET(s) associated/configured with the indicator/parameter in the corresponding ControlResourceSet set to '1' (or '0') and the first indicated TCI state/pair of TCI states to monitor second PDCCH candidate(s) received in CORESET(s) associated/configured with the indicator/parameter in the corresponding ControlResourceSet set to '1' (or '0').

In yet another example, for N=2 or M=2, the UE 116 could apply/use the first (or second) indicated TCI state/pair of TCI states to monitor PDCCH candidate(s) received in CORESET(s) associated/configured with the indicator/parameter in the corresponding ControlResourceSet set to '00' ('01', '10' or '11')—or, equivalently, the UE 116 could assume that the DM-RS antenna port(s) of the PDCCH received in CORESET(s) associated/configured with the indicator/parameter in the corresponding ControlResourceSet set to '00' ('01', 10' or '11') is quasi co-located with the RS(s) in the RS set(s) provided/indicated/configured in the first (or second) indicated TCI state/pair of TCI states. The UE 116 could apply/use the second (or first) indicated TCI state/pair of TCI states to monitor PDCCH candidate(s) received in CORESET(s) associated/configured with the indicator/parameter in the corresponding ControlResourceSet set to '01' ('00', '10' or '11')—or, equivalently, the UE 116 could assume that the DM-RS antenna port(s) of the PDCCH received in CORESET(s) associated/configured with the indicator/parameter in the corresponding ControlResourceSet set to '01' ('00', '10' or '11') is quasi co-located with the RS(s) in the RS set(s) provided/indicated/configured in the second (or first) indicated TCI state/pair of TCI states). The UE 116 could apply/use the first indicated TCI state/pair of TCI states to monitor first PDCCH candidate(s) received in CORESET(s) associated/configured with the indicator/parameter in the corresponding ControlResourceSet set to '10' ('00', '01' or '11') and the second indicated TCI state/pair of TCI states to monitor second PDCCH candidate(s) received in CORESET(s) associated/configured with the indicator/parameter in the corresponding ControlResourceSet set to '10' ('00', '01' or '11') or the UE 116 could apply/use the second indicated TCI state/pair of TCI states to monitor first PDCCH candidate(s) received in CORESET(s) associated/configured with the indicator/parameter in the corresponding ControlResourceSet set to '11' ('00', '01' or '10') and the first indicated TCI state/pair of TCI states to monitor second PDCCH candidate(s) received in CORESET(s) associated/configured with the indicator/parameter in the corresponding ControlResourceSet set to '11' ('00', '01' or '10').

In yet another example, for N=2 or M=2, when/if the beam indication DCI is received in CORESET(s) associated/configured with the indicator/parameter in the corresponding ControlResourceSet set to '0', the UE 116 could apply/use the first (or second) indicated TCI state/pair of TCI states to monitor PDCCH candidate(s), wherein the PDCCH candidate(s) could be received in any CORESET(s) or CORESET(s) not associated/configured with the indicator/parameter specified/defined herein (e.g., in the corresponding ControlResourceSet) or CORESET(s) associated/configured with the indicator/parameter in the corresponding ControlResourceSet set to '0' or '1'. When/if the beam indication DCI is received in CORESET(s) associated/configured with the indicator/parameter in the corresponding ControlResourceSet set to '1', the UE 116 could apply/use the second (or first) indicated TCI state/pair of TCI states to monitor PDCCH candidate(s), wherein the PDCCH candidate(s) could be received in any CORESET(s) or CORESET(s) not associated/configured with the indicator/parameter specified/defined herein (e.g., in the corresponding ControlResourceSet) or CORESET(s) associated/configured with the indicator/parameter in the corresponding ControlResourceSet set to '0' or '1'.

In yet another example, for N=2 or M=2, when/if the beam indication DCI is received in CORESET(s) associated/configured with the indicator/parameter in the corresponding ControlResourceSet set to '0' (or '1'), the UE 116 could apply/use the first indicated TCI state/pair of TCI states to monitor first PDCCH candidate(s) and the second indicated TCI state/pair of TCI states to monitor second PDCCH candidate(s), wherein the first and/or second PDCCH candidate(s) could be received in any CORESET(s) or CORESET(s) not associated/configured with the indicator/parameter specified/defined herein (e.g., in the corresponding ControlResourceSet) or CORESET(s) associated/configured with the indicator/parameter in the corresponding ControlResourceSet set to '0' or '1', and when/if the beam indication DCI is received in CORESET(s) associated/configured with the indicator/parameter in the corresponding ControlResourceSet set to '1' (or '0'), the UE 116 could apply/use the second indicated TCI state/pair of TCI states to monitor the first PDCCH candidate(s) and the first indicated TCI state/pair of TCI states to monitor the second PDCCH candidate(s), wherein the first and/or second PDCCH candidate(s) could be received in any CORESET(s) or CORESET(s) not associated/configured with the indicator/parameter specified/defined herein (e.g., in the corresponding ControlResourceSet) or CORESET(s) associated/configured with the indicator/parameter in the corresponding ControlResourceSet set to '0' or '1'.

In yet another example, for N=2 or M=2, when/if the beam indication DCI is received in CORESET(s) associated/configured with the indicator/parameter in the corresponding ControlResourceSet set to '00' ('01', '10' or '11'), the UE 116 could apply/use the first (or second) indicated TCI state/pair of TCI states to monitor PDCCH candidate(s), wherein the PDCCH candidate(s) could be received in any CORESET(s) or CORESET(s) not associated/configured with the indicator/parameter specified/defined herein (e.g., in the corresponding ControlResourceSet) or CORESET(s) associated/configured with the indicator/parameter in the corresponding ControlResourceSet set to '00' or '01' or '10' or '11'. When/if the beam indication DCI is received in CORESET(s) associated/configured with the indicator/parameter in the corresponding ControlResourceSet set to '01' ('00', '10' or '11'), the UE 116 could apply/use the second (or first) indicated TCI state/pair of TCI states to monitor PDCCH candidate(s), wherein the PDCCH candidate(s) could be received in any CORESET(s) or CORESET(s) not associated/configured with the indicator/parameter specified/defined herein (e.g., in the corresponding ControlResourceSet) or CORESET(s) associated/configured with the indicator/parameter in the corresponding ControlResourceSet set to '00' or '01' or '10' or '11'. When/if the beam indication DCI is received in CORESET(s) associated/configured with the indicator/parameter in the corresponding ControlResourceSet set to '10' ('00', '01' or '11'), the UE 116 could apply/use the first indicated TCI state/pair of TCI states to monitor first PDCCH candidate(s) and the second indicated TCI state/pair of TCI states to monitor second PDCCH candidate(s), wherein the first and/or second PDCCH candidate(s) could be received in any CORESET(s) or CORESET(s) not associated/configured with the indicator/parameter specified/defined herein (e.g., in the corresponding ControlResourceSet) or CORESET(s) associated/configured with the indicator/parameter in the corresponding ControlResourceSet set to '00' or '01' or '10' or '11'. When/if the beam indication DCI is received in CORESET(s) associated/configured with the indicator/parameter in the corresponding ControlResourceSet set to '11' ('00', '01' or '10'), the UE 116 could apply/use the second indicated TCI state/pair of TCI states to monitor the first PDCCH candidate(s) and the first indicated TCI state/pair of TCI states to monitor the second PDCCH candidate(s), wherein the first and/or second PDCCH candidate(s) could be received in any CORESET(s) or CORESET(s) not associated/configured with the indicator/parameter specified/defined herein (e.g., in the corresponding ControlResourceSet) or CORESET(s) associated/configured with the indicator/parameter in the corresponding ControlResourceSet set to '00' or '01' or '10' or '11'.

The UE 116 could first follow one or more examples described herein to determine the association between the indicated TCI state(s) and the PDCCH reception(s). The UE 116 could then follow one or more examples described herein to determine the association between the indicated TCI state(s) and the PDCCH reception(s) according to/based on one or more events or one or more conditions discussed/specified herein.

In one example, for N=2 or M=2, the UE 116 could monitor category-1 PDCCH candidate(s) received in CORESET(s) associated/configured with the indicator/parameter in the corresponding ControlResourceSet set to '0' or '1' or '00' or '01' or '10' or '11' and the UE 116 could monitor category-2 PDCCH candidate(s) received in CORESET(s) not associated/configured with the indicator/parameter specified/defined herein (e.g., in the corresponding ControlResourceSet). The UE 116 could apply/use the first (or second) indicated TCI state/pair of TCI states to monitor the category-1 PDCCH candidate(s) received in CORESET(s) associated/configured with the indicator/parameter in the corresponding ControlResourceSet set to '0' (or, equivalently, the UE 116 could assume that the DM-RS antenna port(s) of the category-1 PDCCH candidate(s) received in CORESET(s) associated/configured with the indicator/parameter in the corresponding ControlResourceSet set to '0' is quasi co-located with the RS(s) in the RS set(s) provided/indicated/configured in the first (or second) indicated TCI state/pair of TCI states), and the UE 116 could apply/use the second (or first) indicated TCI state/pair of TCI states to monitor the category-1 PDCCH candidate(s) received in CORESET(s) associated/configured with the indicator/parameter in the corresponding ControlResourceSet set to '1' (or, equivalently, the UE 116 could assume that the DM-RS antenna port(s) of the category-1 PDCCH candidate(s) received in CORESET(s) associated/configured with the indicator/parameter in the corresponding ControlResourceSet set to '1' is quasi co-located with the RS(s) in the RS set(s) provided/indicated/configured in the second (or first) indicated TCI state/pair of TCI states).

Figure 12:
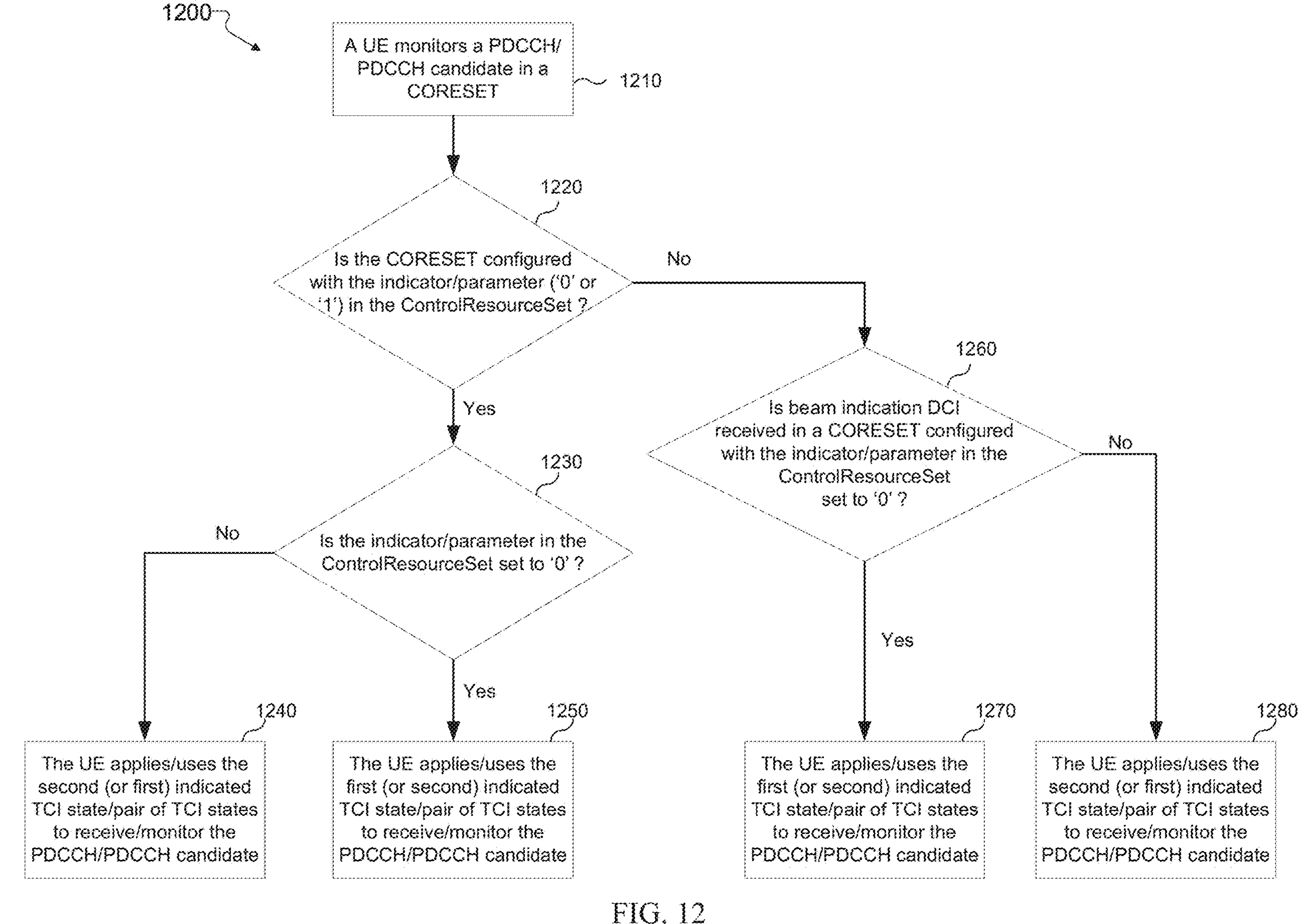
FIG. 12 illustrates a flowchart of an example algorithm for determining which of the indicated TCI state(s) to use for receiving physical downlink control channel (PDCCH) candidates according to embodiments of the present disclosure.

FIG. 12 illustrates a flowchart of an example algorithm 1200 determining which of the indicated TCI state(s) to use for receiving PDCCH candidates according to embodiments of the present disclosure. For example, algorithm 1200 can be used by any of the UEs 111-116 of FIG. 1 and, more particularly, transceiver(s) 310. This example is for illustration only and other embodiments can be used without departing from the scope of the present disclosure.

The algorithm begins with step 1210, a UE monitors a PDCCH/PDCCH candidate in a CORESET. In step 1220, the CORESET can be configured with the indicator/parameter ('0' or '1') in the ControlResourceSet. If so, the algorithm then proceeds to step 1230. Otherwise, the algorithm proceeds to step 1260. In step 1230, the indicator/parameter in the ControlResourceSet can be set to '0'. If so, in step 1250, the UE then applies/uses the first (or second) indicated TCI state/pair of TCI states to receive/monitor the PDCCH/

PDCCH candidate. Otherwise, in step 1240, the UE 116 then applies/uses the second (or the first) indicated TCI state/pair of TCI states to receive/monitor the PDCCH/PDCCH candidate. In step 1260, the beam indication DCI received in a CORESET can be configured with the indicator/parameter in the ControlResourceSet set to '0'. If so, in step 1270, the UE 116 then applies/uses the first (or second) indicated TCI state/pair of TCI states to receive/monitor the PDCCH/PDCCH candidate. Otherwise, in step 1280, the UE 116 then applies/uses the second (or first) indicated TCI state/pair of TCI states to receive/monitor the PDCCH/PDCCH candidate.

For example, for the category-2 PDCCH candidate(s), when/if the beam indication DCI is received in CORESET(s) associated/configured with the indicator/parameter in the corresponding ControlResourceSet set to '0', the UE 116 could apply/use the first (or second) indicated TCI state/pair of TCI states to monitor the category-2 PDCCH candidate(s). When/if the beam indication DCI is received in CORESET(s) associated/configured with the indicator/parameter in the corresponding ControlResourceSet set to '1', the UE 116 could apply/use the second (or first) indicated TCI state/pair of TCI states to monitor the category-2 PDCCH candidate(s).

For another example, when/if the beam indication DCI is received in CORESET(s) associated/configured with the indicator/parameter in the corresponding ControlResourceSet set to '0' (or '1'), the UE 116 could apply/use the first indicated TCI state/pair of TCI states to monitor first category-2 PDCCH candidate(s) and the second indicated TCI state/pair of TCI states to monitor second category-2 PDCCH candidate(s). When/if the beam indication DCI is received in CORESET(s) associated/configured with the indicator/parameter in the corresponding ControlResourceSet set to '1' (or '0'), the UE 116 could apply/use the second indicated TCI state/pair of TCI states to monitor the first category-2 PDCCH candidate(s) and the first indicated TCI state/pair of TCI states to monitor the second category-2 PDCCH candidate(s).

Yet for another example, when/if the beam indication DCI is received in CORESET(s) associated/configured with the indicator/parameter in the corresponding ControlResourceSet set to '00' ('01', '10' or '11'), the UE 116 could apply/use the first (or second) indicated TCI state/pair of TCI states to monitor category-2 PDCCH candidate(s). When/if the beam indication DCI is received in CORESET(s) associated/configured with the indicator/parameter in the corresponding ControlResourceSet set to '01' ('00', '10' or '11'), the UE 116 could apply/use the second (or first) indicated TCI state/pair of TCI states to monitor category-2 PDCCH candidate(s). When/if the beam indication DCI is received in CORESET(s) associated/configured with the indicator/parameter in the corresponding ControlResourceSet set to '10' ('00', '01' or '11'), the UE 116 could apply/use the first indicated TCI state/pair of TCI states to monitor first category-2 PDCCH candidate(s) and the second indicated TCI state/pair of TCI states to monitor second category-2 PDCCH candidate(s). When/if the beam indication DCI is received in CORESET(s) associated/configured with the indicator/parameter in the corresponding ControlResourceSet set to '11' ('00', '01' or '10'), the UE 116 could apply/use the second indicated TCI state/pair of TCI states to monitor the first category-2 PDCCH candidate(s) and the first indicated TCI state/pair of TCI states to monitor the second category-2 PDCCH candidate(s).

In another example, for N=2 or M=2, the UE 116 could monitor category-1 PDCCH candidate(s) received in CORESET(s) associated/configured with the indicator/parameter in the corresponding ControlResourceSet set to '0' or '1' or '00' or '01' or '10' or '11' and the UE 116 could monitor category-2 PDCCH candidate(s) received in CORESET(s) not associated/configured with the indicator/parameter specified/defined in one or more example described herein (e.g., in the corresponding ControlResourceSet). The UE 116 could apply/use the first indicated TCI state/pair of TCI states to monitor first category-1 PDCCH candidate(s) received in CORESET(s) associated/configured with the indicator/parameter in the corresponding ControlResourceSet set to '0' (or '1') and the second indicated TCI state/pair of TCI states to monitor second category-1 PDCCH candidate(s) received in CORESET(s) associated/configured with the indicator/parameter in the corresponding ControlResourceSet set to '0' (or '1'). The UE 116 could apply/use the second indicated TCI state/pair of TCI states to monitor first category-1 PDCCH candidate(s) received in CORESET(s) associated/configured with the indicator/parameter in the corresponding ControlResourceSet set to '1' (or '0') and the first indicated TCI state/pair of TCI states to monitor second category-1 PDCCH candidate(s) received in CORESET(s) associated/configured with the indicator/parameter in the corresponding ControlResourceSet set to '1' (or '0').

For example, when/if the beam indication DCI is received in CORESET(s) associated/configured with the indicator/parameter in the corresponding ControlResourceSet set to '0', the UE 116 could apply/use the first (or second) indicated TCI state/pair of TCI states to monitor the category-2 PDCCH candidate(s). When/if the beam indication DCI is received in CORESET(s) associated/configured with the indicator/parameter in the corresponding ControlResourceSet set to '1', the UE 116 could apply/use the second (or first) indicated TCI state/pair of TCI states to monitor the category-2 PDCCH candidate(s).

For another example, when/if the beam indication DCI is received in CORESET(s) associated/configured with the indicator/parameter in the corresponding ControlResourceSet set to '0' (or '1'), the UE 116 could apply/use the first indicated TCI state/pair of TCI states to monitor first category-2 PDCCH candidate(s) and the second indicated TCI state/pair of TCI states to monitor second category-2 PDCCH candidate(s). When/if the beam indication DCI is received in CORESET(s) associated/configured with the indicator/parameter in the corresponding ControlResourceSet set to '1' (or '0'), the UE 116 could apply/use the second indicated TCI state/pair of TCI states to monitor the first category-2 PDCCH candidate(s) and the first indicated TCI state/pair of TCI states to monitor the second category-2 PDCCH candidate(s).

Yet for another example, when/if the beam indication DCI is received in CORESET(s) associated/configured with the indicator/parameter in the corresponding ControlResourceSet set to '00' ('01', '10' or '11'), the UE 116 could apply/use the first (or second) indicated TCI state/pair of TCI states to monitor category-2 PDCCH candidate(s). When/if the beam indication DCI is received in CORESET(s) associated/configured with the indicator/parameter in the corresponding ControlResourceSet set to '01' ('00', '10' or '11'), the UE 116 could apply/use the second (or first) indicated TCI state/pair of TCI states to monitor category-2 PDCCH candidate(s). When/if the beam indication DCI is received in CORESET(s) associated/configured with the indicator/parameter in the corresponding ControlResourceSet set to '10' ('00', '01' or '11'), the UE 116 could apply/use the first indicated TCI state/pair of TCI states to monitor first category-2 PDCCH candidate(s) and the second indicated TCI state/pair of TCI states to monitor second category-2 PDCCH candidate(s). When/if the beam indication DCI is received in CORESET(s) associated/configured with the indicator/parameter in the corresponding ControlResourceSet set to '11' ('00', '01' or '10'), the UE 116 could apply/use the second indicated TCI state/pair of TCI states to monitor the first category-2 PDCCH candidate(s) and the first indicated TCI state/pair of TCI states to monitor the second category-2 PDCCH candidate(s).

In yet another example, for N=2 or M=2, the UE 116 could monitor category-1 PDCCH candidate(s) received in CORESET(s) associated/configured with the indicator/parameter in the corresponding ControlResourceSet set to '0' or '1' or '00' or '01' or '10' or '11' and the UE 116 could monitor category-2 PDCCH candidate(s) received in CORESET(s) not associated/configured with the indicator/parameter specified/defined in one or more examples described herein (e.g., in the corresponding ControlResourceSet). The UE 116 could apply/use the first (or second) indicated TCI state/pair of TCI states to monitor category-1 PDCCH candidate(s) received in CORESET(s) associated/configured with the indicator/parameter in the corresponding ControlResourceSet set to '00' ('01', '10' or '11')—or, equivalently, the UE 116 could assume that the DM-RS antenna port(s) of the category-1 PDCCH received in CORESET(s) associated/configured with the indicator/parameter in the corresponding ControlResourceSet set to '00' ('01', 10' or '11') is quasi co-located with the RS(s) in the RS set(s) provided/indicated/configured in the first (or second) indicated TCI state/pair of TCI states. The UE 116 could apply/use the second (or first) indicated TCI state/pair of TCI states to monitor category-1 PDCCH candidate(s) received in CORESET(s) associated/configured with the indicator/parameter in the corresponding ControlResourceSet set to '01' ('00', '10' or '11')—or, equivalently, the UE 116 could assume that the DM-RS antenna port(s) of the category-1 PDCCH received in CORESET(s) associated/configured with the indicator/parameter in the corresponding ControlResourceSet set to '01' ('00', '10' or '11') is quasi co-located with the RS(s) in the RS set(s) provided/indicated/configured in the second (or first) indicated TCI state/pair of TCI states). The UE 116 could apply/use the first indicated TCI state/pair of TCI states to monitor first category-1 PDCCH candidate(s) received in CORESET(s) associated/configured with the indicator/parameter in the corresponding ControlResourceSet set to '10' ('00', '01' or '11') and the second indicated TCI state/pair of TCI states to monitor second category-1 PDCCH candidate(s) received in CORESET(s) associated/configured with the indicator/parameter in the corresponding ControlResourceSet set to '10' ('00', '01' or '11'). Alternatively, the UE 116 could apply/use the second indicated TCI state/pair of TCI states to monitor first category-1 PDCCH candidate(s) received in CORESET(s) associated/configured with the indicator/parameter in the corresponding ControlResourceSet set to '11' ('00', '01' or '10') and the first indicated TCI state/pair of TCI states to monitor second category-1 PDCCH candidate(s) received in CORESET(s) associated/configured with the indicator/parameter in the corresponding ControlResourceSet set to '11' ('00', '01' or '10').

For example, when/if the beam indication DCI is received in CORESET(s) associated/configured with the indicator/parameter in the corresponding ControlResourceSet set to '0', the UE 116 could apply/use the first (or second) indicated TCI state/pair of TCI states to monitor the category-2 PDCCH candidate(s), and when/if the beam indication DCI is received in CORESET(s) associated/configured with the indicator/parameter in the corresponding ControlResourceSet set to '1', the UE 116 could apply/use the second (or first) indicated TCI state/pair of TCI states to monitor the category-2 PDCCH candidate(s).

For another example, when/if the beam indication DCI is received in CORESET(s) associated/configured with the indicator/parameter in the corresponding ControlResourceSet set to '0' (or '1'), the UE 116 could apply/use the first indicated TCI state/pair of TCI states to monitor first category-2 PDCCH candidate(s) and the second indicated TCI state/pair of TCI states to monitor second category-2 PDCCH candidate(s). When/if the beam indication DCI is received in CORESET(s) associated/configured with the indicator/parameter in the corresponding ControlResourceSet set to '1' (or '0'), the UE 116 could apply/use the second indicated TCI state/pair of TCI states to monitor the first category-2 PDCCH candidate(s) and the first indicated TCI state/pair of TCI states to monitor the second category-2 PDCCH candidate(s).

Yet for another example, when/if the beam indication DCI is received in CORESET(s) associated/configured with the indicator/parameter in the corresponding ControlResourceSet set to '00' ('01', '10' or '11'), the UE 116 could apply/use the first (or second) indicated TCI state/pair of TCI states to monitor category-2 PDCCH candidate(s). When/if the beam indication DCI is received in CORESET(s) associated/configured with the indicator/parameter in the corresponding ControlResourceSet set to '01' ('00', '10' or '11'), the UE 116 could apply/use the second (or first) indicated TCI state/pair of TCI states to monitor category-2 PDCCH candidate(s). When/if the beam indication DCI is received in CORESET(s) associated/configured with the indicator/parameter in the corresponding ControlResourceSet set to '10' ('00', '01' or '11'), the UE 116 could apply/use the first indicated TCI state/pair of TCI states to monitor first category-2 PDCCH candidate(s) and the second indicated TCI state/pair of TCI states to monitor second category-2 PDCCH candidate(s). When/if the beam indication DCI is received in CORESET(s) associated/configured with the indicator/parameter in the corresponding ControlResourceSet set to '11' ('00', '01' or '10'), the UE 116 could apply/use the second indicated TCI state/pair of TCI states to monitor the first category-2 PDCCH candidate(s) and the first indicated TCI state/pair of TCI states to monitor the second category-2 PDCCH candidate(s).

The UE 116 could first follow one or more examples described herein to determine the association between the indicated TCI state(s) and the PDCCH reception(s). The UE 116 could then follow one or more examples described herein to determine the association between the indicated TCI state(s) and the PDCCH reception(s) according to/based on one or more examples described herein.

In one example, for N=2 or M=2, when/if the beam indication DCI is received in CORESET(s) associated/configured with the indicator/parameter in the corresponding ControlResourceSet set to '0', the UE 116 could apply/use the first (or second) indicated TCI state/pair of TCI states to monitor PDCCH candidate(s), wherein the PDCCH candidate(s) could be received in any CORESET(s) or CORESET(s) not associated/configured with the indicator/parameter specified/defined herein (e.g., in the corresponding ControlResourceSet) or CORESET(s) associated/configured with the indicator/parameter in the corresponding ControlResourceSet set to '0' or '1' or '00' or '01' or '10' or '11'. When/if the beam indication DCI is received in CORESET(s) associated/configured with the indicator/parameter in the corresponding ControlResourceSet set to '1', the UE 116 could apply/use the second (or first) indicated TCI state/pair of TCI states to monitor PDCCH candidate(s), wherein the PDCCH candidate(s) could be received in any CORESET(s) or CORESET(s) not associated/configured with the indicator/parameter specified/defined herein (e.g., in the corresponding ControlResourceSet) or CORESET(s) associated/configured with the indicator/parameter in the corresponding ControlResourceSet set to '0' or '1' or '00' or '01' or '10' or '11'.

When/if the beam indication DCI is received in CORESET(s) not associated/configured with the indicator/parameter specified/defined herein (e.g., in the corresponding ControlResourceSet), for example, the UE 116 could apply/use the first (or second) indicated TCI state/pair of TCI states to monitor PDCCH candidate(s) received in CORESET(s) associated/configured with the indicator/parameter in the corresponding ControlResourceSet set to '0' (or, equivalently, the UE 116 could assume that the DM-RS antenna port(s) of the PDCCH received in CORESET(s) associated/configured with the indicator/parameter in the corresponding ControlResourceSet set to '0' is quasi co-located with the RS(s) in the RS set(s) provided/indicated/configured in the first (or second) indicated TCI state/pair of TCI states). The UE 116 could apply/use the second (or first) indicated TCI state/pair of TCI states to monitor PDCCH candidate(s) received in CORESET(s) associated/configured with the indicator/parameter in the corresponding ControlResourceSet set to '1' (or, equivalently, the UE 116 could assume that the DM-RS antenna port(s) of the PDCCH received in CORESET(s) associated/configured with the indicator/parameter in the corresponding ControlResourceSet set to '1' is quasi co-located with the RS(s) in the RS set(s) provided/indicated/configured in the second (or first) indicated TCI state/pair of TCI states).

For another example, the UE 116 could apply/use the first indicated TCI state/pair of TCI states to monitor first PDCCH candidate(s) received in CORESET(s) associated/configured with the indicator/parameter in the corresponding ControlResourceSet set to '0' (or '1') and the second indicated TCI state/pair of TCI states to monitor second PDCCH candidate(s) received in CORESET(s) associated/configured with the indicator/parameter in the corresponding ControlResourceSet set to '0' (or '1'). The UE 116 could apply/use the second indicated TCI state/pair of TCI states to monitor first PDCCH candidate(s) received in CORESET(s) associated/configured with the indicator/parameter in the corresponding ControlResourceSet set to '1' (or '0') and the first indicated TCI state/pair of TCI states to monitor second PDCCH candidate(s) received in CORESET(s) associated/configured with the indicator/parameter in the corresponding ControlResourceSet set to '1' (or '0').

Yet for another example, the UE 116 could apply/use the first (or second) indicated TCI state/pair of TCI states to monitor PDCCH candidate(s) received in CORESET(s) associated/configured with the indicator/parameter in the corresponding ControlResourceSet set to '00' ('01', '10' or '11')—or, equivalently, the UE 116 could assume that the DM-RS antenna port(s) of the PDCCH received in CORESET(s) associated/configured with the indicator/parameter in the corresponding ControlResourceSet set to '00' ('01', 10' or '11') is quasi co-located with the RS(s) in the RS set(s) provided/indicated/configured in the first (or second) indicated TCI state/pair of TCI states. The UE 116 could apply/use the second (or first) indicated TCI state/pair of TCI states to monitor PDCCH candidate(s) received in CORESET(s) associated/configured with the indicator/parameter in the corresponding ControlResourceSet set to '01' ('00', '10' or '11')—or, equivalently, the UE 116 could assume that the DM-RS antenna port(s) of the PDCCH received in CORESET(s) associated/configured with the indicator/parameter in the corresponding ControlResourceSet set to '01' ('00', '10' or '11') is quasi co-located with the RS(s) in the RS set(s) provided/indicated/configured in the second (or first) indicated TCI state/pair of TCI states). The UE 116 could apply/use the first indicated TCI state/pair of TCI states to monitor first PDCCH candidate(s) received in CORESET(s) associated/configured with the indicator/parameter in the corresponding ControlResourceSet set to '10' ('00', '01' or '11') and the second indicated TCI state/pair of TCI states to monitor second PDCCH candidate(s) received in CORESET(s) associated/configured with the indicator/parameter in the corresponding ControlResourceSet set to '10' ('00', '01' or '11'). Alternatively, the UE 116 could apply/use the second indicated TCI state/pair of TCI states to monitor first PDCCH candidate(s) received in CORESET(s) associated/configured with the indicator/parameter in the corresponding ControlResourceSet set to '11' ('00', '01' or '10') and the first indicated TCI state/pair of TCI states to monitor second PDCCH candidate(s) received in CORE-
SET(s) associated/configured with the indicator/parameter in the corresponding ControlResourceSet set to '11' ('00', '01' or '10').

In another example, for N=2 or M=2, when/if the beam indication DCI is received in CORESET(s) associated/configured with the indicator/parameter in the corresponding ControlResourceSet set to '0' (or '1'), the UE 116 could apply/use the first indicated TCI state/pair of TCI states to monitor first PDCCH candidate(s) and the second indicated TCI state/pair of TCI states to monitor second PDCCH candidate(s), wherein the first and/or second PDCCH candidate(s) could be received in any CORESET(s) or CORESET(s) not associated/configured with the indicator/parameter specified/defined herein (e.g., in the corresponding ControlResourceSet) or CORESET(s) associated/configured with the indicator/parameter in the corresponding ControlResourceSet set to '0' or '1' or '00' or '01' or '10' or '11'. When/if the beam indication DCI is received in CORESET(s) associated/configured with the indicator/parameter in the corresponding ControlResourceSet set to '1' (or '0'), the UE 116 could apply/use the second indicated TCI state/pair of TCI states to monitor the first PDCCH candidate(s) and the first indicated TCI state/pair of TCI states to monitor the second PDCCH candidate(s), wherein the first and/or second PDCCH candidate(s) could be received in any CORESET(s) or CORESET(s) not associated/configured with the indicator/parameter specified/defined herein (e.g., in the corresponding ControlResourceSet) or CORESET(s) associated/configured with the indicator/parameter in the corresponding ControlResourceSet set to '0' or '1' or '00' or '01' or '10' or '11'.

When/if the beam indication DCI is received in CORESET(s) not associated/configured with the indicator/parameter specified/defined herein (e.g., in the corresponding ControlResourceSet), for example, the UE 116 could apply/use the first (or second) indicated TCI state/pair of TCI states to monitor PDCCH candidate(s) received in CORESET(s) associated/configured with the indicator/parameter in the corresponding ControlResourceSet set to '0' (or, equivalently, the UE 116 could assume that the DM-RS antenna port(s) of the PDCCH received in CORESET(s) associated/configured with the indicator/parameter in the corresponding ControlResourceSet set to '0' is quasi co-located with the RS(s) in the RS set(s) provided/indicated/configured in the first (or second) indicated TCI state/pair of TCI states) and the UE 116 could apply/use the second (or first) indicated TCI state/pair of TCI states to monitor PDCCH candidate(s) received in CORESET(s) associated/configured with the indicator/parameter in the corresponding ControlResourceSet set to '1' (or, equivalently, the UE 116 could assume that the DM-RS antenna port(s) of the PDCCH received in CORESET(s) associated/configured with the indicator/parameter in the corresponding ControlResourceSet set to '1' is quasi co-located with the RS(s) in the RS set(s) provided/indicated/configured in the second (or first) indicated TCI state/pair of TCI states).

For another example, the UE 116 could apply/use the first indicated TCI state/pair of TCI states to monitor first PDCCH candidate(s) received in CORESET(s) associated/configured with the indicator/parameter in the corresponding ControlResourceSet set to '0' (or '1') and the second indicated TCI state/pair of TCI states to monitor second PDCCH candidate(s) received in CORESET(s) associated/configured with the indicator/parameter in the corresponding ControlResourceSet set to '0' (or '1'). The UE 116 could apply/use the second indicated TCI state/pair of TCI states to monitor first PDCCH candidate(s) received in CORESET(s) associated/configured with the indicator/parameter in the corresponding ControlResourceSet set to '1' (or '0') and the first indicated TCI state/pair of TCI states to monitor second PDCCH candidate(s) received in CORESET(s) associated/configured with the indicator/parameter in the corresponding ControlResourceSet set to '1' (or '0').

Yet for another example, the UE 116 could apply/use the first (or second) indicated TCI state/pair of TCI states to monitor PDCCH candidate(s) received in CORESET(s) associated/configured with the indicator/parameter in the corresponding ControlResourceSet set to '00' ('01', '10' or '11')—or, equivalently, the UE 116 could assume that the DM-RS antenna port(s) of the PDCCH received in CORESET(s) associated/configured with the indicator/parameter in the corresponding ControlResourceSet set to '00' ('01', 10' or '11') is quasi co-located with the RS(s) in the RS set(s) provided/indicated/configured in the first (or second) indicated TCI state/pair of TCI states. The UE 116 could apply/use the second (or first) indicated TCI state/pair of TCI states to monitor PDCCH candidate(s) received in CORESET(s) associated/configured with the indicator/parameter in the corresponding ControlResourceSet set to '01' ('00', '10' or '11')—or, equivalently, the UE 116 could assume that the DM-RS antenna port(s) of the PDCCH received in CORESET(s) associated/configured with the indicator/parameter in the corresponding ControlResourceSet set to '01' ('00', '10' or '11') is quasi co-located with the RS(s) in the RS set(s) provided/indicated/configured in the second (or first) indicated TCI state/pair of TCI states). The UE 116 could apply/use the first indicated TCI state/pair of TCI states to monitor first PDCCH candidate(s) received in CORESET(s) associated/configured with the indicator/parameter in the corresponding ControlResourceSet set to '10' ('00', '01' or '11') and the second indicated TCI state/pair of TCI states to monitor second PDCCH candidate(s) received in CORESET(s) associated/configured with the indicator/parameter in the corresponding ControlResourceSet set to '10' ('00', '01' or '11'). Alternatively, the UE 116 could apply/use the second indicated TCI state/pair of TCI states to monitor first PDCCH candidate(s) received in CORESET(s) associated/configured with the indicator/parameter in the corresponding ControlResourceSet set to '11' ('00', '01' or '10') and the first indicated TCI state/pair of TCI states to monitor second PDCCH candidate(s) received in CORESET(s) associated/configured with the indicator/parameter in the corresponding ControlResourceSet set to '11' ('00', '01' or '10').

In yet another example, for N=2 or M=2, when/if the beam indication DCI is received in CORESET(s) associated/configured with the indicator/parameter in the corresponding ControlResourceSet set to '00' ('01', '10' or '11'), the UE 116 could apply/use the first (or second) indicated TCI state/pair of TCI states to monitor PDCCH candidate(s), wherein the PDCCH candidate(s) could be received in any CORESET(s) or CORESET(s) not associated/configured with the indicator/parameter specified/defined herein (e.g., in the corresponding ControlResourceSet) or CORESET(s) associated/configured with the indicator/parameter in the corresponding ControlResourceSet set to '0' or '1' or '00' or '01' or '10' or '11'. When/if the beam indication DCI is received in CORESET(s) associated/configured with the indicator/parameter in the corresponding ControlResourceSet set to '01' ('00', '10' or '11'), the UE 116 could apply/use the second (or first) indicated TCI state/pair of TCI states to monitor PDCCH candidate(s), wherein the PDCCH candidate(s) could be received in any CORESET(s) or CORESET(s) not associated/configured with the indicator/parameter specified/defined herein (e.g., in the corresponding ControlResourceSet) or CORESET(s) associated/configured with the indicator/parameter in the corresponding ControlResourceSet set to '0' or '1' or '00' or '01' or '10' or '11'. When/if the beam indication DCI is received in CORESET(s) associated/configured with the indicator/parameter in the corresponding ControlResourceSet set to '10' ('00', '01' or '11'), the UE 116 could apply/use the first indicated TCI state/pair of TCI states to monitor first PDCCH candidate(s) and the second indicated TCI state/pair of TCI states to monitor second PDCCH candidate(s), wherein the first and/or second PDCCH candidate(s) could be received in any CORESET(s) or CORESET(s) not associated/configured with the indicator/parameter specified/defined herein (e.g., in the corresponding ControlResourceSet) or CORESET(s) associated/configured with the indicator/parameter in the corresponding ControlResourceSet set to '0' or '1' or '00' or '01' or '10' or '11'. When/if the beam indication DCI is received in CORESET(s) associated/configured with the indicator/parameter in the corresponding ControlResourceSet set to '11' ('00', '01' or '10'), the UE 116 could apply/use the second indicated TCI state/pair of TCI states to monitor the first PDCCH candidate(s) and the first indicated TCI state/pair of TCI states to monitor the second PDCCH candidate(s), wherein the first and/or second PDCCH candidate(s) could be received in any CORESET(s) or CORESET(s) not associated/configured with the indicator/parameter specified/defined herein (e.g., in the corresponding ControlResourceSet) or CORESET(s) associated/configured with the indicator/parameter in the corresponding ControlResourceSet set to '0' or '1' or '00' or '01' or '10' or '11'.

When/if the beam indication DCI is received in CORESET(s) not associated/configured with the indicator/parameter specified/defined herein (e.g., in the corresponding ControlResourceSet), for example, the UE 116 could apply/use the first (or second) indicated TCI state/pair of TCI states to monitor PDCCH candidate(s) received in CORESET(s) associated/configured with the indicator/parameter in the corresponding ControlResourceSet set to '0' (or, equivalently, the UE 116 could assume that the DM-RS antenna port(s) of the PDCCH received in CORESET(s) associated/configured with the indicator/parameter in the corresponding ControlResourceSet set to '0' is quasi co-located with the RS(s) in the RS set(s) provided/indicated/configured in the first (or second) indicated TCI state/pair of TCI states) and the UE 116 could apply/use the second (or first) indicated TCI state/pair of TCI states to monitor PDCCH candidate(s) received in CORESET(s) associated/configured with the indicator/parameter in the corresponding ControlResourceSet set to '1' (or, equivalently, the UE 116 could assume that the DM-RS antenna port(s) of the PDCCH received in CORESET(s) associated/configured with the indicator/parameter in the corresponding ControlResourceSet set to '1' is quasi co-located with the RS(s) in the RS set(s) provided/indicated/configured in the second (or first) indicated TCI state/pair of TCI states).

For another example, the UE 116 could apply/use the first indicated TCI state/pair of TCI states to monitor first PDCCH candidate(s) received in CORESET(s) associated/configured with the indicator/parameter in the corresponding ControlResourceSet set to '0' (or '1') and the second indicated TCI state/pair of TCI states to monitor second PDCCH candidate(s) received in CORESET(s) associated/configured with the indicator/parameter in the corresponding ControlResourceSet set to '0' (or '1'). The UE 116 could apply/use the second indicated TCI state/pair of TCI states to monitor first PDCCH candidate(s) received in CORESET(s) associated/configured with the indicator/parameter in the corresponding ControlResourceSet set to '1' (or '0') and the first indicated TCI state/pair of TCI states to monitor second PDCCH candidate(s) received in CORESET(s) associated/configured with the indicator/parameter in the corresponding ControlResourceSet set to '1' (or '0').

Yet for another example, the UE 116 could apply/use the first (or second) indicated TCI state/pair of TCI states to monitor PDCCH candidate(s) received in CORESET(s) associated/configured with the indicator/parameter in the corresponding ControlResourceSet set to '00' ('01', '10' or '11')—or, equivalently, the UE 116 could assume that the DM-RS antenna port(s) of the PDCCH received in CORESET(s) associated/configured with the indicator/parameter in the corresponding ControlResourceSet set to '00' ('01', 10' or '11') is quasi co-located with the RS(s) in the RS set(s) provided/indicated/configured in the first (or second) indicated TCI state/pair of TCI states. The UE 116 could apply/use the second (or first) indicated TCI state/pair of TCI states to monitor PDCCH candidate(s) received in CORESET(s) associated/configured with the indicator/parameter in the corresponding ControlResourceSet set to '01' ('00', '10' or '11')—or, equivalently, the UE 116 could assume that the DM-RS antenna port(s) of the PDCCH received in CORESET(s) associated/configured with the indicator/parameter in the corresponding ControlResourceSet set to '01' ('00', '10' or '11') is quasi co-located with the RS(s) in the RS set(s) provided/indicated/configured in the second (or first) indicated TCI state/pair of TCI states). The UE 116 could apply/use the first indicated TCI state/pair of TCI states to monitor first PDCCH candidate(s) received in CORESET(s) associated/configured with the indicator/parameter in the corresponding ControlResourceSet set to '10' ('00', '01' or '11') and the second indicated TCI state/pair of TCI states to monitor second PDCCH candidate(s) received in CORESET(s) associated/configured with the indicator/parameter in the corresponding ControlResourceSet set to '10' ('00', '01' or '11'). Alternatively, the UE 116 could apply/use the second indicated TCI state/pair of TCI states to monitor first PDCCH candidate(s) received in CORESET(s) associated/configured with the indicator/parameter in the corresponding ControlResourceSet set to '11' ('00', '01' or '10') and the first indicated TCI state/pair of TCI states to monitor second PDCCH candidate(s) received in CORESET(s) associated/configured with the indicator/parameter in the corresponding ControlResourceSet set to '11' ('00', '01' or '10').

Furthermore, the UE 116 could be indicated/configured/provided by the network 130, e.g., via higher layer RRC signaling/parameter and/or MAC CE command and/or dynamic DCI based L1 signaling, to follow one or more examples described herein to determine the association between the indicated TCI state(s) and the PDCCH reception(s). For example, when/if the UE 116 receives from the network 130, e.g., via higher layer RRC signaling (e.g., in PDCCH-Config, PDSCH-Config, or ControlResourceSet), a higher layer parameter 'beamSelectionPDCCH' set to 'enabled', the UE 116 could follow the indicator/parameter provided/indicated/configured in the higher layer parameter PDSCH-Config as specified herein to determine the association between the indicated TCI state(s) and the PDSCH reception(s). Otherwise, e.g., when/if the higher layer parameter 'beamSelectionPDSCH' is set to 'disabled', the UE 116 could follow the dynamic TRP(s) selection/switching methods specified herein to determine the association between the indicated TCI state(s) and the PDSCH reception(s).

In one embodiment, the UE 116 could be provided/configured/indicated by the network 130, in a higher layer parameter, e.g., PDSCH-Config, an indicator/parameter to indicate the association between one or more of the indicated TCI states and the corresponding PDSCH reception(s).

For example, for N=2 or M=2, the indicator could be a one-bit indicator with '0' (or '1') indicating that the first indicated TCI state/pairs of TCI states could be applied/used for receiving first (or second) PDSCH(s), and with '1' (or '0') indicating that the second indicated TCI state/pairs of TCI states could be applied/used for receiving second (or first) PDSCH(s).

For another example, for N=2 or M=2, the indicator could be a one-bit indicator with '0' (or '1') indicating that the first indicated TCI state/pairs of TCI states could be applied/used for receiving first PDSCH DM-RS(s) (or, equivalently, the RS(s) in the RS set(s) provided in the first indicated TCI state/pair of TCI states could be quasi-co-located (QCL'ed) with first DM-RS antenna port(s) for PDSCH reception(s)) and the second indicated TCI state/pairs of TCI states could be applied/used for receiving second PDSCH DM-RS(s) (or, equivalently, the RS(s) in the RS set(s) provided in the second indicated TCI state/pair of TCI states could be QCL'ed with second DM-RS antenna port(s) for PDSCH reception(s)) with '1' (or '0') indicating that the first indicated TCI state/pairs of TCI states could be applied/used for receiving the second PDSCH DM-RS(s) (or, equivalently, the RS(s) in the RS set(s) provided in the first indicated TCI state/pair of TCI states could be QCL'ed with the second DM-RS antenna port(s) for PDSCH reception(s)) and the second indicated TCI state/pairs of TCI states could be applied/used for receiving the first PDSCH DM-RS(s) (or, equivalently, the RS(s) in the RS set(s) provided in the second indicated TCI state/pair of TCI states could be QCL'ed with the first DM-RS antenna port(s) for PDSCH reception(s)).

Yet for another example, for N=2 or M=2, the indicator could be a 2-bit indicator with '00' ('01', '10' or '11') indicating that the first indicated TCI state/pairs of TCI states could be applied/used for receiving the first (or second) PDSCH(s), with '01' ('00', '10' or '11') indicating that the second indicated TCI state/pairs of TCI states could be applied/used for receiving the second (or first) PDSCH(s) with '10' ('00', '01' or '11') indicating that the first indicated TCI state/pairs of TCI states could be applied/used for receiving the first PDSCH DM-RS(s) (or, equivalently, the RS(s) in the RS set(s) provided in the first indicated TCI state/pair of TCI states could be QCL'ed with the first DM-RS antenna port(s) for PDSCH reception(s)). The second indicated TCI state/pairs of TCI states could be applied/used for receiving the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s)) with '11' ('00', '01' or '10') indicating that the first indicated TCI state/pairs of TCI states could be applied/used for receiving the second PDSCH DM-RS(s) (or, equivalently, the RS(s) in the RS set(s) provided in the first indicated TCI state/pair of TCI states could be QCL'ed with the second DM-RS antenna port(s) for PDSCH reception(s)) and the second indicated TCI state/pairs of TCI states could be applied/used for receiving the first PDSCH DM-RS(s) (or, equivalently, the RS(s) in the RS set(s) provided in the second indicated TCI state/pair of TCI states could be QCL'ed with the first DM-RS antenna port(s) for PDSCH reception(s)).

Yet for another example, the UE 116 could be provided/configured/indicated by the network 130, in a higher layer parameter, e.g., PDSCH-Config, a single indicator/parameter to indicate the association between one or more of the indicated TCI states and the corresponding PDSCH reception(s).

For example, for N=2 or M=2, the indicator could be a one-bit indicator with '0' (or '1') indicating that the first indicated TCI state/pair of TCI states could be applied/used for receiving first (or second) PDSCH(s), and with '1' (or '0') indicating that the second indicated TCI state/pair of TCI states could be applied/used for receiving second (or first) PDSCH(s).

For another example, for N=2 or M=2, the indicator could be a one-bit indicator with '0' (or '1') indicating that the first indicated TCI state/pair of TCI states could be applied/used for receiving first PDSCH(s) and the second indicated TCI state/pair of TCI states could be applied/used for receiving second PDSCH(s) with '1' (or '0') indicating that the first indicated TCI state/pair of TCI states could be applied/used for receiving second PDSCH(s) and the second indicated TCI state/pair of TCI states could be applied/used for receiving first PDSCH(s).

Yet for another example, for N=2 or M=2, the indicator could be a one-bit indicator with '0' (or '1') indicating that the first indicated TCI state/pair of TCI states could be applied/used for receiving first (or second) PDSCH DM-RS(s) in the first (or second) DM-RS code division multiplexing (CDM) group indicated by the antenna ports field in a DCI (e.g., the scheduling DCI or the beam indication DCI with or without DL assignment)—or, equivalently, the RS(s) in the RS set(s) provided in the first indicated TCI state/pair of TCI states could be quasi-co-located (QCL'ed) with first (or second) DM-RS antenna port(s) in the first (or second) DM-RS CDM group indicated by the antenna ports field in the DCI for PDSCH reception(s) with '1' (or '0') indicating that the second indicated TCI state/pair of TCI states could be applied/used for receiving second (or first) PDSCH DM-RS(s) in the second (or first) DM-RS CDM group indicated by the antenna ports field in a DCI (e.g., the scheduling DCI or the beam indication DCI with or without DL assignment)—or, equivalently, the RS(s) in the RS set(s) provided in the second indicated TCI state/pair of TCI states could be quasi-co-located (QCL'ed) with second (or first) DM-RS antenna port(s) in the second (or first) DM-RS CDM group indicated by the antenna ports field in the DCI for PDSCH reception(s).

Yet for another example, for N=2 or M=2, the indicator could be a one-bit indicator with '0' (or '1') indicating that the first indicated TCI state/pair of TCI states could be applied/used for receiving first PDSCH DM-RS(s) in the first DM-RS CDM group indicated by the antenna ports field in a DCI (e.g., the scheduling DCI or the beam indication DCI with or without DL assignment)—or, equivalently, the RS(s) in the RS set(s) provided in the first indicated TCI state/pair of TCI states could be quasi-co-located (QCL'ed) with first DM-RS antenna port(s) in the first DM-RS CDM group indicated by the antenna ports field in the DCI for PDSCH reception(s) and the second indicated TCI state/pair of TCI states could be applied/used for receiving second PDSCH DM-RS(s) in the second DM-RS CDM group indicated by the antenna ports field in the DCI—or, equivalently, the RS(s) in the RS set(s) provided in the second indicated TCI state/pair of TCI states could be quasi-co-located (QCL'ed) with second DM-RS antenna port(s) in the second DM-RS CDM group indicated by the antenna ports field in the DCI for PDSCH reception(s) with '1' (or '0') indicating that the first indicated TCI state/pair of TCI states could be applied/used for receiving second PDSCH DM-RS(s) in the second DM-RS CDM group indicated by the antenna ports field in a DCI (e.g., the scheduling DCI or the beam indication DCI with or without DL assignment)—or, equivalently, the RS(s) in the RS set(s) provided in the first indicated TCI state/pair of TCI states could be quasi-co-located (QCL'ed) with second DM-RS antenna port(s) in the second DM-RS CDM group indicated by the antenna ports field in the DCI for PDSCH reception(s) and the second indicated TCI state/pair of TCI states could be applied/used for receiving first PDSCH DM-RS(s) in the first DM-RS CDM group indicated by the antenna ports field in the DCI—or, equivalently, the RS(s) in the RS set(s) provided in the second indicated TCI state/pair of TCI states could be quasi-co-located (QCL'ed) with first DM-RS antenna port(s) in the first DM-RS CDM group indicated by the antenna ports field in the DCI for PDSCH reception(s).

Yet for another example, for N=2 or M=2, the indicator could be a one-bit indicator with '0' (or '1') indicating that the first indicated TCI state/pair of TCI states could be applied/used for receiving first PDSCH DM-RS(s) (or, equivalently, the RS(s) in the RS set(s) provided in the first indicated TCI state/pair of TCI states could be quasi-co-located (QCL'ed) with first DM-RS antenna port(s) for PDSCH reception(s)) and the second indicated TCI state/pair of TCI states could be applied/used for receiving second PDSCH DM-RS(s) (or, equivalently, the RS(s) in the RS set(s) provided in the second indicated TCI state/pair of TCI states could be QCL'ed with second DM-RS antenna port(s) for PDSCH reception(s)) with '1' (or '0') indicating that the first indicated TCI state/pair of TCI states could be applied/used for receiving the second PDSCH DM-RS(s) (or, equivalently, the RS(s) in the RS set(s) provided in the first indicated TCI state/pair of TCI states could be QCL'ed with the second DM-RS antenna port(s) for PDSCH reception(s)) and the second indicated TCI state/pair of TCI states could be applied/used for receiving the first PDSCH DM-RS(s) (or, equivalently, the RS(s) in the RS set(s) provided in the second indicated TCI state/pair of TCI states could be QCL'ed with the first DM-RS antenna port(s) for PDSCH reception(s)).

Yet for another example, for N=2 or M=2, the indicator could be a 2-bit indicator with '00' ('01', '10' or '11') indicating that the first indicated TCI state/pair of TCI states could be applied/used for receiving first (or second) PDSCH(s) with '01' ('00', '10' or '11') indicating that the second indicated TCI state/pair of TCI states could be applied/used for receiving second (or first) PDSCH(s), with '10' ('00', '01' or '11') indicating that the first indicated TCI state/pair of TCI states could be applied/used for receiving first PDSCH(s) and the second indicated TCI state/pair of TCI states could be applied/used for receiving second PDSCH(s) with '11' ('00', '01' or '10') indicating that the first indicated TCI state/pair of TCI states could be applied/used for receiving second PDSCH(s) and the second indicated TCI state/pair of TCI states could be applied/used for receiving first PDSCH(s). The value(s) '00' or '01' or '10' or '11' of the indicator could also be reserved or set to 'reserved'.

Yet for another example, for N=2 or M=2, the indicator could be a 2-bit indicator with '00' ('01', '10' or '11') indicating that the first indicated TCI state/pair of TCI states could be applied/used for receiving first (or second) PDSCH DM-RS(s) in the first (or second) DM-RS CDM group indicated by the antenna ports field in a DCI (e.g., the scheduling DCI or the beam indication DCI with or without DL assignment)—or, equivalently, the RS(s) in the RS set(s) provided in the first indicated TCI state/pair of TCI states could be quasi-co-located (QCL'ed) with first (or second) DM-RS antenna port(s) in the first (or second) DM-RS CDM group indicated by the antenna ports field in the DCI for PDSCH reception(s), with '01' ('00', '10' or '11') indicating that the second indicated TCI state/pair of TCI states could be applied/used for receiving second (or first) PDSCH DM-RS(s) in the second (or first) DM-RS CDM group indicated by the antenna ports field in a DCI (e.g., the scheduling DCI or the beam indication DCI with or without DL assignment)—or, equivalently, the RS(s) in the RS set(s) provided in the second indicated TCI state/pair of TCI states could be quasi-co-located (QCL'ed) with second (or first) DM-RS antenna port(s) in the second (or first) DM-RS CDM group indicated by the antenna ports field in the DCI for PDSCH reception(s) with '10' ('00', '01' or '11') indicating that the first indicated TCI state/pair of TCI states could be applied/used for receiving first PDSCH DM-RS(s) in the first DM-RS CDM group indicated by the antenna ports field in a DCI (e.g., the scheduling DCI or the beam indication DCI with or without DL assignment)—or, equivalently, the RS(s) in the RS set(s) provided in the first indicated TCI state/pair of TCI states could be quasi-co-located (QCL'ed) with first DM-RS antenna port(s) in the first DM-RS CDM group indicated by the antenna ports field in the DCI for PDSCH reception(s) and the second indicated TCI state/pair of TCI states could be applied/used for receiving second PDSCH DM-RS(s) in the second DM-RS CDM group indicated by the antenna ports field in the DCI—or, equivalently, the RS(s) in the RS set(s) provided in the second indicated TCI state/pair of TCI states could be quasi-co-located (QCL'ed) with second DM-RS antenna port(s) in the second DM-RS CDM group indicated by the antenna ports field in the DCI for PDSCH reception(s) with '11' ('00', '01' or '10') indicating that the first indicated TCI state/pair of TCI states could be applied/used for receiving second PDSCH DM-RS(s) in the second DM-RS CDM group indicated by the antenna ports field in a DCI (e.g., the scheduling DCI or the beam indication DCI with or without DL assignment)—or, equivalently, the RS(s) in the RS set(s) provided in the first indicated TCI state/pair of TCI states could be quasi-co-located (QCL'ed) with second DM-RS antenna port(s) in the second DM-RS CDM group indicated by the antenna ports field in the DCI for PDSCH reception(s) and the second indicated TCI state/pair of TCI states could be applied/used for receiving first PDSCH DM-RS(s) in the first DM-RS CDM group indicated by the antenna ports field in the DCI—or, equivalently, the RS(s) in the RS set(s) provided in the second indicated TCI state/pair of TCI states could be quasi-co-located (QCL'ed) with first DM-RS antenna port(s) in the first DM-RS CDM group indicated by the antenna ports field in the DCI for PDSCH reception(s). The value(s) '00' or '01' or '10' or '11' of the indicator could also be reserved or set to 'reserved'.

Yet for another example, for N=2 or M=2, the indicator could be a 2-bit indicator with '00' ('01', '10' or '11') indicating that the first indicated TCI state/pair of TCI states could be applied/used for receiving the first (or second) PDSCH(s), with '01' ('00', '10' or '11') indicating that the second indicated TCI state/pair of TCI states could be applied/used for receiving the second (or first) PDSCH(s), with '10' ('00', '01' or '11') indicating that the first indicated TCI state/pair of TCI states could be applied/used for receiving the first PDSCH DM-RS(s) (or, equivalently, the RS(s) in the RS set(s) provided in the first indicated TCI state/pair of TCI states could be QCL'ed with the first DM-RS antenna port(s) for PDSCH reception(s)) and the second indicated TCI state/pair of TCI states could be applied/used for receiving the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s)) with '11' ('00', '01' or '10') indicating that the first indicated TCI state/pair of TCI states could be applied/used for receiving the second PDSCH DM-RS(s) (or, equivalently, the RS(s) in the RS set(s) provided in the first indicated TCI state/pair of TCI states could be QCL'ed with the second DM-RS antenna port(s) for PDSCH reception(s)) and the second indicated TCI state/pair of TCI states could be applied/used for receiving the first PDSCH DM-RS(s) (or, equivalently, the RS(s) in the RS set(s) provided in the second indicated TCI state/pair of TCI states could be QCL'ed with the first DM-RS antenna port(s) for PDSCH reception(s)). The value(s) '00' or '01' or '10' or '11' of the indicator could also be reserved or set to 'reserved'.

Yet for another example, for N=2 or M=2, the indicator could be a 2-bit indicator with '00' ('01', '10' or '11') indicating that the first indicated TCI state/pair of TCI states could be applied/used for receiving first (or second) PDSCH DM-RS(s) in the first (or second) DM-RS CDM group indicated by the antenna ports field in a DCI (e.g., the scheduling DCI or the beam indication DCI with or without DL assignment)—or, equivalently, the RS(s) in the RS set(s) provided in the first indicated TCI state/pair of TCI states could be quasi-co-located (QCL'ed) with first (or second) DM-RS antenna port(s) in the first (or second) DM-RS CDM group indicated by the antenna ports field in the DCI for PDSCH reception(s) with '01' ('00', '10' or '11') indicating that the second indicated TCI state/pair of TCI states could be applied/used for receiving second (or first) PDSCH DM-RS(s) in the second (or first) DM-RS CDM group indicated by the antenna ports field in a DCI (e.g., the scheduling DCI or the beam indication DCI with or without DL assignment)—or, equivalently, the RS(s) in the RS set(s) provided in the second indicated TCI state/pair of TCI states could be quasi-co-located (QCL'ed) with second (or first) DM-RS antenna port(s) in the second (or first) DM-RS CDM group indicated by the antenna ports field in the DCI for PDSCH reception(s) with '10' ('00', '01' or '11') indicating that the first indicated TCI state/pair of TCI states could be applied/used for receiving the first PDSCH DM-RS(s) (or, equivalently, the RS(s) in the RS set(s) provided in the first indicated TCI state/pair of TCI states could be QCL'ed with the first DM-RS antenna port(s) for PDSCH reception(s)) and the second indicated TCI state/pair of TCI states could be applied/used for receiving the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s)) with '11' ('00', '01' or '10') indicating that the first indicated TCI state/pair of TCI states could be applied/used for receiving the second PDSCH DM-RS(s) (or, equivalently, the RS(s) in the RS set(s) provided in the first indicated TCI state/pair of TCI states could be QCL'ed with the second DM-RS antenna port(s) for PDSCH reception(s)) and the second indicated TCI state/pair of TCI states could be applied/used for receiving the first PDSCH DM-RS(s) (or, equivalently, the RS(s) in the RS set(s) provided in the second indicated TCI state/pair of TCI states could be QCL'ed with the first DM-RS antenna port(s) for PDSCH reception(s)). The value(s) '00' or '01' or '10' or '11' of the indicator could also be reserved or set to 'reserved'.

Yet for another example, the UE 116 could be provided/configured/indicated by the network 130, in a higher layer parameter, e.g., PDSCH-Config, more than one (e.g., 2) indicators/parameters—e.g., the first indicator/parameter, the second indicator/parameter, and so on, to indicate the association between one or more of the indicated TCI states and the corresponding PDSCH reception(s).

For the first (or second) indicator/parameter, for example, for N=2 or M=2, the first (or second) indicator/parameter could be a one-bit indicator and associated with first PDSCH(s) with '0' (or '1') indicating that the first indicated TCI state/pair of TCI states could be applied/used for receiving first PDSCH(s) with '1' (or '0') indicating that the second indicated TCI state/pair of TCI states could be applied/used for receiving second PDSCH(s).

For another example, for N=2 or M=2, the first (or second) indicator/parameter could be a one-bit indicator and associated with first PDSCH(s) with '0' (or '1') indicating that the first indicated TCI state/pair of TCI states could be applied/used for receiving first PDSCH(s) and the second indicated TCI state/pair of TCI states could be applied/used for receiving first PDSCH(s) with '1' (or '0') indicating that the first indicated TCI state/pair of TCI states could be applied/used for receiving first PDSCH(s) and the second indicated TCI state/pair of TCI states could be applied/used for receiving first PDSCH(s).

Yet for another example, for N=2 or M=2, the first (or second) indicator/parameter could be a one-bit indicator and associate to first PDSCH DM-RS(s) in the first DM-RS CDM group indicated by the antenna ports field in a DCI (e.g., the scheduling DCI or the beam indication DCI with or without DL assignment) with '0' (or '1') indicating that the first indicated TCI state/pair of TCI states could be applied/used for receiving first PDSCH DM-RS(s) in the first DM-RS CDM group indicated by the antenna ports field in a DCI (e.g., the scheduling DCI or the beam indication DCI with or without DL assignment)—or, equivalently, the RS(s) in the RS set(s) provided in the first indicated TCI state/pair of TCI states could be quasi-co-located (QCL'ed) with first DM-RS antenna port(s) in the first DM-RS CDM group indicated by the antenna ports field in the DCI for PDSCH reception(s) and '1' (or '0') indicating that the second indicated TCI state/pair of TCI states could be applied/used for receiving first PDSCH DM-RS(s) in the first DM-RS CDM group indicated by the antenna ports field in a DCI (e.g., the scheduling DCI or the beam indication DCI with or without DL assignment)—or, equivalently, the RS(s) in the RS set(s) provided in the second indicated TCI state/pair of TCI states could be quasi-co-located (QCL'ed) with first DM-RS antenna port(s) in the first DM-RS CDM group indicated by the antenna ports field in the DCI for PDSCH reception(s).

Yet for another example, for N=2 or M=2, the first (or second) indicator/parameter could be a one-bit indicator and associate to first PDSCH DM-RS(s) in the first DM-RS CDM group indicated by the antenna ports field in a DCI (e.g., the scheduling DCI or the beam indication DCI with or without DL assignment) with '0' (or '1') indicating that the first indicated TCI state/pair of TCI states could be applied/used for receiving first PDSCH DM-RS(s) in the first DM-RS CDM group indicated by the antenna ports field in a DCI (e.g., the scheduling DCI or the beam indication DCI with or without DL assignment)—or, equivalently, the RS(s) in the RS set(s) provided in the first indicated TCI state/pair of TCI states could be quasi-co-located (QCL'ed) with first DM-RS antenna port(s) in the first DM-RS CDM group indicated by the antenna ports field in the DCI for PDSCH reception(s) and the second indicated TCI state/pair of TCI states could be applied/used for receiving first PDSCH DM-RS(s) in the first DM-RS CDM group indicated by the antenna ports field in the DCI—or, equivalently, the RS(s) in the RS set(s) provided in the second indicated TCI state/pair of TCI states could be quasi-co-located (QCL'ed) with first DM-RS antenna port(s) in the first DM-RS CDM group indicated by the antenna ports field in the DCI for PDSCH reception(s) with '1' (or '0') indicating that the first indicated TCI state/pair of TCI states could be applied/used for receiving first PDSCH DM-RS(s) in the first DM-RS CDM group indicated by the antenna ports field in a DCI (e.g., the scheduling DCI or the beam indication DCI with or without DL assignment)—or, equivalently, the RS(s) in the RS set(s) provided in the first indicated TCI state/pair of TCI states could be quasi-co-located (QCL'ed) with first DM-RS antenna port(s) in the first DM-RS CDM group indicated by the antenna ports field in the DCI for PDSCH reception(s) and the second indicated TCI state/pair of TCI states could be applied/used for receiving first PDSCH DM-RS(s) in the first DM-RS CDM group indicated by the antenna ports field in the DCI—or, equivalently, the RS(s) in the RS set(s) provided in the second indicated TCI state/pair of TCI states could be quasi-co-located (QCL'ed) with first DM-RS antenna port(s) in the first DM-RS CDM group indicated by the antenna ports field in the DCI for PDSCH reception(s).

Yet for another example, for N=2 or M=2, the first (or second) indicator/parameter could be a one-bit indicator and associated to first PDSCH DM-RS(s) or first DM-RS antenna port(s) for PDSCH reception(s) with '0' (or '1') indicating that the first indicated TCI state/pair of TCI states could be applied/used for receiving first PDSCH DM-RS(s) (or, equivalently, the RS(s) in the RS set(s) provided in the first indicated TCI state/pair of TCI states could be quasi-co-located (QCL'ed) with first DM-RS antenna port(s) for PDSCH reception(s)) and the second indicated TCI state/pair of TCI states could be applied/used for receiving first PDSCH DM-RS(s) (or, equivalently, the RS(s) in the RS set(s) provided in the second indicated TCI state/pair of TCI states could be QCL'ed with first DM-RS antenna port(s) for PDSCH reception(s)) with '1' (or '0') indicating that the first indicated TCI state/pair of TCI states could be applied/used for receiving the first PDSCH DM-RS(s) (or, equivalently, the RS(s) in the RS set(s) provided in the first indicated TCI state/pair of TCI states could be QCL'ed with the first DM-RS antenna port(s) for PDSCH reception(s)) and the second indicated TCI state/pair of TCI states could be applied/used for receiving the first PDSCH DM-RS(s) (or, equivalently, the RS(s) in the RS set(s) provided in the second indicated TCI state/pair of TCI states could be QCL'ed with the first DM-RS antenna port(s) for PDSCH reception(s)).

Yet for another example, for N=2 or M=2, the first (or second) indicator/parameter could be a 2-bit indicator associated to first PDSCH(s) with '00' ('01', '10' or '11') indicating that the first indicated TCI state/pair of TCI states could be applied/used for receiving first PDSCH(s), with '01' ('00', '10' or '11') indicating that the second indicated TCI state/pair of TCI states could be applied/used for receiving first PDSCH(s), with '10' ('00', '01' or '11') indicating that the first indicated TCI state/pair of TCI states could be applied/used for receiving first PDSCH(s) and the second indicated TCI state/pair of TCI states could be applied/used for receiving first PDSCH(s), and with '11' ('00', '01' or '10') indicating that the first indicated TCI state/pair of TCI states could be applied/used for receiving first PDSCH(s) and the second indicated TCI state/pair of TCI states could be applied/used for receiving first PDSCH(s). The value(s) '00' or '01' or '10' or '11' of the indicator could also be reserved or set to 'reserved'.

Yet for another example, for N=2 or M=2, the first (or second) indicator/parameter could be a 2-bit indicator associate to first PDSCH DM-RS(s) in the first DM-RS CDM group indicated by the antenna ports field in a DCI (e.g., the scheduling DCI or the beam indication DCI with or without DL assignment) with '00' ('01', '10' or '11') indicating that the first indicated TCI state/pair of TCI states could be applied/used for receiving first PDSCH DM-RS(s) in the first DM-RS CDM group indicated by the antenna ports field in a DCI (e.g., the scheduling DCI or the beam indication DCI with or without DL assignment)—or, equivalently, the RS(s) in the RS set(s) provided in the first indicated TCI state/pair of TCI states could be quasi-co-located (QCL'ed) with first DM-RS antenna port(s) in the first DM-RS CDM group indicated by the antenna ports field in the DCI for PDSCH reception(s) with '01' ('00', '10' or '11') indicating that the second indicated TCI state/pair of TCI states could be applied/used for receiving first PDSCH DM-RS(s) in the first DM-RS CDM group indicated by the antenna ports field in a DCI (e.g., the scheduling DCI or the beam indication DCI with or without DL assignment)—or, equivalently, the RS(s) in the RS set(s) provided in the second indicated TCI state/pair of TCI states could be quasi-co-located (QCL'ed) with first DM-RS antenna port(s) in the first DM-RS CDM group indicated by the antenna ports field in the DCI for PDSCH reception(s) with '10' ('00', '01' or '11') indicating that the first indicated TCI state/pair of TCI states could be applied/used for receiving first PDSCH DM-RS(s) in the first DM-RS CDM group indicated by the antenna ports field in a DCI (e.g., the scheduling DCI or the beam indication DCI with or without DL assignment)—or, equivalently, the RS(s) in the RS set(s) provided in the first indicated TCI state/pair of TCI states could be quasi-co-located (QCL'ed) with first DM-RS antenna port(s) in the first DM-RS CDM group indicated by the antenna ports field in the DCI for PDSCH reception(s) and the second indicated TCI state/pair of TCI states could be applied/used for receiving first PDSCH DM-RS(s) in the first DM-RS CDM group indicated by the antenna ports field in the DCI—or, equivalently, the RS(s) in the RS set(s) provided in the second indicated TCI state/pair of TCI states could be quasi-co-located (QCL'ed) with first DM-RS antenna port(s) in the first DM-RS CDM group indicated by the antenna ports field in the DCI for PDSCH reception(s) with '11' ('00', '01' or '10') indicating that the first indicated TCI state/pair of TCI states could be applied/used for receiving first PDSCH DM-RS(s) in the first DM-RS CDM group indicated by the antenna ports field in a DCI (e.g., the scheduling DCI or the beam indication DCI with or without DL assignment)—or, equivalently, the RS(s) in the RS set(s) provided in the first indicated TCI state/pair of TCI states could be quasi-co-located (QCL'ed) with first DM-RS antenna port(s) in the first DM-RS CDM group indicated by the antenna ports field in the DCI for PDSCH reception(s) and the second indicated TCI state/pair of TCI states could be applied/used for receiving first PDSCH DM-RS(s) in the first DM-RS CDM group indicated by the antenna ports field in the DCI—or, equivalently, the RS(s) in the RS set(s) provided in the second indicated TCI state/pair of TCI states could be quasi-co-located (QCL'ed) with first DM-RS antenna port(s) in the first DM-RS CDM group indicated by the antenna ports field in the DCI for PDSCH reception(s). The value(s) '00' or '01' or '10' or '11' of the indicator could also be reserved or set to 'reserved'.

Yet for another example, for N=2 or M=2, the first (or second) indicator/parameter could be a 2-bit indicator and associated to first PDSCH(s) and/or first PDSCH DM-RS(s) or first DM-RS antenna port(s) for PDSCH reception(s) with '00' ('01', '10' or '11') indicating that the first indicated TCI state/pair of TCI states could be applied/used for receiving the first PDSCH(s), with '01' ('00', '10' or '11') indicating that the second indicated TCI state/pair of TCI states could be applied/used for receiving the first PDSCH(s), with '10' ('00', '01' or '11') indicating that the first indicated TCI state/pair of TCI states could be applied/used for receiving the first PDSCH DM-RS(s) (or, equivalently, the RS(s) in the RS set(s) provided in the first indicated TCI state/pair of TCI states could be QCL'ed with the first DM-RS antenna port(s) for PDSCH reception(s)) and the second indicated TCI state/pair of TCI states could be applied/used for receiving the first PDSCH DM-RS(s) (or, equivalently, the RS(s) in the RS set(s) provided in the second indicated TCI state/pair of TCI states could be QCL'ed with the first DM-RS antenna port(s) for PDSCH reception(s)), and with '11' ('00', '01' or '10') indicating that the first indicated TCI state/pair of TCI states could be applied/used for receiving the first PDSCH DM-RS(s) (or, equivalently, the RS(s) in the RS set(s) provided in the first indicated TCI state/pair of TCI states could be QCL'ed with the first DM-RS antenna port(s) for PDSCH reception(s)) and the second indicated TCI state/pair of TCI states could be applied/used for receiving the first PDSCH DM-RS(s) (or, equivalently, the RS(s) in the RS set(s) provided in the second indicated TCI state/pair of TCI states could be QCL'ed with the first DM-RS antenna port(s) for PDSCH reception(s)). The value(s) '00' or '01' or '10' or '11' of the indicator could also be reserved or set to 'reserved'.

Yet for another example, for N=2 or M=2, the first (or second) indicator could be a 2-bit indicator and associated to first PDSCH DM-RS(s) in the first DM-RS CDM group indicated by the antenna ports field in a DCI (e.g., the scheduling DCI or the beam indication DCI with or without DL assignment) and/or first PDSCH DM-RS(s) or first DM-RS antenna port(s) for PDSCH reception(s) with '00' ('01', '10' or '11') indicating that the first indicated TCI state/pair of TCI states could be applied/used for receiving first PDSCH DM-RS(s) in the first DM-RS CDM group indicated by the antenna ports field in a DCI (e.g., the scheduling DCI or the beam indication DCI with or without DL assignment)—or, equivalently, the RS(s) in the RS set(s) provided in the first indicated TCI state/pair of TCI states could be quasi-co-located (QCL'ed) with first DM-RS antenna port(s) in the first DM-RS CDM group indicated by the antenna ports field in the DCI for PDSCH reception(s), with '01' ('00', '10' or '11') indicating that the second indicated TCI state/pair of TCI states could be applied/used for receiving first PDSCH DM-RS(s) in the first DM-RS CDM group indicated by the antenna ports field in a DCI (e.g., the scheduling DCI or the beam indication DCI with or without DL assignment)—or, equivalently, the RS(s) in the RS set(s) provided in the second indicated TCI state/pair of TCI states could be quasi-co-located (QCL'ed) with first DM-RS antenna port(s) in the first DM-RS CDM group indicated by the antenna ports field in the DCI for PDSCH reception(s) with '10' ('00', '01' or '11') indicating that the first indicated TCI state/pair of TCI states could be applied/used for receiving the first PDSCH DM-RS(s) (or, equivalently, the RS(s) in the RS set(s) provided in the first indicated TCI state/pair of TCI states could be QCL'ed with the first DM-RS antenna port(s) for PDSCH reception(s)) and the second indicated TCI state/pair of TCI states could be applied/used for receiving the first PDSCH DM-RS(s) (or, equivalently, the RS(s) in the RS set(s) provided in the second indicated TCI state/pair of TCI states could be QCL'ed with the first DM-RS antenna port(s) for PDSCH reception(s)) and with '11' ('00', '01' or '10') indicating that the first indicated TCI state/pair of TCI states could be applied/used for receiving the first PDSCH DM-RS(s) (or, equivalently, the RS(s) in the RS set(s) provided in the first indicated TCI state/pair of TCI states could be QCL'ed with the first DM-RS antenna port(s) for PDSCH reception(s)) and the second indicated TCI state/pair of TCI states could be applied/used for receiving the first PDSCH DM-RS(s) (or, equivalently, the RS(s) in the RS set(s) provided in the second indicated TCI state/pair of TCI states could be QCL'ed with the first DM-RS antenna port(s) for PDSCH reception(s)). The value(s) '00' or '01' or '10' or '11' of the indicator could also be reserved or set to 'reserved'.

For the one or more examples described herein, the UE 116 may use/apply none of the indicated TCI states/pairs of TCI states for PDSCH reception(s) when/if the indicator/parameter provided in the higher layer parameter, e.g., PDSCH-Config, as specified herein—is set to (i) 'none' or 'disabled' or 'off' or 'not present'/'absent' or 'not configured' and/or (ii) a predetermined value '0', '1', '00', '01', '10' or '11' that is designated for indicating that none of the indicated TCI states/pairs of TCI states could be used/applied for PDSCH reception(s). Alternatively, the UE 116 may use/apply both indicated TCI states/pairs of TCI states for PDSCH reception(s) when/if the indicator/parameter provided in the higher layer parameter, e.g., PDSCH-Config, as specified herein—(i) is set to 'both' or 'none' or 'disabled' or 'off' or (ii) is absent/not present/not configured/not provided. The UE 116 could follow (e.g., according to network's configuration/indication via higher layer RRC signaling/parameter and/or MAC CE command and/or dynamic DCI based L1 signaling) one or more combination(s) of one or more examples described herein to determine the association between one or more of the indicated TCI states/pairs of TCI states and first (or second) PDSCH(s) and/or first (or second) PDSCH DM-RS(s) in the first (or second) DM-RS CDM group indicated by the antenna ports field in a DCI (e.g., the scheduling DCI or the beam indication DCI with or without DL assignment) and/or first (or second) PDSCH DM-RS(s)/first (or second) DM-RS antenna port(s) for PDSCH reception(s). Additionally, the UE 116 could follow (e.g., according to the network 130's configuration/indication via higher layer RRC signaling/parameter and/or MAC CE command and/or dynamic DCI based L1 signaling) one or more combination(s) of one or more examples described herein to determine the association between one or more of the indicated TCI states/pairs of TCI states and first PDSCH(s) and/or first PDSCH DM-RS(s) in the first DM-RS CDM group indicated by the antenna ports field in a DCI (e.g., the scheduling DCI or the beam indication DCI with or without DL assignment) and/or first PDSCH DM-RS(s)/first DM-RS antenna port(s) for PDSCH reception(s). Furthermore, the second (or first) indicator/parameter could be associated to second PDSCH(s) and/or second PDSCH DM-RS(s) in the second DM-RS CDM group indicated by the antenna ports field in a DCI (e.g., the scheduling DCI or the beam indication DCI with or without DL assignment) and/or second PDSCH DM-RS(s)/second DM-RS antenna port(s) for PDSCH reception(s) as specified herein, and so on. The UE 116 could follow (e.g., according to network's configuration/indication via higher layer RRC signaling/parameter and/or MAC CE command and/or dynamic DCI based L1 signaling) one or more combination(s) of one or more examples described herein to determine the association between one or more of the indicated TCI states/pairs of TCI states and second PDSCH(s) and/or second PDSCH DM-RS(s) in the second DM-RS CDM group indicated by the antenna ports field in a DCI (e.g., the scheduling DCI or the beam indication DCI with or without DL assignment) and/or second PDSCH DM-RS(s)/second DM-RS antenna port(s) for PDSCH reception(s). The UE 116 could be provided/configured/indicated by the network 130, e.g., via higher layer RRC signaling/parameter and/or MAC CE command and/or dynamic DCI based L1 signaling, the association/mapping relationship(s) between (i) the first/second indicator/parameter specified herein and (ii) first/second PDSCH(s) and/or first/second PDSCH DM-RS(s) in the first/second DM-RS CDM group indicated by the antenna ports field in a DCI (e.g., the scheduling DCI or the beam indication DCI with or without DL assignment) and/or first/second PDSCH DM-RS(s) and/or first/second DM-RS antenna port(s) for PDSCH reception(s).

In one embodiment, the UE 116 could follow one or more fixed rules to determine which indicated TCI state(s) to use/apply for PDSCH reception(s), wherein the fixed rule(s) could be determined/defined/described as in one or more examples described herein.

For example, for N=2 or M=2, the UE 116 could use/apply the first indicated TCI state/pair of TCI states to receive first (or second) PDSCH(s).

For another example, for N=2 or M=2, the UE 116 could use/apply the second indicated TCI state/pair of TCI states to receive first (or second) PDSCH(s).

Yet for another example, for N=2 or M=2, the UE 116 could use/apply the first indicated TCI state/pair of TCI states to receive first PDSCH(s) and the second indicated TCI state/pair of TCI states to receive second PDSCH(s), e.g., at the same time or simultaneously or in one beam/TCI state indication/update instance or in one slot.

Yet for another example, for N=2 or M=2, the UE 116 could use/apply the first indicated TCI state/pair of TCI states to receive second PDSCH(s) and the second indicated TCI state/pair of TCI states to receive first PDSCH(s), e.g., at the same time or simultaneously or in one beam/TCI state indication/update instance or in one slot.

Yet for another example, for N=2 or M=2, the UE 116 could use/apply the first indicated TCI state/pair of TCI states to receive first (or second) PDSCH DM-RS(s) in the first (or second) DM-RS CDM group indicated by the antenna ports field in a DCI (e.g., the scheduling DCI or the beam indication DCI with or without DL assignment)—or, equivalently, the RS(s) in the RS set(s) provided in the first indicated TCI state/pair of TCI states could be quasi-co-located (QCL'ed) with first (or second) DM-RS antenna port(s) in the first (or second) DM-RS CDM group indicated by the antenna ports field in the DCI for PDSCH reception(s).

Yet for another example, for N=2 or M=2, the UE 116 could use/apply the second indicated TCI state/pair of TCI states to receive second (or first) PDSCH DM-RS(s) in the second (or first) DM-RS CDM group indicated by the antenna ports field in a DCI (e.g., the scheduling DCI or the beam indication DCI with or without DL assignment)—or, equivalently, the RS(s) in the RS set(s) provided in the second indicated TCI state/pair of TCI states could be quasi-co-located (QCL'ed) with second (or first) DM-RS antenna port(s) in the second (or first) DM-RS CDM group indicated by the antenna ports field in the DCI for PDSCH reception(s).

Yet for another example, for N=2 or M=2, the UE 116 could use/apply the first indicated TCI state/pair of TCI states to receive first PDSCH DM-RS(s) in the first DM-RS CDM group indicated by the antenna ports field in a DCI (e.g., the scheduling DCI or the beam indication DCI with or without DL assignment)—or, equivalently, the RS(s) in the RS set(s) provided in the first indicated TCI state/pair of TCI states could be quasi-co-located (QCL'ed) with first DM-RS antenna port(s) in the first DM-RS CDM group indicated by the antenna ports field in the DCI for PDSCH reception(s) and the second indicated TCI state/pair of TCI states to receive second PDSCH DM-RS(s) in the second DM-RS CDM group indicated by the antenna ports field in the DCI—or, equivalently, the RS(s) in the RS set(s) provided in the second indicated TCI state/pair of TCI states could be quasi-co-located (QCL'ed) with second DM-RS antenna port(s) in the second DM-RS CDM group indicated by the antenna ports field in the DCI for PDSCH reception(s), e.g., at the same time or simultaneously or in one beam/TCI state indication/update instance or in one slot.

Yet for another example, for N=2 or M=2, the UE 116 could use/apply the first indicated TCI state/pair of TCI states to receive second PDSCH DM-RS(s) in the second DM-RS CDM group indicated by the antenna ports field in a DCI (e.g., the scheduling DCI or the beam indication DCI with or without DL assignment)—or, equivalently, the RS(s) in the RS set(s) provided in the first indicated TCI state/pair of TCI states could be quasi-co-located (QCL'ed) with second DM-RS antenna port(s) in the second DM-RS CDM group indicated by the antenna ports field in the DCI for PDSCH reception(s) and the second indicated TCI state/pair of TCI states to receive first PDSCH DM-RS(s) in the first DM-RS CDM group indicated by the antenna ports field in the DCI—or, equivalently, the RS(s) in the RS set(s) provided in the second indicated TCI state/pair of TCI states could be quasi-co-located (QCL'ed) with first DM-RS antenna port(s) in the first DM-RS CDM group indicated by the antenna ports field in the DCI for PDSCH reception(s), e.g., at the same time or simultaneously or in one beam/TCI state indication/update instance or in one slot.

Yet for another example, for N=2 or M=2, the UE 116 could use/apply the first indicated TCI state/pair of TCI states to receive first PDSCH DM-RS(s) (or, equivalently, the RS(s) in the RS set(s) provided in the first indicated TCI state/pair of TCI states could be quasi-co-located (QCL'ed) with first DM-RS antenna port(s) for PDSCH reception(s)) and the second indicated TCI state/pair of TCI states to receive second PDSCH DM-RS(s) (or, equivalently, the RS(s) in the RS set(s) provided in the second indicated TCI state/pair of TCI states could be QCL'ed with second DM-RS antenna port(s) for PDSCH reception(s)), e.g., at the same time or simultaneously or in one beam/TCI state indication/update instance or in one slot.

Yet for another example, for N=2 or M=2, the UE 116 could use/apply the first indicated TCI state/pair of TCI states to receive the second PDSCH DM-RS(s) (or, equivalently, the RS(s) in the RS set(s) provided in the first indicated TCI state/pair of TCI states could be QCL'ed with the second DM-RS antenna port(s) for PDSCH reception(s)) and the second indicated TCI state/pair of TCI states to receive the first PDSCH DM-RS(s) (or, equivalently, the RS(s) in the RS set(s) provided in the second indicated TCI state/pair of TCI states could be QCL'ed with the first DM-RS antenna port(s) for PDSCH reception(s)), e.g., at the same time or simultaneously or in one beam/TCI state indication/update instance or in one slot.

Yet for another example, for N=2 or M=2, the UE 116 could use/apply the first indicated TCI state/pair of TCI states to receive first (or second) PDSCH(s), the second indicated TCI state/pair of TCI states to receive second (or first) PDSCH(s), the first indicated TCI state/pair of TCI states to receive first PDSCH(s), and the second indicated TCI state/pair of TCI states to receive second PDSCH(s)—e.g., at the same time or simultaneously or in one beam/TCI state indication or update instance or in one slot.

Yet for another example, for N=2 or M=2, the UE 116 could use/apply the first indicated TCI state/pair of TCI states to receive first (or second) PDSCH(s), the second indicated TCI state/pair of TCI states to receive second (or first) PDSCH(s), the first indicated TCI state/pair of TCI states to receive second PDSCH(s), and the second indicated TCI state/pair of TCI states to receive first PDSCH(s)—e.g., at the same time or simultaneously or in one beam/TCI state indication or update instance or in one slot.

Yet for another example, for N=2 or M=2, the UE 116 could use/apply the first indicated TCI state/pair of TCI states to receive first (or second) PDSCH DM-RS(s) in the first (or second) DM-RS CDM group indicated by the antenna ports field in a DCI (e.g., the scheduling DCI or the beam indication DCI with or without DL assignment)—or, equivalently, the RS(s) in the RS set(s) provided in the first indicated TCI state/pair of TCI states could be quasi-co-located (QCL'ed) with first (or second) DM-RS antenna port(s) in the first (or second) DM-RS CDM group indicated by the antenna ports field in the DCI for PDSCH reception(s), the second indicated TCI state/pair of TCI states to receive second (or first) PDSCH DM-RS(s) in the second (or first) DM-RS CDM group indicated by the antenna ports field in a DCI (e.g., the scheduling DCI or the beam indication DCI with or without DL assignment)—or, equivalently, the RS(s) in the RS set(s) provided in the second indicated TCI state/pair of TCI states could be quasi-co-located (QCL'ed) with second (or first) DM-RS antenna port(s) in the second (or first) DM-RS CDM group indicated by the antenna ports field in the DCI for PDSCH reception(s) and the first indicated TCI state/pair of TCI states to receive first PDSCH DM-RS(s) in the first DM-RS CDM group indicated by the antenna ports field in a DCI (e.g., the scheduling DCI or the beam indication DCI with or without DL assignment)—or, equivalently, the RS(s) in the RS set(s) provided in the first indicated TCI state/pair of TCI states could be quasi-co-located (QCL'ed) with first DM-RS antenna port(s) in the first DM-RS CDM group indicated by the antenna ports field in the DCI for PDSCH reception(s) and the second indicated TCI state/pair of TCI states to receive second PDSCH DM-RS(s) in the second DM-RS CDM group indicated by the antenna ports field in the DCI—or, equivalently, the RS(s) in the RS set(s) provided in the second indicated TCI state/pair of TCI states could be quasi-co-located (QCL'ed) with second DM-RS antenna port(s) in the second DM-RS CDM group indicated by the antenna ports field in the DCI for PDSCH reception(s)—e.g., at the same time or simultaneously or in one beam/TCI state indication or update instance or in one slot.

Yet for another example, the UE 116 could use/apply the first indicated TCI state/pair of TCI states to receive first (or second) PDSCH DM-RS(s) in the first (or second) DM-RS CDM group indicated by the antenna ports field in a DCI (e.g., the scheduling DCI or the beam indication DCI with or without DL assignment)—or, equivalently, the RS(s) in the RS set(s) provided in the first indicated TCI state/pair of TCI states could be quasi-co-located (QCL'ed) with first (or second) DM-RS antenna port(s) in the first (or second) DM-RS CDM group indicated by the antenna ports field in the DCI for PDSCH reception(s), the second indicated TCI state/pair of TCI states to receive second (or first) PDSCH DM-RS(s) in the second (or first) DM-RS CDM group indicated by the antenna ports field in a DCI (e.g., the scheduling DCI or the beam indication DCI with or without DL assignment)—or, equivalently, the RS(s) in the RS set(s) provided in the second indicated TCI state/pair of TCI states could be quasi-co-located (QCL'ed) with second (or first) DM-RS antenna port(s) in the second (or first) DM-RS CDM group indicated by the antenna ports field in the DCI for PDSCH reception(s) and the first indicated TCI state/pair of TCI states to receive second PDSCH DM-RS(s) in the second DM-RS CDM group indicated by the antenna ports field in a DCI (e.g., the scheduling DCI or the beam indication DCI with or without DL assignment)—or, equivalently, the RS(s) in the RS set(s) provided in the first indicated TCI state/pair of TCI states could be quasi-co-located (QCL'ed) with second DM-RS antenna port(s) in the second DM-RS CDM group indicated by the antenna ports field in the DCI for PDSCH reception(s) and the second indicated TCI state/pair of TCI states to receive first PDSCH DM-RS(s) in the first DM-RS CDM group indicated by the antenna ports field in the DCI—or, equivalently, the RS(s) in the RS set(s) provided in the second indicated TCI state/pair of TCI states could be quasi-co-located (QCL'ed) with first DM-RS antenna port(s) in the first DM-RS CDM group indicated by the antenna ports field in the DCI for PDSCH reception(s)—e.g., at the same time or simultaneously or in one beam/TCI state indication or update instance or in one slot.

Yet for another example, for N=2 or M=2, the UE 116 could use/apply the first indicated TCI state/pair of TCI states to receive the first (or second) PDSCH(s), the second indicated TCI state/pair of TCI states to receive the second (or first) PDSCH(s), and the first indicated TCI state/pair of TCI states to receive the first PDSCH DM-RS(s) (or, equivalently, the RS(s) in the RS set(s) provided in the first indicated TCI state/pair of TCI states could be QCL'ed with the first DM-RS antenna port(s) for PDSCH reception(s)) and the second indicated TCI state/pair of TCI states to receive the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s))—e.g., at the same time or simultaneously or in one beam/TCI state indication or update instance or in one slot.

Yet for another example, for N=2 or M=2, the UE 116 could use/apply the first indicated TCI state/pair of TCI states to receive the first (or second) PDSCH(s), the second indicated TCI state/pair of TCI states to receive the second (or first) PDSCH(s), and the first indicated TCI state/pair of TCI states to receive the second PDSCH DM-RS(s) (or, equivalently, the RS(s) in the RS set(s) provided in the first indicated TCI state/pair of TCI states could be QCL'ed with the second DM-RS antenna port(s) for PDSCH reception(s)) and the second indicated TCI state/pair of TCI states to receive the first PDSCH DM-RS(s) (or, equivalently, the RS(s) in the RS set(s) provided in the second indicated TCI state/pair of TCI states could be QCL'ed with the first DM-RS antenna port(s) for PDSCH reception(s))—e.g., at the same time or simultaneously or in one beam/TCI state indication or update instance or in one slot.

Yet for another example, for N=2 or M=2, the UE 116 could use/apply the first indicated TCI state/pair of TCI states to receive first (or second) PDSCH DM-RS(s) in the first (or second) DM-RS CDM group indicated by the antenna ports field in a DCI (e.g., the scheduling DCI or the beam indication DCI with or without DL assignment)—or, equivalently, the RS(s) in the RS set(s) provided in the first indicated TCI state/pair of TCI states could be quasi-co-located (QCL'ed) with first (or second) DM-RS antenna port(s) in the first (or second) DM-RS CDM group indicated by the antenna ports field in the DCI for PDSCH reception(s), the second indicated TCI state/pair of TCI states to receive second (or first) PDSCH DM-RS(s) in the second (or first) DM-RS CDM group indicated by the antenna ports field in a DCI (e.g., the scheduling DCI or the beam indication DCI with or without DL assignment)—or, equivalently, the RS(s) in the RS set(s) provided in the second indicated TCI state/pair of TCI states could be quasi-co-located (QCL'ed) with second (or first) DM-RS antenna port(s) in the second (or first) DM-RS CDM group indicated by the antenna ports field in the DCI for PDSCH reception(s), the first indicated TCI state/pair of TCI states to receive the first PDSCH DM-RS(s) (or, equivalently, the RS(s) in the RS set(s) provided in the first indicated TCI state/pair of TCI states could be QCL'ed with the first DM-RS antenna port(s) for PDSCH reception(s)), and the second indicated TCI state/pair of TCI states to receive the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s))—e.g., at the same time or simultaneously or in one beam/TCI state indication or update instance or in one slot.

Yet for another example, for N=2 or M=2, the UE 116 could use/apply the first indicated TCI state/pair of TCI states to receive first (or second) PDSCH DM-RS(s) in the first (or second) DM-RS CDM group indicated by the antenna ports field in a DCI (e.g., the scheduling DCI or the beam indication DCI with or without DL assignment)—or, equivalently, the RS(s) in the RS set(s) provided in the first indicated TCI state/pair of TCI states could be quasi-co-located (QCL'ed) with first (or second) DM-RS antenna port(s) in the first (or second) DM-RS CDM group indicated by the antenna ports field in the DCI for PDSCH reception(s), the second indicated TCI state/pair of TCI states to receive second (or first) PDSCH DM-RS(s) in the second (or first) DM-RS CDM group indicated by the antenna ports field in a DCI (e.g., the scheduling DCI or the beam indication DCI with or without DL assignment)—or, equivalently, the RS(s) in the RS set(s) provided in the second indicated TCI state/pair of TCI states could be quasi-co-located (QCL'ed) with second (or first) DM-RS antenna port(s) in the second (or first) DM-RS CDM group indicated by the antenna ports field in the DCI for PDSCH reception(s), the first indicated TCI state/pair of TCI states to receive the second PDSCH DM-RS(s) (or, equivalently, the RS(s) in the RS set(s) provided in the first indicated TCI state/pair of TCI states could be QCL'ed with the second DM-RS antenna port(s) for PDSCH reception(s)), and the second indicated TCI state/pair of TCI states to receive the first PDSCH DM-RS(s) (or, equivalently, the RS(s) in the RS set(s) provided in the second indicated TCI state/pair of TCI states could be QCL'ed with the first DM-RS antenna port(s) for PDSCH reception(s))—e.g., at the same time or simultaneously or in one beam/TCI state indication or update instance or in one slot.

Yet for another example, the UE 116 could use/apply the TCI state(s)/pair(s) of TCI states with the respective/corresponding source reference signal(s) indicated/provided therein having the same value(s) as the reference signal(s), e.g., SSB(s)/SSB index(es) or CSI-RS(s)/CSI-RS resource index(es), associated to the last (or the latest in time) PRACH transmission to receive PDSCH(s)—e.g., the first and/or second PDSCHs as specified herein.

In one embodiment, the UE 116 could follow one or more predefined rules to determine which indicated TCI state(s) to use/apply for PDSCH reception(s), wherein the predefined rule(s) could be determined/defined/described as in one or more of the examples herein.

In one example, the UE 116 could first determine a first TCI state/pair of TCI states as the first TCI state/pair of TCI states in/of a TCI codepoint corresponding to the lowest (or highest) TCI codepoint among all first TCI codepoints activated/provided by the MAC CE command for beam indication/activation (e.g., in a slot), e.g., the Unified TCI States Activation/Deactivation MAC CE or Enhanced Unified TCI States Activation/Deactivation MAC CE, and/or a second TCI state/pair of TCI states as the second TCI state/pair of TCI states in/of a TCI codepoint corresponding to the lowest (or highest) TCI codepoint among all the first TCI codepoints activated/provided by the MAC CE command for beam indication/activation (e.g., in a slot), e.g., the Unified TCI States Activation/Deactivation MAC CE or Enhanced Unified TCI States Activation/Deactivation MAC CE, wherein more than one (e.g., 2) joint/DL/UL TCI states or more than one (e.g., 2) pairs of joint/DL/UL TCI states could be mapped to each of the first TCI codepoints described/specified herein, or, equivalently, the first TCI codepoints described/specified herein could contain more than one (e.g., 2) joint/DL/UL TCI states or more than one (e.g., 2) pairs of joint/DL/UL TCI states based on the activated TCI states in a slot. Alternatively, the UE 116 could first determine a first TCI state/pair of TCI states as the first TCI state/pair of TCI states in/of a TCI codepoint corresponding to the lowest (or highest) TCI codepoint among all second TCI codepoints activated/provided by the MAC CE command for beam indication/activation (e.g., in a slot), e.g., the Unified TCI States Activation/Deactivation MAC CE or Enhanced Unified TCI States Activation/Deactivation MAC CE, and/or a second TCI state/pair of TCI states as the second TCI state/pair of TCI states in/of a TCI codepoint corresponding to the lowest (or highest) TCI codepoint among all the second TCI codepoints activated/provided by the MAC CE command for beam indication/activation (e.g., in a slot), e.g., the Unified TCI States Activation/Deactivation MAC CE or Enhanced Unified TCI States Activation/Deactivation MAC CE, wherein a single (i.e., 1) joint/DL/UL TCI state or a single (i.e., 1) pair of joint/DL/UL TCI states could be mapped to each of the second TCI codepoints described/specified herein, or, equivalently, the second TCI codepoints described/specified herein could contain a single (i.e., 1) joint/DL/UL TCI state or a single (i.e., 1) pair of joint/DL/UL TCI states based on the activated TCI states in a slot. For this case, the first TCI state/pair of TCI states could be identical to the second TCI state/pair of TCI states. Optionally, the UE 116 could first determine a first TCI state/pair of TCI states as the first TCI state/pair of TCI states in/of a TCI codepoint corresponding to the lowest (or highest) TCI codepoint among all the TCI codepoints activated/provided by the MAC CE command for beam indication/activation (e.g., in a slot), e.g., the Unified TCI States Activation/Deactivation MAC CE or Enhanced Unified TCI States Activation/Deactivation MAC CE, and/or a second TCI state/pair of TCI states as the second TCI state/pair of TCI states in/of a TCI codepoint corresponding to the lowest (or highest) TCI codepoint among all the TCI codepoints activated/provided by the MAC CE command for beam indication/activation (e.g., in a slot), e.g., the Unified TCI States Activation/Deactivation MAC CE or Enhanced Unified TCI States Activation/Deactivation MAC CE, wherein all the TCI codepoints activated/provided by the MAC CE command for beam indication/activation could comprise/include/contain/provide one or more first TCI codepoints and/or one or more second TCI codepoints described/specified herein.

For example, for N=2 or M=2, the UE 116 could use/apply the first TCI state/pair of TCI states as described herein to receive first (or second) PDSCH(s).

For another example, for N=2 or M=2, the UE 116 could use/apply the second TCI state/pair of TCI states as described herein to receive first (or second) PDSCH(s).

Yet for another example, for N=2 or M=2, the UE 116 could use/apply the first TCI state/pair of TCI states as described herein to receive first PDSCH(s) and the second TCI state/pair of TCI states as described herein to receive second PDSCH(s), e.g., at the same time or simultaneously or in one beam/TCI state indication/update instance or in one slot.

Yet for another example, for N=2 or M=2, the UE 116 could use/apply the first TCI state/pair of TCI states as described herein to receive second PDSCH(s) and the second TCI state/pair of TCI states as described herein to receive first PDSCH(s), e.g., at the same time or simultaneously or in one beam/TCI state indication/update instance or in one slot.

Yet for another example, for N=2 or M=2, the UE 116 could use/apply the first TCI state/pair of TCI states as described herein to receive first (or second) PDSCH DM-RS(s) in the first (or second) DM-RS CDM group indicated by the antenna ports field in a DCI (e.g., the scheduling DCI or the beam indication DCI with or without DL assignment)—or, equivalently, the RS(s) in the RS set(s) provided in the first TCI state/pair of TCI states as described herein could be quasi-co-located (QCL'ed) with first (or second) DM-RS antenna port(s) in the first (or second) DM-RS CDM group indicated by the antenna ports field in the DCI for PDSCH reception(s).

Yet for another example, for N=2 or M=2, the UE 116 could use/apply the second TCI state/pair of TCI states as described herein to receive second (or first) PDSCH DM-RS(s) in the second (or first) DM-RS CDM group indicated by the antenna ports field in a DCI (e.g., the scheduling DCI or the beam indication DCI with or without DL assignment)—or, equivalently, the RS(s) in the RS set(s) provided in the second TCI state/pair of TCI states as described herein could be quasi-co-located (QCL'ed) with second (or first) DM-RS antenna port(s) in the second (or first) DM-RS CDM group indicated by the antenna ports field in the DCI for PDSCH reception(s).

Yet for another example, for N=2 or M=2, the UE 116 could use/apply the first TCI state/pair of TCI states as described herein to receive first PDSCH DM-RS(s) in the first DM-RS CDM group indicated by the antenna ports field in a DCI (e.g., the scheduling DCI or the beam indication DCI with or without DL assignment)—or, equivalently, the RS(s) in the RS set(s) provided in the first TCI state/pair of TCI states as described herein could be quasi-co-located (QCL'ed) with first DM-RS antenna port(s) in the first DM-RS CDM group indicated by the antenna ports field in the DCI for PDSCH reception(s) and the second TCI state/pair of TCI states as described herein to receive second PDSCH DM-RS(s) in the second DM-RS CDM group indicated by the antenna ports field in the DCI—or, equivalently, the RS(s) in the RS set(s) provided in the second TCI state/pair of TCI states could be quasi-co-located (QCL'ed) with second DM-RS antenna port(s) in the second DM-RS CDM group indicated by the antenna ports field in the DCI for PDSCH reception(s), e.g., at the same time or simultaneously or in one beam/TCI state indication/update instance or in one slot.

Yet for another example, for N=2 or M=2, the UE 116 could use/apply the first TCI state/pair of TCI states as described herein to receive second PDSCH DM-RS(s) in the second DM-RS CDM group indicated by the antenna ports field in a DCI (e.g., the scheduling DCI or the beam indication DCI with or without DL assignment)—or, equivalently, the RS(s) in the RS set(s) provided in the first TCI state/pair of TCI states as described herein could be quasi-co-located (QCL'ed) with second DM-RS antenna port(s) in the second DM-RS CDM group indicated by the antenna ports field in the DCI for PDSCH reception(s) and the second TCI state/pair of TCI states as described herein to receive first PDSCH DM-RS(s) in the first DM-RS CDM group indicated by the antenna ports field in the DCI—or, equivalently, the RS(s) in the RS set(s) provided in the second TCI state/pair of TCI states as described herein could be quasi-co-located (QCL'ed) with first DM-RS antenna port(s) in the first DM-RS CDM group indicated by the antenna ports field in the DCI for PDSCH reception(s), e.g., at the same time or simultaneously or in one beam/TCI state indication/update instance or in one slot.

Yet for another example, for N=2 or M=2, the UE 116 could use/apply the first TCI state/pair of TCI states as described herein to receive first PDSCH DM-RS(s) (or, equivalently, the RS(s) in the RS set(s) provided in the first TCI state/pair of TCI states as described herein could be quasi-co-located (QCL'ed) with first DM-RS antenna port(s) for PDSCH reception(s)) and the second TCI state/pair of TCI states as described herein to receive second PDSCH DM-RS(s) (or, equivalently, the RS(s) in the RS set(s) provided in the second TCI state/pair of TCI states as described herein could be QCL'ed with second DM-RS antenna port(s) for PDSCH reception(s)), e.g., at the same time or simultaneously or in one beam/TCI state indication/update instance or in one slot.

Yet for another example, for N=2 or M=2, the UE 116 could use/apply the first TCI state/pair of TCI states as described herein to receive the second PDSCH DM-RS(s) (or, equivalently, the RS(s) in the RS set(s) provided in the first TCI state/pair of TCI states as described herein could be QCL'ed with the second DM-RS antenna port(s) for PDSCH reception(s)) and the second TCI state/pair of TCI states as described herein to receive the first PDSCH DM-RS(s) (or, equivalently, the RS(s) in the RS set(s) provided in the second TCI state/pair of TCI states as described herein could be QCL'ed with the first DM-RS antenna port(s) for PDSCH reception(s)), e.g., at the same time or simultaneously or in one beam/TCI state indication/update instance or in one slot.

Yet for another example, for N=2 or M=2, the UE 116 could use/apply the first TCI state/pair of TCI states as described herein to receive first (or second) PDSCH(s), the second TCI state/pair of TCI states as described herein to receive second (or first) PDSCH(s), the first TCI state/pair of TCI states as described herein to receive first PDSCH(s), and the second TCI state/pair of TCI states as described herein to receive second PDSCH(s)—e.g., at the same time or simultaneously or in one beam/TCI state indication or update instance or in one slot.

Yet for another example, for N=2 or M=2, the UE 116 could use/apply the first TCI state/pair of TCI states as described herein to receive first (or second) PDSCH(s), the second TCI state/pair of TCI states as described herein to receive second (or first) PDSCH(s), the first TCI state/pair of TCI states as described herein to receive second PDSCH(s), and the second TCI state/pair of TCI states as described herein to receive first PDSCH(s)—e.g., at the same time or simultaneously or in one beam/TCI state indication or update instance or in one slot.

Yet for another example, for N=2 or M=2, the UE 116 could use/apply the first TCI state/pair of TCI states as described herein to receive first (or second) PDSCH DM-RS(s) in the first (or second) DM-RS CDM group indicated by the antenna ports field in a DCI (e.g., the scheduling DCI or the beam indication DCI with or without DL assignment)—or, equivalently, the RS(s) in the RS set(s) provided in the first TCI state/pair of TCI states as described herein could be quasi-co-located (QCL'ed) with first (or second) DM-RS antenna port(s) in the first (or second) DM-RS CDM group indicated by the antenna ports field in the DCI for PDSCH reception(s), the second TCI state/pair of TCI states as described herein to receive second (or first) PDSCH DM-RS(s) in the second (or first) DM-RS CDM group indicated by the antenna ports field in a DCI (e.g., the scheduling DCI or the beam indication DCI with or without DL assignment)—or, equivalently, the RS(s) in the RS set(s) provided in the second TCI state/pair of TCI states as described herein could be quasi-co-located (QCL'ed) with second (or first) DM-RS antenna port(s) in the second (or first) DM-RS CDM group indicated by the antenna ports field in the DCI for PDSCH reception(s) and the first TCI state/pair of TCI states as described herein to receive first PDSCH DM-RS(s) in the first DM-RS CDM group indicated by the antenna ports field in a DCI (e.g., the scheduling DCI or the beam indication DCI with or without DL assignment)—or, equivalently, the RS(s) in the RS set(s) provided in the first TCI state/pair of TCI states as described herein could be quasi-co-located (QCL'ed) with first DM-RS antenna port(s) in the first DM-RS CDM group indicated by the antenna ports field in the DCI for PDSCH reception(s) and the second TCI state/pair of TCI states as described herein to receive second PDSCH DM-RS(s) in the second DM-RS CDM group indicated by the antenna ports field in the DCI—or, equivalently, the RS(s) in the RS set(s) provided in the second TCI state/pair of TCI states as described herein could be quasi-co-located (QCL'ed) with second DM-RS antenna port(s) in the second DM-RS CDM group indicated by the antenna ports field in the DCI for PDSCH reception(s)—e.g., at the same time or simultaneously or in one beam/TCI state indication or update instance or in one slot.

Yet for another example, the UE 116 could use/apply the first TCI state/pair of TCI states as described herein to receive first (or second) PDSCH DM-RS(s) in the first (or second) DM-RS CDM group indicated by the antenna ports field in a DCI (e.g., the scheduling DCI or the beam indication DCI with or without DL assignment)—or, equivalently, the RS(s) in the RS set(s) provided in the first TCI state/pair of TCI states as described herein could be quasi-co-located (QCL'ed) with first (or second) DM-RS antenna port(s) in the first (or second) DM-RS CDM group indicated by the antenna ports field in the DCI for PDSCH reception(s) and the second TCI state/pair of TCI states as described herein to receive second (or first) PDSCH DM-RS(s) in the second (or first) DM-RS CDM group indicated by the antenna ports field in a DCI (e.g., the scheduling DCI or the beam indication DCI with or without DL assignment)—or, equivalently, the RS(s) in the RS set(s) provided in the second TCI state/pair of TCI states as described herein could be quasi-co-located (QCL'ed) with second (or first) DM-RS antenna port(s) in the second (or first) DM-RS CDM group indicated by the antenna ports field in the DCI for PDSCH reception(s) and the first TCI state/pair of TCI states as described herein to receive second PDSCH DM-RS(s) in the second DM-RS CDM group indicated by the antenna ports field in a DCI (e.g., the scheduling DCI or the beam indication DCI with or without DL assignment)—or, equivalently, the RS(s) in the RS set(s) provided in the first TCI state/pair of TCI states as described herein could be quasi-co-located (QCL'ed) with second DM-RS antenna port(s) in the second DM-RS CDM group indicated by the antenna ports field in the DCI for PDSCH reception(s) and the second TCI state/pair of TCI states as described herein to receive first PDSCH DM-RS(s) in the first DM-RS CDM group indicated by the antenna ports field in the DCI—or, equivalently, the RS(s) in the RS set(s) provided in the second TCI state/pair of TCI states as described herein could be quasi-co-located (QCL'ed) with first DM-RS antenna port(s) in the first DM-RS CDM group indicated by the antenna ports field in the DCI for PDSCH reception(s)—e.g., at the same time or simultaneously or in one beam/TCI state indication or update instance or in one slot.

Yet for another example, for N=2 or M=2, the UE 116 could use/apply the first TCI state/pair of TCI states as described herein to receive the first (or second) PDSCH(s), the second TCI state/pair of TCI states as described herein to receive the second (or first) PDSCH(s), the first TCI state/pair of TCI states as described herein to receive the first PDSCH DM-RS(s) (or, equivalently, the RS(s) in the RS set(s) provided in the first TCI state/pair of TCI states as described herein could be QCL'ed with the first DM-RS antenna port(s) for PDSCH reception(s)), and the second TCI state/pair of TCI states as described herein to receive the second PDSCH DM-RS(s) (or, equivalently, the RS(s) in the RS set(s) provided in the second TCI state/pair of TCI states as described herein could be QCL'ed with the second DM-RS antenna port(s) for PDSCH reception(s))—e.g., at the same time or simultaneously or in one beam/TCI state indication or update instance or in one slot.

Yet for another example, for N=2 or M=2, the UE 116 could use/apply the first TCI state/pair of TCI states as described herein to receive the first (or second) PDSCH(s), the second TCI state/pair of TCI states as described herein to receive the second (or first) PDSCH(s), the first TCI state/pair of TCI states as described herein to receive the second PDSCH DM-RS(s) (or, equivalently, the RS(s) in the RS set(s) provided in the first TCI state/pair of TCI states as described herein could be QCL'ed with the second DM-RS antenna port(s) for PDSCH reception(s)), and the second TCI state/pair of TCI states as described herein to receive the first PDSCH DM-RS(s) (or, equivalently, the RS(s) in the RS set(s) provided in the second TCI state/pair of TCI states as described herein could be QCL'ed with the first DM-RS antenna port(s) for PDSCH reception(s))—e.g., at the same time or simultaneously or in one beam/TCI state indication or update instance or in one slot.

Yet for another example, for N=2 or M=2, the UE 116 could use/apply the first TCI state/pair of TCI states as described herein to receive first (or second) PDSCH DM-RS(s) in the first (or second) DM-RS CDM group indicated by the antenna ports field in a DCI (e.g., the scheduling DCI or the beam indication DCI with or without DL assignment)—or, equivalently, the RS(s) in the RS set(s) provided in the first TCI state/pair of TCI states as described herein could be quasi-co-located (QCL'ed) with first (or second) DM-RS antenna port(s) in the first (or second) DM-RS CDM group indicated by the antenna ports field in the DCI for PDSCH reception(s), the second TCI state/pair of TCI states as described herein to receive second (or first) PDSCH DM-RS(s) in the second (or first) DM-RS CDM group indicated by the antenna ports field in a DCI (e.g., the scheduling DCI or the beam indication DCI with or without DL assignment)—or, equivalently, the RS(s) in the RS set(s) provided in the second TCI state/pair of TCI states as described herein could be quasi-co-located (QCL'ed) with second (or first) DM-RS antenna port(s) in the second (or first) DM-RS CDM group indicated by the antenna ports field in the DCI for PDSCH reception(s), the first TCI state/pair of TCI states as described herein to receive the first PDSCH DM-RS(s) (or, equivalently, the RS(s) in the RS set(s) provided in the first TCI state/pair of TCI states as described herein could be QCL'ed with the first DM-RS antenna port(s) for PDSCH reception(s)), and the second TCI state/pair of TCI states as described herein to receive the second PDSCH DM-RS(s) (or, equivalently, the RS(s) in the RS set(s) provided in the second TCI state/pair of TCI states as described herein could be QCL'ed with the second DM-RS antenna port(s) for PDSCH reception(s))—e.g., at the same time or simultaneously or in one beam/TCI state indication or update instance or in one slot.

Yet for another example, for N=2 or M=2, the UE 116 could use/apply the first TCI state/pair of TCI states as described herein to receive first (or second) PDSCH DM-RS(s) in the first (or second) DM-RS CDM group indicated by the antenna ports field in a DCI (e.g., the scheduling DCI or the beam indication DCI with or without DL assignment)—or, equivalently, the RS(s) in the RS set(s) provided in the first TCI state/pair of TCI states as described herein could be quasi-co-located (QCL'ed) with first (or second) DM-RS antenna port(s) in the first (or second) DM-RS CDM group indicated by the antenna ports field in the DCI for PDSCH reception(s) and the second TCI state/pair of TCI states as described herein to receive second (or first) PDSCH DM-RS(s) in the second (or first) DM-RS CDM group indicated by the antenna ports field in a DCI (e.g., the scheduling DCI or the beam indication DCI with or without DL assignment)—or, equivalently, the RS(s) in the RS set(s) provided in the second TCI state/pair of TCI states as described herein could be quasi-co-located (QCL'ed) with second (or first) DM-RS antenna port(s) in the second (or first) DM-RS CDM group indicated by the antenna ports field in the DCI for PDSCH reception(s), the first TCI state/pair of TCI states as described herein to receive the second PDSCH DM-RS(s) (or, equivalently, the RS(s) in the RS set(s) provided in the first TCI state/pair of TCI states as described herein could be QCL'ed with the second DM-RS antenna port(s) for PDSCH reception(s)), and the second TCI state/pair of TCI states as described herein to receive the first PDSCH DM-RS(s) (or, equivalently, the RS(s) in the RS set(s) provided in the second TCI state/pair of TCI states as described herein could be QCL'ed with the first DM-RS antenna port(s) for PDSCH reception(s))—e.g., at the same time or simultaneously or in one beam/TCI state indication or update instance or in one slot.

In another example, the UE 116 could use/apply the same TCI state(s)/pair(s) of TCI states used/applied for receiving the scheduling PDCCH(s)/DCI(s)—e.g., following one or more examples described herein—to receive PDSCH(s) scheduled by the scheduling PDCCH(s)/DCI(s).

For example, for N=2 or M=2, the UE 116 could use/apply the first indicated TCI state/pair of TCI states to receive first (or second) PDSCH(s) when/if the UE 116 uses/applies the first indicated TCI state/pair of TCI states to receive (scheduling) PDCCH(s)/DCI(s)—following one or more examples described herein—that schedules the first (or second) PDSCH(s).

For another example, for N=2 or M=2, the UE 116 could use/apply the second indicated TCI state/pair of TCI states to receive first (or second) PDSCH(s) when/if the UE 116 uses/applies the second indicated TCI state/pair of TCI states to receive (scheduling) PDCCH(s)/DCI(s)—following one or more examples described herein—that schedules the first (or second) PDSCH(s).

Yet for another example, for N=2 or M=2, the UE 116 could use/apply the first indicated TCI state/pair of TCI states to receive first PDSCH(s) and the second indicated TCI state/pair of TCI states to receive second PDSCH(s), e.g., at the same time or simultaneously or in one beam/TCI state indication/update instance or in one slot, when/if the UE 116 uses/applies the first indicated TCI state/pair of TCI states and the second indicated TCI state/pair of TCI states to receive (scheduling) PDCCH(s)/DCI(s)—following one or more examples described herein—that (respectively) schedules the first and/or second PDSCH(s) at the same time, simultaneously, in one beam/TCI state indication/update instance, or in one slot.

Yet for another example, for N=2 or M=2, the UE 116 could use/apply the first indicated TCI state/pair of TCI states to receive second PDSCH(s) and the second indicated TCI state/pair of TCI states to receive first PDSCH(s), e.g., at the same time or simultaneously or in one beam/TCI state indication/update instance or in one slot, when/if the UE 116 uses/applies the first indicated TCI state/pair of TCI states and the second indicated TCI state/pair of TCI states to receive (scheduling) PDCCH(s)/DCI(s)—following one or more examples described herein—that (respectively) schedules the second and/or first PDSCH(s), e.g., at the same time, simultaneously, in one beam/TCI state indication/update instance, or in one slot.

Yet for another example, for N=2 or M=2, the UE 116 could use/apply the first indicated TCI state/pair of TCI states to receive first (or second) PDSCH DM-RS(s) in the first (or second) DM-RS CDM group indicated by the antenna ports field in a DCI (e.g., the scheduling DCI or the beam indication DCI with or without DL assignment)—or, equivalently, the RS(s) in the RS set(s) provided in the first indicated TCI state/pair of TCI states could be quasi-co-located (QCL'ed) with first (or second) DM-RS antenna port(s) in the first (or second) DM-RS CDM group indicated by the antenna ports field in the DCI for PDSCH reception(s) when/if the UE 116 uses/applies the first indicated TCI state/pair of TCI states to receive (scheduling) PDCCH(s)/DCI(s)—following one or more examples described herein—that schedules the PDSCH(s) with the first (or second) DM-RS antenna port(s) in the first (or second) DM-RS CDM group indicated by the antenna ports field in the DCI.

Yet for another example, for N=2 or M=2, the UE 116 could use/apply the second indicated TCI state/pair of TCI states to receive second (or first) PDSCH DM-RS(s) in the second (or first) DM-RS CDM group indicated by the antenna ports field in a DCI (e.g., the scheduling DCI or the beam indication DCI with or without DL assignment)—or, equivalently, the RS(s) in the RS set(s) provided in the second indicated TCI state/pair of TCI states could be quasi-co-located (QCL'ed) with second (or first) DM-RS antenna port(s) in the second (or first) DM-RS CDM group indicated by the antenna ports field in the DCI for PDSCH reception(s) when/if the UE 116 uses/applies the second indicated TCI state/pair of TCI states to receive (scheduling) PDCCH(s)/DCI(s)—following one or more examples described herein—that schedules the PDSCH(s) with the second (or first) DM-RS antenna port(s) in the second (or first) DM-RS CDM group indicated by the antenna ports field in the DCI.

Yet for another example, for N=2 or M=2, the UE 116 could use/apply the first indicated TCI state/pair of TCI states to receive first PDSCH DM-RS(s) in the first DM-RS CDM group indicated by the antenna ports field in a DCI (e.g., the scheduling DCI or the beam indication DCI with or without DL assignment)—or, equivalently, the RS(s) in the RS set(s) provided in the first indicated TCI state/pair of TCI states could be quasi-co-located (QCL'ed) with first DM-RS antenna port(s) in the first DM-RS CDM group indicated by the antenna ports field in the DCI for PDSCH reception(s) and the second indicated TCI state/pair of TCI states to receive second PDSCH DM-RS(s) in the second DM-RS CDM group indicated by the antenna ports field in the DCI—or, equivalently, the RS(s) in the RS set(s) provided in the second indicated TCI state/pair of TCI states could be quasi-co-located (QCL'ed) with second DM-RS antenna port(s) in the second DM-RS CDM group indicated by the antenna ports field in the DCI for PDSCH reception(s), e.g., at the same time or simultaneously or in one beam/TCI state indication/update instance or in one slot, when/if the UE 116 uses/applies the first indicated TCI state/pair of TCI states and the second indicated TCI state/pair of TCI states to receive (scheduling) PDCCH(s)/DCI(s)—following one or more examples described herein—that (respectively) schedules the PDSCH(s) with the first and/or second DM-RS antenna ports in the first and/or second DM-RS CDM groups indicated by the antenna ports field in the DCI, e.g., at the same time, simultaneously, in one beam/TCI state indication/update instance, or in one slot.

Yet for another example, for N=2 or M=2, the UE 116 could use/apply the first indicated TCI state/pair of TCI states to receive second PDSCH DM-RS(s) in the second DM-RS CDM group indicated by the antenna ports field in a DCI (e.g., the scheduling DCI or the beam indication DCI with or without DL assignment)—or, equivalently, the RS(s) in the RS set(s) provided in the first indicated TCI state/pair of TCI states could be quasi-co-located (QCL'ed) with second DM-RS antenna port(s) in the second DM-RS CDM group indicated by the antenna ports field in the DCI for PDSCH reception(s) and the second indicated TCI state/pair of TCI states to receive first PDSCH DM-RS(s) in the first DM-RS CDM group indicated by the antenna ports field in the DCI—or, equivalently, the RS(s) in the RS set(s) provided in the second indicated TCI state/pair of TCI states could be quasi-co-located (QCL'ed) with first DM-RS antenna port(s) in the first DM-RS CDM group indicated by the antenna ports field in the DCI for PDSCH reception(s), e.g., at the same time, simultaneously, in one beam/TCI state indication/update instance, or in one slot, when/if the UE 116 uses/applies the first indicated TCI state/pair of TCI states and the second indicated TCI state/pair of TCI states to receive (scheduling) PDCCH(s)/DCI(s)—following one or more examples described herein—that (respectively) schedules the PDSCH(s) with the second and/or first DM-RS antenna ports in the second and/or first DM-RS CDM groups indicated by the antenna ports field in the DCI, e.g., at the same time or simultaneously or in one beam/TCI state indication/update instance or in one slot.

Yet for another example, for N=2 or M=2, the UE 116 could use/apply the first indicated TCI state/pair of TCI states to receive first PDSCH DM-RS(s) (or, equivalently, the RS(s) in the RS set(s) provided in the first indicated TCI state/pair of TCI states could be quasi-co-located (QCL'ed) with first DM-RS antenna port(s) for PDSCH reception(s)) and the second indicated TCI state/pair of TCI states to receive second PDSCH DM-RS(s) (or, equivalently, the RS(s) in the RS set(s) provided in the second indicated TCI state/pair of TCI states could be QCL'ed with second DM-RS antenna port(s) for PDSCH reception(s)), e.g., at the same time, simultaneously, in one beam/TCI state indication/update instance, or in one slot, when/if the UE 116 uses/applies the first indicated TCI state/pair of TCI states and the second indicated TCI state/pair of TCI states to receive (scheduling) PDCCH(s)/DCI(s)—following one or more examples described herein—that (respectively) schedules the PDSCH(s) with the first and/or second DM-RS antenna ports, e.g., at the same time or simultaneously or in one beam/TCI state indication/update instance or in one slot.

Yet for another example, for N=2 or M=2, the UE 116 could use/apply the first indicated TCI state/pair of TCI states to receive the second PDSCH DM-RS(s) (or, equivalently, the RS(s) in the RS set(s) provided in the first indicated TCI state/pair of TCI states could be QCL'ed with the second DM-RS antenna port(s) for PDSCH reception(s)) and the second indicated TCI state/pair of TCI states to receive the first PDSCH DM-RS(s) (or, equivalently, the RS(s) in the RS set(s) provided in the second indicated TCI state/pair of TCI states could be QCL'ed with the first DM-RS antenna port(s) for PDSCH reception(s)), e.g., at the same time, simultaneously, in one beam/TCI state indication/update instance, or in one slot, when/if the UE 116 uses/applies the first indicated TCI state/pair of TCI states and the second indicated TCI state/pair of TCI states to receive (scheduling) PDCCH(s)/DCI(s)—following one or more examples described herein—that (respectively) schedules the PDSCH(s) with the second and/or first DM-RS antenna ports, e.g., at the same time or simultaneously or in one beam/TCI state indication/update instance or in one slot.

Yet for another example, for N=2 or M=2, the UE 116 could use/apply the first indicated TCI state/pair of TCI states to receive first (or second) PDSCH(s) when/if the UE 116 uses/applies the first indicated TCI state/pair of TCI states to receive (scheduling) PDCCH(s)/DCI(s)—following one or more examples described herein—that schedules the first (or second) PDSCH(s), the second indicated TCI state/pair of TCI states to receive second (or first) PDSCH(s) when/if the UE 116 uses/applies the second indicated TCI state/pair of TCI states to receive (scheduling) PDCCH(s)/DCI(s)—following one or more examples described herein—that schedules the second (or first) PDSCH(s), and the first indicated TCI state/pair of TCI states to receive first PDSCH(s) and the second indicated TCI state/pair of TCI states to receive second PDSCH(s)—e.g., at the same time, simultaneously, in one beam/TCI state indication, update instance, or in one slot, when/if the UE 116 uses/applies the first indicated TCI state/pair of TCI states and the second indicated TCI state/pair of TCI states to receive (scheduling) PDCCH(s)/DCI(s)—following one or more examples described herein—that (respectively) schedules the first and/or second PDSCH(s), e.g., at the same time or simultaneously or in one beam/TCI state indication/update instance or in one slot.

Yet for another example, for N=2 or M=2, the UE 116 could use/apply the first indicated TCI state/pair of TCI states to receive first (or second) PDSCH(s) when/if the UE 116 uses/applies the first indicated TCI state/pair of TCI states to receive (scheduling) PDCCH(s)/DCI(s)—following one or more examples described herein—that schedules the first (or second) PDSCH(s), the second indicated TCI state/pair of TCI states to receive second (or first) PDSCH(s) when/if the UE 116 uses/applies the second indicated TCI state/pair of TCI states to receive (scheduling) PDCCH(s)/DCI(s)—following one or more examples described herein—that schedules the second (or first) PDSCH(s), and the first indicated TCI state/pair of TCI states to receive second PDSCH(s) and the second indicated TCI state/pair of TCI states to receive first PDSCH(s)—e.g., at the same time, simultaneously, in one beam/TCI state indication, update instance or in one slot, when/if the UE 116 uses/applies the first indicated TCI state/pair of TCI states and the second indicated TCI state/pair of TCI states to receive (scheduling) PDCCH(s)/DCI(s)—one or more examples described herein—that (respectively) schedules the second and/or first PDSCH(s), e.g., at the same time, simultaneously, in one beam/TCI state indication/update instance, or in one slot.

Yet for another example, for N=2 or M=2, the UE 116 could use/apply the first indicated TCI state/pair of TCI states to receive first (or second) PDSCH DM-RS(s) in the first (or second) DM-RS CDM group indicated by the antenna ports field in a DCI (e.g., the scheduling DCI or the beam indication DCI with or without DL assignment)—or, equivalently, the RS(s) in the RS set(s) provided in the first indicated TCI state/pair of TCI states could be quasi-co-located (QCL'ed) with first (or second) DM-RS antenna port(s) in the first (or second) DM-RS CDM group indicated by the antenna ports field in the DCI for PDSCH reception(s) when/if the UE 116 uses/applies the first indicated TCI state/pair of TCI states to receive (scheduling) PDCCH(s)/DCI(s)—following one or more examples described herein—that schedules the PDSCH(s) with the first (or second) DM-RS antenna ports in the first (or second) DM-RS CDM groups indicated by the antenna ports field in the DCI and the second indicated TCI state/pair of TCI states to receive second (or first) PDSCH DM-RS(s) in the second (or first) DM-RS CDM group indicated by the antenna ports field in a DCI (e.g., the scheduling DCI or the beam indication DCI with or without DL assignment)—or, equivalently, the RS(s) in the RS set(s) provided in the second indicated TCI state/pair of TCI states could be quasi-co-located (QCL'ed) with second (or first) DM-RS antenna port(s) in the second (or first) DM-RS CDM group indicated by the antenna ports field in the DCI for PDSCH reception(s) when/if the UE 116 uses/applies the second indicated TCI state/pair of TCI states to receive (scheduling) PDCCH(s)/DCI(s)—following one or more examples described herein—that schedules the PDSCH(s) with the second (or first) DM-RS antenna ports in the second (or first) DM-RS CDM groups indicated by the antenna ports field in the DCI and the first indicated TCI state/pair of TCI states to receive first PDSCH DM-RS(s) in the first DM-RS CDM group indicated by the antenna ports field in a DCI (e.g., the scheduling DCI or the beam indication DCI with or without DL assignment)—or, equivalently, the RS(s) in the RS set(s) provided in the first indicated TCI state/pair of TCI states could be quasi-co-located (QCL'ed) with first DM-RS antenna port(s) in the first DM-RS CDM group indicated by the antenna ports field in the DCI for PDSCH reception(s) and the second indicated TCI state/pair of TCI states to receive second PDSCH DM-RS(s) in the second DM-RS CDM group indicated by the antenna ports field in the DCI—or, equivalently, the RS(s) in the RS set(s) provided in the second indicated TCI state/pair of TCI states could be quasi-co-located (QCL'ed) with second DM-RS antenna port(s) in the second DM-RS CDM group indicated by the antenna ports field in the DCI for PDSCH reception(s)—e.g., at the same time or simultaneously or in one beam/TCI state indication or update instance or in one slot, when/if the UE 116 uses/applies the first indicated TCI state/pair of TCI states and the second indicated TCI state/pair of TCI states to receive (scheduling) PDCCH(s)/DCI(s)—following one or more examples described herein—that (respectively) schedules the PDSCH(s) with the first and/or second DM-RS antenna ports in the first and/or second DM-RS CDM groups indicated by the antenna ports field in the DCI, e.g., at the same time, simultaneously, in one beam/TCI state indication/update instance, or in one slot.

Yet for another example, for N=2 or M=2, the UE 116 could use/apply the first indicated TCI state/pair of TCI states to receive first (or second) PDSCH DM-RS(s) in the first (or second) DM-RS CDM group indicated by the antenna ports field in a DCI (e.g., the scheduling DCI or the beam indication DCI with or without DL assignment)—or, equivalently, the RS(s) in the RS set(s) provided in the first indicated TCI state/pair of TCI states could be quasi-co-located (QCL'ed) with first (or second) DM-RS antenna port(s) in the first (or second) DM-RS CDM group indicated by the antenna ports field in the DCI for PDSCH reception(s) when/if the UE 116 uses/applies the first indicated TCI state/pair of TCI states to receive (scheduling) PDCCH(s)/DCI(s)—following one or more examples described herein—that schedules the PDSCH(s) with the first (or second) DM-RS antenna ports in the first (or second) DM-RS CDM groups indicated by the antenna ports field in the DCI, the second indicated TCI state/pair of TCI states to receive second (or first) PDSCH DM-RS(s) in the second (or first) DM-RS CDM group indicated by the antenna ports field in a DCI (e.g., the scheduling DCI or the beam indication DCI with or without DL assignment)—or, equivalently, the RS(s) in the RS set(s) provided in the second indicated TCI state/pair of TCI states could be quasi-co-located (QCL'ed) with second (or first) DM-RS antenna port(s) in the second (or first) DM-RS CDM group indicated by the antenna ports field in the DCI for PDSCH reception(s) when/if the UE 116 uses/applies the second indicated TCI state/pair of TCI states to receive (scheduling) PDCCH(s)/DCI(s)—following one or more examples described herein—that schedules the PDSCH(s) with the second (or first) DM-RS antenna ports in the second (or first) DM-RS CDM groups indicated by the antenna ports field in the DCI and the first indicated TCI state/pair of TCI states to receive second PDSCH DM-RS(s) in the second DM-RS CDM group indicated by the antenna ports field in a DCI (e.g., the scheduling DCI or the beam indication DCI with or without DL assignment)—or, equivalently, the RS(s) in the RS set(s) provided in the first indicated TCI state/pair of TCI states could be quasi-co-located (QCL'ed) with second DM-RS antenna port(s) in the second DM-RS CDM group indicated by the antenna ports field in the DCI for PDSCH reception(s) and the second indicated TCI state/pair of TCI states to receive first PDSCH DM-RS(s) in the first DM-RS CDM group indicated by the antenna ports field in the DCI—or, equivalently, the RS(s) in the RS set(s) provided in the second indicated TCI state/pair of TCI states could be quasi-co-located (QCL'ed) with first DM-RS antenna port(s) in the first DM-RS CDM group indicated by the antenna ports field in the DCI for PDSCH reception(s)—e.g., at the same time, simultaneously, in one beam/TCI state indication, update instance, or in one slot, when/if the UE 116 uses/applies the first indicated TCI state/pair of TCI states and the second indicated TCI state/pair of TCI states to receive (scheduling) PDCCH(s)/DCI(s)—following one or more examples described herein—that (respectively) schedules the PDSCH(s) with the second and/or first DM-RS antenna ports in the second and/or first DM-RS CDM groups indicated by the antenna ports field in the DCI, e.g., at the same time, simultaneously, in one beam/TCI state indication/update instance, or in one slot.

Yet for another example, for N=2 or M=2, the UE 116 could use/apply the first indicated TCI state/pair of TCI states to receive the first (or second) PDSCH(s) when/if the UE 116 uses/applies the first indicated TCI state/pair of TCI states to receive (scheduling) PDCCH(s)/DCI(s)—following one or more examples described herein—that schedules the first (or second) PDSCH(s), the second indicated TCI state/pair of TCI states to receive the second (or first) PDSCH(s) when/if the UE 116 uses/applies the second indicated TCI state/pair of TCI states to receive (scheduling) PDCCH(s)/DCI(s)—following one or more examples described herein—that schedules the second (or first) PDSCH(s), and the first indicated TCI state/pair of TCI states to receive the first PDSCH DM-RS(s) (or, equivalently, the RS(s) in the RS set(s) provided in the first indicated TCI state/pair of TCI states could be QCL'ed with the first DM-RS antenna port(s) for PDSCH reception(s)) and the second indicated TCI state/pair of TCI states to receive the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s))—e.g., at the same time, simultaneously, in one beam/TCI state indication, update instance, or in one slot, when/if the UE 116 uses/applies the first indicated TCI state/pair of TCI states and the second indicated TCI state/pair of TCI states to receive (scheduling) PDCCH(s)/DCI(s)—following one or more examples described herein—that (respectively) schedules the PDSCH(s) with the first and/or second DM-RS antenna ports, e.g., at the same time, simultaneously, in one beam/TCI state indication/update instance, or in one slot.

Yet for another example, for N=2 or M=2, the UE 116 could use/apply the first indicated TCI state/pair of TCI states to receive the first (or second) PDSCH(s) when/if the UE 116 uses/applies the first indicated TCI state/pair of TCI states to receive (scheduling) PDCCH(s)/DCI(s)—following one or more examples described herein—that schedules the first (or second) PDSCH(s), the second indicated TCI state/pair of TCI states to receive the second (or first) PDSCH(s) when/if the UE 116 uses/applies the second indicated TCI state/pair of TCI states to receive (scheduling) PDCCH(s)/DCI(s)—following one or more examples described herein—that schedules the second (or first) PDSCH(s), and the first indicated TCI state/pair of TCI states to receive the second PDSCH DM-RS(s) (or, equivalently, the RS(s) in the RS set(s) provided in the first indicated TCI state/pair of TCI states could be QCL'ed with the second DM-RS antenna port(s) for PDSCH reception(s)) and the second indicated TCI state/pair of TCI states to receive the first PDSCH DM-RS(s) (or, equivalently, the RS(s) in the RS set(s) provided in the second indicated TCI state/pair of TCI states could be QCL'ed with the first DM-RS antenna port(s) for PDSCH reception(s))—e.g., at the same time, simultaneously, in one beam/TCI state indication, update instance or in one slot, when/if the UE 116 uses/applies the first indicated TCI state/pair of TCI states and the second indicated TCI state/pair of TCI states to receive (scheduling) PDCCH(s)/DCI(s)—following one or more examples described herein—that (respectively) schedules the PDSCH(s) with the second and/or first DM-RS antenna ports, e.g., at the same time, simultaneously, in one beam/TCI state indication/update instance, or in one slot.

Yet for another example, for N=2 or M=2, the UE 116 could use/apply the first indicated TCI state/pair of TCI states to receive first (or second) PDSCH DM-RS(s) in the first (or second) DM-RS CDM group indicated by the antenna ports field in a DCI (e.g., the scheduling DCI or the beam indication DCI with or without DL assignment)—or, equivalently, the RS(s) in the RS set(s) provided in the first indicated TCI state/pair of TCI states could be quasi-co-located (QCL'ed) with first (or second) DM-RS antenna port(s) in the first (or second) DM-RS CDM group indicated by the antenna ports field in the DCI for PDSCH reception(s) when/if the UE 116 uses/applies the first indicated TCI state/pair of TCI states to receive (scheduling) PDCCH(s)/DCI(s)—following one or more examples described herein—that schedules the PDSCH(s) with the first (or second) DM-RS antenna ports in the first (or second) DM-RS CDM groups indicated by the antenna ports field in the DCI and the second indicated TCI state/pair of TCI states to receive second (or first) PDSCH DM-RS(s) in the second (or first) DM-RS CDM group indicated by the antenna ports field in a DCI (e.g., the scheduling DCI or the beam indication DCI with or without DL assignment)—or, equivalently, the RS(s) in the RS set(s) provided in the second indicated TCI state/pair of TCI states could be quasi-co-located (QCL'ed) with second (or first) DM-RS antenna port(s) in the second (or first) DM-RS CDM group indicated by the antenna ports field in the DCI for PDSCH reception(s) when/if the UE 116 uses/applies the second indicated TCI state/pair of TCI states to receive (scheduling) PDCCH(s)/DCI(s)—following one or more examples described herein—that schedules the PDSCH(s) with the second (or first) DM-RS antenna ports in the second (or first) DM-RS CDM groups indicated by the antenna ports field in the DCI, and the first indicated TCI state/pair of TCI states to receive the first PDSCH DM-RS(s) (or, equivalently, the RS(s) in the RS set(s) provided in the first indicated TCI state/pair of TCI states could be QCL'ed with the first DM-RS antenna port(s) for PDSCH reception(s)) and the second indicated TCI state/pair of TCI states to receive the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s))—e.g., at the same time, simultaneously, in one beam/TCI state indication, update instance or in one slot, when/if the UE 116 uses/applies the first indicated TCI state/pair of TCI states and the second indicated TCI state/pair of TCI states to receive (scheduling) PDCCH(s)/DCI(s)—following one or more examples described herein—that (respectively) schedules the PDSCH(s) with the first and/or second DM-RS antenna ports, e.g., at the same time, simultaneously, in one beam/TCI state indication/update instance, or in one slot.

Yet for another example, for N=2 or M=2, the UE 116 could use/apply the first indicated TCI state/pair of TCI states to receive first (or second) PDSCH DM-RS(s) in the first (or second) DM-RS CDM group indicated by the antenna ports field in a DCI (e.g., the scheduling DCI or the beam indication DCI with or without DL assignment)—or, equivalently, the RS(s) in the RS set(s) provided in the first indicated TCI state/pair of TCI states could be quasi-co-located (QCL'ed) with first (or second) DM-RS antenna port(s) in the first (or second) DM-RS CDM group indicated by the antenna ports field in the DCI for PDSCH reception(s) when/if the UE 116 uses/applies the first indicated TCI state/pair of TCI states to receive (scheduling) PDCCH(s)/DCI(s)—one or more examples described herein—that schedules the PDSCH(s) with the first (or second) DM-RS antenna ports in the first (or second) DM-RS CDM groups indicated by the antenna ports field in the DCI and the second indicated TCI state/pair of TCI states to receive second (or first) PDSCH DM-RS(s) in the second (or first) DM-RS CDM group indicated by the antenna ports field in a DCI (e.g., the scheduling DCI or the beam indication DCI with or without DL assignment)—or, equivalently, the RS(s) in the RS set(s) provided in the second indicated TCI state/pair of TCI states could be quasi-co-located (QCL'ed) with second (or first) DM-RS antenna port(s) in the second (or first) DM-RS CDM group indicated by the antenna ports field in the DCI for PDSCH reception(s) when/if the UE 116 uses/applies the second indicated TCI state/pair of TCI states to receive (scheduling) PDCCH(s)/DCI(s)—following one or more examples described herein—that schedules the PDSCH(s) with the second (or first) DM-RS antenna ports in the second (or first) DM-RS CDM groups indicated by the antenna ports field in the DCI and the first indicated TCI state/pair of TCI states to receive the second PDSCH DM-RS(s) (or, equivalently, the RS(s) in the RS set(s) provided in the first indicated TCI state/pair of TCI states could be QCL'ed with the second DM-RS antenna port(s) for PDSCH reception(s)) and the second indicated TCI state/pair of TCI states to receive the first PDSCH DM-RS(s) (or, equivalently, the RS(s) in the RS set(s) provided in the second indicated TCI state/pair of TCI states could be QCL'ed with the first DM-RS antenna port(s) for PDSCH reception(s))—e.g., at the same time, simultaneously, in one beam/TCI state indication, update instance, or in one slot, when/if the UE 116 uses/applies the first indicated TCI state/pair of TCI states and the second indicated TCI state/pair of TCI states to receive (scheduling) PDCCH(s)/DCI(s)—following one or more examples described herein—that (respectively) schedules the PDSCH(s) with the second and/or first DM-RS antenna ports, e.g., at the same time, simultaneously, in one beam/TCI state indication/update instance, or in one slot.

In yet another example, at time t, the UE 116 could use/apply the same TCI state(s)/pair(s) of TCI states used/applied for receiving reference PDCCH(s)/DCI(s)—e.g., following one or more examples described herein—to receive PDSCH(s), or, equivalent, the UE 116 may assume that the DM-RS ports of PDSCH(s) are quasi co-located with the RS(s) with respect to the QCL parameter(s) used for monitoring/receiving the reference PDCCH(s)/DCI(s)—e.g., following one or more examples described herein. The reference PDCCH(s)/DCI(s) can be of any DCI format, e.g., DCI format 1_1 or 1_2. Furthermore, the reference PDCCH(s)/DCI(s) could correspond to PDCCH(s)/DCI(s) with DL assignment (i.e., the scheduling PDCCH(s)/DCI(s)) that is associated with or schedules the PDSCH(s). Alternatively, the reference PDCCH(s)/DCI(s) could correspond to PDCCH(s)/DCI(s) with (unified) TCI state(s) indication/update—i.e., the beam indication DCI (e.g., DCI format 1_1/1_2 with or without DL assignment), wherein one or more TCI states/pairs of TCI states could be indicated/provided by one or more TCI codepoints of one or more TCI fields for receiving DL channels/signals such as PDCCH and PDSCH and/or transmitting UL channels such as PUCCH and PUSCH. In addition, the reference PDCCH(s)/DCI(s) could correspond to one or more combination(s) of one or more of the following examples.

For example, the reference PDCCH(s)/DCI(s) could correspond to the latest or the most recent PDCCH(s)/DCI(s) received in time.

For another example, the reference PDCCH(s)/DCI(s) could correspond to the PDCCH(s)/DCI(s) that is received later in time and/or in the latest slot in which one or more CORESETs within the active BWP of the serving cell are monitored by the UE 116.

Yet for another example, the reference PDCCH(s)/DCI(s) could correspond to the latest or the most recent (received in time) PDCCH(s)/DCI(s) that is received before a reference application time Tref, and/or the latest or the most recent (received in time) PDCCH(s)/DCI(s) whose reference application time Tref has been reached/passed (e.g., less than or equal to, or greater than or equal to the time t).

Yet for another example, the reference PDCCH(s)/DCI(s) could correspond to the PDCCH(s)/DCI(s) that is received later in time and/or in the latest slot in which one or more CORESETs within the active BWP of the serving cell are monitored by the UE 116 and/or before a reference application time Tref.

Yet for another example, the reference PDCCH(s)/DCI(s) could correspond to the PDCCH(s)/DCI(s) that is received later in time and/or in the latest slot in which one or more CORESETs within the active BWP of the serving cell are monitored by the UE 116 whose reference application time Tref has been reached/passed (e.g., less than or equal to, or greater than or equal to the time t).

Yet for another example, the reference PDCCH(s)/DCI(s) could correspond to the second latest or the previous/prior PDCCH(s)/DCI(s) received in time.

Yet for another example, the reference PDCCH(s)/DCI(s) could correspond to the PDCCH(s)/DCI(s) that is received earlier in time and/or in the latest slot in which one or more CORESETs within the active BWP of the serving cell are monitored by the UE 116.

Yet for another example, the reference PDCCH(s)/DCI(s) could correspond to the second latest or the previous/prior (received in time) PDCCH(s)/DCI(s) that is received before a reference application time Tref, and/or the second latest or the previous/prior (received in time) PDCCH(s)/DCI(s) whose reference application time Tref has been reached/passed (e.g., less than or equal to, or greater than or equal to the time t).

Yet for another example, the reference PDCCH(s)/DCI(s) could correspond to the PDCCH(s)/DCI(s) that is received earlier in time and/or in the latest slot in which one or more CORESETs within the active BWP of the serving cell are monitored by the UE 116 and/or before a reference application time Tref.

Yet for another example, the reference PDCCH(s)/DCI(s) could correspond to the PDCCH(s)/DCI(s) that is received earlier in time and/or in the latest slot in which one or more CORESETs within the active BWP of the serving cell are monitored by the UE 116 whose reference application time Tref has been reached/passed (e.g., less than or equal to, or greater than or equal to the time t).

Here, the reference application time Tref could be determined according to one or more of: (1) Tref=0, (2) fixed in the system specifications, e.g., Tref=7 symbols, Tref=3 ms, etc., (3) selected/determined from a set of candidate values for application time, (4) provided/configured/indicated by the network 130 (e.g., from a set of candidate values for application time), e.g., via higher layer RRC signaling/parameter and/or MAC CE command and/or dynamic DCI based L1 signaling, (5) Tref=timeDurationForQCL, (6) Tref=BeamAppTime_r17, (7) Tref corresponds to the first slot that is at least BeamAppTime_r17 symbols after the last symbol of the PUCCH, and the first slot and the BeamAppTime_r17 symbols are both determined on the carrier with the smallest SCS among the carrier(s) applying the beam indication, (8) the maximum (max) or minimum (min) between Tref determined according to one or more examples described herein (e.g., those specified in (1)-(7) herein) and a reference time Tref', where Tref' could be similarly determined according to one or more examples described herein (e.g., those specified in (1)-(7) herein). The UE 116 could follow one or more examples described herein by replacing the scheduling PDCCH(s)/DCI(s) in one or more examples described herein with the reference PDCCH(s)/DCI(s) in one or more examples described herein to determine the first and/or second TCI state(s)/pair(s) of TCI states for PDCCH receptions—e.g., the first and/or second PDSCH(s) as specified herein, wherein the UE 116 could use/apply the first and/or second TCI state(s)/pair(s) of TCI states to receive/monitor the reference PDCCH(s)/DCIs following one or more examples described herein.

In yet another example, the UE 116 could use/apply the same TCI state(s)/pair(s) of TCI states used/applied for receiving reference PDCCH(s)/DCI(s)—e.g., following one or more examples described herein—to receive PDSCH(s). Equivalently, the UE 116 may assume that the DM-RS ports of PDSCH(s) are quasi co-located with the RS(s) with respect to the QCL parameter(s) used for monitoring/receiving the reference PDCCH(s)/DCI(s)—e.g., following one or more examples described herein. The reference PDCCH(s)/DCI(s) can be of any DCI format, e.g., DCI format 1_1 or 1_2. Furthermore, the reference PDCCH(s)/DCI(s) could correspond to PDCCH(s)/DCI(s) with DL assignment (i.e., the scheduling PDCCH(s)/DCI(s)) that is associated with or schedules the PDSCH(s). Alternatively, the reference PDCCH(s)/DCI(s) could correspond to PDCCH(s)/DCI(s) with (unified) TCI state(s) indication/update—i.e., the beam indication DCI (e.g., DCI format 1_1/1_2 with or without DL assignment), wherein one or more TCI states/pairs of TCI states could be indicated/provided by one or more TCI codepoints of one or more TCI fields for receiving DL channels/signals such as PDCCH and PDSCH and/or transmitting UL channels such as PUCCH and PUSCH. In addition, the reference PDCCH(s)/DCI(s) could correspond to one or more combination(s) of one or more of the following examples.

For example, the reference PDCCH(s)/DCI(s) could correspond to the PDCCH(s)/DCI(s) received in the CORESET associated with a monitored search space with the lowest CORESET ID or controlResourceSetId in the latest slot in which one or more CORESETs within the active BWP of the serving cell are monitored by the UE 116.

For another example, when/if a UE is configured with enableDefaultTCI-StatePerCoresetPoolIndex and/or the UE 116 is configured by higher layer parameter PDCCH-Config that contains two different values of CORESETPoolIndex or coresetPoolIndex in different CORESETs provided by ControlResourceSets, the UE 116 could use/apply the same TCI state(s)/pair(s) of TCI states used/applied for receiving reference PDCCH(s)/DCI(s) in the CORESET associated with a monitored search space with the lowest CORESET ID or controlResourceSetId among CORESETs which are configured with the same value of CORESETPoolIndex or coresetPoolIndex as that associated to the PDSCH(s) or the PDCCH scheduling the PDSCH(s)—e.g., following one or more examples described herein—to receive the PDSCH(s) associated with the value of CORESETPoolIndex or coresetPoolIndex described herein, in the latest slot in which one or more CORESETs associated with the same value of CORESETPoolIndex or coresetPoolIndex as that associated to the PDSCH(s) or the PDCCH scheduling the PDSCH(s). Equivalently, the UE 116 may assume that the DM-RS ports of PDSCH(s) associated with a value of CORESETPoolIndex or coresetPoolIndex are quasi co-located with the RS(s) with respect to the QCL parameter(s) used for monitoring/receiving the reference PDCCH(s)/DCI(s)—e.g., following one or more examples described herein—in the CORESET associated with a monitored search space with the lowest CORESET ID or controlResourceSetId among CORESETs which are configured with the same value of CORESETPoolIndex or coresetPoolIndex as that associated to the PDSCH(s) or the PDCCH scheduling the PDSCH(s) in the latest slot in which one or more CORESETs associated with the same value of CORESETPoolIndex or coresetPoolIndex as that associated to the PDSCH(s) or the PDCCH scheduling the PDSCH(s).

Yet for another example, when/if a UE is configured with enableDefaultTCI-StatePerCoresetGroupIndex and/or the UE 116 is configured by higher layer parameter PDCCH-Config that contains two different values of CORESETGroupIndex or coresetGroupIndex in different CORESETs provided by ControlResourceSets, the UE 116 could use/apply the same TCI state(s)/pair(s) of TCI states used/applied for receiving reference PDCCH(s)/DCI(s) in the CORESET associated with a monitored search space with the lowest CORESET ID or controlResourceSetId among CORESETs which are configured with the same value of CORESETGroupIndex or coresetGroupIndex as that associated to the PDSCH(s) or the PDCCH scheduling the PDSCH(s)—e.g., following one or more examples described herein—to receive the PDSCH(s) associated with the value of CORESETGroupIndex or coresetGroupIndex described herein, in the latest slot in which one or more CORESETs associated with the same value of CORESETGroupIndex or coresetGroupIndex as that associated to the PDSCH(s) or the PDCCH scheduling the PDSCH(s). Equivalently, the UE 116 may assume that the DM-RS ports of PDSCH(s) associated with a value of CORESETGroupIndex or coresetGroupIndex are quasi co-located with the RS(s) with respect to the QCL parameter(s) used for monitoring/receiving the reference PDCCH(s)/DCI(s)—e.g., following one or more examples described herein—in the CORESET associated with a monitored search space with the lowest CORESET ID or controlResourceSetId among CORESETs which are configured with the same value of CORESETGroupIndex or coresetGroupIndex as that associated to the PDSCH(s) or the PDCCH scheduling the PDSCH(s) in the latest slot in which one or more CORESETs associated with the same value of CORESETGroupIndex or coresetGroupIndex as that associated to the PDSCH(s) or the PDCCH scheduling the PDSCH(s).

The UE 116 could follow the one or more examples described herein by replacing the scheduling PDCCH(s)/DCI(s) in the one or more examples described herein with the reference PDCCH(s)/DCI(s) in the one or more examples described herein to determine the first and/or second TCI state(s)/pair(s) of TCI states for PDCCH receptions—e.g., the first and/or second PDSCH(s) as specified herein, wherein the UE 116 could use/apply the first and/or second TCI state(s)/pair(s) of TCI states to receive/monitor the reference PDCCH(s)/DCIs following one or more examples described herein.

In one embodiment, the UE 116 could be indicated/provided/configured by the network 130, e.g., in a beam indication/activation MAC CE or beam indication DCI (e.g., DCI format 1_1 or 1_2 with or without DL assignment), one or more, e.g., N≥1 or M≥1 (e.g., N=2 or M=2), TCI states/pairs of TCI states for UE-dedicated DL channels/signals receptions and/or UL channels/signals transmissions. The indicated TCI states/pairs of TCI states could be different from the previously indicated (first and/or second) TCI states/pairs of TCI states described/discussed herein and can, therefore, be referred to as newly indicated TCI states/pairs of TCI states. In a beam indication DCI, the TCI state(s)/pair(s) of TCI states could be indicated/provided by one or more TCI codepoints in one or more TCI fields (e.g., the existing TCI field).

In one example, for N=1 or M=1, the (newly) indicated TCI state/pair of TCI states could be applied/used for all PDSCH receptions before or after the corresponding beam application time Tapp. For N=2 or M=2, the (newly) indicated first TCI state/pair of TCI states could be applied/used for all PDSCH receptions before or after the corresponding beam application time Tapp. Alternatively, for N=2 or M=2, the (newly) indicated second TCI state/pair of TCI states could be applied/used for all PDSCH receptions before or after the corresponding beam application time Tapp. Optionally, for N=2 or M=2, both of the (newly) indicated first and second TCI states/pairs of TCI states could be applied/used for PDSCH reception(s), e.g., at the same time, simultaneously, in one beam/TCI state indication/update instance, or in one slot before or after the corresponding beam application time Tapp. Here, the beam application time Tapp could start from the first slot that is at least BeamAppTime_r17 symbols after the last symbol of the PUCCH.

In another example, the UE 116 could be indicated/provided/configured by the network 130, e.g., in a beam indication/activation MAC CE or beam indication DCI (e.g., DCI format 1_1 or 1_2 with or without DL assignment), a single TCI state/pair of TCI states (i.e., N=1 or M=1) for UE-dedicated DL channels/signals receptions and/or UL channels/signals transmissions. When/if the newly indicated TCI state/pair of TCI states correspond to the previously indicated first TCI state/pair of TCI states, the UE 116 could still use/apply the previously indicated first TCI state/pair of TCI states to receive the PDSCH(s) before or after the corresponding beam application time Tapp. Here, the beam application time Tapp could start from the first slot that is at least BeamAppTime_r17 symbols after the last symbol of the PUCCH. Alternatively, the UE 116 could be indicated/provided/configured by the network 130, e.g., in a beam indication/activation MAC CE or beam indication DCI (e.g., DCI format 1_1 or 1_2 with or without DL assignment), two TCI states/pairs of TCI states (i.e., N=2 or M=2) for UE-dedicated DL channels/signals receptions and/or UL channels/signals transmissions. Both newly indicated TCI states/pairs of TCI states could be the same/identical, and they could correspond to the previously indicated first TCI state/pair of TCI states. For this case, the UE 116 could still use/apply the previously indicated first TCI state/pair of TCI states to receive the PDSCH(s) before or after the corresponding beam application time Tapp. Here, the beam application time Tapp could start from the first slot that is at least BeamAppTime_r17 symbols after the last symbol of the PUCCH.

In another example, the UE 116 could be indicated/provided/configured by the network 130, e.g., in a beam indication/activation MAC CE or beam indication DCI (e.g., DCI format 1_1 or 1_2 with or without DL assignment), a single TCI state/pair of TCI states (i.e., N=1 or M=1) for UE-dedicated DL channels/signals receptions and/or UL channels/signals transmissions. When/if the newly indicated TCI state/pair of TCI states correspond to the previously indicated second TCI state/pair of TCI states, the UE 116 could use/apply the previously indicated second TCI state/pair of TCI states to receive the PDSCH(s) before or after the corresponding beam application time Tapp. Here, the beam application time Tapp could start from the first slot that is at least BeamAppTime_r17 symbols after the last symbol of the PUCCH. Optionally, the UE 116 could be indicated/provided/configured by the network 130, e.g., in a beam indication/activation MAC CE or beam indication DCI (e.g., DCI format 1_1 or 1_2 with or without DL assignment), a single TCI state/pair of TCI states (i.e., N=1 or M=1) for UE-dedicated DL channels/signals receptions and/or UL channels/signals transmissions. The newly indicated TCI state/pair of TCI states could be different from the previously indicated first and/or second TCI states/pairs of TCI states. For this case, the UE 116 could use/apply the newly indicated TCI state/pair of TCI states to receive the PDSCH(s) before or after the corresponding beam application time Tapp. Here, the beam application time Tapp could start from the first slot that is at least BeamAppTime_r17 symbols after the last symbol of the PUCCH. Alternatively, the UE 116 could be indicated/provided/configured by the network 130, e.g., in a beam indication/activation MAC CE or beam indication DCI (e.g., DCI format 1_1 or 1_2 with or without DL assignment), two TCI states/pairs of TCI states (i.e., N=2 or M=2) for UE-dedicated DL channels/signals receptions and/or UL channels/signals transmissions. Both newly indicated TCI states/pairs of TCI states could be the same/identical. Furthermore, they could correspond to the previously indicated second TCI state/pair of TCI states or they could be different from the previously indicated first and/or second TCI states/pairs of TCI states (they both correspond to a newly indicated TCI state/pair of TCI states). For this case, the UE 116 could use/apply the previously indicated second TCI state/pair of TCI states or the newly indicated TCI state/pair of TCI states to receive the PDSCH(s) before or after the corresponding beam application time Tapp. Here, the beam application time Tapp could start from the first slot that is at least BeamAppTime_r17 symbols after the last symbol of the PUCCH.

In yet another example, the UE 116 could be indicated/provided/configured by the network 130, e.g., in a beam indication/activation MAC CE or beam indication DCI (e.g., DCI format 1_1 or 1_2 with or without DL assignment), two TCI states/pairs of TCI states (i.e., N=2 or M=2) for UE-dedicated DL channels/signals receptions and/or UL channels/signals transmissions. The newly indicated first TCI state/pair of TCI states could be the same as or different from the previously indicated first (or second) TCI state/pair of TCI states, and/or the newly indicated second TCI state/pair of TCI states could be the same as or different from the previously indicated second (or first) TCI state/pair of TCI states. For this case, the UE 116 could use/apply the newly indicated first TCI state/pair of TCI states (e.g., corresponding to the previously indicated first or second TCI state/pair of TCI states) to receive the first (or second) PDSCH(s) before or after the corresponding beam application time Tapp and the newly indicated second TCI state/pair of TCI states (e.g., corresponding to the previously indicated first or second TCI state/pair of TCI states) to receive the second (or first) PDSCH(s) before or after the corresponding beam application time Tapp. Here, the beam application time Tapp could start from the first slot that is at least BeamAppTime_r17 symbols after the last symbol of the PUCCH.

In yet another example, the UE 116 could be indicated/provided/configured by the network 130, e.g., in a beam indication/activation MAC CE or beam indication DCI (e.g., DCI format 1_1 or 1_2 with or without DL assignment), two TCI states/pairs of TCI states (i.e., N=2 or M=2) for UE-dedicated DL channels/signals receptions and/or UL channels/signals transmissions. The newly indicated first TCI state/pair of TCI states could be the same as or different from the previously indicated first (or second) TCI state/pair of TCI states, and/or the newly indicated second TCI state/pair of TCI states could be the same as or different from the previously indicated second (or first) TCI state/pair of TCI states. For this case, the UE 116 could use/apply the newly indicated first TCI state/pair of TCI states (e.g., corresponding to the previously indicated first or second TCI state/pair of TCI states) to receive the first (or second) PDSCH DM-RS(s) (or, equivalently, the RS(s) in the RS set(s) provided in the newly indicated first TCI state/pair of TCI states could be QCL'ed with the first (or second) DM-RS antenna port(s) for PDSCH reception(s)) before or after the corresponding beam application time Tapp and the newly indicated second TCI state/pair of TCI states (e.g., corresponding to the previously indicated first or second TCI state/pair of TCI states) to receive the second (or first) PDSCH DM-RS(s) (or, equivalently, the RS(s) in the RS set(s) provided in the newly indicated second TCI state/pair of TCI states could be QCL'ed with the second (or first) DM-RS antenna port(s) for PDSCH reception(s)) before or after the corresponding beam application time Tapp. Here, the beam application time Tapp could start from the first slot that is at least BeamAppTime_r17 symbols after the last symbol of the PUCCH.

In yet another example, the UE 116 could be indicated/provided/configured by the network 130, e.g., in a beam indication/activation MAC CE or beam indication DCI (e.g., DCI format 1_1 or 1_2 with or without DL assignment), two TCI states/pairs of TCI states (i.e., N=2 or M=2) for UE-dedicated DL channels/signals receptions and/or UL channels/signals transmissions. One or more of the TCI field bits—denoted by beam association TCI field bit(s)—of the TCI field(s) in the beam indication DCI (e.g., DCI format 1_1/1_2 with or without DL assignment) could be used/repurposed/applied to indicate which of the TCI states/pairs of TCI states indicated by/via one or more TCI codepoints of the TCI field(s)—using one or more of the TCI field bits denoted by beam indication TCI field bit(s)—could be used/applied for PDSCH reception(s).

For example, the beam association TCI field bit could be the MSB or the LSB (i.e., a one-bit indicator) of the total/maximum TCI field bits of the TCI field(s) in the beam indication DCI.

For another example, the beam association TCI field bits could be the first two bits (or the first two MSBs) or the last two bits (or the last two LSBs) (i.e., a two-bit indicator) of the total/maximum TCI field bits of the TCI field(s) in the beam indication DCI.

Yet for another example, the UE 116 could be provided/indicated/configured by the network 130, e.g., via higher layer RRC signaling/parameter and/or MAC CE command and/or dynamic DCI based L1 signaling, which of the total/maximum TCI field bits of the TCI field(s) could be used/applied as the beam association TCI field bit(s) or the beam indication TCI field bit(s).

For example, the beam association TCI field bit could be a one-bit indicator, e.g., corresponding to the MSB or the LSB (i.e., a one-bit indicator) of the total/maximum TCI field bits of the TCI field(s) in the beam indication DCI and/or configured/provided/indicated by the network 130. When/if the beam association TCI field bit is set to '0', the first indicated TCI state/pair of TCI states could be applied/used for all PDSCH receptions before or after a beam association application time Tassoc, and when/if the beam association TCI field bit is set to '1', the second indicated TCI state/pair of TCI states could be applied/used for all PDSCH receptions before or after a beam association application time Tassoc.

For another example, the beam association TCI field bit could be a one-bit indicator, e.g., corresponding to the MSB or the LSB (i.e., a one-bit indicator) of the total/maximum TCI field bits of the TCI field(s) in the beam indication DCI and/or configured/provided/indicated by the network 130. When/if the beam association TCI field bit is set to '0', the second indicated TCI state/pair of TCI states could be applied/used for all PDSCH receptions before or after a beam association application time Tassoc, and when/if the beam association TCI field bit is set to '1', the first indicated TCI state/pair of TCI states could be applied/used for all PDSCH receptions before or after a beam association application time Tassoc.

In yet another example, the beam association TCI field bit could be a one-bit indicator, e.g., corresponding to the MSB or the LSB (i.e., a one-bit indicator) of the total/maximum TCI field bits of the TCI field(s) in the beam indication DCI and/or configured/provided/indicated by the network 130. When/if the beam association TCI field bit is set to '0' (or '1'), the first indicated TCI state/pair of TCI states could be applied/used for receiving the first PDSCH(s), and the second indicated TCI state/pair of TCI states could be applied/used for receiving the second PDSCH(s), before or after a beam association application time Tassoc. When/if the beam association TCI field bit is set to '1' (or '0'), the first indicated TCI state/pair of TCI states could be applied/used for receiving the second PDSCH(s) and the second indicated TCI state/pair of TCI states could be applied/used for receiving the first PDSCH(s), before or after a beam association application time Tassoc. The UE 116 could be configured/indicated/provided by the network 130, e.g., via higher layer RRC signaling/parameter and/or MAC CE command and/or dynamic DCI based L1 signaling, the first and/or second PDSCHs and their corresponding/respective configuration information.

In yet another example, the beam association TCI field bit could be a one-bit indicator, e.g., corresponding to the MSB or the LSB (i.e., a one-bit indicator) of the total/maximum TCI field bits of the TCI field(s) in the beam indication DCI and/or configured/provided/indicated by the network 130. When/if the beam association TCI field bit is set to '0' (or '1'), the first indicated TCI state/pair of TCI states could be applied/used for all PDSCH receptions before or after a beam association application time Tassoc, when/if the beam association TCI field bit is set to '1' (or '0'), the first indicated TCI state/pair of TCI states could be applied/used for receiving the first (or second) PDSCH(s), and the second indicated TCI state/pair of TCI states could be applied/used for receiving the second (or first) PDSCH(s), before or after a beam association application time Tassoc. The UE 116 could be configured/indicated/provided by the network 130, e.g., via higher layer RRC signaling/parameter and/or MAC CE command and/or dynamic DCI based L1 signaling, the first and/or second PDSCHs and their corresponding/respective configuration information.

In yet another example, the beam association TCI field bit could be a one-bit indicator, e.g., corresponding to the MSB or the LSB (i.e., a one-bit indicator) of the total/maximum TCI field bits of the TCI field(s) in the beam indication DCI and/or configured/provided/indicated by the network 130. When/if the beam association TCI field bit is set to '0' (or '1'), the second indicated TCI state/pair of TCI states could be applied/used for all PDSCH receptions before or after a beam association application time Tassoc, when/if the beam association TCI field bit is set to '1' (or '0'), the first indicated TCI state/pair of TCI states could be applied/used for receiving the first (or second) PDSCH(s), and the second indicated TCI state/pair of TCI states could be applied/used for receiving the second (or first) PDSCH(s), before or after a beam association application time Tassoc. The UE 116 could be configured/indicated/provided by the network 130, e.g., via higher layer RRC signaling/parameter and/or MAC CE command and/or dynamic DCI based L1 signaling, the first and/or second PDSCHs and their corresponding/respective configuration information.

In yet another example, the beam association TCI field bit could be a one-bit indicator, e.g., corresponding to the MSB or the LSB (i.e., a one-bit indicator) of the total/maximum TCI field bits of the TCI field(s) in the beam indication DCI and/or configured/provided/indicated by the network 130. When/if the beam association TCI field bit is set to '0' (or '1'), the first indicated TCI state/pair of TCI states could be applied/used for receiving the first PDSCH DM-RS(s) (or, equivalently, the RS(s) in the RS set(s) provided in the first indicated TCI state/pair of TCI states could be QCL'ed with the first DM-RS antenna port(s) for PDSCH reception(s)) before or after a beam association application time Tassoc and the second indicated TCI state/pair of TCI states could be applied/used for receiving the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s)) before or after a beam association application time Tassoc. When/if the beam association TCI field bit is set to '1' (or '0'), the first indicated TCI state/pair of TCI states could be applied/used for receiving the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s)) before or after a beam association application time Tassoc and the second indicated TCI state/pair of TCI states could be applied/used for receiving the first PDSCH DM-RS(s) (or, equivalently, the RS(s) in the RS set(s) provided in the second indicated TCI state/pair of TCI states could be QCL'ed with the first DM-RS antenna port(s) for PDSCH reception(s)) before or after a beam association application time Tassoc.

In yet another example, the beam association TCI field bits could be a two-bit indicator, e.g., corresponding to the first two bits (or the first two MSBs) or the last two bits (or the last two LSBs) of the total/maximum TCI field bits of the TCI field(s) in the beam indication DCI and/or configured/provided/indicated by the network 130. When/if the beam association TCI field bits are set to '00' ('01', '10' or '11'), the first indicated TCI state/pair of TCI states could be applied/used for all PDSCH receptions before or after a beam association application time Tassoc, when/if the beam association TCI field bits are set to '01' ('00', '10' or '11'), the second indicated TCI state/pair of TCI states could be applied/used for all PDSCH receptions before or after a beam association application time Tassoc. When/if the beam association TCI field bits are set to '10' ('00', '01' or '11'), the first indicated TCI state/pair of TCI states could be applied/used for receiving the first PDSCH(s) and the second indicated TCI state/pair of TCI states could be applied/used for receiving the second PDSCH(s), before or after a beam association application time Tassoc, and when/if the beam association TCI field bits are set to '11' ('00', '01' or '10'), the first indicated TCI state/pair of TCI states could be applied/used for receiving the second PDSCH(s) and the second indicated TCI state/pair of TCI states could be applied/used for receiving the first PDSCH(s), before or after a beam association application time Tassoc.

In yet another example, the beam association TCI field bits could be a two-bit indicator, e.g., corresponding to the first two bits (or the first two MSBs) or the last two bits (or the last two LSBs) of the total/maximum TCI field bits of the TCI field(s) in the beam indication DCI and/or configured/provided/indicated by the network 130. When/if the beam association TCI field bits are set to '00' ('01', '10' or '11'), the first indicated TCI state/pair of TCI states could be applied/used for all PDSCH receptions before or after a beam association application time Tassoc. When/if the beam association TCI field bits are set to '01' ('00', '10' or '11'), the second indicated TCI state/pair of TCI states could be applied/used for all PDSCH receptions before or after a beam association application time Tassoc. When/if the beam association TCI field bits are set to '10' ('00', '01' or '11'), the first indicated TCI state/pair of TCI states could be applied/used for receiving the first PDSCH DM-RS(s) (or, equivalently, the RS(s) in the RS set(s) provided in the first indicated TCI state/pair of TCI states could be QCL'ed with the first DM-RS antenna port(s) for PDSCH reception(s)) and the second indicated TCI state/pair of TCI states could be applied/used for receiving the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s)), before or after a beam association application time Tassoc. When/if the beam association TCI field bits are set to '11' ('00', '01' or '10'), the first indicated TCI state/pair of TCI states could be applied/used for receiving the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s)) and the second indicated TCI state/pair of TCI states could be applied/used for receiving the first PDSCH DM-RS(s) (or, equivalently, the RS(s) in the RS set(s) provided in the second indicated TCI state/pair of TCI states could be QCL'ed with the first DM-RS antenna port(s) for PDSCH reception(s)), before or after a beam association application time Tassoc.

The UE 116 could be indicated/configured/provided/informed by the network 130, e.g., via higher layer RRC signaling/parameter and/or MAC CE command and/or dynamic DCI based L1 signaling whether one or more of the TCI field bits of the TCI field(s) in the beam indication DCI could be used/repurposed as the beam association TCI field bit(s). Furthermore, the beam association application time Tassoc could be determined according to one or more of: (1) Tassoc=0, (2) fixed in the system specifications, e.g., Tassoc=7 symbols, Tassoc=3 ms, etc., (3) selected/determined from a set of candidate values for application time, (4) provided/configured/indicated by the network 130 (e.g., from a set of candidate values for application time), e.g., via higher layer RRC signaling/parameter and/or MAC CE command and/or dynamic DCI based L1 signaling, (5) Tassoc=timeDurationForQCL, (6) Tassoc=BeamAppTime_r17, (7) Tassoc corresponds to the first slot that is at least BeamAppTime_r17 symbols after the last symbol of the PUCCH, and the first slot and the BeamAppTime_r17 symbols are both determined on the carrier with the smallest SCS among the carrier(s) applying the beam association, (8) the maximum (max) or minimum (min) between Tassoc determined according to one or more examples described herein (e.g., those specified in (1)-(7) herein) and another beam association application time Tassoc', where Tassoc' could be similarly determined according to one or more of the examples described herein (e.g., those specified in (1)-(7) herein).

In yet another example, a TCI codepoint—among all the TCI codepoints activated/provided by the beam indication/activation MAC CE, e.g., the Unified TCI States Activation/Deactivation MAC CE or Enhanced Unified TCI States Activation/Deactivation MAC CE—indicated/provided in the TCI field(s) in the beam indication DCI could contain/comprise/include two parts, wherein the first part could indicate/provide the first (or second) indicated TCI state/pair of TCI states and the second part could indicate/provide the second (or first) indicated TCI state/pair. The first (or second) part could be absent/not present/not configured/not provided or set to 'none', 'off', 'disabled', or invalid value(s) such as invalid TCI state ID(s).

For example, when/if the second (or first) part is absent/not present/not configured/not provided or set to 'none', 'off', 'disabled' or invalid value(s) such as invalid TCI state ID(s), the first indicated TCI state/pair of TCI states could be applied/used for all PDSCH receptions before or after a beam association application time Tassoc, and when/if the first (or second) part is absent/not present/not configured/not provided or set to 'none', 'off', 'disabled', or invalid value(s) such as invalid TCI state ID(s), the second indicated TCI state/pair of TCI states could be applied/used for all PDSCH receptions before or after a beam association application time Tassoc.

For another example, when/if both of the first and second parts are present/configured/provided or set to 'on', 'enabled' or valid values such as valid TCI state IDs for the first and second indicated TCI states/pairs of TCI states, the first indicated TCI state/pair of TCI states could be applied/used for receiving the first PDSCH(s) and the second indicated TCI state/pair of TCI states could be applied/used for receiving the second PDSCH(s), before or after a beam association application time Tassoc. Alternatively, when/if both of the first and second parts are present/configured/provided or set to 'on', 'enabled', or valid values such as valid TCI state IDs for the first and second indicated TCI states/pairs of TCI states, the first indicated TCI state/pair of TCI states could be applied/used for receiving the second PDSCH(s) and the second indicated TCI state/pair of TCI states could be applied/used for receiving the first PDSCH(s), before or after a beam association application time Tassoc. The UE 116 could be configured/indicated/provided by the network 130, e.g., via higher layer RRC signaling/parameter and/or MAC CE command and/or dynamic DCI based L1 signaling, the first and/or second PDSCHs and their corresponding/respective configuration information.

In yet another example, when/if both of the first and second parts are present/configured/provided or set to 'on', 'enabled', or valid values such as valid TCI state IDs for the first and second indicated TCI states/pairs of TCI states, the first indicated TCI state/pair of TCI states could be applied/used for receiving the first PDSCH DM-RS(s) (or, equivalently, the RS(s) in the RS set(s) provided in the first indicated TCI state/pair of TCI states could be QCL'ed with the first DM-RS antenna port(s) for PDSCH reception(s)) before or after a beam association application time Tassoc and the second indicated TCI state/pair of TCI states could be applied/used for receiving the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s)) before or after a beam association application time Tassoc. Alternatively, when/if both of the first and second parts are present/configured/provided or set to 'on', 'enabled', or valid values such as valid TCI state IDs for the first and second indicated TCI states/pairs of TCI states, the first indicated TCI state/pair of TCI states could be applied/used for receiving the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s)) before or after a beam association application time Tassoc and the second indicated TCI state/pair of TCI states could be applied/used for receiving the first PDSCH DM-RS(s) (or, equivalently, the RS(s) in the RS set(s) provided in the second indicated TCI state/pair of TCI states could be QCL'ed with the first DM-RS antenna port(s) for PDSCH reception(s)) before or after a beam association application time Tassoc.

The beam association application time Tassoc could be determined according to one or more of: (1) Tassoc=0, (2) fixed in the system specifications, e.g., Tassoc=7 symbols, Tassoc=3 ms, etc., (3) selected/determined from a set of candidate values for application time, (4) provided/configured/indicated by the network 130 (e.g., from a set of candidate values for application time), e.g., via higher layer RRC signaling/parameter and/or MAC CE command and/or dynamic DCI based L1 signaling, (5) Tassoc=timeDurationForQCL, (6) Tassoc=BeamAppTime_r17, (7) Tassoc corresponds to the first slot that is at least BeamAppTime_r17 symbols after the last symbol of the PUCCH and the first slot and the BeamAppTime_r17 symbols are both determined on the carrier with the smallest SCS among the carrier(s) applying the beam association, (8) the maximum (max) or minimum (min) between Tassoc determined according to one or more examples described herein (e.g., those specified in (1)-(7) herein) and another beam association application time Tassoc', where Tassoc' could be similarly determined according to one or more of the examples specified herein (e.g., those specified in (1)-(7) herein).

In yet another example, the UE 116 could be indicated/provided/configured by the network 130, e.g., in a beam indication/activation MAC CE or beam indication DCI (e.g., DCI format 1_1 or 1_2 with or without DL assignment), two TCI states/pairs of TCI states (i.e., N=2 or M=2) for UE-dedicated DL channels/signals receptions and/or UL channels/signals transmissions. For this case, the UE 116 could follow the indicator/parameter provided/indicated/configured in PDSCH-Config described herein (e.g., e.g., following one or more examples described herein) or the fixed rule(s) described herein (e.g., following one or more examples described herein) or the predefined rule(s) described herein (e.g., following one or more examples described herein) or the DCI field indicator in the DCI (e.g., the scheduling DCI or the beam indication DCI with or without DL assignment) as specified herein—e.g., following one or more examples described herein to determine the association between the indicated TCI state(s) and the PDSCH reception(s), or, equivalently, which of the indicated TCI state(s) to use for PDSCH reception(s).

In yet another example, the UE 116 could be indicated/provided/configured by the network 130, e.g., in a beam indication/activation MAC CE or beam indication DCI (e.g., DCI format 1_1 or 1_2 with or without DL assignment), a single TCI state/pair of TCI states (i.e., N=1 or M=1) for UE-dedicated DL channels/signals receptions and/or UL channels/signals transmissions. The UE 116 could be indicated/configured/provided/informed by the network 130, e.g., via higher layer RRC signaling/parameter and/or MAC CE command and/or dynamic DCI based L1 signaling, that the (newly) indicated TCI state/pair of TCI states could be a TCI state/pair of TCI states update for one of the (previously) indicated TCI states/pairs of TCI states—i.e., the UE 116 could assume that one of the (previously) indicated TCI states/pairs of TCI states is replaced/updated with/by the (newly) indicated TCI state/pair of TCI states—also referred to as the updated TCI state/pair of TCI states—and the other one of the (previously) indicated TCI states/pairs of TCI states are unchanged. The UE 116 could use/apply the updated TCI state/pair of TCI states and the other one of the (previously) indicated TCI states/pairs of TCI states for PDSCH reception(s).

For example, the UE 116 could assume that the (previously) indicated first TCI state/pair of TCI states is replaced/updated with/by the (newly) indicated TCI state/pair of TCI states—also referred to as the updated first TCI state/pair of TCI states. The UE 116 could then use/apply the updated first TCI state/pair of TCI states and/or the (previously) indicated second TCI state/pair of TCI states for PDSCH reception(s) before or after a beam application Tapp following those specified herein. Alternatively, the UE 116 could assume that the (previously) indicated second TCI state/pair of TCI states is replaced/updated with/by the (newly) indicated TCI state/pair of TCI states—also referred to as the updated second TCI state/pair of TCI states—the UE 116 could then use/apply the (previously) indicated first TCI state/pair of TCI states and/or the updated second TCI state/pair of TCI states for PDSCH reception(s) before or after a beam application time Tapp following those specified herein.

For another example, the UE 116 could be indicated/configured/provided by the network 130 via higher layer RRC signaling/parameter, e.g., an indicator/parameter provided in PDSCH-Config/PDCCH-Config/ControlResource- Set, which one of the (previously) indicated TCI states/pairs of TCI states could be updated/replaced by/with the (newly) indicated TCI state/pair of TCI states. For instance, when/if the higher layer indicator/parameter is set to '0' or ('1'), the UE 116 could assume that the (previously) indicated first TCI state/pair of TCI states is replaced/updated with/by the (newly) indicated TCI state/pair of TCI states—also referred to as the updated first TCI state/pair of TCI states—the UE 116 could then use/apply the updated first TCI state/pair of TCI states and/or the (previously) indicated second TCI state/pair of TCI states for PDSCH reception(s) before or after a beam application Tapp following those specified herein. Alternatively, when/if the higher layer indicator/parameter is set to '1' or ('0'), the UE 116 could assume that the (previously) indicated second TCI state/pair of TCI states is replaced/updated with/by the (newly) indicated TCI state/pair of TCI states—also referred to as the updated second TCI state/pair of TCI states—the UE 116 could then use/apply the (previously) indicated first TCI state/pair of TCI states and/or the updated second TCI state/pair of TCI states for PDSCH reception(s) before or after a beam application time Tapp following those specified herein.

Yet for another example, the UE 116 could be indicated/configured/provided by the network 130 via MAC CE command, e.g., the Unified TCI States Activation/Deactivation MAC CE or Enhanced Unified TCI States Activation/Deactivation MAC CE, which one of the (previously) indicated TCI states/pairs of TCI states could be updated/replaced by/with the (newly) indicated TCI state/pair of TCI states. For instance, a TCI codepoint that is activated/provided by the MAC CE command could be associated with an indicator/parameter, where the indicator/parameter could also be indicated/provided in the MAC CE command. When/if the indicator/parameter associated with the TCI codepoint that provides the (newly) indicated TCI state/pair of TCI states in the TCI field(s) in the beam indication DCI is set to '0' (or '1'), the UE 116 could assume that the (previously) indicated first TCI state/pair of TCI states is replaced/updated with/by the (newly) indicated TCI state/pair of TCI states—also referred to as the updated first TCI state/pair of TCI states—the UE 116 could then use/apply the updated first TCI state/pair of TCI states and/or the (previously) indicated second TCI state/pair of TCI states for PDSCH reception(s) before or after a beam application time Tapp following those specified herein. When/if the indicator/parameter associated with the TCI codepoint that provides the (newly) indicated TCI state/pair of TCI states in the TCI field(s) in the beam indication DCI is set to '1' (or '0'), the UE 116 could assume that the (previously) indicated second TCI state/pair of TCI states is replaced/updated with/by the (newly) indicated TCI state/pair of TCI states—also referred to as the updated second TCI state/pair of TCI states—the UE 116 could then use/apply the updated second TCI state/pair of TCI states and/or the (previously) indicated first TCI state/pair of TCI states for PDSCH reception(s) before or after a beam application time Tapp following those specified herein.

Yet for another example, the UE 116 could be indicated/configured/provided by the network 130 via dynamic DCI based L1 signaling, e.g., an indicator/parameter provided in a DCI—e.g., a beam indication DCI (e.g., DCI format 1_1/1_2 with or without DL assignment) that carries one or more unified TCI states/pairs of TCI states, which one of the (previously) indicated TCI states/pairs of TCI states could be updated/replaced by/with the (newly) indicated TCI state/pair of TCI states. For instance, when/if the DCI indicator/parameter is set to '0' or ('1'), the UE 116 could assume that the (previously) indicated first TCI state/pair of TCI states is replaced/updated with/by the (newly) indicated TCI state/pair of TCI states—also referred to as the updated first TCI state/pair of TCI states—the UE 116 could then use/apply the updated first TCI state/pair of TCI states and/or the (previously) indicated second TCI state/pair of TCI states for PDSCH reception(s) before or after a beam application Tapp following those specified herein. Alternatively, when/if the DCI indicator/parameter is set to '1' or ('0'), the UE 116 could assume that the (previously) indicated second TCI state/pair of TCI states is replaced/updated with/by the (newly) indicated TCI state/pair of TCI states—also referred to as the updated second TCI state/pair of TCI states—the UE 116 could then use/apply the (previously) indicated first TCI state/pair of TCI states and/or the updated second TCI state/pair of TCI states for PDSCH reception(s) before or after a beam application time Tapp following those specified herein. Here, the DCI indicator/parameter discussed herein could be a new DCI field introduced in a DCI format dedicated to indicating which one of the (previously) indicated TCI states/pairs of TCI states could be updated/replaced by/with the (newly) indicated TCI state/pair of TCI states. Optionally, the DCI indicator/parameter discussed herein could correspond to one or more field bits of one or more existing DCI fields (e.g., the TCI field(s)) in a DCI format repurposed for indicating which one of the (previously) indicated TCI states/pairs of TCI states could be updated/replaced by/with the (newly) indicated TCI state/pair of TCI states.

The UE 116 could be provided/configured/indicated by the network 130, e.g., via higher layer RRC signaling/parameter and/or MAC CE command and/or dynamic DCI based L1 signaling, to follow one or more of the examples (e.g., one or more examples described herein) and/or combination(s) of one or more examples (e.g., one or more examples described herein) specified/discussed herein to determine the association between the indicated TCI state(s) and the PDSCH reception(s). For instance, a higher layer parameter 'dynamicBeamSelectionTCI' can be provided/configured/indicated in, e.g., PDSCH-Config. When/if the higher layer parameter 'dynamicBeamSelectionTCI' is set to 'enabled', the UE 116 could follow one or more of the examples (e.g., one or more examples described herein) and/or combination(s) of one or more examples (e.g., one or more examples described herein) specified/discussed herein to determine the association between the indicated TCI state(s) and the PDSCH reception(s). Furthermore, the beam application time Tapp could be determined according to one or more of: (1) Tapp=0, (2) fixed in the system specifications, e.g., Tapp=7 symbols, Tapp=3 ms, etc., (3) selected/determined from a set of candidate values for application time, (4) provided/configured/indicated by the network 130 (e.g., from a set of candidate values for application time), e.g., via higher layer RRC signaling/parameter and/or MAC CE command and/or dynamic DCI based L1 signaling, (5) Tapp=timeDurationForQCL, (6) Tapp=BeamAppTime_r17, (7) Tapp corresponds to the first slot that is at least BeamAppTime_r17 symbols after the last symbol of the PUCCH and the first slot and the BeamAppTime_r17 symbols are both determined on the carrier with the smallest SCS among the carrier(s) applying the beam indication, (8) the maximum (max) or minimum (min) between Tapp determined according to one or more examples described herein (e.g., those specified in (1)-(7) herein) and another beam application time Tapp', where Tapp' could be similarly determined according to one or more of the examples specified herein (e.g., those specified in (1)-(7) herein).

Throughout the present disclosure, unless otherwise specified, the first PDSCH(s) could correspond to all PDSCH(s)/PDSCH reception(s)—e.g., configured by the higher layer parameter PDSCH-Config, the first PDSCH DM-RS(s), the first DM-RS antenna port(s) for PDSCH reception(s), the first PDSCH DM-RS CDM group indicated by the antenna ports field in a DCI (e.g., the scheduling DCI or the beam indication DCI with or without DL assignment), or the first DM-RS(s) for PDSCH reception(s) in the first DM-RS CDM group indicated by the antenna ports field in a DCI (e.g., the scheduling DCI or the beam indication DCI with or without DL assignment), and the second PDSCH(s) could correspond to all PDSCH(s)/PDSCH reception(s)—e.g., configured by the higher layer parameter PDSCH-Config, the second PDSCH DM-RS(s), the second DM-RS antenna port(s) for PDSCH reception(s), the second PDSCH DM-RS CDM group indicated by the antenna ports field in a DCI (e.g., the scheduling DCI or the beam indication DCI with or without DL assignment), or the second DM-RS(s) for PDSCH reception(s) in the second DM-RS CDM group indicated by the antenna ports field in a DCI (e.g., the scheduling DCI or the beam indication DCI with or without DL assignment).

In one example to support dynamic selection/switching of PDSCH reception(s) in a multi-TRP system, the UE 116 could be first informed/provided/indicated/configured by the network 130, e.g., by the indicator/parameter in PDSCH-Config described herein, the UE 116 could first follow a fixed rule specified herein (e.g., follow one or more examples herein), or the UE 116 could first follow a predefined rule specified herein (e.g., follow one or more examples described herein) to determine a default association between one or more indicated TCI states/pairs of TCI states and PDSCH reception(s) such that the first indicated TCI state/pair of TCI states is applied/used for all PDSCH receptions. That is, the indicators/parameters in all PDSCH-Config's for all PDSCHs could be set to the same value '0' (or '1', '00', '01', '10' or '11') according to the descriptions/discussions herein, the fixed rule specified herein (e.g., according to one or more examples described herein) indicates/informs/tells/states that the first indicated TCI state/pair of TCI states could be applied/used for all PDSCH receptions, or the predefined rule specified herein (e.g., according to one or more examples described herein) indicates/informs/tells/states that the first indicated TCI state/pair of TCI states could be applied/used for all PDSCH receptions. The UE 116 could then follow one or more of the examples specified/provided herein to further determine the association between the indicated TCI state(s) and the PDSCH reception(s).

For example, the UE 116 could be provided/indicated/configured by the network 130, in a higher layer parameter, e.g., ControlResourceSet for a CORESET, an indicator/parameter to inform/indicate/provide/configure the UE 116 the association between the indicated TCI state(s) and the PDSCH reception(s), wherein different CORESETs configured with the same indicator/parameter could be in a same CORESET group.

In one example, when/if the indicator/parameter discussed herein is absent, disabled, or not provided/configured/indicated/specified/defined in ControlResourceSet, and/or when/if all CORESETs are configured/associated with same indicators/parameters set to '0's or '1's or '00's or '01's or '10's or '11's, the UE 116 could follow the indicator/parameter provided/indicated/configured in PDSCH-Config described herein, the fixed rule(s) described herein, or the predefined rule(s) described herein to determine the association between the indicated TCI state(s) and the PDSCH reception(s).

FIG. 13 illustrates an example flow diagram 1300 for determining which of the indicated TCI state(s) to use for PDSCH reception(s) according to embodiments of the present disclosure. For example, flow diagram 1300 can be utilized by the gNB 102 of FIG. 2 and, more particularly, the processor 225. This example is for illustration only and other embodiments can be used without departing from the scope of the present disclosure.

In another example, if the DCI (e.g., the scheduling DCI or the beam indication DCI with or without DL assignment) is received in a CORESET configured/associated with the indicator/parameter in the corresponding ControlResourceSet set to '0', the first indicated TCI state/pair of TCI states could still be applied/used for all PDSCH receptions and if the DCI (e.g., the scheduling DCI or the beam indication DCI with or without DL assignment) is received in a CORESET configured/associated with the indicator/parameter in the corresponding ControlResourceSet set to '1', the second indicated TCI state/pair of TCI states could be applied/used for all PDSCH receptions—change of TRP that transmits the PDSCH(s).

In yet another example, if the DCI (e.g., the scheduling DCI or the beam indication DCI with or without DL assignment) is received in a CORESET configured/associated with the indicator/parameter in the corresponding ControlResourceSet set to '0', the second indicated TCI state/pair of TCI states could be applied/used for all PDSCH receptions—change of TRP that transmits the PDSCH(s), and if the DCI (e.g., the scheduling DCI or the beam indication DCI with or without DL assignment) is received in a CORESET configured/associated with the indicator/parameter in the corresponding ControlResourceSet set to '1', the first indicated TCI state/pair of TCI states could still be applied/used for all PDSCH receptions.

In yet another example, if the DCI (e.g., the scheduling DCI or the beam indication DCI with or without DL assignment) is received in a CORESET configured/associated with the indicator/parameter in the corresponding ControlResourceSet set to '0' (or '1'), the first indicated TCI state/pair of TCI states could be applied/used for receiving the first PDSCH(s) and the second indicated TCI state/pair of TCI states could be applied/used for receiving the second PDSCH(s). If the DCI (e.g., the scheduling DCI or the beam indication DCI with or without DL assignment) is received in a CORESET configured/associated with the indicator/parameter in the corresponding ControlResourceSet set to '1' (or '0'), the first indicated TCI state/pair of TCI states could be applied/used for receiving the second PDSCH(s) and the second indicated TCI state/pair of TCI states could be applied/used for receiving the first PDSCH(s). The UE 116 could be configured/indicated/provided by the network 130, e.g., via higher layer RRC signaling/parameter and/or MAC CE command and/or dynamic DCI based L1 signaling, the first and/or second PDSCHs and their corresponding/respective configuration information.

In yet another example, if the DCI (e.g., the scheduling DCI or the beam indication DCI with or without DL assignment) is received in a CORESET configured/associated with the indicator/parameter in the corresponding ControlResourceSet set to '0' (or '1'), the first indicated TCI state/pair of TCI states could still be applied/used for all PDSCH receptions and if the DCI (e.g., the scheduling DCI or the beam indication DCI with or without DL assignment) is received in a CORESET configured/associated with the indicator/parameter in the corresponding ControlResourceSet set to '1' (or '0'), the first indicated TCI state/pair of TCI states could be applied/used for receiving the first (or second) PDSCH(s). The second indicated TCI state/pair of TCI states could be applied/used for receiving the second (or first) PDSCH(s). The UE 116 could be configured/indicated/provided by the network 130, e.g., via higher layer RRC signaling/parameter and/or MAC CE command and/or dynamic DCI based L1 signaling, the first and/or second PDSCHs and their corresponding/respective configuration information.

In yet another example, if the DCI (e.g., the scheduling DCI or the beam indication DCI with or without DL assignment) is received in a CORESET configured/associated with the indicator/parameter in the corresponding ControlResourceSet set to '0' (or '1'), the second indicated TCI state/pair of TCI states could be applied/used for all PDSCH receptions—change of TRP that transmits the PDSCH(s). If the DCI (e.g., the scheduling DCI or the beam indication DCI with or without DL assignment) is received in a CORESET configured/associated with the indicator/parameter in the corresponding ControlResourceSet set to '1' (or '0'), the first indicated TCI state/pair of TCI states could be applied/used for receiving the first (or second) PDSCH(s) and the second indicated TCI state/pair of TCI states could be applied/used for receiving the second (or first) PDSCH(s). The UE 116 could be configured/indicated/provided by the network 130, e.g., via higher layer RRC signaling/parameter and/or MAC CE command and/or dynamic DCI based L1 signaling, the first and/or second PDSCHs and their corresponding/respective configuration information.

In yet another example, if the DCI (e.g., the scheduling DCI or the beam indication DCI with or without DL assignment) is received in a CORESET configured/associated with the indicator/parameter in the corresponding ControlResourceSet set to '0' (or '1'), the first indicated TCI state/pair of TCI states could be applied/used for receiving the first PDSCH DM-RS(s) (or, equivalently, the RS(s) in the RS set(s) provided in the first indicated TCI state/pair of TCI states could be QCL'ed with the first DM-RS antenna port(s) for PDSCH reception(s)) and the second indicated TCI state/pair of TCI states could be applied/used for receiving the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s)). If the DCI (e.g., the scheduling DCI or the beam indication DCI with or without DL assignment) is received in a CORESET configured/associated with the indicator/parameter in the corresponding ControlResourceSet set to '1' (or '0'), the first indicated TCI state/pair of TCI states could be applied/used for receiving the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s)) and the second indicated TCI state/pair of TCI states could be applied/used for receiving the first PDSCH DM-RS(s) (or, equivalently, the RS(s) in the RS set(s) provided in the second indicated TCI state/pair of TCI states could be QCL'ed with the first DM-RS antenna port(s) for PDSCH reception(s)).

In yet another example, if the DCI (e.g., the scheduling DCI or the beam indication DCI with or without DL assignment) is received in a CORESET configured/associated with the indicator/parameter in the corresponding ControlResourceSet set to '00' ('01', '10' or '11'), the first indicated TCI state/pair of TCI states could still be applied/used for all PDSCH receptions. If the DCI (e.g., the scheduling DCI or the beam indication DCI with or without DL assignment) is received in a CORESET configured/associated with the indicator/parameter in the corresponding ControlResourceSet set to '01' ('00', '10' or '11'), the second indicated TCI state/pair of TCI states could be applied/used for all PDSCH receptions—change of TRP that transmits the PDSCH(s). If the DCI (e.g., the scheduling DCI or the beam indication DCI with or without DL assignment) is received in a CORESET configured/associated with the indicator/parameter in the corresponding ControlResourceSet set to '10' ('00', '01' or '11'), the first indicated TCI state/pair of TCI states could be applied/used for receiving the first PDSCH(s) and the second indicated TCI state/pair of TCI states could be applied/used for receiving the second PDSCH(s). If the DCI (e.g., the scheduling DCI or the beam indication DCI with or without DL assignment) is received in a CORESET configured/associated with the indicator/parameter in the corresponding ControlResourceSet set to '11' ('00', '01' or '10'), the first indicated TCI state/pair of TCI states could be applied/used for receiving the second PDSCH(s), and the second indicated TCI state/pair of TCI states could be applied/used for receiving the first PDSCH(s).

In yet another example, if the DCI (e.g., the scheduling DCI or the beam indication DCI with or without DL assignment) is received in a CORESET configured/associated with the indicator/parameter in the corresponding ControlResourceSet set to '00' ('01', '10' or '11'), the first indicated TCI state/pair of TCI states could still be applied/used for all PDSCH receptions. If the DCI (e.g., the scheduling DCI or the beam indication DCI with or without DL assignment) is received in a CORESET configured/associated with the indicator/parameter in the corresponding ControlResourceSet set to '01' ('00', '10' or '11'), the second indicated TCI state/pair of TCI states could be applied/used for all PDSCH receptions—change of TRP that transmits the PDSCH(s). If the DCI (e.g., the scheduling DCI or the beam indication DCI with or without DL assignment) is received in a CORESET configured/associated with the indicator/parameter in the corresponding ControlResourceSet set to '10' ('00', '01' or '11'), the first indicated TCI state/pair of TCI states could be applied/used for receiving the first PDSCH DM-RS(s) (or, equivalently, the RS(s) in the RS set(s) provided in the first indicated TCI state/pair of TCI states could be QCL'ed with the first DM-RS antenna port(s) for PDSCH reception(s)) and the second indicated TCI state/pair of TCI states could be applied/used for receiving the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s)). If the DCI (e.g., the scheduling DCI or the beam indication DCI with or without DL assignment) is received in a CORESET configured/associated with the indicator/parameter in the corresponding ControlResourceSet set to '11' ('00', '01' or '10'), the first indicated TCI state/pair of TCI states could be applied/used for receiving the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s)) and the second indicated TCI state/pair of TCI states could be applied/used for receiving the first PDSCH DM-RS(s) (or, equivalently, the RS(s) in the RS set(s)

provided in the second indicated TCI state/pair of TCI states could be QCL'ed with the first DM-RS antenna port(s) for PDSCH reception(s)).

The UE 116 could be provided/configured/indicated by the network 130, e.g., via higher layer RRC signaling/parameter and/or MAC CE command and/or dynamic DCI based L1 signaling, to follow one or more examples (e.g., one or more examples described herein) and/or combination(s) of one or more examples described herein to determine the association between the indicated TCI state(s) and the PDSCH reception(s). For instance, a higher layer parameter 'dynamicBeamSelectionCoreset' can be provided/configured/indicated in, e.g., PDSCH-Config. When/if the higher layer parameter 'dynamicBeamSelectionCoreset' is set to 'enabled', the UE 116 could follow one or more examples described herein and/or combination(s) of one or more examples described herein to determine the association between the indicated TCI state(s) and the PDSCH reception(s).

For another example, the UE 116 could be indicated/provided/configured by the network 130, e.g., in a beam indication/activation MAC CE or beam indication DCI (e.g., DCI format 1_1 or 1_2 with or without DL assignment), one or more, e.g., N 1 or M 1 (e.g., N=2 or M=2), TCI states/pairs of TCI states for UE-dedicated DL channels/signals receptions and/or UL channels/signals transmissions. The indicated TCI states/pairs of TCI states could be different from the previously indicated (first and/or second) TCI states/pairs of TCI states described/discussed herein and can therefore be referred to as newly indicated TCI states/pairs of TCI states. In a beam indication DCI, the TCI state(s)/pair(s) of TCI states could be indicated/provided by one or more TCI codepoints in one or more TCI fields (e.g., the existing TCI field).

In one example, the UE 116 could follow the indicator/parameter provided/indicated/configured in PDSCH-Config described herein, the fixed rule(s) described herein, or the predefined rule(s) described herein to determine the association between the newly indicated TCI state(s) and the PDSCH reception(s).

For example, for N=1 or M=1, the newly indicated TCI state/pair of TCI states could be applied/used for all PDSCH receptions before or after the corresponding beam application time.

For another example, for N=2 or M=2, the newly indicated first TCI state/pair of TCI states could be applied/used for all PDSCH receptions before or after the corresponding beam application time.

Yet for another example, the previously indicated first TCI state/pair of TCI states could still be applied/used for all PDSCH receptions before or after the corresponding beam application time. Here, the beam application time starts from the first slot that is at least BeamAppTime_r17 symbols after the last symbol of the PUCCH.

In another example, the UE 116 could be indicated/provided/configured by the network 130, e.g., in a beam indication/activation MAC CE or beam indication DCI (e.g., DCI format 1_1 or 1_2 with or without DL assignment), a single TCI state/pair of TCI states (i.e., N=1 or M=1) for UE-dedicated DL channels/signals receptions and/or UL channels/signals transmissions. When/if the newly indicated TCI state/pair of TCI states correspond to the previously indicated first TCI state/pair of TCI states, the UE 116 could still use/apply the previously indicated first TCI state/pair of TCI states to receive the PDSCH(s) before or after the corresponding beam application time. Here, the beam application time starts from the first slot that is at least BeamAppTime_r17 symbols after the last symbol of the PUCCH. Alternatively, the UE 116 could be indicated/provided/configured by the network 130, e.g., in a beam indication/activation MAC CE or beam indication DCI (e.g., DCI format 1_1 or 1_2 with or without DL assignment), two TCI states/pairs of TCI states (i.e., N=2 or M=2) for UE-dedicated DL channels/signals receptions and/or UL channels/signals transmissions. Both newly indicated TCI states/pairs of TCI states could be the same/identical and they could correspond to the previously indicated first TCI state/pair of TCI states. For this case, the UE 116 could still use/apply the previously indicated first TCI state/pair of TCI states to receive the PDSCH(s) before or after the corresponding beam application time. Here, the beam application time starts from the first slot that is at least BeamAppTime_r17 symbols after the last symbol of the PUCCH.

In another example, the UE 116 could be indicated/provided/configured by the network 130, e.g., in a beam indication/activation MAC CE or beam indication DCI (e.g., DCI format 1_1 or 1_2 with or without DL assignment), a single TCI state/pair of TCI states (i.e., N=1 or M=1) for UE-dedicated DL channels/signals receptions and/or UL channels/signals transmissions. When/if the newly indicated TCI state/pair of TCI states correspond to the previously indicated second TCI state/pair of TCI states, the UE 116 could use/apply the previously indicated second TCI state/pair of TCI states to receive the PDSCH(s) before or after the corresponding beam application time. Here, the beam application time starts from the first slot that is at least BeamAppTime_r17 symbols after the last symbol of the PUCCH. Optionally, the UE 116 could be indicated/provided/configured by the network 130, e.g., in a beam indication/activation MAC CE or beam indication DCI (e.g., DCI format 1_1 or 1_2 with or without DL assignment), a single TCI state/pair of TCI states (i.e., N=1 or M=1) for UE-dedicated DL channels/signals receptions and/or UL channels/signals transmissions. The newly indicated TCI state/pair of TCI states could be different from the previously indicated first and/or second TCI states/pairs of TCI states. For this case, the UE 116 could use/apply the newly indicated TCI state/pair of TCI states to receive the PDSCH(s) before or after the corresponding beam application time. Here, the beam application time starts from the first slot that is at least BeamAppTime_r17 symbols after the last symbol of the PUCCH. Alternatively, the UE 116 could be indicated/provided/configured by the network 130, e.g., in a beam indication/activation MAC CE or beam indication DCI (e.g., DCI format 1_1 or 1_2 with or without DL assignment), two TCI states/pairs of TCI states (i.e., N=2 or M=2) for UE-dedicated DL channels/signals receptions and/or UL channels/signals transmissions. Both newly indicated TCI states/pairs of TCI states could be the same/identical. Furthermore, they could correspond to the previously indicated second TCI state/pair of TCI states or they could be different from the previously indicated first and/or second TCI states/pairs of TCI states (they both correspond to a newly indicated TCI state/pair of TCI states). For this case, the UE 116 could use/apply the previously indicated second TCI state/pair of TCI states, or the newly indicated TCI state/pair of TCI states, to receive the PDSCH(s) before or after the corresponding beam application time. Here, the beam application time starts from the first slot that is at least BeamAppTime_r17 symbols after the last symbol of the PUCCH.

In yet another example, the UE 116 could be indicated/provided/configured by the network 130, e.g., in a beam indication/activation MAC CE or beam indication DCI (e.g., DCI format 1_1 or 1_2 with or without DL assignment), two TCI states/pairs of TCI states (i.e., N=2 or M=2) for UE-dedicated DL channels/signals receptions and/or UL channels/signals transmissions. The newly indicated first TCI state/pair of TCI states could be the same as or different from the previously indicated first (or second) TCI state/pair of TCI states, and/or the newly indicated second TCI state/pair of TCI states could be the same as or different from the previously indicated second (or first) TCI state/pair of TCI states. For this case, the UE 116 could use/apply the newly indicated first TCI state/pair of TCI states (e.g., corresponding to the previously indicated first or second TCI state/pair of TCI states) to receive the first (or second) PDSCH(s) before or after the corresponding beam application time, and the newly indicated second TCI state/pair of TCI states (e.g., corresponding to the previously indicated first or second TCI state/pair of TCI states) to receive the second (or first) PDSCH(s) before or after the corresponding beam application time. Here, the beam application time starts from the first slot that is at least BeamAppTime_r17 symbols after the last symbol of the PUCCH.

In yet another example, the UE 116 could be indicated/provided/configured by the network 130, e.g., in a beam indication/activation MAC CE or beam indication DCI (e.g., DCI format 1_1 or 1_2 with or without DL assignment), two TCI states/pairs of TCI states (i.e., N=2 or M=2) for UE-dedicated DL channels/signals receptions and/or UL channels/signals transmissions. The newly indicated first TCI state/pair of TCI states could be the same as or different from the previously indicated first (or second) TCI state/pair of TCI states, and/or the newly indicated second TCI state/pair of TCI states could be the same as or different from the previously indicated second (or first) TCI state/pair of TCI states. For this case, the UE 116 could use/apply the newly indicated first TCI state/pair of TCI states (e.g., corresponding to the previously indicated first or second TCI state/pair of TCI states) to receive the first (or second) PDSCH DM-RS(s) (or, equivalently, the RS(s) in the RS set(s) provided in the newly indicated first TCI state/pair of TCI states could be QCL'ed with the first (or second) DM-RS antenna port(s) for PDSCH reception(s)) before or after the corresponding beam application time and the newly indicated second TCI state/pair of TCI states (e.g., corresponding to the previously indicated first or second TCI state/pair of TCI states) to receive the second (or first) PDSCH DM-RS(s) (or, equivalently, the RS(s) in the RS set(s) provided in the newly indicated second TCI state/pair of TCI states could be QCL'ed with the second (or first) DM-RS antenna port(s) for PDSCH reception(s)) before or after the corresponding beam application time. Here, the beam application time starts from the first slot that is at least BeamAppTime_r17 symbols after the last symbol of the PUCCH.

In yet another example, the UE 116 could follow the examples specified herein, e.g., following one or more examples described herein, to determine which one or more of the indicated TCI states/pairs of TCI states to use/apply for PDSCH reception(s).

The UE 116 could be provided/configured/indicated by the network 130, e.g., via higher layer RRC signaling/parameter and/or MAC CE command and/or dynamic DCI based L1 signaling, to follow one or more examples described herein and/or combination(s) of one or more examples specified/discussed herein to determine the association between the indicated TCI state(s) and the PDSCH reception(s). For instance, a higher layer parameter 'dynamicBeamSelectionTCI' can be provided/configured/indicated in, e.g., PDSCH-Config. When/if the higher layer parameter 'dynamicBeamSelectionTCI' is set to 'enabled', the UE 116 could follow one or more examples described herein and/or combination(s) of one or more of the examples specified/discussed herein to determine the association between the indicated TCI state(s) and the PDSCH reception(s).

Yet for another example, the UE 116 could be provided/configured/indicated by the network 130, via an indicator field in a DCI (e.g., the scheduling DCI or the beam indication DCI with or without DL assignment), the association between one or more of the indicated TCI states and PDSCH reception(s).

For example, the indicator field could be an existing DCI field in the corresponding DCI and repurposed to indicate/provide/configure the association between the indicated TCI state(s) and the PDSCH reception(s).

For another example, the indicator field could be a new DCI field introduced in the corresponding DCI dedicated to indicating/configuring/providing the association between the indicated TCI state(s) and the PDSCH reception(s).

Yet for another example, the indicator field could be configured by the network 130, e.g., via higher layer RRC signaling and/or MAC CE command and/or dynamic DCI based signaling. For instance, the indicator field could be higher layer RRC configured and/or MAC CE indicated and/or DCI signaled to 'on', 'off', 'enabled', 'disabled', 'present', 'absent'; that is, whether or not the indicator field is present in the corresponding DCI (e.g., DCI format 1_1 or 1_2) is configured/controlled by the network 130, e.g., via higher layer RRC signaling and/or MAC CE command and/or dynamic DCI based L1 signaling.

In one example, when/if the DCI indicator/indicator field discussed herein is absent, disabled, or not provided/configured/indicated/specified/defined in the corresponding DCI (e.g., the scheduling DCI or the beam indication DCI with or without DL assignment), the UE 116 could follow the indicator/parameter provided/indicated/configured in PDSCH-Config described herein, the fixed rule(s) described herein, or the predefined rule(s) described herein to determine the association between the indicated TCI state(s) and the PDSCH reception(s).

In another example, if the indicator in the DCI (e.g., the scheduling DCI or the beam indication DCI with or without DL assignment) is set to '0', the first indicated TCI state/pair of TCI states could still be applied/used for all PDSCH receptions before or after a beam association application time. If the indicator in the DCI (e.g., the scheduling DCI or the beam indication DCI with or without DL assignment) is set to '1', the second indicated TCI state/pair of TCI states could be applied/used for all PDSCH receptions—change of TRP that transmits the PDSCH(s)—before or after a beam association application time.

In yet another example, if the indicator in the DCI (e.g., the scheduling DCI or the beam indication DCI with or without DL assignment) is set to '0', the second indicated TCI state/pair of TCI states could be applied/used for all PDSCH receptions—change of TRP that transmits the PDSCH(s)—before or after a beam association application time. If the indicator in the DCI (e.g., the scheduling DCI or the beam indication DCI with or without DL assignment) is set to '1', the first indicated TCI state/pair of TCI states could still be applied/used for all PDSCH receptions before or after a beam association application time.

In yet another example, if the indicator in the DCI (e.g., the scheduling DCI or the beam indication DCI with or without DL assignment) is set to '0' (or '1'), the first indicated TCI state/pair of TCI states could be applied/used for receiving the first PDSCH(s) and the second indicated TCI state/pair of TCI states could be applied/used for receiving the second PDSCH(s), before or after a beam association application time. If the indicator in the DCI (e.g., the scheduling DCI or the beam indication DCI with or without DL assignment) is set to '1' (or '0'), the first indicated TCI state/pair of TCI states could be applied/used for receiving the second PDSCH(s) and the second indicated TCI state/pair of TCI states could be applied/used for receiving the first PDSCH(s), before or after a beam association application time. The UE 116 could be configured/indicated/provided by the network 130, e.g., via higher layer RRC signaling/parameter and/or MAC CE command and/or dynamic DCI based L1 signaling, the first and/or second PDSCHs and their corresponding/respective configuration information.

In yet another example, if the indicator in the DCI (e.g., the scheduling DCI or the beam indication DCI with or without DL assignment) is set to '0' (or '1'), the first indicated TCI state/pair of TCI states could still be applied/used for all PDSCH receptions before or after a beam association application time. If the indicator in the DCI (e.g., the scheduling DCI or the beam indication DCI with or without DL assignment) is set to '1' (or '0'), the first indicated TCI state/pair of TCI states could be applied/used for receiving the first (or second) PDSCH(s) and the second indicated TCI state/pair of TCI states could be applied/used for receiving the second (or first) PDSCH(s), before or after a beam association application time. The UE 116 could be configured/indicated/provided by the network 130, e.g., via higher layer RRC signaling/parameter and/or MAC CE command and/or dynamic DCI based L1 signaling, the first and/or second PDSCHs and their corresponding/respective configuration information.

In yet another example, if the indicator in the DCI (e.g., the scheduling DCI or the beam indication DCI with or without DL assignment) is set to '0' (or '1'), the second indicated TCI state/pair of TCI states could be applied/used for all PDSCH receptions—change of TRP that transmits the PDSCH(s)—before or after a beam association application time, and if the indicator in the DCI (e.g., the scheduling DCI or the beam indication DCI with or without DL assignment) is set to '1' (or '0'), the first indicated TCI state/pair of TCI states could be applied/used for receiving the first (or second) PDSCH(s) and the second indicated TCI state/pair of TCI states could be applied/used for receiving the second (or first) PDSCH(s), before or after a beam association application time. The UE 116 could be configured/indicated/provided by the network 130, e.g., via higher layer RRC signaling/parameter and/or MAC CE command and/or dynamic DCI based L1 signaling, the first and/or second PDSCHs and their corresponding/respective configuration information.

In yet another example, if the indicator in the DCI (e.g., the scheduling DCI or the beam indication DCI with or without DL assignment) is set to '0' (or '1'), the first indicated TCI state/pair of TCI states could be applied/used for receiving the first PDSCH DM-RS(s) (or, equivalently, the RS(s) in the RS set(s) provided in the first indicated TCI state/pair of TCI states could be QCL'ed with the first DM-RS antenna port(s) for PDSCH reception(s)) before or after a beam association application time and the second indicated TCI state/pair of TCI states could be applied/used for receiving the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s)) before or after a beam association application time. If the indicator in the DCI (e.g., the scheduling DCI or the beam indication DCI with or without DL assignment) is set to '1' (or '0'), the first indicated TCI state/pair of TCI states could be applied/used for receiving the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s)) before or after a beam association application time and the second indicated TCI state/pair of TCI states could be applied/used for receiving the first PDSCH DM-RS(s) (or, equivalently, the RS(s) in the RS set(s) provided in the second indicated TCI state/pair of TCI states could be QCL'ed with the first DM-RS antenna port(s) for PDSCH reception(s)) before or after a beam association application time.

In yet another example, if the indicator in the DCI (e.g., the scheduling DCI or the beam indication DCI with or without DL assignment) is set to '00' ('01', '10' or '11'), the first indicated TCI state/pair of TCI states could still be applied/used for all PDSCH receptions before or after a beam association application time. If the indicator in the DCI (e.g., the scheduling DCI or the beam indication DCI with or without DL assignment) is set to '01' ('00', '10' or '11'), the second indicated TCI state/pair of TCI states could be applied/used for all PDSCH receptions—change of TRP that transmits the PDSCH(s)—before or after a beam association application time. If the indicator in the DCI (e.g., the scheduling DCI or the beam indication DCI with or without DL assignment) is set to '10' ('00', '01' or '11'), the first indicated TCI state/pair of TCI states could be applied/used for receiving the first PDSCH(s) and the second indicated TCI state/pair of TCI states could be applied/used for receiving the second PDSCH(s), before or after a beam association application time. If the indicator in the DCI (e.g., the scheduling DCI or the beam indication DCI with or without DL assignment) is set to '11' ('00', '01' or '10'), the first indicated TCI state/pair of TCI states could be applied/used for receiving the second PDSCH(s) and the second indicated TCI state/pair of TCI states could be applied/used for receiving the first PDSCH(s), before or after a beam association application time.

In yet another example, if the indicator in the DCI (e.g., the scheduling DCI or the beam indication DCI with or without DL assignment) is set to '00' ('01', '10' or '11'), the first indicated TCI state/pair of TCI states could still be applied/used for all PDSCH receptions before or after a beam association application time. If the indicator in the DCI (e.g., the scheduling DCI or the beam indication DCI with or without DL assignment) is set to '01' ('00', '10' or '11'), the second indicated TCI state/pair of TCI states could be applied/used for all PDSCH receptions—change of TRP that transmits the PDSCH(s)—before or after a beam association application time. If the indicator in the DCI (e.g., the scheduling DCI or the beam indication DCI with or without DL assignment) is set to '10' ('00', '01' or '11'), the first indicated TCI state/pair of TCI states could be applied/used for receiving the first PDSCH DM-RS(s) (or, equivalently, the RS(s) in the RS set(s) provided in the first indicated TCI state/pair of TCI states could be QCL'ed with the first DM-RS antenna port(s) for PDSCH reception(s)) and the second indicated TCI state/pair of TCI states could be applied/used for receiving the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s)), before or after a beam association application time. If the indicator in the DCI (e.g., the scheduling DCI or the beam indication DCI with or without DL assignment) is set to '11' ('00', '01' or '10'), the first indicated TCI state/pair of TCI states could be applied/used for receiving the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s)) and the second indicated TCI state/pair of TCI states could be applied/used for receiving the first PDSCH DM-RS(s) (or, equivalently, the RS(s) in the RS set(s) provided in the second indicated TCI state/pair of TCI states could be QCL'ed with the first DM-RS antenna port(s) for PDSCH reception(s)), before or after a beam association application time.

The UE 116 could be provided/configured/indicated by the network 130, e.g., via higher layer RRC signaling/parameter and/or MAC CE command and/or dynamic DCI based L1 signaling, to follow one or more examples described herein and/or combination(s) of one or more examples specified/discussed herein to determine the association between the indicated TCI state(s) and the PDSCH reception(s). For instance, a higher layer parameter 'dynamicBeamSelectionDCI' can be provided/configured/indicated in, e.g., PDSCH-Config. When/if the higher layer parameter 'dynamicBeamSelectionDCI' is set to 'enabled', the UE 116 could follow one or more examples described herein and/or combination(s) of one or more of the examples specified/discussed herein to determine the association between the indicated TCI state(s) and the PDSCH reception(s).

In another example, the UE 116 could be first informed/provided/configured/indicated by the network 130, e.g., by the indicator/parameter in PDSCH-Config described herein, the UE 116 could first follow a fixed rule specified herein (e.g., follow one or more examples described herein), or the UE 116 could first follow a predefined rule specified herein (e.g., follow one or more examples described herein) to determine a default association between one or more indicated TCI states/pairs of TCI states and PDSCH reception(s) such that the second indicated TCI state/pair of TCI states is applied/used for all PDSCH receptions. That is, the indicators/parameters in all PDSCH-Config's for all PDSCHs could be set to the same value '1' (or '0', '00', '01', '10' or '11') according to the descriptions/discussions herein, the fixed rule specified herein (e.g., according to one or more examples described herein) indicates/informs/tells/states that the second indicated TCI state/pair of TCI states is applied/used for all PDSCH receptions, or the predefined rule specified herein (e.g., according to one or more examples described herein) indicates/informs/tells/states that the second indicated TCI state/pair of TCI states could be applied/used for all PDSCH receptions. The UE 116 could then follow one or more of the examples specified/provided herein to further determine the association between the indicated TCI state(s) and the PDSCH reception(s).

For example, the UE 116 could be provided/indicated/configured by the network 130, in a higher layer parameter, e.g., ControlResourceSet for a CORESET, an indicator/parameter to inform/provide/configure/indicate the UE 116 the association between the indicated TCI state(s) and the PDSCH reception(s), wherein different CORESETs configured with the same indicator/parameter could be in a same CORESET group.

In one example, when/if the indicator/parameter discussed herein is absent, disabled, or not provided/configured/indicated/specified/defined in ControlResourceSet, and/or when/if all CORESETs are configured/associated with same indicators/parameters set to '0's or '1's or '00's or '01's or '10's or '11's, the UE 116 could follow the indicator/parameter provided/indicated/configured in PDSCH-Config described herein, the fixed rule(s) described herein, or the predefined rule(s) described herein to determine the association between the indicated TCI state(s) and the PDSCH reception(s).

In another example, if the DCI (e.g., the scheduling DCI or the beam indication DCI with or without DL assignment) is received in a CORESET configured/associated with the indicator/parameter in the corresponding ControlResourceSet set to '0', the second indicated TCI state/pair of TCI states could still be applied/used for all PDSCH receptions. If the DCI (e.g., the scheduling DCI or the beam indication DCI with or without DL assignment) is received in a CORESET configured/associated with the indicator/parameter in the corresponding ControlResourceSet set to '1', the first indicated TCI state/pair of TCI states could be applied/used for all PDSCH receptions—change of TRP that transmits the PDSCH(s).

In yet another example, if the DCI (e.g., the scheduling DCI or the beam indication DCI with or without DL assignment) is received in a CORESET configured/associated with the indicator/parameter in the corresponding ControlResourceSet set to '0', the first indicated TCI state/pair of TCI states could be applied/used for all PDSCH receptions—change of TRP that transmits the PDSCH(s), and if the DCI (e.g., the scheduling DCI or the beam indication DCI with or without DL assignment) is received in a CORESET configured/associated with the indicator/parameter in the corresponding ControlResourceSet set to '1', the second indicated TCI state/pair of TCI states could still be applied/used for all PDSCH receptions.

In yet another example, if the DCI (e.g., the scheduling DCI or the beam indication DCI with or without DL assignment) is received in a CORESET configured/associated with the indicator/parameter in the corresponding ControlResourceSet set to '0' (or '1'), the first indicated TCI state/pair of TCI states could be applied/used for receiving the first PDSCH(s) and the second indicated TCI state/pair of TCI states could be applied/used for receiving the second PDSCH(s). If the DCI (e.g., the scheduling DCI or the beam indication DCI with or without DL assignment) is received in a CORESET configured/associated with the indicator/parameter in the corresponding ControlResourceSet set to '1' (or '0'), the first indicated TCI state/pair of TCI states could be applied/used for receiving the second PDSCH(s) and the second indicated TCI state/pair of TCI states could be applied/used for receiving the first PDSCH(s). The UE 116 could be configured/indicated/provided by the network 130, e.g., via higher layer RRC signaling/parameter and/or MAC CE command and/or dynamic DCI based L1 signaling, the first and/or second PDSCHs and their corresponding/respective configuration information.

In yet another example, if the DCI (e.g., the scheduling DCI or the beam indication DCI with or without DL assignment) is received in a CORESET configured/associated with the indicator/parameter in the corresponding ControlResourceSet set to '0' (or '1'), the second indicated TCI state/pair of TCI states could still be applied/used for all PDSCH receptions. If the DCI (e.g., the scheduling DCI or the beam indication DCI with or without DL assignment) is received in a CORESET configured/associated with the indicator/parameter in the corresponding ControlResourceSet set to '1' (or '0'), the first indicated TCI state/pair of TCI states could be applied/used for receiving the first (or second) PDSCH(s) and the second indicated TCI state/pair of TCI states could be applied/used for receiving the second (or first) PDSCH(s). The UE 116 could be configured/indicated/provided by the network 130, e.g., via higher layer RRC signaling/parameter and/or MAC CE command and/or dynamic DCI based L1 signaling, the first and/or second PDSCHs and their corresponding/respective configuration information.

In yet another example, if the DCI (e.g., the scheduling DCI or the beam indication DCI with or without DL assignment) is received in a CORESET configured/associated with the indicator/parameter in the corresponding ControlResourceSet set to '0' (or '1'), the first indicated TCI state/pair of TCI states could be applied/used for all PDSCH receptions—change of TRP that transmits the PDSCH(s). If the DCI (e.g., the scheduling DCI or the beam indication DCI with or without DL assignment) is received in a CORESET configured/associated with the indicator/parameter in the corresponding ControlResourceSet set to '1' (or '0'), the first indicated TCI state/pair of TCI states could be applied/used for receiving the first (or second) PDSCH(s) and the second indicated TCI state/pair of TCI states could be applied/used for receiving the second (or first) PDSCH(s). The UE 116 could be configured/indicated/provided by the network 130, e.g., via higher layer RRC signaling/parameter and/or MAC CE command and/or dynamic DCI based L1 signaling, the first and/or second PDSCHs and their corresponding/respective configuration information.

In yet another example, if the DCI (e.g., the scheduling DCI or the beam indication DCI with or without DL assignment) is received in a CORESET configured/associated with the indicator/parameter in the corresponding ControlResourceSet set to '0' (or '1'), the first indicated TCI state/pair of TCI states could be applied/used for receiving the first PDSCH DM-RS(s) (or, equivalently, the RS(s) in the RS set(s) provided in the first indicated TCI state/pair of TCI states could be QCL'ed with the first DM-RS antenna port(s) for PDSCH reception(s)) and the second indicated TCI state/pair of TCI states could be applied/used for receiving the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s)). If the DCI (e.g., the scheduling DCI or the beam indication DCI with or without DL assignment) is received in a CORESET configured/associated with the indicator/parameter in the corresponding ControlResourceSet set to '1' (or '0'), the first indicated TCI state/pair of TCI states could be applied/used for receiving the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s)) and the second indicated TCI state/pair of TCI states could be applied/used for receiving the first PDSCH DM-RS(s) (or, equivalently, the RS(s) in the RS set(s) provided in the second indicated TCI state/pair of TCI states could be QCL'ed with the first DM-RS antenna port(s) for PDSCH reception(s)).

In yet another example, if the DCI (e.g., the scheduling DCI or the beam indication DCI with or without DL assignment) is received in a CORESET configured/associated with the indicator/parameter in the corresponding ControlResourceSet set to '00' ('01', '10' or '11'), the second indicated TCI state/pair of TCI states could still be applied/used for all PDSCH receptions. If the DCI (e.g., the scheduling DCI or the beam indication DCI with or without DL assignment) is received in a CORESET configured/associated with the indicator/parameter in the corresponding ControlResourceSet set to '01' ('00', '10' or '11'), the first indicated TCI state/pair of TCI states could be applied/used for all PDSCH receptions—change of TRP that transmits the PDSCH(s). If the DCI (e.g., the scheduling DCI or the beam indication DCI with or without DL assignment) is received in a CORESET configured/associated with the indicator/parameter in the corresponding ControlResourceSet set to '10' ('00', '01' or '11'), the first indicated TCI state/pair of TCI states could be applied/used for receiving the first PDSCH(s) and the second indicated TCI state/pair of TCI states could be applied/used for receiving the second PDSCH(s). If the DCI (e.g., the scheduling DCI or the beam indication DCI with or without DL assignment) is received in a CORESET configured/associated with the indicator/parameter in the corresponding ControlResourceSet set to '11' ('00', '01' or '10'), the first indicated TCI state/pair of TCI states could be applied/used for receiving the second PDSCH(s) and the second indicated TCI state/pair of TCI states could be applied/used for receiving the first PDSCH(s).

In yet another example, if the DCI (e.g., the scheduling DCI or the beam indication DCI with or without DL assignment) is received in a CORESET configured/associated with the indicator/parameter in the corresponding ControlResourceSet set to '00' ('01', '10' or '11'), the second indicated TCI state/pair of TCI states could still be applied/used for all PDSCH receptions. If the DCI (e.g., the scheduling DCI or the beam indication DCI with or without DL assignment) is received in a CORESET configured/associated with the indicator/parameter in the corresponding ControlResourceSet set to '01' ('00', '10' or '11'), the first indicated TCI state/pair of TCI states could be applied/used for all PDSCH receptions—change of TRP that transmits the PDSCH(s). If the DCI (e.g., the scheduling DCI or the beam indication DCI with or without DL assignment) is received in a CORESET configured/associated with the indicator/parameter in the corresponding ControlResourceSet set to '10' ('00', '01' or '11'), the first indicated TCI state/pair of TCI states could be applied/used for receiving the first PDSCH DM-RS(s) (or, equivalently, the RS(s) in the RS set(s) provided in the first indicated TCI state/pair of TCI states could be QCL'ed with the first DM-RS antenna port(s) for PDSCH reception(s)) and the second indicated TCI state/pair of TCI states could be applied/used for receiving the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s)). If the DCI (e.g., the scheduling DCI or the beam indication DCI with or without DL assignment) is received in a CORESET configured/associated with the indicator/parameter in the corresponding ControlResourceSet set to '11' ('00', '01' or '10'), the first indicated TCI state/pair of TCI states could be applied/used for receiving the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s)) and the second indicated TCI state/pair of TCI states could be applied/used for receiving the first PDSCH DM-RS(s) (or, equivalently, the RS(s) in the RS set(s) provided in the second indicated TCI state/pair of TCI states could be QCL'ed with the first DM-RS antenna port(s) for PDSCH reception(s)).

The UE 116 could be provided/configured/indicated by the network 130, e.g., via higher layer RRC signaling/parameter and/or MAC CE command and/or dynamic DCI based L1 signaling, to follow one or more examples described herein and/or combination(s) of one or more of the examples specified/discussed herein to determine the association between the indicated TCI state(s) and the PDSCH reception(s). For instance, a higher layer parameter 'dynamicBeamSelectionCoreset' can be provided/configured/indicated in, e.g., PDSCH-Config. When/if the higher layer parameter 'dynamicBeamSelectionCoreset' is set to 'enabled', the UE 116 could follow one or more examples described herein and/or combination(s) of one or more of the examples specified/discussed herein to determine the association between the indicated TCI state(s) and the PDSCH reception(s).

For another example, the UE 116 could be indicated/provided/configured by the network 130, e.g., in a beam indication/activation MAC CE or beam indication DCI (e.g., DCI format 1_1 or 1_2 with or without DL assignment), one or more, e.g., N 1 or M 1 (e.g., N=2 or M=2), TCI states/pairs of TCI states for UE-dedicated DL channels/signals receptions and/or UL channels/signals transmissions. The indicated TCI states/pairs of TCI states could be different from the previously indicated (first and/or second) TCI states/pairs of TCI states described/discussed herein and can; therefore, be referred to as newly indicated TCI states/pairs of TCI states. In a beam indication DCI, the TCI state(s)/pair(s) of TCI states could be indicated/provided by one or more TCI codepoints in one or more TCI fields (e.g., the existing TCI field).

In one example, the UE 116 could follow the indicator/parameter provided/indicated/configured in PDSCH-Config described herein, the fixed rule(s) described herein, or the predefined rule(s) described herein to determine the association between the newly indicated TCI state(s) and the PDSCH reception(s).

For example, for N=1 or M=1, the newly indicated TCI state/pair of TCI states could be applied/used for all PDSCH receptions before or after the corresponding beam application time.

For another example, for N=2 or M=2, the newly indicated second TCI state/pair of TCI states could be applied/used for all PDSCH receptions before or after the corresponding beam application time.

Yet for another example, the previously indicated second TCI state/pair of TCI states could still be applied/used for all PDSCH receptions before or after the corresponding beam application time. Here, the beam application time starts from the first slot that is at least BeamAppTime_r17 symbols after the last symbol of the PUCCH.

In another example, the UE 116 could be indicated/provided/configured by the network 130, e.g., in a beam indication/activation MAC CE or beam indication DCI (e.g., DCI format 1_1 or 1_2 with or without DL assignment), a single TCI state/pair of TCI states (i.e., N=1 or M=1) for UE-dedicated DL channels/signals receptions and/or UL channels/signals transmissions. When/if the newly indicated TCI state/pair of TCI states correspond to the previously indicated second TCI state/pair of TCI states, the UE 116 could still use/apply the previously indicated second TCI state/pair of TCI states to receive the PDSCH(s) before or after the corresponding beam application time. Here, the beam application time starts from the first slot that is at least BeamAppTime_r17 symbols after the last symbol of the PUCCH. Alternatively, the UE 116 could be indicated/provided/configured by the network 130, e.g., in a beam indication/activation MAC CE or beam indication DCI (e.g., DCI format 1_1 or 1_2 with or without DL assignment), two TCI states/pairs of TCI states (i.e., N=2 or M=2) for UE-dedicated DL channels/signals receptions and/or UL channels/signals transmissions. Both newly indicated TCI states/pairs of TCI states could be the same/identical and they could correspond to the previously indicated second TCI state/pair of TCI states. For this case, the UE 116 could still use/apply the previously indicated second TCI state/pair of TCI states to receive the PDSCH(s) before or after the corresponding beam application time. Here, the beam application time starts from the first slot that is at least BeamAppTime_r17 symbols after the last symbol of the PUCCH.

In yet another example, the UE 116 could be indicated/provided/configured by the network 130, e.g., in a beam indication/activation MAC CE or beam indication DCI (e.g., DCI format 1_1 or 1_2 with or without DL assignment), a single TCI state/pair of TCI states (i.e., N=1 or M=1) for UE-dedicated DL channels/signals receptions and/or UL channels/signals transmissions. When/if the newly indicated TCI state/pair of TCI states correspond to the previously indicated first TCI state/pair of TCI states, the UE 116 could use/apply the previously indicated first TCI state/pair of TCI states to receive the PDSCH(s) before or after the corresponding beam application time. Here, the beam application time starts from the first slot that is at least BeamAppTime_r17 symbols after the last symbol of the PUCCH. Optionally, the UE 116 could be indicated/provided/configured by the network 130, e.g., in a beam indication/activation MAC CE or beam indication DCI (e.g., DCI format 1_1 or 1_2 with or without DL assignment), a single TCI state/pair of TCI states (i.e., N=1 or M=1) for UE-dedicated DL channels/signals receptions and/or UL channels/signals transmissions. The newly indicated TCI state/pair of TCI states could be different from the previously indicated first and/or second TCI states/pairs of TCI states. For this case, the UE 116 could use/apply the newly indicated TCI state/pair of TCI states to receive the PDSCH(s) before or after the corresponding beam application time. Here, the beam application time starts from the first slot that is at least BeamAppTime_r17 symbols after the last symbol of the PUCCH. Alternatively, the UE 116 could be indicated/provided/configured by the network 130, e.g., in a beam indication/activation MAC CE or beam indication DCI (e.g., DCI format 1_1 or 1_2 with or without DL assignment), two TCI states/pairs of TCI states (i.e., N=2 or M=2) for UE-dedicated DL channels/signals receptions and/or UL channels/signals transmissions. Both newly indicated TCI states/pairs of TCI states could be the same/identical. Furthermore, they could correspond to the previously indicated first TCI state/pair of TCI states or they could be different from the previously indicated first and/or second TCI states/pairs of TCI states (they both correspond to a newly indicated TCI state/pair of TCI states). For this case, the UE 116 could use/apply the previously indicated first TCI state/pair of TCI states, or the newly indicated TCI state/pair of TCI states, to receive the PDSCH(s) before or after the corresponding beam application time. Here, the beam application time starts from the first slot that is at least BeamAppTime_r17 symbols after the last symbol of the PUCCH.

In yet another example, the UE 116 could be indicated/provided/configured by the network 130, e.g., in a beam indication/activation MAC CE or beam indication DCI (e.g., DCI format 1_1 or 1_2 with or without DL assignment), two TCI states/pairs of TCI states (i.e., N=2 or M=2) for UE-dedicated DL channels/signals receptions and/or UL channels/signals transmissions. The newly indicated first TCI state/pair of TCI states could be the same as or different from the previously indicated first (or second) TCI state/pair of TCI states, and/or the newly indicated second TCI state/pair of TCI states could be the same as or different from the previously indicated second (or first) TCI state/pair of TCI states. For this case, the UE 116 could use/apply the newly indicated first TCI state/pair of TCI states (e.g., corresponding to the previously indicated first or second TCI state/pair of TCI states) to receive the first (or second) PDSCH(s) before or after the corresponding beam application time and the newly indicated second TCI state/pair of TCI states (e.g., corresponding to the previously indicated first or second TCI state/pair of TCI states) to receive the second (or first) PDSCH(s) before or after the corresponding beam application time. Here, the beam application time starts from the first slot that is at least BeamAppTime_r17 symbols after the last symbol of the PUCCH.

In yet another example, the UE 116 could be indicated/provided/configured by the network 130, e.g., in a beam indication/activation MAC CE or beam indication DCI (e.g., DCI format 1_1 or 1_2 with or without DL assignment), two TCI states/pairs of TCI states (i.e., N=2 or M=2) for UE-dedicated DL channels/signals receptions and/or UL channels/signals transmissions. The newly indicated first TCI state/pair of TCI states could be the same as or different from the previously indicated first (or second) TCI state/pair of TCI states, and/or the newly indicated second TCI state/pair of TCI states could be the same as or different from the previously indicated second (or first) TCI state/pair of TCI states. For this case, the UE 116 could use/apply the newly indicated first TCI state/pair of TCI states (e.g., corresponding to the previously indicated first or second TCI state/pair of TCI states) to receive the first (or second) PDSCH DM-RS(s) (or, equivalently, the RS(s) in the RS set(s) provided in the newly indicated first TCI state/pair of TCI states could be QCL'ed with the first (or second) DM-RS antenna port(s) for PDSCH reception(s)) before or after the corresponding beam application time and the newly indicated second TCI state/pair of TCI states (e.g., corresponding to the previously indicated first or second TCI state/pair of TCI states) to receive the second (or first) PDSCH DM-RS(s) (or, equivalently, the RS(s) in the RS set(s) provided in the newly indicated second TCI state/pair of TCI states could be QCL'ed with the second (or first) DM-RS antenna port(s) for PDSCH reception(s)) before or after the corresponding beam application time. Here, the beam application time starts from the first slot that is at least BeamAppTime_r17 symbols after the last symbol of the PUCCH.

In yet another example, the UE 116 could follow one or more examples described herein to determine which one or more of the indicated TCI states/pairs of TCI states to use/apply for PDSCH reception(s).

The UE 116 could be provided/configured/indicated by the network 130, e.g., via higher layer RRC signaling/parameter and/or MAC CE command and/or dynamic DCI based L1 signaling, to follow one or more examples described herein and/or combination(s) of one or more examples specified/discussed herein to determine the association between the indicated TCI state(s) and the PDSCH reception(s). For instance, a higher layer parameter 'dynamicBeamSelectionTCI' can be provided/configured/indicated in, e.g., PDSCH-Config. When/if the higher layer parameter 'dynamicBeamSelectionTCI' is set to 'enabled', the UE 116 could follow one or more examples described herein and/or combination(s) of one or more of the specified/discussed herein to determine the association between the indicated TCI state(s) and the PDSCH reception(s).

Yet for another example, the UE 116 could be provided/configured/indicated by the network 130, via an indicator field in a DCI (e.g., the scheduling DCI or the beam indication DCI with or without DL assignment), the association between one or more of the indicated TCI states and PDSCH reception(s).

For example, the indicator field could be an existing DCI field in the corresponding DCI and repurposed to indicate/provide/configure the association between the indicated TCI state(s) and the PDSCH reception(s).

For another example, the indicator field could be a new DCI field introduced in the corresponding DCI dedicated to indicating/configuring/providing the association between the indicated TCI state(s) and the PDSCH reception(s).

Yet for another example, the indicator field could be configured by the network 130, e.g., via higher layer RRC signaling and/or MAC CE command and/or dynamic DCI based signaling. For instance, the indicator field could be higher layer RRC configured and/or MAC CE indicated and/or DCI signaled to 'on', 'off', 'enabled', 'disabled', 'present', 'absent'; that is, whether or not the indicator field is present in the corresponding DCI (e.g., DCI format 11 or 1_2) is configured/controlled by the network 130, e.g., via higher layer RRC signaling and/or MAC CE command and/or dynamic DCI based L1 signaling.

In one example, when/if the DCI indicator/indicator field discussed herein is absent, disabled, or not provided/configured/indicated/specified/defined in the corresponding DCI (e.g., the scheduling DCI or the beam indication DCI with or without DL assignment), the UE 116 could follow the indicator/parameter provided/indicated/configured in PDSCH-Config described herein, the fixed rule(s) described herein, or the predefined rule(s) described herein to determine the association between the indicated TCI state(s) and the PDSCH reception(s).

In another example, if the indicator in the DCI (e.g., the scheduling DCI or the beam indication DCI with or without DL assignment) is set to '0', the second indicated TCI state/pair of TCI states could still be applied/used for all PDSCH receptions before or after a beam association application time. If the indicator in the DCI (e.g., the scheduling DCI or the beam indication DCI with or without DL assignment) is set to '1', the first indicated TCI state/pair of TCI states could be applied/used for all PDSCH receptions—change of TRP that transmits the PDSCH(s)—before or after a beam association application time.

In yet another example, if the indicator in the DCI (e.g., the scheduling DCI or the beam indication DCI with or without DL assignment) is set to '0', the first indicated TCI state/pair of TCI states could be applied/used for all PDSCH receptions—change of TRP that transmits the PDSCH(s)—before or after a beam association application time. If the indicator in the DCI (e.g., the scheduling DCI or the beam indication DCI with or without DL assignment) is set to '1', the second indicated TCI state/pair of TCI states could still be applied/used for all PDSCH receptions before or after a beam association application time.

In yet another example, if the indicator in the DCI (e.g., the scheduling DCI or the beam indication DCI with or without DL assignment) is set to '0' (or '1'), the first indicated TCI state/pair of TCI states could be applied/used for receiving the first PDSCH(s) and the second indicated TCI state/pair of TCI states could be applied/used for receiving the second PDSCH(s), before or after a beam association application time. If the indicator in the DCI (e.g., the scheduling DCI or the beam indication DCI with or without DL assignment) is set to '1' (or '0'), the first indicated TCI state/pair of TCI states could be applied/used for receiving the second PDSCH(s) and the second indicated TCI state/pair of TCI states could be applied/used for receiving the first PDSCH(s), before or after a beam association application time. The UE 116 could be configured/indicated/provided by the network 130, e.g., via higher layer RRC signaling/parameter and/or MAC CE command and/or dynamic DCI based L1 signaling, the first and/or second PDSCHs and their corresponding/respective configuration information.

In yet another example, if the indicator in the DCI (e.g., the scheduling DCI or the beam indication DCI with or without DL assignment) is set to '0' (or '1'), the second indicated TCI state/pair of TCI states could still be applied/used for all PDSCH receptions before or after a beam association application time. If the indicator in the DCI (e.g., the scheduling DCI or the beam indication DCI with or without DL assignment) is set to '1' (or '0'), the first indicated TCI state/pair of TCI states could be applied/used for receiving the first (or second) PDSCH(s) and the second indicated TCI state/pair of TCI states could be applied/used for receiving the second (or first) PDSCH(s), before or after a beam association application time. The UE 116 could be configured/indicated/provided by the network 130, e.g., via higher layer RRC signaling/parameter and/or MAC CE command and/or dynamic DCI based L1 signaling, the first and/or second PDSCHs and their corresponding/respective configuration information.

In yet another example, if the indicator in the DCI (e.g., the scheduling DCI or the beam indication DCI with or without DL assignment) is set to '0' (or '1'), the first indicated TCI state/pair of TCI states could be applied/used for all PDSCH receptions—change of TRP that transmits the PDSCH(s)—before or after a beam association application time. If the indicator in the DCI (e.g., the scheduling DCI or the beam indication DCI with or without DL assignment) is set to '1' (or '0'), the first indicated TCI state/pair of TCI states could be applied/used for receiving the first (or second) PDSCH(s) and the second indicated TCI state/pair of TCI states could be applied/used for receiving the second (or first) PDSCH(s), before or after a beam association application time. The UE 116 could be configured/indicated/provided by the network 130, e.g., via higher layer RRC signaling/parameter and/or MAC CE command and/or dynamic DCI based L1 signaling, the first and/or second PDSCHs and their corresponding/respective configuration information.

In yet another example, if the indicator in the DCI (e.g., the scheduling DCI or the beam indication DCI with or without DL assignment) is set to '0' (or '1'), the first indicated TCI state/pair of TCI states could be applied/used for receiving the first PDSCH DM-RS(s) (or, equivalently, the RS(s) in the RS set(s) provided in the first indicated TCI state/pair of TCI states could be QCL'ed with the first DM-RS antenna port(s) for PDSCH reception(s)) before or after a beam association application time and the second indicated TCI state/pair of TCI states could be applied/used for receiving the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s)) before or after a beam association application time. If the indicator in the DCI (e.g., the scheduling DCI or the beam indication DCI with or without DL assignment) is set to '1' (or '0'), the first indicated TCI state/pair of TCI states could be applied/used for receiving the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s)) before or after a beam association application time and the second indicated TCI state/pair of TCI states could be applied/used for receiving the first PDSCH DM-RS(s) (or, equivalently, the RS(s) in the RS set(s) provided in the second indicated TCI state/pair of TCI states could be QCL'ed with the first DM-RS antenna port(s) for PDSCH reception(s)) before or after a beam association application time.

In yet another example, if the indicator in the DCI (e.g., the scheduling DCI or the beam indication DCI with or without DL assignment) is set to '00' ('01', '10' or '11'), the second indicated TCI state/pair of TCI states could still be applied/used for all PDSCH receptions before or after a beam association application time. If the indicator in the DCI (e.g., the scheduling DCI or the beam indication DCI with or without DL assignment) is set to '01' ('00', '10' or '11'), the first indicated TCI state/pair of TCI states could be applied/used for all PDSCH receptions—change of TRP that transmits the PDSCH(s)—before or after a beam association application time. If the indicator in the DCI (e.g., the scheduling DCI or the beam indication DCI with or without DL assignment) is set to '10' ('00', '01' or '11'), the first indicated TCI state/pair of TCI states could be applied/used for receiving the first PDSCH(s) and the second indicated TCI state/pair of TCI states could be applied/used for receiving the second PDSCH(s), before or after a beam association application time. If the indicator in the DCI (e.g., the scheduling DCI or the beam indication DCI with or without DL assignment) is set to '11' ('00', '01' or '10'), the first indicated TCI state/pair of TCI states could be applied/used for receiving the second PDSCH(s) and the second indicated TCI state/pair of TCI states could be applied/used for receiving the first PDSCH(s), before or after a beam association application time.

In yet another example, if the indicator in the DCI (e.g., the scheduling DCI or the beam indication DCI with or without DL assignment) is set to '00' ('01', '10' or '11'), the second indicated TCI state/pair of TCI states could still be applied/used for all PDSCH receptions before or after a beam association application time. If the indicator in the DCI (e.g., the scheduling DCI or the beam indication DCI with or without DL assignment) is set to '01' ('00', '10' or '11'), the first indicated TCI state/pair of TCI states could be applied/used for all PDSCH receptions—change of TRP that transmits the PDSCH(s)—before or after a beam association application time. If the indicator in the DCI (e.g., the scheduling DCI or the beam indication DCI with or without DL assignment) is set to '10' ('00', '01' or '11'), the first indicated TCI state/pair of TCI states could be applied/used for receiving the first PDSCH DM-RS(s) (or, equivalently, the RS(s) in the RS set(s) provided in the first indicated TCI state/pair of TCI states could be QCL'ed with the first DM-RS antenna port(s) for PDSCH reception(s)) and the second indicated TCI state/pair of TCI states could be applied/used for receiving the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s)), before or after a beam association application time. If the indicator in the DCI (e.g., the scheduling DCI or the beam indication DCI with or without DL assignment) is set to '11' ('00', '01' or '10'), the first indicated TCI state/pair of TCI states could be applied/used for receiving the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s)) and the second indicated TCI state/pair of TCI states could be applied/used for receiving the first PDSCH DM-RS(s) (or, equivalently, the RS(s) in the RS set(s) provided in the second indicated TCI state/pair of TCI states could be QCL'ed with the first DM-RS antenna port(s) for PDSCH reception(s)), before or after a beam association application time.

The UE 116 could be provided/configured/indicated by the network 130, e.g., via higher layer RRC signaling/parameter and/or MAC CE command and/or dynamic DCI based L1 signaling, to follow one or more examples described herein and/or combination(s) of one or more of the examples specified/discussed herein to determine the association between the indicated TCI state(s) and the PDSCH reception(s). For instance, a higher layer parameter 'dynamicBeamSelectionDCI' can be provided/configured/indicated in, e.g., PDSCH-Config. When/if the higher layer parameter 'dynamicBeamSelectionDCI' is set to 'enabled', the UE 116 could follow one or more examples described herein and/or combination(s) of one or more of the examples specified/discussed herein to determine the association between the indicated TCI state(s) and the PDSCH reception(s).

Furthermore, one or more bits or one or more codepoints (e.g., '00', '01', '10' or '11') of the DCI indicator as specified herein could be reserved, and/or used/repurposed to provide indication(s) other than the association between the indicated TCI states (e.g., of a TCI codepoint) and the PDSCH reception(s). For instance, the indication(s) could be (dynamic) switching between coherent joint transmission (CJT) and non-coherent joint transmission (NCJT) in a multi-TRP system. Note that other (existing/new) DCI field(s) than the DCI indicator field as specified herein in the corresponding DCI format(s)—e.g., DCI format 1_1/1_2 with or without DL assignment, could be reserved, and/or used/repurposed to indicate the (dynamic) switching between the CJT and NCJT operations in a multi-TRP system. For example, when the DCI indicator as specified herein is set to '11' (or '00', '01' or '10'), or is not set to '11' (or '00', '01' or '10'), the CJT operation is enabled according to one or more of the following.

In one example, the UE 116 could be configured/provided/indicated by the network 130, e.g., via higher layer RRC signaling/parameter (denoted by enableCjtMtrp) and/or MAC CE command and/or dynamic DCI based L1 signaling, that the CJT operation is enabled for DL and/or UL channels/signals.

In another example, the UE 116 could be configured/provided/indicated by the network 130, e.g., via higher layer RRC signaling/parameter (denoted by enablePDSCHCjt) and/or MAC CE command and/or dynamic DCI based L1 signaling, that CJT-based PDSCH reception is enabled.

In yet another example, the UE 116 could be indicated/provided, e.g., in a (unified) TCI state(s) activation/indication MAC CE and/or beam indication DCI (e.g., via one or more TCI fields in DCI format 1_1/1_2 with or without DL assignment), up to K≥1 (e.g., K=2) joint/DL/UL TCI states of (associated with) a TCI codepoint for at least UE-dedicated reception on PDSCH/PDCCH or dynamic-grant/configured-grant based PUSCH and all dedicated PUCCH resources. Furthermore, DMRS port(s) of PDSCH could be quasi co-located with the RS(s) in one or more of the indicated K joint/DL/UL TCI states as specified herein with respect to QCL-TypeA.

In yet another example, the UE 116 could be indicated/provided, e.g., in a (unified) TCI state(s) activation/indication MAC CE and/or beam indication DCI (e.g., via one or more TCI fields in DCI format 1_1/1_2 with or without DL assignment), up to K≥1 (e.g., K=2) joint/DL/UL TCI states of (associated with) a TCI codepoint for at least UE-dedicated reception on PDSCH/PDCCH or dynamic-grant/configured-grant based PUSCH and all dedicated PUCCH resources. Furthermore, DMRS port(s) of PDSCH could be quasi co-located with the RS(s) in one or more of the indicated K joint/DL/UL TCI states as specified herein with respect to QCL-TypeA except for one or more QCL parameters such as {Doppler shift, Doppler spread} of one or more of the indicated K joint/DL/UL TCI states as specified herein.

In yet another example, the UE 116 could be indicated/provided, e.g., in a (unified) TCI state(s) activation/indication MAC CE and/or beam indication DCI (e.g., via one or more TCI fields in DCI format 1_1/1_2 with or without DL assignment), up to K≥1 (e.g., K=2) joint/DL/UL TCI states of (associated with) a TCI codepoint for at least UE-dedicated reception on PDSCH/PDCCH or dynamic-grant/configured-grant based PUSCH and all dedicated PUCCH resources. Furthermore, DMRS port(s) of PDSCH could be quasi co-located with the RS(s) in one or more of the indicated K joint/DL/UL TCI states as specified herein with respect to QCL-TypeA, and the RS(s) in one or more of the indicated K joint/DL/UL TCI states as specified herein with respect to QCL-TypeB.

In yet another example, the UE 116 could be indicated/provided/configured by the network 130, e.g., via higher layer RRC signaling/parameter and/or MAC CE command and/or dynamic DCI based L1 signaling, signaling(s)/parameter(s)/configuration(s)/indication(s) other than those specified herein, that the CJT operation is enabled. The UE 116 could also identify, based on one or more of the signaling(s)/configuration(s)/parameter(s)/indication(s) other than those specified herein, that the CJT operation is enabled.

When the DCI indicator as specified herein is not set to '11' (or '00', '01' or '10'), or set to '11' (or '00', '01' or '10'), the NCJT operation is enabled according to one or more of the following examples.

In one example, the UE 116 could be indicated/provided, e.g., in a (unified) TCI state(s) activation/indication MAC CE and/or beam indication DCI (e.g., via one or more TCI fields in DCI format 1_1/1_2 with or without DL assignment), K=1 joint/DL/UL TCI state/pair of TCI states of (associated with) a TCI codepoint for at least UE-dedicated reception on PDSCH/PDCCH or dynamic-grant/configured-grant based PUSCH and all dedicated PUCCH resources. Furthermore, the UE 116 could be indicated/configured/provided by the network 130, e.g., via higher layer RRC signaling/parameter and/or MAC CE command and/or dynamic DCI based L1 signaling, L 1 CDM groups. The UE 116 could also be indicated/configured/provided by the network 130, e.g., via higher layer RRC signaling/parameter and/or MAC CE command and/or dynamic DCI based L1 signaling, that SFN operation (e.g., for PDCCH and/or PDSCH) is enabled—e.g. when the UE 116 is configured with higher layer parameter sfnSchemePdsch set to either 'sfnSchemeA' or 'sfnSchemeB'.

In another example, the UE 116 could be indicated/provided, e.g., in a (unified) TCI state(s) activation/indication MAC CE and/or beam indication DCI (e.g., via one or more TCI fields in DCI format 1_1/1_2 with or without DL assignment), K=1 joint/DL/UL TCI state/pair of TCI states of (associated with) a TCI codepoint for at least UE-dedicated reception on PDSCH/PDCCH or dynamic-grant/configured-grant based PUSCH and all dedicated PUCCH resources. Furthermore, the UE 116 could be indicated/configured/provided by the network 130, e.g., via higher layer RRC signaling/parameter and/or MAC CE command and/or dynamic DCI based L1 signaling, L 1 CDM groups. The UE 116 could be provided/configured by the network 130 with at least one entry/row in pdsch-TimeDomainAllocationList not containing repetitionNumber and at least one entry/row in pdsch-TimeDomainAllocationList containing repetitionNumber (e.g., >1), which could be indicated by the TDRA field in the corresponding DCI format. The UE 116 could also be indicated/configured/provided by the network 130, e.g., via higher layer RRC signaling/parameter and/or MAC CE command and/or dynamic DCI based L1 signaling, that SFN operation (e.g., for PDCCH and/or PDSCH) is enabled—e.g. when the UE 116 is configured with higher layer parameter sfnSchemePdsch set to either 'sfnSchemeA' or 'sfnSchemeB'.

In yet another example, the UE 116 could be indicated/provided, e.g., in a (unified) TCI state(s) activation/indication MAC CE and/or beam indication DCI (e.g., via one or more TCI fields in DCI format 1_1/1_2 with or without DL assignment), K=1 joint/DL/UL TCI state/pair of TCI states of (associated with) a TCI codepoint for at least UE-dedicated reception on PDSCH/PDCCH or dynamic-grant/configured-grant based PUSCH and all dedicated PUCCH resources. Furthermore, the UE 116 could be indicated/configured/provided by the network 130, e.g., via higher layer RRC signaling/parameter and/or MAC CE command and/or dynamic DCI based L1 signaling, L≥1 CDM groups. The UE 116 could be provided/configured by the network 130 with at least one entry/row in pdsch-TimeDomainAllocationList not containing repetitionNumber, and at least one entry/row in pdsch-TimeDomainAllocationList containing repetitionNumber (e.g., >1), which could be indicated by the TDRA field in the corresponding DCI format. In addition, the UE 116 could be configured/provided/indicated by the network 130, e.g., via higher layer RRC signaling/parameter and/or MAC CE command and/or dynamic DCI based L1 signaling, that one or more repetition schemes are enabled. The UE 116 could also be indicated/configured/provided by the network 130, e.g., via higher layer RRC signaling/parameter and/or MAC CE command and/or dynamic DCI based L1 signaling, that SFN operation (e.g., for PDCCH and/or PDSCH) is enabled—e.g. when the UE 116 is configured with higher layer parameter sfnSchemePdsch set to either 'sfnSchemeA' or 'sfnSchemeB'.

In yet another example, the UE 116 could be indicated/provided, e.g., in a (unified) TCI state(s) activation/indication MAC CE and/or beam indication DCI (e.g., via one or more TCI fields in DCI format 1_1/1_2 with or without DL assignment), K=1 joint/DL/UL TCI state/pair of TCI states of (associated with) a TCI codepoint for at least UE-dedicated reception on PDSCH/PDCCH or dynamic-grant/configured-grant based PUSCH and all dedicated PUCCH resources. Furthermore, the UE 116 could be indicated/configured/provided by the network 130, e.g., via higher layer RRC signaling/parameter and/or MAC CE command and/or dynamic DCI based L1 signaling, L≥1 CDM groups. The UE 116 could be provided/configured by the network 130 a pdsch-TimeDomainAllocationList, wherein none of the entries/rows in the pdsch-TimeDomainAllocationList contains repetitionNumber. In addition, the UE 116 could be configured/provided/indicated by the network 130, e.g., via higher layer RRC signaling/parameter and/or MAC CE command and/or dynamic DCI based L1 signaling, that one or more repetition schemes are enabled. The UE 116 could also be indicated/configured/provided by the network 130, e.g., via higher layer RRC signaling/parameter and/or MAC CE command and/or dynamic DCI based L1 signaling, that SFN operation (e.g., for PDCCH and/or PDSCH) is enabled—e.g. when the UE 116 is configured with higher layer parameter sfnSchemePdsch set to either 'sfnSchemeA' or 'sfnSchemeB'.

In yet another example, the UE 116 could be indicated/provided, e.g., in a (unified) TCI state(s) activation/indication MAC CE and/or beam indication DCI (e.g., via one or more TCI fields in DCI format 1_1/1_2 with or without DL assignment), K=1 joint/DL/UL TCI state/pair of TCI states of (associated with) a TCI codepoint for at least UE-dedicated reception on PDSCH/PDCCH or dynamic-grant/configured-grant based PUSCH and all dedicated PUCCH resources. Furthermore, the UE 116 could be indicated/configured/provided by the network 130, e.g., via higher layer RRC signaling/parameter and/or MAC CE command and/or dynamic DCI based L1 signaling, L=1 CDM group. The UE 116 could be provided/configured by the network 130 with at least one entry/row in pdsch-TimeDomainAllocationList containing repetitionNumber (e.g., >1), which could be indicated by the TDRA field in the corresponding DCI format. In addition, the UE 116 could be configured/provided/indicated by the network 130, e.g., via higher layer RRC signaling/parameter and/or MAC CE command and/or dynamic DCI based L1 signaling, that one or more repetition schemes are enabled. The UE 116 could also be indicated/configured/provided by the network 130, e.g., via higher layer RRC signaling/parameter and/or MAC CE command and/or dynamic DCI based L1 signaling, that SFN operation (e.g., for PDCCH and/or PDSCH) is enabled—e.g. when the UE 116 is configured with higher layer parameter sfnSchemePdsch set to either 'sfnSchemeA' or 'sfnSchemeB'.

In yet another example, the UE 116 could be indicated/provided, e.g., in a (unified) TCI state(s) activation/indication MAC CE and/or beam indication DCI (e.g., via one or more TCI fields in DCI format 1_1/1_2 with or without DL assignment), K=2 joint/DL/UL TCI states/pairs of TCI states of (associated with) a TCI codepoint for at least UE-dedicated reception on PDSCH/PDCCH or dynamic-grant/configured-grant based PUSCH and all dedicated PUCCH resources. Furthermore, the UE 116 could be indicated/configured/provided by the network 130, e.g., via higher layer RRC signaling/parameter and/or MAC CE command and/or dynamic DCI based L1 signaling, L=2 CDM groups. The UE 116 could be provided/configured by the network 130 with at least one entry/row in pdsch-TimeDomainAllocationList not containing repetitionNumber and at least one entry/row in pdsch-TimeDomainAllocationList containing repetitionNumber (e.g., >1), which could be indicated by the TDRA field in the corresponding DCI format.

In yet another example, the UE 116 could be indicated/provided, e.g., in a (unified) TCI state(s) activation/indication MAC CE and/or beam indication DCI (e.g., via one or more TCI fields in DCI format 1_1/1_2 with or without DL assignment), K=2 joint/DL/UL TCI states/pairs of TCI states of (associated with) a TCI codepoint for at least UE-dedicated reception on PDSCH/PDCCH or dynamic-grant/configured-grant based PUSCH and all dedicated PUCCH resources. Furthermore, the UE 116 could be indicated/configured/provided by the network 130, e.g., via higher layer RRC signaling/parameter and/or MAC CE command and/or dynamic DCI based L1 signaling, L=2 CDM groups. The UE 116 could be provided/configured by the network 130 a pdsch-TimeDomainAllocationList, wherein none of the entries/rows in the pdsch-TimeDomainAllocationList contains repetitionNumber.

In yet another example, the UE 116 could be indicated/provided, e.g., in a (unified) TCI state(s) activation/indication MAC CE and/or beam indication DCI (e.g., via one or more TCI fields in DCI format 1_1/1_2 with or without DL assignment), K=2 joint/DL/UL TCI states/pairs of TCI states of (associated with) a TCI codepoint for at least UE-dedicated reception on PDSCH/PDCCH or dynamic-grant/configured-grant based PUSCH and all dedicated PUCCH resources. Furthermore, the UE 116 could be indicated/configured/provided by the network 130, e.g., via higher layer RRC signaling/parameter and/or MAC CE command and/or dynamic DCI based L1 signaling, L=2 CDM groups. The UE 116 could be provided/configured by the network 130 a pdsch-TimeDomainAllocationList, wherein none of the entries/rows in the pdsch-TimeDomainAllocationList contains repetitionNumber. In addition, the UE 116 could be configured/provided/indicated by the network 130, e.g., via higher layer RRC signaling/parameter and/or MAC CE command and/or dynamic DCI based L1 signaling, that one or more repetition schemes are enabled.

In yet another example, the UE 116 could be indicated/provided, e.g., in a (unified) TCI state(s) activation/indication MAC CE and/or beam indication DCI (e.g., via one or more TCI fields in DCI format 1_1/1_2 with or without DL assignment), K=2 joint/DL/UL TCI states/pairs of TCI states of (associated with) a TCI codepoint for at least UE-dedicated reception on PDSCH/PDCCH or dynamic-grant/configured-grant based PUSCH and all dedicated PUCCH resources. Furthermore, the UE 116 could be indicated/configured/provided by the network 130, e.g., via higher layer RRC signaling/parameter and/or MAC CE command and/or dynamic DCI based L1 signaling, L=1 CDM group. The UE 116 could be provided/configured by the network 130 a pdsch-TimeDomainAllocationList, wherein none of the entries/rows in the pdsch-TimeDomainAllocationList contains repetitionNumber. In addition, the UE 116 could be configured/provided/indicated by the network 130, e.g., via higher layer RRC signaling/parameter and/or MAC CE command and/or dynamic DCI based L1 signaling, that one or more repetition schemes are enabled.

In yet another example, the UE 116 could be indicated/provided, e.g., in a (unified) TCI state(s) activation/indication MAC CE and/or beam indication DCI (e.g., via one or more TCI fields in DCI format 1_1/1_2 with or without DL assignment), K=2 joint/DL/UL TCI states/pairs of TCI states of (associated with) a TCI codepoint for at least UE-dedicated reception on PDSCH/PDCCH or dynamic-grant/configured-grant based PUSCH and all dedicated PUCCH resources. Furthermore, the UE 116 could be indicated/configured/provided by the network 130, e.g., via higher layer RRC signaling/parameter and/or MAC CE command and/or dynamic DCI based L1 signaling, L=1 CDM group. The UE 116 could be provided/configured by the network 130 with at least one entry/row in pdsch-TimeDomainAllocationList containing repetitionNumber (e.g., >1), which could be indicated by the TDRA field in the corresponding DCI format.

In yet another example, the UE 116 could be indicated/provided/configured by the network 130, e.g., via higher layer RRC signaling/parameter and/or MAC CE command and/or dynamic DCI based L1 signaling, signaling(s)/parameter(s)/configuration(s)/indication(s) other than those specified herein, that the NCJT operation is enabled. The UE 116 could also identify, based on one or more of the signaling(s)/configuration(s)/parameter(s)/indication(s) other than those specified herein, that the NCJT operation is enabled.

The repetition schemes as specified herein could be configured to the UE 116 or identified by the UE 116 according to one or more of the following examples.

In one example, the UE 116 could be configured/provided/indicated by the network 130, e.g., via higher layer RRC signaling/parameter and/or MAC CE command and/or dynamic DCI based L1 signaling, that PDCCH repetition scheme(s) is enabled such that PDCCH candidates could be received in different search space sets/CORESETs that are linked via higher layer RRC signaling/parameter. For instance, the UE 116 could receive/monitor two PDCCH candidates in two search space sets that are higher layer RRC configured with SearchSpaceLinking.

In another example, the UE 116 could be configured/provided/indicated by the network 130, e.g., via higher layer RRC signaling/parameter and/or MAC CE command and/or dynamic DCI based L1 signaling, that PDSCH repetition FDM scheme A, FDM scheme B, or intra-slot TDM scheme A is enabled. For instance, the UE 116 could be configured/provided by the network 130 the higher layer RRC parameter repetitionScheme set to 'fdmSchemeA' or 'fdmSchemeB' or 'tdmSchemeA'.

In yet another example, the UE 116 could be configured/provided/indicated by the network 130, e.g., via higher layer RRC signaling/parameter and/or MAC CE command and/or dynamic DCI based L1 signaling, that PUCCH repetition is enabled. For instance, the UE 116 could be (higher layer RRC) configured with a number of slots, denoted by Npucch, for repetitions of a PUCCH transmission.

In yet another example, the UE 116 could be configured/provided/indicated by the network 130, e.g., via higher layer RRC signaling/parameter and/or MAC CE command and/or dynamic DCI based L1 signaling, that PUSCH repetition type A or type B is enabled. The UE 116 could be configured with two SRS resource sets with higher layer parameter usage in SRS-ResourceSet set to 'codebook' or 'noncodebook'. Furthermore, for PUSCH scheduled by DCI format 01, pusch-RepTypeIndicatorDCI-0-1 could be set to 'pusch-RepTypeB' or 'pusch-RepTypeA' for PUSCH repetition type A or type B. For PUSCH scheduled by DCI format 02, pusch-RepTypeIndicatorDCI-0-2 could be set to 'pusch-RepTypeB' or 'pusch-RepTypeA' for PUSCH repetition type A or type B.

In yet another example, the UE 116 could be indicated/provided/configured by the network 130, e.g., via higher layer RRC signaling/parameter and/or MAC CE command and/or dynamic DCI based L1 signaling, signaling(s)/parameter(s)/configuration(s)/indication(s) other than those specified herein, that one or more repetition schemes are enabled. The UE 116 could also identify, based on one or more of the signaling(s)/configuration(s)/parameter(s)/indication(s) other than those specified herein (that one or more repetition schemes are enabled.

In yet another example, the UE 116 could be first informed by the network 130, e.g., by the indicator/parameter in PDSCH-Config described herein, the UE 116 could first follow a fixed rule specified herein (e.g., one or more examples described herein), or the UE 116 could first follow a predefined rule specified herein (e.g., follow one or more examples described herein) to determine a default association between one or more indicated TCI states/pairs of TCI states and PDSCH reception(s) such that the first indicated TCI state/pair of TCI states is applied/used for receiving the first (or second) PDSCH(s)—e.g., when the indicator/parameter in the corresponding PDSCH-Config is set to '0' (or '1', '00', '01', '10' or '11') or the fixed rule specified herein (e.g., according to one or more examples described herein) indicates/states/tells/informs that the first indicated TCI state/pair of TCI states is applied/used for receiving the first (or second) PDSCH(s) or the predefined rule specified herein (e.g., according to one or more examples described herein) indicates/states/tells/informs that the first indicated TCI state/pair of TCI states is applied/used for receiving the first (or second) PDSCH(s). The second indicated TCI state/pair of TCI states is applied/used for receiving the second (or first) PDSCH(s)—e.g., when the indicator/parameter in the corresponding PDSCH-Config is set to '1' (or '0', '00', '01', '10' or '11') or the fixed rule specified herein (e.g., according to one or more examples described herein) indicates/states/tells/informs that the second indicated TCI state/pair of TCI states is applied/used for receiving the second (or first) PDSCH(s) or the predefined rule specified herein (e.g., according to one or more examples described herein) indicates/states/tells/informs that the second indicated TCI state/pair of TCI states is applied/used for receiving the second (or first) PDSCH(s). Optionally, the UE 116 could be informed by the network 130, e.g., by the indicator/parameter in PDSCH-Config described herein, the UE 116 could follow a fixed rule specified herein (e.g., follow one or more examples described herein) to determine, or the UE 116 could follow a predefined rule specified herein (e.g., follow one or more examples described herein) to determine that the first indicated TCI state/pair of TCI states is applied/used for receiving the first PDSCH DM-RS(s) and the second indicated TCI state/pair of TCI states is applied/used for receiving the second PDSCH DM-RS(s)—e.g. when the indicator/parameter in the corresponding PDSCH-Config is set to '0' (or '1', '00', '01', '10' or '11') or the fixed rule specified herein (e.g., according to one or more examples described herein) indicates/states/tells/informs that the first indicated TCI state/pair of TCI states is applied/used for receiving the first PDSCH DM-RS(s). The second indicated TCI state/pair of TCI states is applied/used for receiving the second PDSCH DM-RS(s) or the predefined rule specified herein (e.g., according to one or more examples described herein) indicates/states/tells/informs that the first indicated TCI state/pair of TCI states is applied/used for receiving the first PDSCH DM-RS(s) and the second indicated TCI state/pair of TCI states is applied/used for receiving the second PDSCH DM-RS(s). The first indicated TCI state/pair of TCI states is applied/used for receiving the second PDSCH DM-RS(s), and the second indicated TCI state/pair of TCI states is applied/used for receiving the first PDSCH DM-RS(s)—e.g., when the indicator/parameter in the corresponding PDSCH-Config is set to '1' (or '0', '00', '01', '10' or '11') or the fixed rule specified herein (e.g., according to one or more examples described herein) indicates/states/tells/informs that the first indicated TCI state/pair of TCI states is applied/used for receiving the second PDSCH DM-RS(s). The second indicated TCI state/pair of TCI states is applied/used for receiving the first PDSCH DM-RS(s) or the predefined rule specified herein (e.g., according to one or more examples described herein) indicates/states/tells/informs that the first indicated TCI state/pair of TCI states is applied/used for receiving the second PDSCH DM-RS(s) and the second indicated TCI state/pair of TCI states is applied/used for receiving the first PDSCH DM-RS(s). The UE 116 could then follow one or more of the examples specified/provided herein to further determine the association between the indicated TCI state(s) and the PDSCH reception(s).

For example, the UE 116 could be provided/indicated/configured by the network 130, in a higher layer parameter, e.g., ControlResourceSet for a CORESET, an indicator/parameter to inform the UE 116 of the association between the indicated TCI state(s) and the PDSCH reception(s), wherein different CORESETs configured with the same indicator/parameter could be in a same CORESET group.

In one example, when/if the indicator/parameter discussed herein is absent or disabled or not provided/configured/indicated/specified/defined in ControlResourceSet, and/or when/if all CORESETs are configured/associated with same indicators/parameters set to '0's or '1's or '00's or '01's or '10's or '11's, the UE 116 could follow the indicator/parameter provided/indicated/configured in PDSCH-Config described herein, the fixed rule(s) described herein, or the predefined rule(s) described herein to determine the association between the indicated TCI state(s) and the PDSCH reception(s).

In another example, if the DCI (e.g., the scheduling DCI or the beam indication DCI with or without DL assignment) is received in a CORESET configured/associated with the indicator/parameter in the corresponding ControlResourceSet set to '0', the first indicated TCI state/pair of TCI states could be applied/used for all PDSCH receptions. If the DCI (e.g., the scheduling DCI or the beam indication DCI with or without DL assignment) is received in a CORESET configured/associated with the indicator/parameter in the corresponding ControlResourceSet set to '1', the second indicated TCI state/pair of TCI states could be applied/used for all PDSCH receptions.

In yet another example, if the DCI (e.g., the scheduling DCI or the beam indication DCI with or without DL assignment) is received in a CORESET configured/associated with the indicator/parameter in the corresponding ControlResourceSet set to '0', the second indicated TCI state/pair of TCI states could be applied/used for all PDSCH receptions. If the DCI (e.g., the scheduling DCI or the beam indication DCI with or without DL assignment) is received in a CORESET configured/associated with the indicator/parameter in the corresponding ControlResourceSet set to '1', the first indicated TCI state/pair of TCI states could still be applied/used for all PDSCH receptions.

In yet another example, if the DCI (e.g., the scheduling DCI or the beam indication DCI with or without DL assignment) is received in a CORESET configured/associated with the indicator/parameter in the corresponding ControlResourceSet set to '0' (or '1'), the first indicated TCI state/pair of TCI states could be applied/used for receiving the first PDSCH(s) and the second indicated TCI state/pair of TCI states could be applied/used for receiving the second PDSCH(s). If the DCI (e.g., the scheduling DCI or the beam indication DCI with or without DL assignment) is received in a CORESET configured/associated with the indicator/parameter in the corresponding ControlResourceSet set to '1' (or '0'), the first indicated TCI state/pair of TCI states could be applied/used for receiving the second PDSCH(s) and the second indicated TCI state/pair of TCI states could be applied/used for receiving the first PDSCH(s). The UE 116 could be configured/indicated/provided by the network 130, e.g., via higher layer RRC signaling/parameter and/or MAC CE command and/or dynamic DCI based L1 signaling, the first and/or second PDSCHs and their corresponding/respective configuration information.

In yet another example, if the DCI (e.g., the scheduling DCI or the beam indication DCI with or without DL assignment) is received in a CORESET configured/associated with the indicator/parameter in the corresponding ControlResourceSet set to '0' (or '1'), the first indicated TCI state/pair of TCI states could be applied/used for all PDSCH receptions. If the DCI (e.g., the scheduling DCI or the beam indication DCI with or without DL assignment) is received in a CORESET configured/associated with the indicator/parameter in the corresponding ControlResourceSet set to '1' (or '0'), the first indicated TCI state/pair of TCI states could be applied/used for receiving the first (or second) PDSCH(s), and the second indicated TCI state/pair of TCI states could be applied/used for receiving the second (or first) PDSCH(s). The UE 116 could be configured/indicated/provided by the network 130, e.g., via higher layer RRC signaling/parameter and/or MAC CE command and/or dynamic DCI based L1 signaling, the first and/or second PDSCHs and their corresponding/respective configuration information.

In yet another example, if the DCI (e.g., the scheduling DCI or the beam indication DCI with or without DL assignment) is received in a CORESET configured/associated with the indicator/parameter in the corresponding ControlResourceSet set to '0' (or '1'), the second indicated TCI state/pair of TCI states could be applied/used for all PDSCH receptions. If the DCI (e.g., the scheduling DCI or the beam indication DCI with or without DL assignment) is received in a CORESET configured/associated with the indicator/parameter in the corresponding ControlResourceSet set to '1' (or '0'), the first indicated TCI state/pair of TCI states could be applied/used for receiving the first (or second) PDSCH(s) and the second indicated TCI state/pair of TCI states could be applied/used for receiving the second (or first) PDSCH(s). The UE 116 could be configured/indicated/provided by the network 130, e.g., via higher layer RRC signaling/parameter and/or MAC CE command and/or dynamic DCI based L1 signaling, the first and/or second PDSCHs and their corresponding/respective configuration information.

In yet another example, if the DCI (e.g., the scheduling DCI or the beam indication DCI with or without DL assignment) is received in a CORESET configured/associated with the indicator/parameter in the corresponding ControlResourceSet set to '0' (or '1'), the first indicated TCI state/pair of TCI states could be applied/used for receiving the first PDSCH DM-RS(s) (or, equivalently, the RS(s) in the RS set(s) provided in the first indicated TCI state/pair of TCI states could be QCL'ed with the first DM-RS antenna port(s) for PDSCH reception(s)) and the second indicated TCI state/pair of TCI states could be applied/used for receiving the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s)). If the DCI (e.g., the scheduling DCI or the beam indication DCI with or without DL assignment) is received in a CORESET configured/associated with the indicator/parameter in the corresponding ControlResourceSet set to '1' (or '0'), the first indicated TCI state/pair of TCI states could be applied/used for receiving the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s)) and the second indicated TCI state/pair of TCI states could be applied/used for receiving the first PDSCH DM-RS(s) (or, equivalently, the RS(s) in the RS set(s) provided in the second indicated TCI state/pair of TCI states could be QCL'ed with the first DM-RS antenna port(s) for PDSCH reception(s)).

In yet another example, if the DCI (e.g., the scheduling DCI or the beam indication DCI with or without DL assignment) is received in a CORESET configured/associated with the indicator/parameter in the corresponding ControlResourceSet set to '00' ('01', '10' or '11'), the first indicated TCI state/pair of TCI states could still be applied/used for all PDSCH receptions. If the DCI (e.g., the scheduling DCI or the beam indication DCI with or without DL assignment) is received in a CORESET configured/associated with the indicator/parameter in the corresponding ControlResourceSet set to '01' ('00', '10' or '11'), the second indicated TCI state/pair of TCI states could be applied/used for all PDSCH receptions. If the DCI (e.g., the scheduling DCI or the beam indication DCI with or without DL assignment) is received in a CORESET configured/associated with the indicator/parameter in the corresponding ControlResourceSet set to '10' ('00', '01' or '11'), the first indicated TCI state/pair of TCI states could be applied/used for receiving the first PDSCH(s) and the second indicated TCI state/pair of TCI states could be applied/used for receiving the second PDSCH(s). If the DCI (e.g., the scheduling DCI or the beam indication DCI with or without DL assignment) is received in a CORESET configured/associated with the indicator/parameter in the corresponding ControlResourceSet set to '11' ('00', '01' or '10'), the first indicated TCI state/pair of TCI states could be applied/used for receiving the second PDSCH(s) and the second indicated TCI state/pair of TCI states could be applied/used for receiving the first PDSCH(s).

In yet another example, if the DCI (e.g., the scheduling DCI or the beam indication DCI with or without DL assignment) is received in a CORESET configured/associated with the indicator/parameter in the corresponding ControlResourceSet set to '00' ('01', '10' or '11'), the first indicated TCI state/pair of TCI states could be applied/used for all PDSCH receptions. If the DCI (e.g., the scheduling DCI or the beam indication DCI with or without DL assignment) is received in a CORESET configured/associated with the indicator/parameter in the corresponding ControlResourceSet set to '01' ('00', '10' or '11'), the second indicated TCI state/pair of TCI states could be applied/used for all PDSCH receptions. If the DCI (e.g., the scheduling DCI or the beam indication DCI with or without DL assignment) is received in a CORESET configured/associated with the indicator/parameter in the corresponding ControlResourceSet set to '10' ('00', '01' or '11'), the first indicated TCI state/pair of TCI states could be applied/used for receiving the first PDSCH DM-RS(s) (or, equivalently, the RS(s) in the RS set(s) provided in the first indicated TCI state/pair of TCI states could be QCL'ed with the first DM-RS antenna port(s) for PDSCH reception(s)) and the second indicated TCI state/pair of TCI states could be applied/used for receiving the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s)). If the DCI (e.g., the scheduling DCI or the beam indication DCI with or without DL assignment) is received in a CORESET configured/associated with the indicator/parameter in the corresponding ControlResourceSet set to '11' ('00', '01' or '10'), the first indicated TCI state/pair of TCI states could be applied/used for receiving the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s)) and the second indicated TCI state/pair of TCI states could be applied/used for receiving the first PDSCH DM-RS(s) (or, equivalently, the RS(s) in the RS set(s) provided in the second indicated TCI state/pair of TCI states could be QCL'ed with the first DM-RS antenna port(s) for PDSCH reception(s)).

The UE 116 could be provided/configured/indicated by the network 130, e.g., via higher layer RRC signaling/parameter and/or MAC CE command and/or dynamic DCI based L1 signaling, to follow one or more examples described herein and/or combination(s) of one or more of the examples specified/discussed herein to determine the association between the indicated TCI state(s) and the PDSCH reception(s). For instance, a higher layer parameter 'dynamicBeamSelectionCoreset' can be provided/configured/indicated in, e.g., PDSCH-Config. When/if the higher layer parameter 'dynamicBeamSelectionCoreset' is set to 'enabled', the UE 116 could follow one or more examples described herein and/or combination(s) of one or more of the examples specified/discussed herein to determine the association between the indicated TCI state(s) and the PDSCH reception(s).

For another example, the UE 116 could be indicated/provided/configured by the network 130, e.g., in a beam indication/activation MAC CE or beam indication DCI (e.g., DCI format 1_1 or 1_2 with or without DL assignment), one or more, e.g., N 1 or M 1 (e.g., N=2 or M=2), TCI states/pairs of TCI states for UE-dedicated DL channels/signals receptions and/or UL channels/signals transmissions. The indicated TCI states/pairs of TCI states could be different from the previously indicated (first and/or second) TCI states/pairs of TCI states described/discussed herein and can; therefore, be referred to as newly indicated TCI states/pairs of TCI states. In a beam indication DCI, the TCI state(s)/pair(s) of TCI states could be indicated/provided by one or more TCI codepoints in one or more TCI fields (e.g., the existing TCI field).

In one example, the UE 116 could follow the indicator/parameter provided/indicated/configured in PDSCH-Config described herein, the fixed rule(s) described herein, or the predefined rule(s) described herein to determine the association between the newly indicated TCI state(s) and the PDSCH reception(s).

For example, the newly/previously indicated first TCI state/pair of TCI states is applied/used for receiving the first (or second) PDSCH(s)—e.g. when the indicator/parameter in the corresponding PDSCH-Config is set to '0' (or '1', '00', '01', '10' or '11') and the newly/previously indicated second TCI state/pair of TCI states is applied/used for receiving the second (or first) PDSCH(s)—e.g. when the indicator/parameter in the corresponding PDSCH-Config is set to '1' (or '0', '00', '01', '10' or '11').

For another example, the newly/previously indicated first TCI state/pair of TCI states is applied/used for receiving the first PDSCH DM-RS(s), and the newly/previously indicated second TCI state/pair of TCI states is applied/used for receiving the second PDSCH DM-RS(s)—e.g. when the indicator/parameter in the corresponding PDSCH-Config is set to '0' (or '1', '00', '01', '10' or '11'), the newly/previously indicated first TCI state/pair of TCI states is applied/used for receiving the second PDSCH DM-RS(s), and the newly/previously indicated second TCI state/pair of TCI states is applied/used for receiving the first PDSCH DM-RS(s)—e.g. when the indicator/parameter in the corresponding PDSCH-Config is set to '1' (or '0', '00', '01', '10' or '11').

In another example, the UE 116 could be indicated/provided/configured by the network 130, e.g., in a beam indication/activation MAC CE or beam indication DCI (e.g., DCI format 1_1 or 1_2 with or without DL assignment), a single TCI state/pair of TCI states (i.e., N=1 or M=1) for UE-dedicated DL channels/signals receptions and/or UL channels/signals transmissions. When/if the newly indicated TCI state/pair of TCI states correspond to the previously indicated first TCI state/pair of TCI states, the UE 116 could use/apply the previously indicated first TCI state/pair of TCI states to receive all the PDSCH(s) before or after the corresponding beam application time. Here, the beam application time starts from the first slot that is at least BeamAppTime_r17 symbols after the last symbol of the PUCCH. Alternatively, the UE 116 could be indicated/provided/configured by the network 130, e.g., in a beam indication/activation MAC CE or beam indication DCI (e.g., DCI format 1_1 or 1_2 with or without DL assignment), two TCI states/pairs of TCI states (i.e., N=2 or M=2) for UE-dedicated DL channels/signals receptions and/or UL channels/signals transmissions. Both newly indicated TCI states/pairs of TCI states could be the same/identical and they could correspond to the previously indicated first TCI state/pair of TCI states. For this case, the UE 116 could use/apply the previously indicated first TCI state/pair of TCI states to receive all the PDSCH(s) before or after the corresponding beam application time. Here, the beam application time starts from the first slot that is at least BeamAppTime_r17 symbols after the last symbol of the PUCCH.

In yet another example, the UE 116 could be indicated/provided/configured by the network 130, e.g., in a beam indication/activation MAC CE or beam indication DCI (e.g., DCI format 1_1 or 1_2 with or without DL assignment), a single TCI state/pair of TCI states (i.e., N=1 or M=1) for UE-dedicated DL channels/signals receptions and/or UL channels/signals transmissions. When/if the newly indicated TCI state/pair of TCI states correspond to the previously indicated second TCI state/pair of TCI states, the UE 116 could use/apply the previously indicated second TCI state/pair of TCI states to receive all the PDSCH(s) before or after the corresponding beam application time. Here, the beam application time starts from the first slot that is at least BeamAppTime_r17 symbols after the last symbol of the PUCCH. Optionally, the UE 116 could be indicated/provided/configured by the network 130, e.g., in a beam indication/activation MAC CE or beam indication DCI (e.g., DCI format 1_1 or 1_2 with or without DL assignment), a single TCI state/pair of TCI states (i.e., N=1 or M=1) for UE-dedicated DL channels/signals receptions and/or UL channels/signals transmissions. The newly indicated TCI state/pair of TCI states could be different from the previously indicated first and/or second TCI states/pairs of TCI states. For this case, the UE 116 could use/apply the newly indicated TCI state/pair of TCI states to receive all the PDSCH(s) before or after the corresponding beam application time. Here, the beam application time starts from the first slot that is at least BeamAppTime_r17 symbols after the last symbol of the PUCCH. Alternatively, the UE 116 could be indicated/provided/configured by the network 130, e.g., in a beam indication/activation MAC CE or beam indication DCI (e.g., DCI format 1_1 or 1_2 with or without DL assignment), two TCI states/pairs of TCI states (i.e., N=2 or M=2) for UE-dedicated DL channels/signals receptions and/or UL channels/signals transmissions. Both newly indicated TCI states/pairs of TCI states could be the same/identical. Furthermore, they could correspond to the previously indicated second TCI state/pair of TCI states, or they could be different from the previously indicated first and/or second TCI states/pairs of TCI states (they both correspond to a newly indicated TCI state/pair of TCI states). For this case, the UE 116 could use/apply the previously indicated second TCI state/pair of TCI states, or the newly indicated TCI state/pair of TCI states, to receive all the PDSCH(s) before or after the corresponding beam application time. Here, the beam application time starts from the first slot that is at least BeamAppTime_r17 symbols after the last symbol of the PUCCH.

In yet another example, the UE 116 could be indicated/provided/configured by the network 130, e.g., in a beam indication/activation MAC CE or beam indication DCI (e.g., DCI format 1_1 or 1_2 with or without DL assignment), two TCI states/pairs of TCI states (i.e., N=2 or M=2) for UE-dedicated DL channels/signals receptions and/or UL channels/signals transmissions. The newly indicated first TCI state/pair of TCI states could be the same as or different from the previously indicated first (or second) TCI state/pair of TCI states and/or the newly indicated second TCI state/pair of TCI states could be the same as or different from the previously indicated second (or first) TCI state/pair of TCI states. For this case, the UE 116 could use/apply the newly indicated first TCI state/pair of TCI states (e.g., corresponding to the previously indicated first or second TCI state/pair of TCI states) to receive the first (or second) PDSCH(s) before or after the corresponding beam application time, and the newly indicated second TCI state/pair of TCI states (e.g., corresponding to the previously indicated first or second TCI state/pair of TCI states) to receive the second (or first) PDSCH(s) before or after the corresponding beam application time. Here, the beam application time starts from the first slot that is at least BeamAppTime_r17 symbols after the last symbol of the PUCCH.

In yet another example, the UE 116 could be indicated/provided/configured by the network 130, e.g., in a beam indication/activation MAC CE or beam indication DCI (e.g., DCI format 1_1 or 1_2 with or without DL assignment), two TCI states/pairs of TCI states (i.e., N=2 or M=2) for UE-dedicated DL channels/signals receptions and/or UL channels/signals transmissions. The newly indicated first TCI state/pair of TCI states could be the same as or different from the previously indicated first (or second) TCI state/pair of TCI states, and/or the newly indicated second TCI state/pair of TCI states could be the same as or different from the previously indicated second (or first) TCI state/pair of TCI states. For this case, the UE 116 could use/apply the newly indicated first TCI state/pair of TCI states (e.g., corresponding to the previously indicated first or second TCI state/pair of TCI states) to receive the first (or second) PDSCH DM-RS(s) (or, equivalently, the RS(s) in the RS set(s) provided in the newly indicated first TCI state/pair of TCI states could be QCL'ed with the first (or second) DM-RS antenna port(s) for PDSCH reception(s)) before or after the corresponding beam application time and the newly indicated second TCI state/pair of TCI states (e.g., corresponding to the previously indicated first or second TCI state/pair of TCI states) to receive the second (or first) PDSCH DM-RS(s) (or, equivalently, the RS(s) in the RS set(s) provided in the newly indicated second TCI state/pair of TCI states could be QCL'ed with the second (or first) DM-RS antenna port(s) for PDSCH reception(s)) before or after the corresponding beam application time. Here, the beam application time starts from the first slot that is at least BeamAppTime_r17 symbols after the last symbol of the PUCCH.

In yet another example, the UE 116 could follow the examples specified herein, e.g., following one or more examples described herein, to determine which one or more of the indicated TCI states/pairs of TCI states to use/apply for PDSCH reception(s).

The UE 116 could be provided/configured/indicated by the network 130, e.g., via higher layer RRC signaling/parameter and/or MAC CE command and/or dynamic DCI based L1 signaling, to follow one or more examples described herein and/or combination(s) of one or more of the specified/discussed herein to determine the association between the indicated TCI state(s) and the PDSCH reception(s). For instance, a higher layer parameter 'dynamicBeamSelectionTCI' can be provided/configured/indicated in, e.g., PDSCH-Config. When/if the higher layer parameter 'dynamicBeamSelectionTCI' is set to 'enabled', the UE 116 could follow one or more examples described herein and/or combination(s) of one or more of the specified/discussed herein to determine the association between the indicated TCI state(s) and the PDSCH reception(s).

Yet for another example, the UE 116 could be provided/configured/indicated by the network 130, via an indicator field in a DCI (e.g., the scheduling DCI or the beam indication DCI with or without DL assignment), the association between one or more of the indicated TCI states and PDSCH reception(s).

For example, the indicator field could be an existing DCI field in the corresponding DCI and repurposed to indicate/provide/configure the association between the indicated TCI state(s) and the PDSCH reception(s).

For another example, the indicator field could be a new DCI field introduced in the corresponding DCI dedicated to indicating/configuring/providing the association between the indicated TCI state(s) and the PDSCH reception(s).

Yet for another example, the indicator field could be configured by the network 130, e.g., via higher layer RRC signaling and/or MAC CE command and/or dynamic DCI based signaling. For instance, the indicator field could be higher layer RRC configured and/or MAC CE indicated and/or DCI signaled to 'on', 'off', 'enabled', 'disabled', 'present', 'absent'; that is, whether or not the indicator field is present in the corresponding DCI (e.g., DCI format 11 or 1_2) is configured/controlled by the network 130, e.g., via higher layer RRC signaling and/or MAC CE command and/or dynamic DCI based L1 signaling.

In one example, when/if the DCI indicator/indicator field discussed herein is absent or disabled or not provided/configured/indicated/specified/defined in the corresponding DCI (e.g., the scheduling DCI or the beam indication DCI with or without DL assignment), the UE 116 could follow the indicator/parameter provided/indicated/configured in PDSCH-Config described herein, the fixed rule specified/described herein, or the predefined rule specified/described herein to determine the association between the indicated TCI state(s) and the PDSCH reception(s).

In another example, if the indicator in the DCI (e.g., the scheduling DCI or the beam indication DCI with or without DL assignment) is set to '0', the first indicated TCI state/pair of TCI states could be applied/used for all PDSCH receptions before or after a beam association application time. If the indicator in the DCI (e.g., the scheduling DCI or the beam indication DCI with or without DL assignment) is set to '1', the second indicated TCI state/pair of TCI states could be applied/used for all PDSCH receptions before or after a beam association application time.

In yet another example, if the indicator in the DCI (e.g., the scheduling DCI or the beam indication DCI with or without DL assignment) is set to '0', the second indicated TCI state/pair of TCI states could be applied/used for all PDSCH receptions before or after a beam association application time. If the indicator in the DCI (e.g., the scheduling DCI or the beam indication DCI with or without DL assignment) is set to '1', the first indicated TCI state/pair of TCI states could be applied/used for all PDSCH receptions before or after a beam association application time.

In yet another example, if the indicator in the DCI (e.g., the scheduling DCI or the beam indication DCI with or without DL assignment) is set to '0' (or '1'), the first indicated TCI state/pair of TCI states could be applied/used for receiving the first PDSCH(s) and the second indicated TCI state/pair of TCI states could be applied/used for receiving the second PDSCH(s), before or after a beam association application time. If the indicator in the DCI (e.g., the scheduling DCI or the beam indication DCI with or without DL assignment) is set to '1' (or '0'), the first indicated TCI state/pair of TCI states could be applied/used for receiving the second PDSCH(s) and the second indicated TCI state/pair of TCI states could be applied/used for receiving the first PDSCH(s), before or after a beam association application time. The UE 116 could be configured/indicated/provided by the network 130, e.g., via higher layer RRC signaling/parameter and/or MAC CE command and/or dynamic DCI based L1 signaling, the first and/or second PDSCHs and their corresponding/respective configuration information.

In yet another example, if the indicator in the DCI (e.g., the scheduling DCI or the beam indication DCI with or without DL assignment) is set to '0' (or '1'), the first indicated TCI state/pair of TCI states could be applied/used for all PDSCH receptions before or after a beam association application time. If the indicator in the DCI (e.g., the scheduling DCI or the beam indication DCI with or without DL assignment) is set to '1' (or '0'), the first indicated TCI state/pair of TCI states could be applied/used for receiving the first (or second) PDSCH(s) and the second indicated TCI state/pair of TCI states could be applied/used for receiving the second (or first) PDSCH(s), before or after a beam association application time. The UE 116 could be configured/indicated/provided by the network 130, e.g., via higher layer RRC signaling/parameter and/or MAC CE command and/or dynamic DCI based L1 signaling, the first and/or second PDSCHs and their corresponding/respective configuration information.

In yet another example, if the indicator in the DCI (e.g., the scheduling DCI or the beam indication DCI with or without DL assignment) is set to '0' (or '1'), the second indicated TCI state/pair of TCI states could be applied/used for all PDSCH receptions before or after a beam association application time. If the indicator in the DCI (e.g., the scheduling DCI or the beam indication DCI with or without DL assignment) is set to '1' (or '0'), the first indicated TCI state/pair of TCI states could be applied/used for receiving the first (or second) PDSCH(s) and the second indicated TCI state/pair of TCI states could be applied/used for receiving the second (or first) PDSCH(s), before or after a beam association application time. The UE 116 could be configured/indicated/provided by the network 130, e.g., via higher layer RRC signaling/parameter and/or MAC CE command and/or dynamic DCI based L1 signaling, the first and/or second PDSCHs and their corresponding/respective configuration information.

In yet another example, if the indicator in the DCI (e.g., the scheduling DCI or the beam indication DCI with or without DL assignment) is set to '0' (or '1'), the first indicated TCI state/pair of TCI states could be applied/used for receiving the first PDSCH DM-RS(s) (or, equivalently, the RS(s) in the RS set(s) provided in the first indicated TCI state/pair of TCI states could be QCL'ed with the first DM-RS antenna port(s) for PDSCH reception(s)) before or after a beam association application time and the second indicated TCI state/pair of TCI states could be applied/used for receiving the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s)) before or after a beam association application time. If the indicator in the DCI (e.g., the scheduling DCI or the beam indication DCI with or without DL assignment) is set to '1' (or '0'), the first indicated TCI state/pair of TCI states could be applied/used for receiving the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s)) before or after a beam association application time and the second indicated TCI state/pair of TCI states could be applied/used for receiving the first PDSCH DM-RS(s) (or, equivalently, the RS(s) in the RS set(s) provided in the second indicated TCI state/pair of TCI states could be QCL'ed with the first DM-RS antenna port(s) for PDSCH reception(s)) before or after a beam association application time.

In yet another example, if the indicator in the DCI (e.g., the scheduling DCI or the beam indication DCI with or without DL assignment) is set to '00' ('01', '10' or '11'), the first indicated TCI state/pair of TCI states could still be applied/used for all PDSCH receptions before or after a beam association application time. If the indicator in the DCI (e.g., the scheduling DCI or the beam indication DCI with or without DL assignment) is set to '01' ('00', '10' or '11'), the second indicated TCI state/pair of TCI states could be applied/used for all PDSCH receptions before or after a beam association application time. If the indicator in the DCI (e.g., the scheduling DCI or the beam indication DCI with or without DL assignment) is set to '10' ('00', '01' or '11'), the first indicated TCI state/pair of TCI states could be applied/used for receiving the first PDSCH(s) and the second indicated TCI state/pair of TCI states could be applied/used for receiving the second PDSCH(s), before or after a beam association application time. If the indicator in the DCI (e.g., the scheduling DCI or the beam indication DCI with or without DL assignment) is set to '11' ('00', '01' or '10'), the first indicated TCI state/pair of TCI states could be applied/used for receiving the second PDSCH(s) and the second indicated TCI state/pair of TCI states could be applied/used for receiving the first PDSCH(s), before or after a beam association application time.

In yet another example, if the indicator in the DCI (e.g., the scheduling DCI or the beam indication DCI with or without DL assignment) is set to '00' ('01', '10' or '11'), the first indicated TCI state/pair of TCI states could still be applied/used for all PDSCH receptions before or after a beam association application time. If the indicator in the DCI (e.g., the scheduling DCI or the beam indication DCI with or without DL assignment) is set to '01' ('00', '10' or '11'), the second indicated TCI state/pair of TCI states could be applied/used for all PDSCH receptions before or after a beam association application time. If the indicator in the DCI (e.g., the scheduling DCI or the beam indication DCI with or without DL assignment) is set to '10' ('00', '01' or '11'), the first indicated TCI state/pair of TCI states could be applied/used for receiving the first PDSCH DM-RS(s) (or, equivalently, the RS(s) in the RS set(s) provided in the first indicated TCI state/pair of TCI states could be QCL'ed with the first DM-RS antenna port(s) for PDSCH reception(s)) and the second indicated TCI state/pair of TCI states could be applied/used for receiving the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s)), before or after a beam association application time. If the indicator in the DCI (e.g., the scheduling DCI or the beam indication DCI with or without DL assignment) is set to '11' ('00', '01' or '10'), the first indicated TCI state/pair of TCI states could be applied/used for receiving the second PDSCH DM-RS(s) (or, equivalently, the RS(s) in the RS set(s) provided in the second indicated TCI state/pair of TCI states could be QCL'ed with the second DM-RS antenna port(s) for PDSCH reception(s)) and the second indicated TCI state/pair of TCI states could be applied/used for receiving the first PDSCH DM-RS(s) (or, equivalently, the RS(s) in the RS set(s) provided in the second indicated TCI state/pair of TCI states could be QCL'ed with the first DM-RS antenna port(s) for PDSCH reception(s)), before or after a beam association application time.

The UE 116 could be provided/configured/indicated by the network 130, e.g., via higher layer RRC signaling/parameter and/or MAC CE command and/or dynamic DCI based L1 signaling, to follow one or more examples described herein and/or combination(s) of one or more of the examples specified/discussed herein to determine the association between the indicated TCI state(s) and the PDSCH reception(s). For instance, a higher layer parameter 'dynamicBeamSelectionDCI' can be provided/configured/indicated in, e.g., PDSCH-Config. When/if the higher layer parameter 'dynamicBeamSelectionDCI' is set to 'enabled', the UE 116 could follow one or more examples described herein and/or combination(s) of one or more of the examples specified/discussed herein to determine the association between the indicated TCI state(s) and the PDSCH reception(s).

The UE 116 could be provided/configured/indicated by the network 130, e.g., via higher layer RRC signaling/parameter and/or MAC CE command and/or dynamic DCI based L1 signaling, to follow one or more examples described herein and/or combination(s) of one or more of the examples specified/discussed herein to determine the association between the indicated TCI state(s) and the PDSCH reception(s). For instance, a higher layer parameter 'dynamicBeamSelectionPDSCH' can be provided/configured/indicated in, e.g., PDSCH-Config. When/if the higher layer parameter 'dynamicBeamSelectionPDSCH' is set to 'enabled', the UE 116 could follow one or more examples described herein and/or combination(s) of one or more of the examples specified/discussed herein to determine the association between the indicated TCI state(s) and the PDSCH reception(s).

In one embodiment, the UE 116 could be indicated/configured/provided/informed by the network 130, e.g., via higher layer RRC signaling and/or MAC CE command and/or dynamic DCI based L1 signaling, when (start and/or end) to follow the indicator/parameter provided/indicated/configured in the higher layer parameter PDSCH-Config as specified herein, the fixed rule(s) described herein, or the predefined rule(s) described herein for determining the association between the indicated TCI state(s) and the PDSCH reception(s). The UE 116 could also be indicated/configured/provided/informed by the network 130, e.g., via higher layer RRC signaling and/or MAC CE command and/or dynamic DCI based L1 signaling, when (start and/or end) to follow the dynamic TRP(s) selection/switching methods specified herein (e.g., one or more examples described herein) for determining the association between the indicated TCI state(s) and the PDSCH reception(s).

In one example, the UE 116 could be indicated/configured/provided by the network 130, e.g., via higher layer RRC signaling and/or MAC CE command and/or dynamic DCI based signaling, a first application timer. The UE 116 could follow the indicator/parameter provided/indicated/configured in the higher layer parameter PDSCH-Config as specified herein, the fixed rule(s) specified herein, or the predefined rule(s) specified herein to determine the association between the indicated TCI state(s) and the PDSCH reception(s) before the first application timer expires. In addition, the UE 116 could be indicated/configured/provided by the network 130, e.g., via higher layer RRC signaling and/or MAC CE command and/or dynamic DCI based signaling, a second application timer. The UE 116 could follow the dynamic TRP(s) selection/switching methods specified herein (e.g., one or more examples described herein) to determine the association between the indicated TCI state(s) and the PDSCH reception(s) before the second application timer expires. The first application timer could be the same as or different from the second application timer. The first application timer could have higher or lower priority than the second application timer. The first and/or second application timers could be reset by the network 130 (e.g., via higher layer RRC signaling and/or MAC CE command and/or dynamic DCI based signaling), and/or according to one or more events such as TCI state(s) update.

In another example, the UE 116 could be indicated/configured/provided by the network 130, e.g., via higher layer RRC signaling and/or MAC CE command and/or dynamic DCI based signaling, a first application time window/period. The UE 116 could follow the indicator/parameter provided/indicated/configured in the higher layer parameter PDSCH-Config as specified herein, the fixed rule(s) specified herein, or the predefined rule(s) specified herein to determine the association between the indicated TCI state(s) and the PDSCH reception(s) within the first application time window/period. In addition, the UE 116 could be indicated/configured/provided by the network 130, e.g., via higher layer RRC signaling and/or MAC CE command and/or dynamic DCI based signaling, a second application time window/period. The UE 116 could follow the dynamic TRP(s) selection/switching methods specified herein (e.g., one or more examples described herein) to determine the association between the indicated TCI state(s) and the PDSCH reception(s) within the second application time window/period. The first application time window/period could be the same as or different from the second application time window/period.

In yet another example, when/if the UE 116 is indicated/provided/configured by the network 130, e.g., via beam indication/activation MAC CE and/or one or more TCI codepoints in one or more TCI fields in the beam indication DCI (e.g., DCI format 1_1 or 1_2 with or without DL assignment), N>1 or M>1 (e.g., N=2 or M=2) TCI states/pairs of TCI states update(s)/indication(s), the UE 116 could follow the indicator/parameter provided/indicated/configured in the higher layer parameter PDSCH-Config as specified herein, the fixed rule(s) specified herein, or the predefined rule(s) specified herein to determine the association between the indicated TCI state(s) and the PDSCH reception (s). When/if the UE 116 is indicated/provided/configured by the network 130, e.g., via beam indication/activation MAC CE and/or one or more TCI codepoints in one or more TCI fields in the beam indication DCI (e.g., DCI format 1_1 or 1_2 with or without DL assignment), a single (e.g., N=1 or M=1) TCI state/pair of TCI states update(s)/indication(s), the UE 116 could follow the dynamic TRP(s) selection/switching methods specified herein (e.g., one or more examples described herein) to determine the association between the indicated TCI state(s) and the PDSCH reception(s).

In yet another example, when/if the UE 116 is indicated/provided/configured by the network 130, e.g., via beam indication/activation MAC CE and/or one or more TCI codepoints in one or more TCI fields in the beam indication DCI (e.g., DCI format 1_1 or 1_2 with or without DL assignment), a single (e.g., N=1 or M=1) TCI state/pair of TCI states update(s)/indication(s), the UE 116 could follow the indicator/parameter provided/indicated/configured in the higher layer parameter PDSCH-Config as specified herein, the fixed rule(s) specified herein, or the predefined rule(s) specified herein to determine the association between the indicated TCI state(s) and the PDSCH reception(s). When/if the UE 116 is indicated/provided/configured by the network 130, e.g., via beam indication/activation MAC CE and/or one or more TCI codepoints in one or more TCI fields in the beam indication DCI (e.g., DCI format 1_1 or 1_2 with or without DL assignment), N>1 or M>1 (e.g., N=2 or M=2) TCI states/pairs of TCI states update(s)/indication(s), the UE 116 could follow the dynamic TRP(s) selection/switching methods specified herein (e.g., one or more examples described herein) to determine the association between the indicated TCI state(s) and the PDSCH reception(s).

In yet another example, when/if the UE 116 receives from the network 130, e.g., via higher layer RRC signaling (e.g., in PDSCH-Config), a higher layer parameter 'beamSelectionPDSCH' set to 'enabled', the UE 116 could follow the indicator/parameter provided/indicated/configured in the higher layer parameter PDSCH-Config as specified herein, the fixed rule(s) specified herein, or the predefined rule(s) specified herein to determine the association between the indicated TCI state(s) and the PDSCH reception(s). Otherwise, e.g., when/if the higher layer parameter 'beamSelectionPDSCH' is set to 'disabled', the UE 116 could follow the dynamic TRP(s) selection/switching methods specified herein (e.g., one or more examples described herein) to determine the association between the indicated TCI state(s) and the PDSCH reception(s). Alternatively, when/if the UE 116 receives from the network 130, e.g., via higher layer RRC signaling (e.g., in PDSCH-Config), higher layer parameter(s) 'dynamicBeamSelectionPDSCH' or 'dynamicBeamSelectionCoreset' or 'dynamicBeamSelectionTCI' or 'dynamicBeamSelectionDCI' specified/defined herein set to 'enabled', the UE 116 could follow the dynamic TRP(s) selection/switching methods specified herein (e.g., one or more examples described herein) to determine the association between the indicated TCI state(s) and the PDSCH reception(s). Otherwise, e.g., when/if the higher layer parameter(s) 'dynamicBeamSelectionPDSCH' or 'dynamicBeamSelectionCoreset' or 'dynamicBeamSelectionTCI' or 'dynamicBeamSelectionDCI' specified/defined herein is set to 'disabled', the UE 116 could follow the indicator/parameter provided/indicated/configured in the higher layer parameter PDSCH-Config as specified herein, the fixed rule(s) specified herein, or the predefined rule(s) specified herein to determine the association between the indicated TCI state(s) and the PDSCH reception(s).

Figures 14, 15:
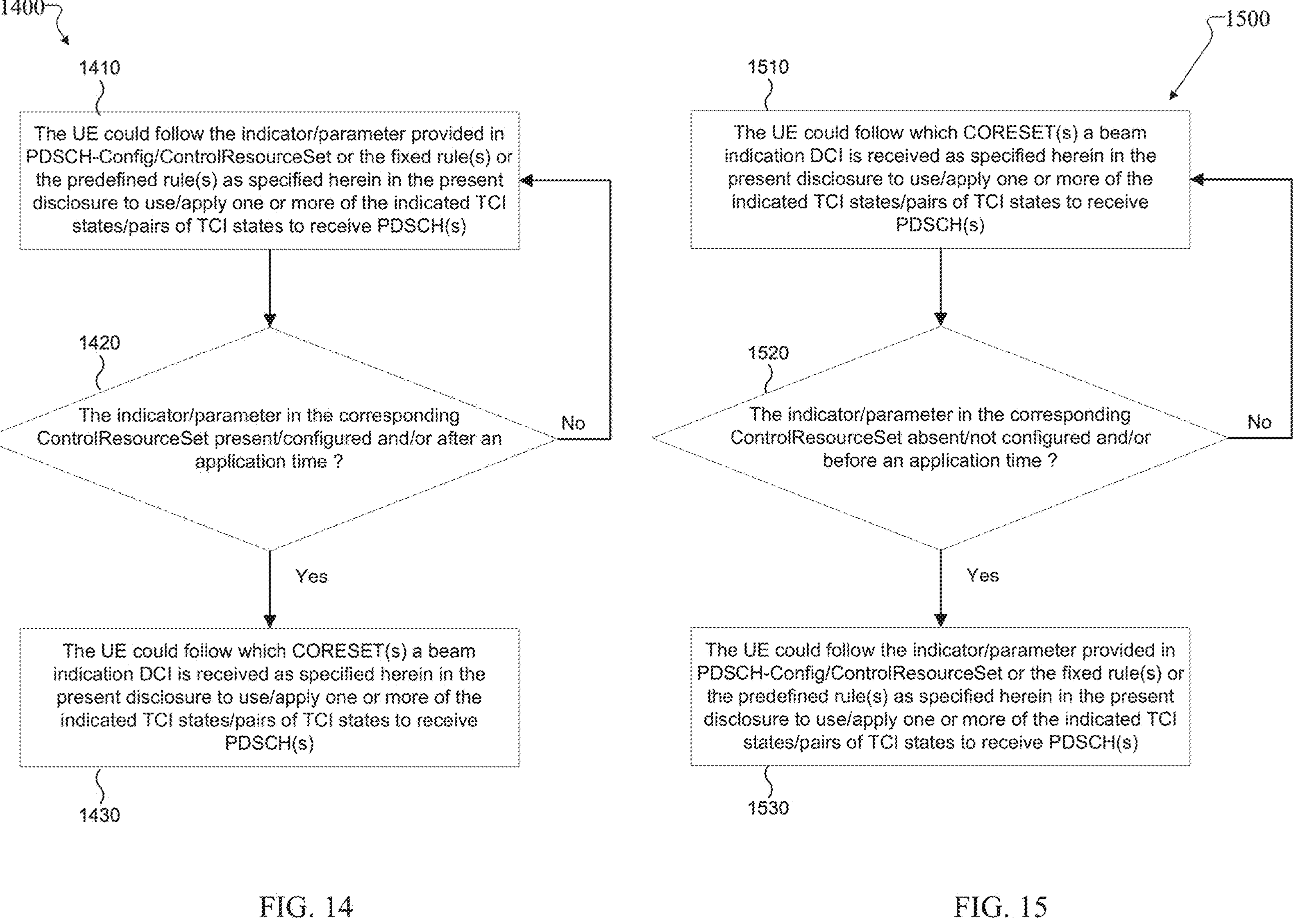
FIG. 14 illustrates a flowchart of another example procedure for determining which of the indicated TCI state(s) to use for PDSCH reception(s) according to embodiments of the present disclosure.
FIG. 15 illustrates a flowchart of yet another example procedure for determining which of the indicated TCI state(s) to use for PDSCH reception(s) according to embodiments of the present disclosure.

FIG. 14 illustrates a flowchart of another example procedure 1400 for determining which of the indicated TCI state(s) to use for PDSCH reception(s) according to embodiments of the present disclosure. For example, procedure 1400 could be performed by any of the UEs 111-116 and, more particularly, by the processor 340. This example is for illustration only and other embodiments can be used without departing from the scope of the present disclosure.

The procedure begins in step 1410, the UE 116 could follow the indicator/parameter provided in PDSCH-Config/ControlResourceSet, the fixed rule(s), or the predefined rule(s) as specified herein to use/apply one or more of the indicated TCI states/pairs of TCI states to receive PDSCH(s). In step 1420, the UE 116 can have the indicator/parameter in the corresponding ControlResourceSet present/configured and/or after an application time. If so, in step 1430, the UE 116 could then follow which CORESET(s) a beam indication DCI is received as specified herein to use/apply one or more of the indicated TCI states/pairs of TCI states to receive PDSCH(s). Otherwise, the procedure returns to step 1410.

In one embodiment, the UE 116 could first follow the indicator/parameter provided in the higher layer parameter, e.g., PDSCH-Config, as specified herein—e.g., following one or more examples described herein or the fixed rule(s) specified herein—e.g., following one or more examples described herein, or the predefined rule(s) specified herein—e.g., following one or more examples described herein, to determine and apply a first association between one or more of the indicated TCI states/pairs of TCI states and the PDSCH reception(s)—or, equivalently, to determine and apply one or more of the indicated TCI states/pairs of TCI states—denoted by first (default) TCI state(s)/pair(s) of TCI states—for PDSCH reception(s). The UE 116 could stop applying the first association or the first (default) TCI state(s)/pair(s) of TCI states for PDSCH reception(s), and use which CORESET(s) the beam indication DCI is received, as specified herein—e.g., following one or more examples described herein, to determine and apply a second association between one or more of the indicated TCI states/pairs of TCI states and PDSCH reception(s)—or, equivalently, to determine and apply one or more of the indicated TCI states/pairs of TCI states—denoted by second TCI state(s)/pair(s) of TCI states—for PDSCH reception(s) according to one or more of the following conditions.

In one example, the indicator/parameter in ControlResourceSet as specified herein (e.g., according to one or more examples described herein) is configured/enabled/present.

In another example, the indicator/parameter in ControlResourceSet as specified herein (according to one or more examples described herein) is configured/enabled/present, and set to a specific value such as '0', '1', '00', '01', '10' or '11'.

In yet another example, a higher layer parameter, e.g., denoted by 'dynamicBeamAssociationPDSCH', provided in a higher layer RRC parameter, e.g., PDSCH-Config/PDCCH-Config/ControlResourceSet, is set to 'enabled' or 'on', or is configured/present.

In yet another example, a higher layer parameter, e.g., denoted by 'defaultBeamAssociationPDSCH', provided in a higher layer RRC parameter, e.g., PDSCH-Config/PDCCH-Config/ControlResourceSet, is set to 'disabled' or 'off', or is not configured/present.

In yet another example, the number of TCI states or configurations configured/provided in a first list of TCI states or configurations or a second list of TCI states or configurations is smaller/lower (or greater/higher) than a threshold, wherein the UE 116 can be configured with the first list of DLorJointTCIState configurations within the higher layer parameter PDSCH-Config for providing a reference signal for the quasi co-location for DM-RS of PDSCH and DM-RS of PDCCH in a CC, for CSI-RS, and to provide a reference, if applicable, for determining UL TX spatial filter for dynamic-grant and configured-grant based PUSCH and PUCCH resource in a CC, and SRS, and the second list of UL-TCIState configurations, to provide a reference, if applicable, for determining UL TX spatial filter for dynamic-grant and configured-grant based PUSCH and PUCCH resource in a CC, and SRS, wherein the UE 116 could be provided/configured/indicated by the network 130, e.g., via higher layer RRC signaling/parameter and/or MAC CE command and/or dynamic DCI based L1 signaling, the threshold.

In yet another example, the number of TCI codepoints activated by a beam indication/activation MAC CE, e.g., the Unified TCI States Activation/Deactivation MAC CE or Enhanced Unified TCI States Activation/Deactivation MAC CE, is smaller/lower (or greater/higher) than a threshold, wherein the UE 116 could be provided/configured/indicated by the network 130, e.g., via higher layer RRC signaling/parameter and/or MAC CE command and/or dynamic DCI based L1 signaling, the threshold.

In yet another example, the beam application time (BAT) provided by, e.g., BeamAppTime_r17, is smaller/lower (or greater/higher) than a threshold, wherein the UE 116 could be provided/configured/indicated by the network 130, e.g., via higher layer RRC signaling/parameter and/or MAC CE command and/or dynamic DCI based L1 signaling, the threshold. Furthermore, the beam application time is defined as follows. When the UE 116 would transmit the last symbol of a PUCCH with HARQ-ACK information corresponding to the DCI carrying the TCI State indication and without DL assignment or corresponding to the PDSCH scheduling by the DCI carrying the TCI State indication, and if the indicated TCI State is different from the previously indicated one, the indicated DLorJointTCIState or UL-TCIstate should be applied starting from the first slot that is at least BeamAppTime_r17 symbols after the last symbol of the PUCCH. The first slot and the BeamAppTime_r17 symbols are both determined on the carrier with the smallest SCS among the carrier(s) applying the beam indication.

In yet another example, a capability signaling/value, e.g., dynamicBeamAssociationPDSCH, to indicate to the network 130 that the UE 116 is capable of or able to use which CORESET(s) the beam indication DCI is received, as specified herein—e.g., following one or more examples described herein, to determine the association between one or more of the indicated TCI states/pairs of TCI states and PDSCH reception(s), is reported. Optionally, the UE 116 could be configured by the network 130, e.g., via higher layer RRC signaling/parameter (denoted by enableDynamicBeamAssociationPDSCH) and/or MAC CE command and/or dynamic DCI based L1 signaling, to use which CORESET(s) the beam indication DCI is received, as specified herein—e.g., following one or more examples described herein, to determine the association between one or more of the indicated TCI states/pairs of TCI states and PDSCH reception(s).

In yet another example, a capability signaling/value, e.g., defaultBeamAssociationPDSCH, to indicate to the network 130 that the UE 116 is capable of or able to use the indicator/parameter provided in the higher layer parameter, e.g., PDSCH-Config, as specified herein—e.g., following one or more examples described herein, to determine the association between one or more of the indicated TCI states/pairs of TCI states and the PDSCH reception(s), is not reported. Optionally, the UE 116 could be configured by the network 130, e.g., via higher layer RRC signaling/parameter (denoted by enableDefaultBeamAssociationPDSCH) and/or MAC CE command and/or dynamic DCI based L1 signaling, to use the indicator/parameter provided in the higher layer parameter, e.g., PDSCH-Config, as specified herein—e.g., following one or more examples described herein, to determine the association between one or more of the indicated TCI states/pairs of TCI states and the PDSCH reception(s).

In yet another example, a DCI (e.g., the scheduling DCI or the beam indication DCI with or without DL assignment) is received in a first CORESET, wherein the UE 116 could be provided/configured/indicated by the network 130, e.g., via higher layer RRC signaling/parameter and/or MAC CE command and/or dynamic DCI based L1 signaling, configuration information of the first CORESET. For example, the first CORESET could correspond to a CORESET with UE specific search space (USS) or common search space (CSS). For another example, the first CORESET could be configured/associated with an indicator set to '0' (or '1') in the corresponding ControlResourceSet that configures the first CORESET. Yet for another example, the first CORESET could be comprised/included/contained in a CORESET group/pool with the corresponding CORESET group/pool index value set to '0' (or '1').

Here, the first association could be identical to/same as or different from the second association, and the first application time T1 could be determined according to one or more of: (1) T1=0, (2) fixed in the system specifications, e.g., T1=7 symbols, T1=3 ms, etc., (3) selected/determined from a set of candidate values for application time, (4) provided/configured/indicated by the network 130 (e.g., from a set of candidate values for application time), e.g., via higher layer RRC signaling/parameter and/or MAC CE command and/or dynamic DCI based L1 signaling, (5) T1=timeDurationForQCL, (6) T1=BeamAppTime_r17, (7) T1 corresponds to the first slot that is at least BeamAppTime_r17 symbols after the last symbol of the PUCCH, and the first slot and the BeamAppTime_r17 symbols are both determined on the carrier with the smallest SCS among the carrier(s) applying the beam indication, (8) the maximum (max) or minimum (min) between T1 determined according to one or more of the examples specified herein (e.g., those specified in (1)-(7) herein) and a second application time T2, where T2 could be similarly determined according to one or more of the examples specified herein (e.g., those specified in (1)-(7) herein). In addition, the first TCI state(s)/pair(s) of TCI states could be identical to/same as or different from the second (default) TCI state(s)/pair(s) of TCI states.

In one embodiment, the UE 116 could first use which CORESET(s) the beam indication DCI is received, as specified herein—e.g., following one or more examples described herein, to determine a first association between one or more of the indicated TCI states/pairs of TCI states and PDSCH reception(s)—or, equivalently, to determine one or more of the indicated TCI states/pairs of TCI states—denoted by first TCI state(s)/pair(s) of TCI states—for PDSCH reception(s). The UE 116 could apply the first association or the first TCI state(s)/pair(s) of TCI states for PDSCH reception(s) after a first application time T1. Before the first application time or before the first application time becomes effective or before the UE 116 could apply the first association or the first TCI state(s)/pair(s) of TCI states for PDSCH reception(s)—e.g., at time t, In one example, the UE 116 could follow the indicator/parameter provided in the higher layer parameter, e.g., PDSCH-Config, as specified herein—e.g., following one or more examples described herein, or the fixed rule(s) specified herein—e.g., following one or more examples described herein or the predefined rule(s) specified—e.g., following one or more examples described herein, to determine and apply a second association between one or more of the indicated TCI states/pairs of TCI states and the PDSCH reception(s)—or, equivalently, to determine and apply one or more of the indicated TCI states/pairs of TCI states—denoted by second (default) TCI state(s)/pair(s) of TCI states—for PDSCH reception(s).

In another example, the UE 116 could use the indicated TCI state(s)/pair(s) of TCI states by one or more TCI codepoints in one or more TCI fields in the beam indication DCI (e.g., DCI 1_1/1_2 with or without DL assignment), as specified herein—e.g., following one or more examples described herein, to determine and apply a second association between one or more of the indicated TCI states/pairs of TCI states and PDSCH reception(s)—or, equivalently, to determine and apply one or more of the indicated TCI states/pairs of TCI states—denoted by second TCI state(s)/pair(s) of TCI states—for PDSCH reception(s). Alternatively, the UE 116 could use/apply the same TCI state(s)/pair(s) of TCI states used/applied for receiving the beam indication DCI—e.g., following those specified herein (e.g., according to one or more examples described herein)—for PDSCH reception(s). Or equivalent, the UE 116 may assume that the DM-RS ports of the PDSCH(s) are quasi co-located with the RS(s) with respect to the QCL parameter(s) used for monitoring/receiving the beam indication DCI—e.g., following those specified herein (e.g., according to one or more examples described herein). Here, the beam indication DCI could be received in PDCCH(s) specified herein, e.g., following one or more examples described herein.

In yet another example, the UE 116 could use the DCI field indicator in the DCI (e.g., the scheduling DCI or the beam indication DCI with or without DL assignment) as specified herein—e.g., following one or more examples described herein, to determine a second association between one or more of the indicated TCI states/pairs of TCI states and PDSCH reception(s)—or, equivalently, to determine one or more of the indicated TCI states/pairs of TCI states—denoted by second TCI state(s)/pair(s) of TCI states—for PDSCH reception(s). Alternatively, the UE 116 could use/apply the same TCI state(s)/pair(s) of TCI states used/applied for receiving the DCI with the DCI field indicator present/configured—e.g., following those specified herein (e.g., according to one or more examples described herein)—for PDSCH reception(s). Or equivalent, the UE 116 may assume that the DM-RS ports of the PDSCH(s) are quasi co-located with the RS(s) with respect to the QCL parameter(s) used for monitoring/receiving the DCI with the DCI field indicator present/configured—e.g., following those specified herein (e.g., according to one or more examples described herein). Here, the DCI with the DCI field indicator present/configured could be received in PDCCH(s) specified herein, e.g., following one or more examples described herein.

In yet another example, the UE 116 could use which CORESET(s) the beam indication DCI is received, as specified herein—e.g., one or more examples described herein, to determine and apply a second association between one or more of the indicated TCI states/pairs of TCI states and PDSCH reception(s)—or, equivalently, to determine and apply one or more of the indicated TCI states/pairs of TCI states—denoted by second TCI state(s)/pair(s) of TCI states—for PDSCH reception(s).

In one example, the indicated TCI state(s)/pair(s) of TCI states could correspond to the TCI state(s)/pair(s) of TCI states indicated/provided in the latest or the most recent beam indication/activation MAC CE, e.g., the Unified TCI States Activation/Deactivation MAC CE or Enhanced Unified TCI States Activation/Deactivation MAC CE or the beam indication DCI (e.g., DCI format 1_1/1_2 with or without DL assignment) received in time.

In another example, the indicated TCI state(s)/pair(s) of TCI states could correspond to the TCI state(s)/pair(s) of TCI states indicated/provided in the beam indication/activation MAC CE, e.g., the Unified TCI States Activation/Deactivation MAC CE or Enhanced Unified TCI States Activation/Deactivation MAC CE or the beam indication DCI (e.g., DCI format 1_1/1_2 with or without DL assignment) that is received later in time and/or in the latest slot in which one or more CORESETs within the active BWP of the serving cell are monitored by the UE 116.

In yet another example, the indicated TCI state(s)/pair(s) of TCI states could correspond to the TCI state(s)/pair(s) of TCI states indicated/provided in the latest or the most recent (received in time) beam indication/activation MAC CE, e.g., the Unified TCI States Activation/Deactivation MAC CE, Enhanced Unified TCI States Activation/Deactivation MAC CE, or the beam indication DCI (e.g., DCI format 1_1/1_2 with or without DL assignment) that is received before the first application time T1, a second application time T2, or when/if the first application time T1 or a second application time T2 has been reached/passed (e.g., less than or equal to, or greater than or equal to the time t).

In yet another example, the indicated TCI state(s)/pair(s) of TCI states could correspond to the TCI state(s)/pair(s) of TCI states indicated/provided in the beam indication/activation MAC CE, e.g., the Unified TCI States Activation/Deactivation MAC CE, Enhanced Unified TCI States Activation/Deactivation MAC CE, or the beam indication DCI (e.g., DCI format 1_1/1_2 with or without DL assignment) that is received later in time and/or in the latest slot in which one or more CORESETs within the active BWP of the serving cell are monitored by the UE 116 and/or before the first application time T1, a second application time T2, or when/if the first application time T1 or a second application time T2 has been reached/passed (e.g., less than or equal to, or greater than or equal to the time t).

In yet another example, the indicated TCI state(s)/pair(s) of TCI states could correspond to the TCI state(s)/pair(s) of TCI states indicated/provided in the second latest or the previous/prior beam indication/activation MAC CE, e.g., the Unified TCI States Activation/Deactivation MAC CE, Enhanced Unified TCI States Activation/Deactivation MAC CE, or the beam indication DCI (e.g., DCI format 1_1/1_2 with or without DL assignment) received in time.

In yet another example, the indicated TCI state(s)/pair(s) of TCI states could correspond to the TCI state(s)/pair(s) of TCI states indicated/provided in the beam indication/activation MAC CE, e.g., the Unified TCI States Activation/Deactivation MAC CE, Enhanced Unified TCI States Activation/Deactivation MAC CE, or the beam indication DCI (e.g., DCI format 1_1/1_2 with or without DL assignment) that is received earlier in time and/or in the latest slot in which one or more CORESETs within the active BWP of the serving cell are monitored by the UE 116.

In yet another example, the indicated TCI state(s)/pair(s) of TCI states could correspond to the TCI state(s)/pair(s) of TCI states indicated/provided in the second latest or the previous/prior (received in time) beam indication/activation MAC CE, e.g., the Unified TCI States Activation/Deactivation MAC CE, Enhanced Unified TCI States Activation/Deactivation MAC CE, or the beam indication DCI (e.g., DCI format 1_1/1_2 with or without DL assignment) that is received before the first application time T1, a second application time T2, or when/if the first application time T1 or a second application time T2 has been reached/passed (e.g., less than or equal to, or greater than or equal to the time t).

In yet another example, the indicated TCI state(s)/pair(s) of TCI states could correspond to the TCI state(s)/pair(s) of TCI states indicated/provided in the beam indication/activation MAC CE, e.g., the Unified TCI States Activation/Deactivation MAC CE, Enhanced Unified TCI States Activation/Deactivation MAC CE, or the beam indication DCI (e.g., DCI format 1_1/1_2 with or without DL assignment) that is received earlier in time and/or in the latest slot in which one or more CORESETs within the active BWP of the serving cell are monitored by the UE 116 and/or before the first application time T1, a second application time T2, or when/if the first application time T1 or a second application time T2 has been reached/passed (e.g., less than or equal to, or greater than or equal to the time t).

FIG. 15 illustrates a flowchart of yet another example procedure 1500 for determining which of the indicated TCI state(s) to use for PDSCH reception(s) according to embodiments of the present disclosure. For example, procedure 1500 could be performed by any of the UEs 111-116 and, more particularly, by the processor 340 and the memory 360. This example is for illustration only and other embodiments can be used without departing from the scope of the present disclosure.

The procedure begins in step 1510, the UE 116 could follow which CORESET(s) a beam indication DCI is received as specified herein to use/apply one or more of the indicated TCI states/pairs of TCI states to receive PDSCH(s). In step 1520, the UE 116 can have the indicator/parameter in the corresponding ControlResourceSet absent/not configured and/or before an application time. If so, in step 1530, the UE 116 could then follow the indicator/parameter provided in PDSCH-Config/ControlResourceSet, the fixed rule(s), or the predefined rules as specified herein. Otherwise, the procedure returns to step 1510.

Even after the first application time, i.e., when the UE 116 is able to apply the first association or the first TCI state(s)/pair(s) of TCI states for PDSCH reception(s), the UE 116 could still determine and apply the second association or the second (default) TCI state(s)/pair(s) of TCI states—e.g. follow one or more examples described herein—to receive PDSCH(s) according to one or more of the following conditions.

In one example, the indicator/parameter in ControlResourceSet as specified herein (e.g., according to one or more examples described herein) is not configured/enabled/present.

In another example, the indicator/parameter in ControlResourceSet as specified herein (according to one or more examples described herein) is configured/enabled/present, and set to a specific value such as ‘0’, ‘1’, ‘00’, ‘01’, ‘10’ or ‘11’.

In yet another example, a higher layer parameter, e.g., denoted by ‘dynamicBeamAssociationPDSCH’, provided in a higher layer RRC parameter, e.g., PDSCH-Config/PDCCH-Config/ControlResourceSet, is set to ‘disabled’ or ‘off’, or is not configured/present.

In yet another example, a higher layer parameter, e.g., denoted by ‘defaultBeamAssociationPDSCH’, provided in a higher layer RRC parameter, e.g., PDSCH-Config/PDCCH-Config/ControlResourceSet, is set to ‘enabled’ or ‘on’, or is configured/present.

In yet another example, the number of TCI states or configurations configured/provided in a first list of TCI states or configurations or a second list of TCI states or configurations is smaller/lower (or greater/higher) than a threshold, wherein the UE 116 can be configured with the first list of DLorJointTCIState configurations within the higher layer parameter PDSCH-Config for providing a reference signal for the quasi co-location for DM-RS of PDSCH and DM-RS of PDCCH in a CC, for CSI-RS, and to provide a reference, if applicable, for determining UL TX spatial filter for dynamic-grant and configured-grant based PUSCH and PUCCH resource in a CC, and SRS, and the second list of UL-TCIState configurations, to provide a reference, if applicable, for determining UL TX spatial filter for dynamic-grant and configured-grant based PUSCH and PUCCH resource in a CC, and SRS, wherein the UE 116 could be provided/configured/indicated by the network 130, e.g., via higher layer RRC signaling/parameter and/or MAC CE command and/or dynamic DCI based L1 signaling, the threshold.

In yet another example, the number of TCI codepoints activated by a beam indication/activation MAC CE, e.g., the Unified TCI States Activation/Deactivation MAC CE or Enhanced Unified TCI States Activation/Deactivation MAC CE, is smaller/lower (or greater/higher) than a threshold, wherein the UE 116 could be provided/configured/indicated by the network 130, e.g., via higher layer RRC signaling/parameter and/or MAC CE command and/or dynamic DCI based L1 signaling, the threshold.

In yet another example, the beam application time (BAT) provided by, e.g., BeamAppTime_r17, is smaller/lower (or greater/higher) than a threshold, wherein the UE 116 could be provided/configured/indicated by the network 130, e.g., via higher layer RRC signaling/parameter and/or MAC CE command and/or dynamic DCI based L1 signaling, the threshold. Furthermore, the beam application time is defined as follows. When the UE 116 would transmit the last symbol of a PUCCH with HARQ-ACK information corresponding to the DCI carrying the TCI State indication and without DL assignment or corresponding to the PDSCH scheduling by the DCI carrying the TCI State indication, and if the indicated TCI State is different from the previously indicated one, the indicated DLorJointTCIState or UL-TCIstate should be applied starting from the first slot that is at least BeamAppTime_r17 symbols after the last symbol of the PUCCH. The first slot and the BeamAppTime_r17 symbols are both determined on the carrier with the smallest SCS among the carrier(s) applying the beam indication.

In yet another example, the first application time as specified herein is smaller/lower (or greater/higher) than a threshold, wherein the UE 116 could be provided/configured/indicated by the network 130, e.g., via higher layer RRC signaling/parameter and/or MAC CE command and/or dynamic DCI based L1 signaling, the threshold.

In yet another example, the second application time as specified herein is smaller/lower (or greater/higher) than a threshold, wherein the UE 116 could be provided/configured/indicated by the network 130, e.g., via higher layer RRC signaling/parameter and/or MAC CE command and/or dynamic DCI based L1 signaling, the threshold.

In yet another example, a capability signaling/value, e.g., dynamicBeamAssociationPDSCH, to indicate to the network 130 that the UE 116 is capable of or able to use which CORESET(s) the beam indication DCI is received, as specified herein—e.g., following one or more examples described herein, to determine the association between one or more of the indicated TCI states/pairs of TCI states and PDSCH reception(s), is not reported. Optionally, the UE 116 could be configured by the network 130, e.g., via higher layer RRC signaling/parameter (denoted by enableDynamicBeamAssociationPDSCH) and/or MAC CE command and/or dynamic DCI based L1 signaling, to use which CORESET(s) the beam indication DCI is received, as specified herein—e.g., following one or more examples described herein, to determine the association between one or more of the indicated TCI states/pairs of TCI states and PDSCH reception(s).

In yet another example, a capability signaling/value, e.g., defaultBeamAssociationPDSCH, to indicate to the network 130 that the UE 116 is capable of or able to use the indicator/parameter provided in the higher layer parameter, e.g., PDSCH-Config, as specified herein—e.g., following one or more examples described herein, to determine the association between one or more of the indicated TCI states/pairs of TCI states and the PDSCH reception(s), is reported. Optionally, the UE 116 could be configured by the network 130, e.g., via higher layer RRC signaling/parameter (denoted by enableDefaultBeamAssociationPDSCH) and/or MAC CE command and/or dynamic DCI based L1 signaling, to use the indicator/parameter provided in the higher layer parameter, e.g., PDSCH-Config, as specified herein—e.g., following one or more examples described herein, to determine the association between one or more of the indicated TCI states/pairs of TCI states and the PDSCH reception(s).

In yet another example, a DCI (e.g., the scheduling DCI or the beam indication DCI with or without DL assignment) is received in a first CORESET, wherein the UE 116 could be provided/configured/indicated by the network 130, e.g., via higher layer RRC signaling/parameter and/or MAC CE command and/or dynamic DCI based L1 signaling, configuration information of the first CORESET.

For example, the first CORESET could correspond to a CORESET with UE specific search space (USS) or common search space (CSS).

For another example, the first CORESET could be configured/associated with an indicator set to '0' (or '1') in the corresponding ControlResourceSet that configures the first CORESET.

Yet for another example, the first CORESET could be comprised/included/contained in a CORESET group/pool with the corresponding CORESET group/pool index value set to '0' (or '1').

Here, the first association could be identical to/same as or different from the second association and the first or second application time T1 or T2 could be determined according to one or more of: (1) T1=0 or T2=0, (2) fixed in the system specifications, e.g., T1=7 symbols, T1=3 ms, T2=7 symbols, T2=3 ms, etc., (3) selected/determined from a set of candidate values for application time, (4) provided/configured/indicated by the network 130 (e.g., from a set of candidate values for application time), e.g., via higher layer RRC signaling/parameter and/or MAC CE command and/or dynamic DCI based L1 signaling, (5) T1=timeDurationForQCL or T2=timeDurationForQCL, (6) T1=BeamAppTime_r17 or T2=BeamAppTime_r17, (7) T1 or T2 corresponds to the first slot that is at least BeamAppTime_r17 symbols after the last symbol of the PUCCH, and the first slot and the BeamAppTime_r17 symbols are both determined on the carrier with the smallest SCS among the carrier(s) applying the beam indication, (8) the maximum (max) or minimum (min) between T1 or T2 determined according to one or more of the examples specified herein (e.g., those specified in (1)-(7) herein) and a third application time T3, where T3 could be similarly determined according to one or more of the examples specified herein (e.g., those specified in (1)-(7) herein). In addition, the first TCI state(s)/pair(s) of TCI states could be identical to/same as or different from the second (default) TCI state(s)/pair(s) of TCI states.

Figure 16:
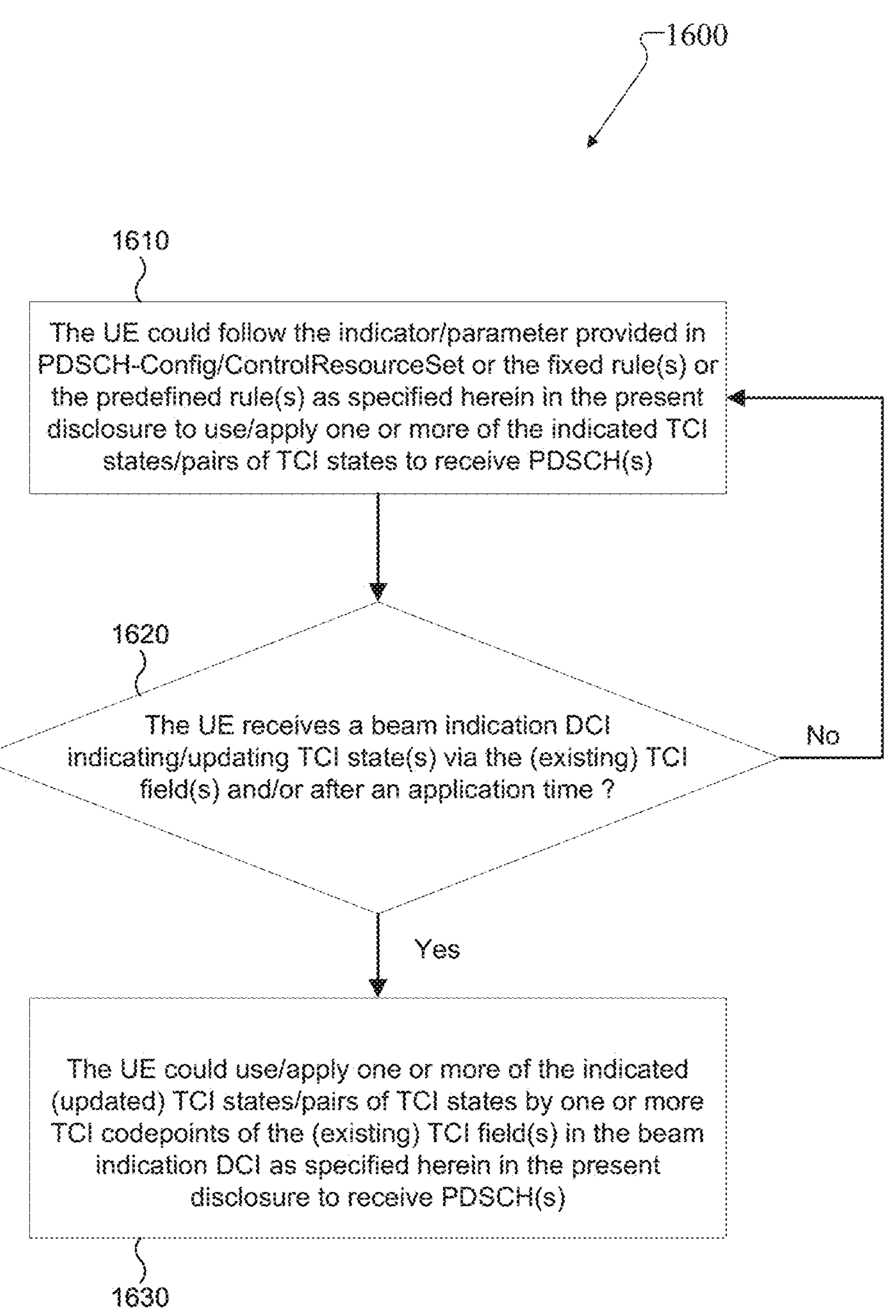
FIG. 16 illustrates a flowchart of yet another example procedure for determining which of the indicated TCI state(s) to use for PDSCH reception(s) according to embodiments of the present disclosure.

FIG. 16 illustrates a flowchart of yet another example procedure 1600 for determining which of the indicated TCI state(s) to use for PDSCH reception(s) according to embodiments of the present disclosure. For example, procedure 1600 could be performed by any of the UEs 111-116 and, more particularly, by the processor 340 and the memory 360. This example is for illustration only and other embodiments can be used without departing from the scope of the present disclosure.

The procedure begins in step 1610, the UE 116 could follow the indicator/parameter provided in PDSCH-Config/ControlResourceSet, the fixed rule(s), or the predefined rule(s) as specified herein to use/apply one or more of the indicated TCI states/pairs of TCI states to receive PDSCH (s). In step 1620, the UE 116 can receive a beam indication DCI indicating/updating TCI state(s) via the (existing) TCI field(s) and/or after an application time. If so, in step 1630, the UE 116 then could use/apply one or more of the indicated (updated) TCI states/pairs of TCI states by one or more TCI codepoints of the (existing) TCI field(s) in the beam indication DCI as specified herein to receive PDSCH(s). Otherwise, the procedure returns to step 1610.

In one embodiment, the UE 116 could first follow the indicator/parameter provided in the higher layer parameter, e.g., PDSCH-Config, as specified herein—e.g., following one or more examples described herein, the fixed rule(s) specified herein—e.g., following one or more examples described herein, or the predefined rule(s) specified herein—e.g., following one or more examples described herein, to determine and apply a first association between one or more of the indicated TCI states/pairs of TCI states and the PDSCH reception(s)—or, equivalently, to determine and apply one or more of the indicated TCI states/pairs of TCI states—denoted by first (default) TCI state(s)/pair(s) of TCI states—for PDSCH reception(s). The UE 116 could stop applying the first association or the first (default) TCI state(s)/pair(s) of TCI states for PDSCH reception(s) and use the indicated TCI state(s)/pair(s) of TCI states by one or more TCI codepoints in one or more TCI fields in the beam indication DCI (e.g., DCI 1_1/1_2 with or without DL assignment), as specified herein—e.g., following one or more examples described herein, to determine and apply a second association between one or more of the indicated TCI states/pairs of TCI states and PDSCH reception(s)—or, equivalently, to determine and apply one or more of the indicated TCI states/pairs of TCI states—denoted by second TCI state(s)/pair(s) of TCI states—for PDSCH reception(s) according to one or more of the following conditions.

In one example, a beam indication DCI (e.g., DCI format 1_1/1_2 with or without DL assignment) indicating one or more TCI states/pairs of TCI states is received and after a first application time.

In another example, a beam indication DCI (e.g., DCI format 1_1/1_2 with or without DL assignment) indicating one or more TCI states/pairs of TCI states is received and after a first application time, the indicated TCI state(s)/pair(s) of TCI states by one or more TCI codepoints in one or more TCI fields in the beam indication DCI (e.g., DCI 11/1_2 with or without DL assignment) is the same as/identical to the previously indicated one(s).

In another example, a beam indication DCI (e.g., DCI format 1_1/1_2 with or without DL assignment) indicating one or more TCI states/pairs of TCI states is received and after a first application time, the indicated TCI states/pairs of TCI states by one or more TCI codepoints in one or more TCI fields in the beam indication DCI (e.g., DCI 1_1/1_2 with or without DL assignment) are the same or identical to each other.

In another example, a beam indication DCI (e.g., DCI format 1_1/1_2 with or without DL assignment) indicating one or more TCI states/pairs of TCI states is received and after a first application time. The indicated TCI state(s)/pair (s) of TCI states by one or more TCI codepoints in one or more TCI fields in the beam indication DCI (e.g., DCI 1_1/1_2 with or without DL assignment) is different from the previously indicated one(s).

In yet another example, a beam indication DCI (e.g., DCI format 1_1/1_2 with or without DL assignment) indicating one or more TCI states/pairs of TCI states is received and after a first application time, the TCI field(s) in the beam indication DCI (e.g., DCI 1_1/1_2 with or without DL assignment) is configured/present or is set to 'enabled' or 'on'.

In yet another example, a beam indication DCI (e.g., DCI format 1_1/1_2 with or without DL assignment) indicating one or more TCI states/pairs of TCI states is received and after a first application time, in addition, specific TCI state(s)/pair(s) of TCI states or TCI codepoint(s) is indicated in the beam indication DCI (e.g., DCI 1_1/1_2 with or without DL assignment).

In yet another example, a higher layer parameter, e.g., denoted by 'dynamicBeamAssociationPDSCH', provided in a higher layer RRC parameter, e.g., PDSCH-Config/PDCCH-Config/ControlResourceSet, is set to 'enabled' or 'on', or is configured/present.

In yet another example, a higher layer parameter, e.g., denoted by 'defaultBeamAssociationPDSCH', provided in a higher layer RRC parameter, e.g., PDSCH-Config/PDCCH-Config/ControlResourceSet, is set to 'disabled' or 'off', or is not configured/present.

In yet another example, the number of TCI states or configurations configured/provided in a first list of TCI states or configurations or a second list of TCI states or configurations is smaller/lower (or greater/higher) than a threshold, wherein the UE 116 can be configured with the first list of DLorJointTCIState configurations within the higher layer parameter PDSCH-Config for providing a reference signal for the quasi co-location for DM-RS of PDSCH and DM-RS of PDCCH in a CC, for CSI-RS, and to provide a reference, if applicable, for determining UL TX spatial filter for dynamic-grant and configured-grant based PUSCH and PUCCH resource in a CC, and SRS, and the second list of UL-TCIState configurations, to provide a reference, if applicable, for determining UL TX spatial filter for dynamic-grant and configured-grant based PUSCH and PUCCH resource in a CC, and SRS, wherein the UE 116 could be provided/configured/indicated by the network 130, e.g., via higher layer RRC signaling/parameter and/or MAC CE command and/or dynamic DCI based L1 signaling, the threshold.

In yet another example, the number of TCI codepoints activated by a beam indication/activation MAC CE, e.g., the Unified TCI States Activation/Deactivation MAC CE or Enhanced Unified TCI States Activation/Deactivation MAC CE, is smaller/lower (or greater/higher) than a threshold, wherein the UE 116 could be provided/configured/indicated by the network 130, e.g., via higher layer RRC signaling/parameter and/or MAC CE command and/or dynamic DCI based L1 signaling, the threshold.

In yet another example, the beam application time (BAT) provided by, e.g., BeamAppTime_r17, is smaller/lower (or greater/higher) than a threshold, wherein the UE 116 could be provided/configured/indicated by the network 130, e.g., via higher layer RRC signaling/parameter and/or MAC CE command and/or dynamic DCI based L1 signaling, the threshold. Furthermore, the beam application time is defined as follows. When the UE 116 would transmit the last symbol of a PUCCH with HARQ-ACK information corresponding to the DCI carrying the TCI State indication and without DL assignment or corresponding to the PDSCH scheduling by the DCI carrying the TCI State indication, and if the indicated TCI State is different from the previously indicated one, the indicated DLorJointTCIState or UL-TCIstate should be applied starting from the first slot that is at least BeamAppTime_r17 symbols after the last symbol of the PUCCH. The first slot and the BeamAppTime_r17 symbols are both determined on the carrier with the smallest SCS among the carrier(s) applying the beam indication.

In yet another example, a capability signaling/value, e.g., dynamicBeamAssociationPDSCH, to indicate to the network 130 that the UE 116 is capable of or able to use the indicated TCI state(s)/pair(s) of TCI states by one or more TCI codepoints in one or more TCI fields in the beam indication DCI (e.g., DCI 1_1/1_2 with or without DL assignment), as specified herein—e.g., following one or more examples described herein, to determine the association between one or more of the indicated TCI states/pairs of TCI states and PDSCH reception(s), is reported. Optionally, the UE 116 could be configured by the network 130, e.g., via higher layer RRC signaling/parameter (denoted by enableDynamicBeamAssociationPDSCH) and/or MAC CE command and/or dynamic DCI based L1 signaling, to use the indicated TCI state(s)/pair(s) of TCI states by one or more TCI codepoints in one or more TCI fields in the beam indication DCI (e.g., DCI 1_1/1_2 with or without DL assignment), as specified herein—e.g., following one or more examples described herein, to determine the association between one or more of the indicated TCI states/pairs of TCI states and PDSCH reception(s).

In yet another example, a capability signaling/value, e.g., defaultBeamAssociationPDSCH, to indicate to the network 130 that the UE 116 is capable of or able to use the indicator/parameter provided in the higher layer parameter, e.g., PDSCH-Config, as specified herein—e.g., following one or more examples described herein, to determine the association between one or more of the indicated TCI states/pairs of TCI states and the PDSCH reception(s), is not reported. Optionally, the UE 116 could be configured by the network 130, e.g., via higher layer RRC signaling/parameter (denoted by enableDefaultBeamAssociationPDSCH) and/or MAC CE command and/or dynamic DCI based L1 signaling, to use the indicator/parameter provided in the higher layer parameter, e.g., PDSCH-Config, as specified herein—e.g., following one or more examples described herein, to determine the association between one or more of the indicated TCI states/pairs of TCI states and the PDSCH reception(s).

In yet another example, a DCI (e.g., the scheduling DCI or the beam indication DCI with or without DL assignment) is received in a first CORESET, wherein the UE 116 could be provided/configured/indicated by the network 130, e.g., via higher layer RRC signaling/parameter and/or MAC CE command and/or dynamic DCI based L1 signaling, configuration information of the first CORESET.

For example, the first CORESET could correspond to a CORESET with UE specific search space (USS) or common search space (CSS).

For another example, the first CORESET could be configured/associated with an indicator set to '0' (or '1') in the corresponding ControlResourceSet that configures the first CORESET.

Yet for another example, the first CORESET could be comprised/included/contained in a CORESET group/pool with the corresponding CORESET group/pool index value set to '0' (or '1').

Here, the first application time T1 could be determined according to one or more of: (1) T1=0, (2) fixed in the system specifications, e.g., T1=7 symbols, T1=3 ms, etc., (3) selected/determined from a set of candidate values for application time, (4) provided/configured/indicated by the network 130 (e.g., from a set of candidate values for application time), e.g., via higher layer RRC signaling/ parameter and/or MAC CE command and/or dynamic DCI based L1 signaling, (5) T1=timeDurationForQCL, (6) T1=BeamAppTime_r17, (7) T1 corresponds to the first slot that is at least BeamAppTime_r17 symbols after the last symbol of the PUCCH, and the first slot and the BeamApp-Time_r17 symbols are both determined on the carrier with the smallest SCS among the carrier(s) applying the beam indication, (8) the maximum (max) or minimum (min) between T1 determined according to one or more of the examples specified herein (e.g., those specified in (1)-(7) herein) and a second application time T2, where T2 could be similarly determined according to one or more of the examples described herein (e.g., those specified in (1)-(7) herein). In addition, the first TCI state(s)/pair(s) of TCI states could be identical to/same as or different from the second (default) TCI state(s)/pair(s) of TCI states.

In one embodiment, the UE 116 could first use the indicated TCI state(s)/pair(s) of TCI states by one or more TCI codepoints in one or more TCI fields in the beam indication DCI (e.g., DCI 1_1/1_2 with or without DL assignment), as specified herein—e.g., following one or more examples described herein, to determine a first association between one or more of the indicated TCI states/pairs of TCI states and PDSCH reception(s)—or, equivalently, to determine one or more of the indicated TCI states/pairs of TCI states—denoted by first TCI state(s)/pair(s) of TCI states—for PDSCH reception(s). The UE 116 could apply the first association or the first TCI state(s)/pair(s) of TCI states for PDSCH reception(s) after a first application time T1. Before the first application time or before the first application time becomes effective or before the UE 116 could apply the first association or the first TCI state(s)/ pair(s) of TCI states for PDSCH reception(s)—e.g., at time t.

In one example, the UE 116 could follow the indicator/ parameter provided in the higher layer parameter, e.g., PDSCH-Config, as specified herein—e.g., following one or more examples described herein, the fixed rule(s) specified herein—e.g., following one or more examples described herein, or the predefined rule(s) specified herein—e.g., following one or more examples described herein, to determine and apply a second association between one or more of the indicated TCI states/pairs of TCI states and the PDSCH reception(s)—or, equivalently, to determine and apply one or more of the indicated TCI states/pairs of TCI states—denoted by second (default) TCI state(s)/pair(s) of TCI states—for PDSCH reception(s).

In another example, the UE 116 could use which CORE-SET(s) the beam indication DCI is received, as specified herein—e.g., following one or more examples described herein, to determine and apply a second association between one or more of the indicated TCI states/pairs of TCI states and PDSCH reception(s)—or, equivalently, to determine and apply one or more of the indicated TCI states/pairs of TCI states—denoted by second TCI state(s)/pair(s) of TCI states—for PDSCH reception(s).

In yet another example, the UE 116 could use the indicated TCI state(s)/pair(s) of TCI states by one or more TCI codepoints in one or more TCI fields in the beam indication DCI (e.g., DCI 1_1/1_2 with or without DL assignment), as specified herein—e.g., one or more examples described herein, to determine and apply a second association between one or more of the indicated TCI states/pairs of TCI states and PDSCH reception(s)—or, equivalently, to determine and apply one or more of the indicated TCI states/pairs of TCI states—denoted by second TCI state(s)/pair(s) of TCI states—for PDSCH reception(s). Alternatively, the UE 116 could use/apply the same TCI state(s)/pair(s) of TCI states used/applied for receiving the beam indication DCI—e.g., following one or more examples described herein—for PDSCH reception(s). Or equivalent, the UE 116 may assume that the DM-RS ports of the PDSCH(s) are quasi co-located with the RS(s) with respect to the QCL parameter(s) used for monitoring/receiving the beam indication DCI—e.g., following one or more examples described herein. Here, the beam indication DCI could be received in PDCCH(s) specified herein, e.g., following one or more examples described herein.

In yet another example, the UE 116 could use the DCI field indicator in the DCI (e.g., the scheduling DCI or the beam indication DCI with or without DL assignment) as specified herein—e.g., following one or more examples described herein, to determine a second association between one or more of the indicated TCI states/pairs of TCI states and PDSCH reception(s)—or, equivalently, to determine one or more of the indicated TCI states/pairs of TCI states—denoted by second TCI state(s)/pair(s) of TCI states—for PDSCH reception(s). Alternatively, the UE 116 could use/ apply the same TCI state(s)/pair(s) of TCI states used/ applied for receiving the DCI with the DCI field indicator present/configured—e.g., following one or more examples described herein—for PDSCH reception(s). Or equivalent, the UE 116 may assume that the DM-RS ports of the PDSCH(s) are quasi co-located with the RS(s) with respect to the QCL parameter(s) used for monitoring/receiving the DCI with the DCI field indicator present/configured—e.g., following one or more examples described herein. Here, the DCI with the DCI field indicator present/configured could be received in PDCCH(s) specified herein, e.g., following one or more examples described herein.

In one example, the indicated TCI state(s)/pair(s) of TCI states could correspond to the TCI state(s)/pair(s) of TCI states indicated/provided in the latest or the most recent beam indication/activation MAC CE, e.g., the Unified TCI States Activation/Deactivation MAC CE or Enhanced Unified TCI States Activation/Deactivation MAC CE, or the beam indication DCI (e.g., DCI format 1_1/1_2 with or without DL assignment) received in time.

In another example, the indicated TCI state(s)/pair(s) of TCI states could correspond to the TCI state(s)/pair(s) of TCI states indicated/provided in the beam indication/activation MAC CE, e.g., the Unified TCI States Activation/ Deactivation MAC CE or Enhanced Unified TCI States Activation/Deactivation MAC CE, or the beam indication DCI (e.g., DCI format 1_1/1_2 with or without DL assignment) that is received later in time and/or in the latest slot in which one or more CORESETs within the active BWP of the serving cell are monitored by the UE 116.

In yet another example, the indicated TCI state(s)/pair(s) of TCI states could correspond to the TCI state(s)/pair(s) of TCI states indicated/provided in the latest or the most recent (received in time) beam indication/activation MAC CE, e.g., the Unified TCI States Activation/Deactivation MAC CE or Enhanced Unified TCI States Activation/Deactivation MAC CE, or the beam indication DCI (e.g., DCI format 1_1/1_2 with or without DL assignment) that is received before the first application time T1 or a second application time T2, or when/if the first application time T1 or a second application time T2 has been reached/passed (e.g., less than or equal to, or greater than or equal to the time t).

In yet another example, the indicated TCI state(s)/pair(s) of TCI states could correspond to the TCI state(s)/pair(s) of TCI states indicated/provided in the beam indication/activation MAC CE, e.g., the Unified TCI States Activation/Deactivation MAC CE or Enhanced Unified TCI States Activation/Deactivation MAC CE, or the beam indication DCI (e.g., DCI format 1_1/1_2 with or without DL assignment) that is received later in time and/or in the latest slot in which one or more CORESETs within the active BWP of the serving cell are monitored by the UE 116 and/or before the first application time T1 or a second application time T2, or when/if the first application time T1 or a second application time T2 has been reached/passed (e.g., less than or equal to, or greater than or equal to the time t).

In yet another example, the indicated TCI state(s)/pair(s) of TCI states could correspond to the TCI state(s)/pair(s) of TCI states indicated/provided in the second latest or the previous/prior beam indication/activation MAC CE, e.g., the Unified TCI States Activation/Deactivation MAC CE or Enhanced Unified TCI States Activation/Deactivation MAC CE, or the beam indication DCI (e.g., DCI format 1_1/1_2 with or without DL assignment) received in time.

In yet another example, the indicated TCI state(s)/pair(s) of TCI states could correspond to the TCI state(s)/pair(s) of TCI states indicated/provided in the beam indication/activation MAC CE, e.g., the Unified TCI States Activation/Deactivation MAC CE or Enhanced Unified TCI States Activation/Deactivation MAC CE, or the beam indication DCI (e.g., DCI format 1_1/1_2 with or without DL assignment) that is received earlier in time and/or in the latest slot in which one or more CORESETs within the active BWP of the serving cell are monitored by the UE 116.

In yet another example, the indicated TCI state(s)/pair(s) of TCI states could correspond to the TCI state(s)/pair(s) of TCI states indicated/provided in the second latest or the previous/prior (received in time) beam indication/activation MAC CE, e.g., the Unified TCI States Activation/Deactivation MAC CE or Enhanced Unified TCI States Activation/Deactivation MAC CE, or the beam indication DCI (e.g., DCI format 1_1/1_2 with or without DL assignment) that is received before the first application time T1 or a second application time T2, or when/if the first application time T1 or a second application time T2 has been reached/passed (e.g., less than or equal to, or greater than or equal to the time t).

In yet another example, the indicated TCI state(s)/pair(s) of TCI states could correspond to the TCI state(s)/pair(s) of TCI states indicated/provided in the beam indication/activation MAC CE, e.g., the Unified TCI States Activation/Deactivation MAC CE or Enhanced Unified TCI States Activation/Deactivation MAC CE, or the beam indication DCI (e.g., DCI format 1_1/1_2 with or without DL assignment) that is received earlier in time and/or in the latest slot in which one or more CORESETs within the active BWP of the serving cell are monitored by the UE 116 and/or before the first application time T1 or a second application time T2, or when/if the first application time T1 or a second application time T2 has been reached/passed (e.g., less than or equal to, or greater than or equal to the time t).

Figure 17:
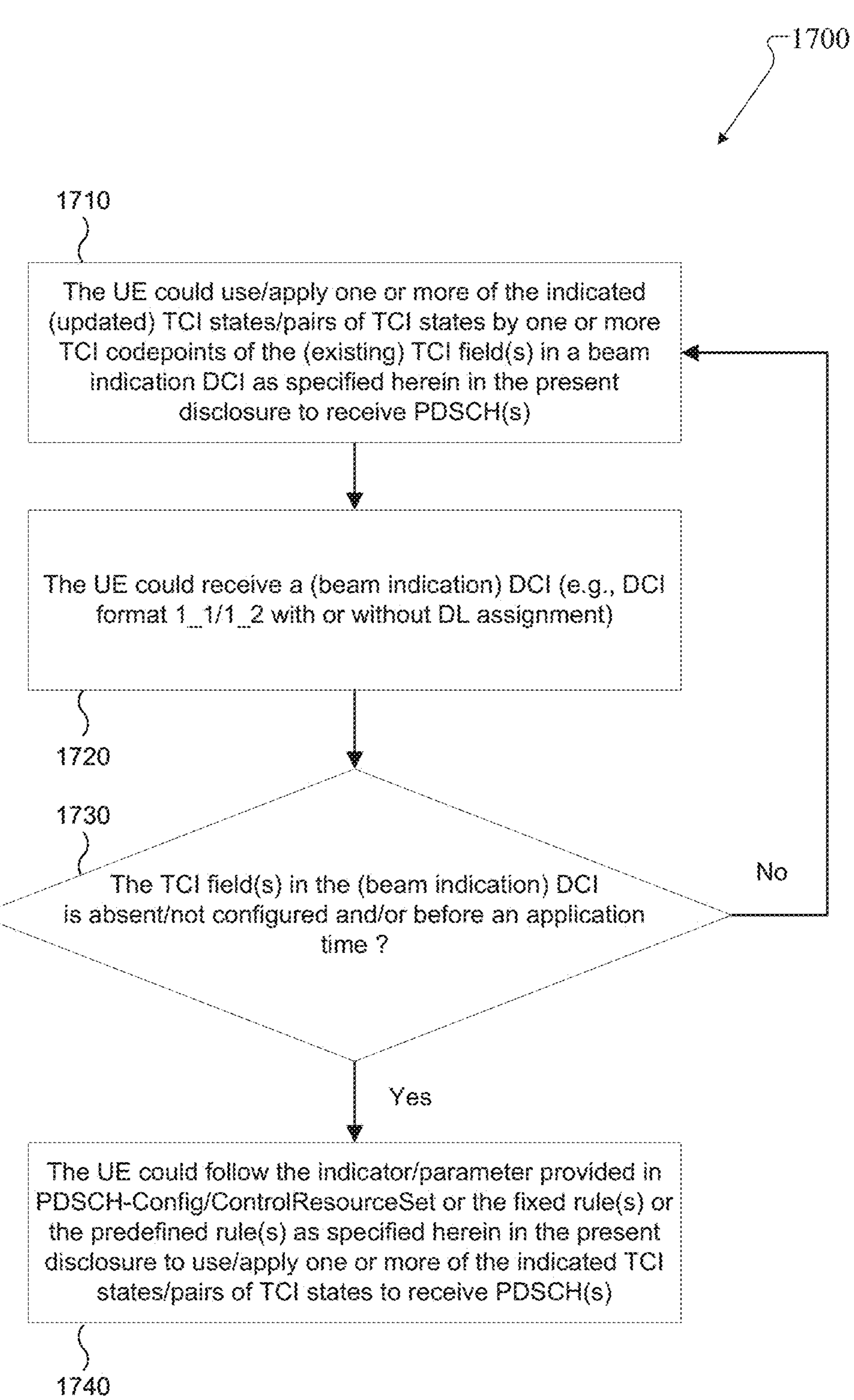
FIG. 17 illustrates a flowchart of yet another example procedure for determining which of the indicated TCI state(s) to use for PDSCH reception(s) according to embodiments of the present disclosure.

FIG. 17 illustrates a flowchart of yet another example procedure 1700 for determining which of the indicated TCI state(s) to use for PDSCH reception(s) according to embodiments of the present disclosure. For example, procedure 1700 could be performed by the UE 116 and, more particularly, by the processor 340 and the memory 360. This example is for illustration only and other embodiments can be used without departing from the scope of the present disclosure.

The procedure begins in step 1710, the UE 116 could use/apply one or more of the indicated (updated) TCI states/pairs of TCI states by one or more TCI codepoints of the (existing) TCI field(s) in a beam indication DCI as specified herein to receive PDSCH(s). In step 1720, the UE 116 could then receive a (beam indication) DCI. In step 1730, the UE 116 can have the TCI field(s) in the (beam indication) DCI absent/not configured and/or before an application time. If so, in step 1740, the UE 116 then could follow the indicator/parameter provided in the PDSCH-Config/ControlResourceSet, the fixed rule(s), or the pre-defined rule(s) as specified herein to use/apply one or more of the indicated TCI states/pairs of TCI states to receive PDSCH(s). Otherwise, the procedure returns to step 1710.

Even after the first application time, i.e., when the UE 116 is able to apply the first association or the first TCI state(s)/pair(s) of TCI states for PDSCH reception(s), the UE 116 could still determine and apply the second association or the second (default) TCI state(s)/pair(s) of TCI states—e.g., follow one or more examples described herein—to receive PDSCH(s) according to one or more of the following conditions.

In one example, the indicated TCI state(s)/pair(s) of TCI states by one or more TCI codepoints in one or more TCI fields in the beam indication DCI (e.g., DCI 1_1/1_2 with or without DL assignment) is the same as/identical to the previously indicated one(s).

In another example, the indicated TCI states/pairs of TCI states by one or more TCI codepoints in one or more TCI fields in the beam indication DCI (e.g., DCI 1_1/1_2 with or without DL assignment) are the same or identical to each other.

In yet another example, the TCI field(s) in the beam indication DCI (e.g., DCI 1_1/1_2 with or without DL assignment) is not configured/present or is set to 'disabled' or 'off'.

In yet another example, specific TCI state(s)/pair(s) of TCI states or TCI codepoint(s) is indicated in the beam indication DCI (e.g., DCI 1_1/1_2 with or without DL assignment).

In yet another example, a higher layer parameter, e.g., denoted by 'dynamicBeamAssociationPDSCH', provided in a higher layer RRC parameter, e.g., PDSCH-Config/PDCCH-Config/ControlResourceSet, is set to 'disabled' or 'off', or is not configured/present.

In yet another example, a higher layer parameter, e.g., denoted by 'defaultBeamAssociationPDSCH', provided in a higher layer RRC parameter, e.g., PDSCH-Config/PDCCH-Config/ControlResourceSet, is set to 'enabled' or 'on', or is configured/present.

In yet another example, the number of TCI states or configurations configured/provided in a first list of TCI states or configurations or a second list of TCI states or configurations is smaller/lower (or greater/higher) than a threshold, wherein the UE 116 can be configured with the first list of DLorJointTCIState configurations within the higher layer parameter PDSCH-Config for providing a reference signal for the quasi co-location for DM-RS of PDSCH and DM-RS of PDCCH in a CC, for CSI-RS, and to provide a reference, if applicable, for determining UL TX spatial filter for dynamic-grant and configured-grant based PUSCH and PUCCH resource in a CC, and SRS, and the second list of UL-TCIState configurations, to provide a reference, if applicable, for determining UL TX spatial filter for dynamic-grant and configured-grant based PUSCH and PUCCH resource in a CC, and SRS, wherein the UE 116 could be provided/configured/indicated by the network 130, e.g., via higher layer RRC signaling/parameter and/or MAC CE command and/or dynamic DCI based L1 signaling, the threshold.

In yet another example, the number of TCI codepoints activated by a beam indication/activation MAC CE, e.g., the Unified TCI States Activation/Deactivation MAC CE or Enhanced Unified TCI States Activation/Deactivation MAC CE, is smaller/lower (or greater/higher) than a threshold, wherein the UE 116 could be provided/configured/indicated by the network 130, e.g., via higher layer RRC signaling/parameter and/or MAC CE command and/or dynamic DCI based L1 signaling, the threshold.

In yet another example, the beam application time (BAT) provided by, e.g., BeamAppTime_r17, is smaller/lower (or greater/higher) than a threshold, wherein the UE 116 could be provided/configured/indicated by the network 130, e.g., via higher layer RRC signaling/parameter and/or MAC CE command and/or dynamic DCI based L1 signaling, the threshold. Furthermore, the beam application time is defined as follows. When the UE 116 would transmit the last symbol of a PUCCH with HARQ-ACK information corresponding to the DCI carrying the TCI State indication and without DL assignment or corresponding to the PDSCH scheduling by the DCI carrying the TCI State indication, and if the indicated TCI State is different from the previously indicated one, the indicated DLorJointTCIState or UL-TCIstate should be applied starting from the first slot that is at least BeamAppTime_r17 symbols after the last symbol of the PUCCH. The first slot and the BeamAppTime_r17 symbols are both determined on the carrier with the smallest SCS among the carrier(s) applying the beam indication.

In yet another example, the first application time as specified herein is smaller/lower (or greater/higher) than a threshold, wherein the UE 116 could be provided/configured/indicated by the network 130, e.g., via higher layer RRC signaling/parameter and/or MAC CE command and/or dynamic DCI based L1 signaling, the threshold.

In yet another example, the second application time as specified herein is smaller/lower (or greater/higher) than a threshold, wherein the UE 116 could be provided/configured/indicated by the network 130, e.g., via higher layer RRC signaling/parameter and/or MAC CE command and/or dynamic DCI based L1 signaling, the threshold.

In yet another example, a capability signaling/value, e.g., dynamicBeamAssociationPDSCH, to indicate to the network 130 that the UE 116 is capable of or able to use the indicated TCI state(s)/pair(s) of TCI states by one or more TCI codepoints in one or more TCI fields in the beam indication DCI (e.g., DCI 1_1/1_2 with or without DL assignment), as specified herein—e.g., following one or more examples described herein, to determine the association between one or more of the indicated TCI states/pairs of TCI states and PDSCH reception(s), is not reported. Optionally, the UE 116 could be configured by the network 130, e.g., via higher layer RRC signaling/parameter (denoted by enableDynamicBeamAssociationPDSCH) and/or MAC CE command and/or dynamic DCI based L1 signaling, to use the indicated TCI state(s)/pair(s) of TCI states by one or more TCI codepoints in one or more TCI fields in the beam indication DCI (e.g., DCI 1_1/1_2 with or without DL assignment), as specified herein—e.g., following one or more examples described herein, to determine the association between one or more of the indicated TCI states/pairs of TCI states and PDSCH reception(s).

In yet another example, a capability signaling/value, e.g., defaultBeamAssociationPDSCH, to indicate to the network 130 that the UE 116 is capable of or able to use the indicator/parameter provided in the higher layer parameter, e.g., PDSCH-Config, as specified herein—e.g., following one or more examples described herein, to determine the association between one or more of the indicated TCI states/pairs of TCI states and the PDSCH reception(s), is reported. Optionally, the UE 116 could be configured by the network 130, e.g., via higher layer RRC signaling/parameter (denoted by enableDefaultBeamAssociationPDSCH) and/or MAC CE command and/or dynamic DCI based L1 signaling, to use the indicator/parameter provided in the higher layer parameter, e.g., PDSCH-Config, as specified herein—e.g., following one or more examples described herein, to determine the association between one or more of the indicated TCI states/pairs of TCI states and the PDSCH reception(s).

In yet another example, a DCI (e.g., the scheduling DCI or the beam indication DCI with or without DL assignment) is received in a first CORESET, wherein the UE 116 could be provided/configured/indicated by the network 130, e.g., via higher layer RRC signaling/parameter and/or MAC CE command and/or dynamic DCI based L1 signaling, configuration information of the first CORESET.

For example, the first CORESET could correspond to a CORESET with UE specific search space (USS) or common search space (CSS).

For another example, the first CORESET could be configured/associated with an indicator set to '0' (or '1') in the corresponding ControlResourceSet that configures the first CORESET.

Yet for another example, the first CORESET could be comprised/included/contained in a CORESET group/pool with the corresponding CORESET group/pool index value set to '0' (or '1').

Here, the first association could be identical to/same as or different from the second association and the first or second application time T1 or T2 could be determined according to one or more of: (1) T1=0 or T2=0, (2) fixed in the system specifications, e.g., T1=7 symbols, T1=3 ms, T2=7 symbols, T2=3 ms, etc., (3) selected/determined from a set of candidate values for application time, (4) provided/configured/indicated by the network 130 (e.g., from a set of candidate values for application time), e.g., via higher layer RRC signaling/parameter and/or MAC CE command and/or dynamic DCI based L1 signaling, (5) T1=timeDurationForQCL or T2=timeDurationForQCL, (6) T1=BeamAppTime_r17 or T2=BeamAppTime_r17, (7) T1 or T2 corresponds to the first slot that is at least BeamAppTime_r17 symbols after the last symbol of the PUCCH, and the first slot and the BeamAppTime_r17 symbols are both determined on the carrier with the smallest SCS among the carrier(s) applying the beam indication, (8) the maximum (max) or minimum (min) between T1 or T2 determined according to one or more of the examples specified herein (e.g., those specified in (1)-(7) herein) and a third application time T3, where T3 could be similarly determined according to one or more of the examples specified herein (e.g., those specified in (1)-(7) herein). In addition, the first TCI state(s)/pair(s) of TCI states could be identical to/same as or different from the second (default) TCI state(s)/pair(s) of TCI states.

Figures 18, 19:
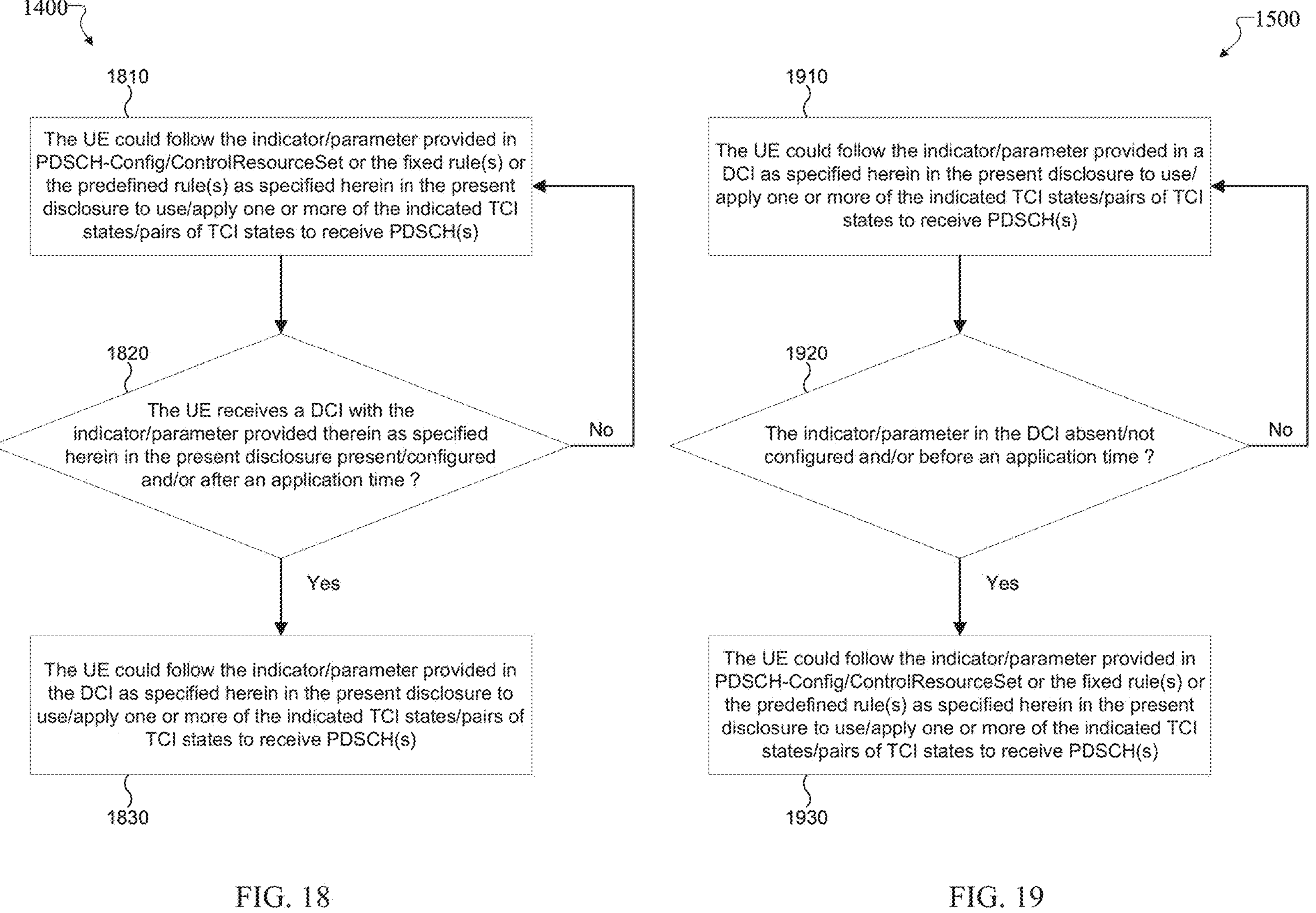
FIG. 18 illustrates a flowchart of yet another example procedure for determining which of the indicated TCI state(s) to use for PDSCH reception(s) according to embodiments of the present disclosure.
FIG. 19 illustrates a flowchart of yet another example procedure for determining which of the indicated TCI state(s) to use for PDSCH reception(s) according to embodiments of the present disclosure.

FIG. 18 illustrates a flowchart of yet another example procedure 1800 for determining which of the indicated TCI state(s) to use for PDSCH reception(s) according to embodiments of the present disclosure. For example, procedure 1800 could be performed by any of the UEs 111-116. This example is for illustration only and other embodiments can be used without departing from the scope of the present disclosure.

The procedure begins in step 1810, the UE 116 could follow the indicator/parameter provided in PDSCH-Config/ControlResourceSet, the fixed rule(s), or the predefined rule(s) as specified herein to use/apply one or more indicated TCI states/pairs of TCI states to receive PDSCH(s). In step 1820, the UE 116 can receive a DCI with the indicator/parameter provided therein as specified herein is present/configured and/or after an application time. If so, in step 1830, the UE 116 then could follow the indicator/parameter provided in the DCI as specified herein to use/apply one or more of the indicated TCI states/pairs of TCI states to receive PDSCH(s). Otherwise, the procedure returns to step 1810.

In one embodiment, the UE 116 could first follow the indicator/parameter provided in the higher layer parameter, e.g., PDSCH-Config, as specified herein—e.g., following one or more examples described herein or the fixed rule(s) specified herein—e.g., following one or more examples described herein, to determine and apply a first association between one or more of the indicated TCI states/pairs of TCI states and the PDSCH reception(s)—or, equivalently, to determine and apply one or more of the indicated TCI states/pairs of TCI states—denoted by first (default) TCI state(s)/pair(s) of TCI states—for PDSCH reception(s). The UE 116 could stop applying the first association or the first (default) TCI state(s)/pair(s) of TCI states for PDSCH reception(s) and use the DCI field indicator in the DCI (e.g., the scheduling DCI or the beam indication DCI with or without DL assignment) as specified herein—e.g., following one or more examples described herein, to determine a second association between one or more of the indicated TCI states/pairs of TCI states and PDSCH reception(s)—or, equivalently, to determine one or more of the indicated TCI states/pairs of TCI states—denoted by second TCI state(s)/pair(s) of TCI states—for PDSCH reception(s) according to one or more of the following conditions.

In one example, a beam indication DCI (e.g., DCI format 1_1/1_2 with or without DL assignment) indicating one or more TCI states/pairs of TCI states is received and after a first application time.

In another example, a beam indication DCI (e.g., DCI format 1_1/1_2 with or without DL assignment) indicating one or more TCI states/pairs of TCI states is received and after a first application time, the indicated TCI state(s)/pair(s) of TCI states by one or more TCI codepoints in one or more TCI fields in the beam indication DCI (e.g., DCI 11/1_2 with or without DL assignment) is the same as/identical to the previously indicated one(s).

In yet another example, a beam indication DCI (e.g., DCI format 1_1/1_2 with or without DL assignment) indicating one or more TCI states/pairs of TCI states is received and after a first application time; the indicated TCI states/pairs of TCI states by one or more TCI codepoints in one or more TCI fields in the beam indication DCI (e.g., DCI 1_1/1_2 with or without DL assignment) are the same or identical to each other.

In yet another example, a beam indication DCI (e.g., DCI format 1_1/1_2 with or without DL assignment) indicating one or more TCI states/pairs of TCI states is received and after a first application time, the indicated TCI state(s)/pair(s) of TCI states by one or more TCI codepoints in one or more TCI fields in the beam indication DCI (e.g., DCI 11/1_2 with or without DL assignment) is different from the previously indicated one(s).

In yet another example, a beam indication DCI (e.g., DCI format 1_1/1_2 with or without DL assignment) indicating one or more TCI states/pairs of TCI states is received and after a first application time, the TCI field(s) in the beam indication DCI (e.g., DCI 1_1/1_2 with or without DL assignment) is configured/present or is set to 'enabled' or 'on'.

In yet another example, a beam indication DCI (e.g., DCI format 1_1/1_2 with or without DL assignment) indicating one or more TCI states/pairs of TCI states is received and after a first application time, in addition, specific TCI state(s)/pair(s) of TCI states or TCI codepoint(s) is indicated in the beam indication DCI (e.g., DCI 1_1/1_2 with or without DL assignment).

In yet another example, a DCI (e.g., a scheduling DCI or a beam indication DCI with or without DL assignment) with the DCI field indicator specified herein configured/present, or set to 'enabled' or 'on' or valid value(s) is received and after a first application time.

In yet another example, a DCI (e.g., a scheduling DCI or a beam indication DCI with or without DL assignment) with the DCI field indicator specified herein is set to a particular value such as '0', '1', '00', '01', '10', '11' or 'reserved' is received and after a first application time.

In yet another example, a higher layer parameter, e.g., denoted by 'dynamicBeamAssociationPDSCH', provided in a higher layer RRC parameter, e.g., PDSCH-Config/PDCCH-Config/ControlResourceSet, is set to 'enabled' or 'on', or is configured/present.

In yet another example, a higher layer parameter, e.g., denoted by 'defaultBeamAssociationPDSCH', provided in a higher layer RRC parameter, e.g., PDSCH-Config/PDCCH-Config/ControlResourceSet, is set to 'disabled' or 'off', or is not configured/present.

In yet another example, the number of TCI states or configurations configured/provided in a first list of TCI states or configurations or a second list of TCI states or configurations is smaller/lower (or greater/higher) than a threshold, wherein the UE 116 can be configured with the first list of DLorJointTCIState configurations within the higher layer parameter PDSCH-Config for providing a reference signal for the quasi co-location for DM-RS of PDSCH and DM-RS of PDCCH in a CC, for CSI-RS, and to provide a reference, if applicable, for determining UL TX spatial filter for dynamic-grant and configured-grant based PUSCH and PUCCH resource in a CC, and SRS, and the second list of UL-TCIState configurations, to provide a reference, if applicable, for determining UL TX spatial filter for dynamic-grant and configured-grant based PUSCH and PUCCH resource in a CC, and SRS, wherein the UE 116 could be provided/configured/indicated by the network 130, e.g., via higher layer RRC signaling/parameter and/or MAC CE command and/or dynamic DCI based L1 signaling, the threshold.

In yet another example, the number of TCI codepoints activated by a beam indication/activation MAC CE, e.g., the Unified TCI States Activation/Deactivation MAC CE or Enhanced Unified TCI States Activation/Deactivation MAC CE, is smaller/lower (or greater/higher) than a threshold, wherein the UE 116 could be provided/configured/indicated by the network 130, e.g., via higher layer RRC signaling/parameter and/or MAC CE command and/or dynamic DCI based L1 signaling, the threshold.

In yet another example, the beam application time (BAT) provided by, e.g., BeamAppTime_r17, is smaller/lower (or greater/higher) than a threshold, wherein the UE 116 could be provided/configured/indicated by the network 130, e.g., via higher layer RRC signaling/parameter and/or MAC CE command and/or dynamic DCI based L1 signaling, the threshold. Furthermore, the beam application time is defined as follows. When the UE 116 would transmit the last symbol of a PUCCH with HARQ-ACK information corresponding to the DCI carrying the TCI State indication and without DL assignment or corresponding to the PDSCH scheduling by the DCI carrying the TCI State indication, and if the indicated TCI State is different from the previously indicated one, the indicated DLorJointTCIState or UL-TCIstate should be applied starting from the first slot that is at least BeamAppTime_r17 symbols after the last symbol of the PUCCH. The first slot and the BeamAppTime_r17 symbols are both determined on the carrier with the smallest SCS among the carrier(s) applying the beam indication.

In yet another example, a capability signaling/value, e.g., dynamicBeamAssociationPDSCH, to indicate to the network 130 that the UE 116 is capable of or able to use the indicated TCI state(s)/pair(s) of TCI states by one or more TCI codepoints in one or more TCI fields in the beam indication DCI (e.g., DCI 1_1/1_2 with or without DL assignment), as specified herein—e.g., following one or more examples described herein, to determine the association between one or more of the indicated TCI states/pairs of TCI states and PDSCH reception(s), is reported. Optionally, the UE 116 could be configured by the network 130, e.g., via higher layer RRC signaling/parameter (denoted by enableDynamicBeamAssociationPDSCH) and/or MAC CE command and/or dynamic DCI based L1 signaling, to use the indicated TCI state(s)/pair(s) of TCI states by one or more TCI codepoints in one or more TCI fields in the beam indication DCI (e.g., DCI 1_1/1_2 with or without DL assignment), as specified herein—e.g., following one or more examples described herein, to determine the association between one or more of the indicated TCI states/pairs of TCI states and PDSCH reception(s).

In yet another example, a capability signaling/value, e.g., defaultBeamAssociationPDSCH, to indicate to the network 130 that the UE 116 is capable of or able to use the indicator/parameter provided in the higher layer parameter, e.g., PDSCH-Config, as specified herein—e.g., following one or more examples described herein, to determine the association between one or more of the indicated TCI states/pairs of TCI states and the PDSCH reception(s), is not reported. Optionally, the UE 116 could be configured by the network 130, e.g., via higher layer RRC signaling/parameter (denoted by enableDefaultBeamAssociationPDSCH) and/or MAC CE command and/or dynamic DCI based L1 signaling, to use the indicator/parameter provided in the higher layer parameter, e.g., PDSCH-Config, as specified herein—e.g., following one or more examples described herein, to determine the association between one or more of the indicated TCI states/pairs of TCI states and the PDSCH reception(s).

In yet another example, a DCI (e.g., the scheduling DCI or the beam indication DCI with or without DL assignment) is received in a first CORESET, wherein the UE 116 could be provided/configured/indicated by the network 130, e.g., via higher layer RRC signaling/parameter and/or MAC CE command and/or dynamic DCI based L1 signaling, configuration information of the first CORESET.

For example, the first CORESET could correspond to a CORESET with UE specific search space (USS) or common search space (CSS).

For another example, the first CORESET could be configured/associated with an indicator set to '0' (or '1') in the corresponding ControlResourceSet that configures the first CORESET.

Yet for another example, the first CORESET could be comprised/included/contained in a CORESET group/pool with the corresponding CORESET group/pool index value set to '0' (or '1').

Here, the first application time T1 could be determined according to one or more of: (1) T1=0, (2) fixed in the system specifications, e.g., T1=7 symbols, T1=3 ms, etc., (3) selected/determined from a set of candidate values for application time, (4) provided/configured/indicated by the network 130 (e.g., from a set of candidate values for application time), e.g., via higher layer RRC signaling/parameter and/or MAC CE command and/or dynamic DCI based L1 signaling, (5) T1=timeDurationForQCL, (6) T1=BeamAppTime_r17, (7) T1 corresponds to the first slot that is at least BeamAppTime_r17 symbols after the last symbol of the PUCCH, and the first slot and the BeamAppTime_r17 symbols are both determined on the carrier with the smallest SCS among the carrier(s) applying the beam indication, (8) the maximum (max) or minimum (min) between T1 determined according to one or more of the examples specified herein (e.g., those specified in (1)-(7) herein) and a second application time T2, where T2 could be similarly determined according to one or more of the examples specified herein (e.g., those specified in (1)-(7) herein). In addition, the first TCI state(s)/pair(s) of TCI states could be identical to/same as or different from the second (default) TCI state(s)/pair(s) of TCI states.

In one embodiment, the UE 116 could first use the DCI field indicator in the DCI (e.g., the scheduling DCI or the beam indication DCI with or without DL assignment) as specified herein—e.g., following one or more examples described herein, to determine a first association between one or more of the indicated TCI states/pairs of TCI states and PDSCH reception(s)—or, equivalently, to determine one or more of the indicated TCI states/pairs of TCI states—denoted by first TCI state(s)/pair(s) of TCI states—for PDSCH reception(s). The UE 116 could apply the first association or the first TCI state(s)/pair(s) of TCI states for PDSCH reception(s) after a first application time T1. Before the first application time or before the first application time becomes effective or before the UE 116 could apply the first association or the first TCI state(s)/pair(s) of TCI states for PDSCH reception(s)—e.g., at time t.

In one example, the UE 116 could follow the indicator/parameter provided in the higher layer parameter, e.g., PDSCH-Config, as specified herein—e.g., following one or more examples described herein or the fixed rule(s) specified herein—e.g., following one or more examples described herein or the predefined rule(s) specified herein—e.g., following one or more examples described herein, to determine and apply a second association between one or more of the indicated TCI states/pairs of TCI states and the PDSCH reception(s)—or, equivalently, to determine and apply one or more of the indicated TCI states/pairs of TCI states—denoted by second (default) TCI state(s)/pair(s) of TCI states—for PDSCH reception(s).

In another example, the UE 116 could use which CORESET(s) the beam indication DCI is received, as specified herein—e.g., following one or more examples described herein, to determine and apply a second association between one or more of the indicated TCI states/pairs of TCI states and PDSCH reception(s)—or, equivalently, to determine and apply one or more of the indicated TCI states/pairs of TCI states—denoted by second TCI state(s)/pair(s) of TCI states—for PDSCH reception(s).

In yet another example, the UE 116 could use the indicated TCI state(s)/pair(s) of TCI states by one or more TCI codepoints in one or more TCI fields in the beam indication DCI (e.g., DCI 1_1/1_2 with or without DL assignment), as specified herein—e.g., following one or more examples described herein, to determine and apply a second association between one or more of the indicated TCI states/pairs of TCI states and PDSCH reception(s)—or, equivalently, to determine and apply one or more of the indicated TCI states/pairs of TCI states—denoted by second TCI state(s)/pair(s) of TCI states—for PDSCH reception(s). Alternatively, the UE 116 could use/apply the same TCI state(s)/pair(s) of TCI states used/applied for receiving the beam indication DCI—e.g., following one or more examples described herein—for PDSCH reception(s). Or equivalent, the UE 116 may assume that the DM-RS ports of the PDSCH(s) are quasi co-located with the RS(s) with respect to the QCL parameter(s) used for monitoring/receiving the beam indication DCI—e.g., following one or more examples described herein. Here, the beam indication DCI could be received in PDCCH(s) specified herein, e.g., following one or more examples described herein.

In yet another example, the UE 116 could use the DCI field indicator in the DCI (e.g., the scheduling DCI or the beam indication DCI with or without DL assignment) as specified herein—e.g., following one or more examples described herein, to determine a second association between one or more of the indicated TCI states/pairs of TCI states and PDSCH reception(s)—or, equivalently, to determine one or more of the indicated TCI states/pairs of TCI states—denoted by second TCI state(s)/pair(s) of TCI states—for PDSCH reception(s). Alternatively, the UE 116 could use/apply the same TCI state(s)/pair(s) of TCI states used/applied for receiving the DCI with the DCI field indicator present/configured—e.g., following one or more examples described herein—for PDSCH reception(s). Or equivalent, the UE 116 may assume that the DM-RS ports of the PDSCH(s) are quasi co-located with the RS(s) with respect to the QCL parameter(s) used for monitoring/receiving the DCI with the DCI field indicator present/configured—e.g., following one or more examples described herein. Here, the DCI with the DCI field indicator present/configured could be received in PDCCH(s) specified herein, e.g., following one or more examples described herein.

In one example, the indicated TCI state(s)/pair(s) of TCI states could correspond to the TCI state(s)/pair(s) of TCI states indicated/provided in the latest or the most recent beam indication/activation MAC CE, e.g., the Unified TCI States Activation/Deactivation MAC CE or Enhanced Unified TCI States Activation/Deactivation MAC CE, or the beam indication DCI (e.g., DCI format 1_1/1_2 with or without DL assignment) received in time.

In another example, the indicated TCI state(s)/pair(s) of TCI states could correspond to the TCI state(s)/pair(s) of TCI states indicated/provided in the beam indication/activation MAC CE, e.g., the Unified TCI States Activation/Deactivation MAC CE or Enhanced Unified TCI States Activation/Deactivation MAC CE, or the beam indication DCI (e.g., DCI format 1_1/1_2 with or without DL assignment) that is received later in time and/or in the latest slot in which one or more CORESETs within the active BWP of the serving cell are monitored by the UE 116.

In yet another example, the indicated TCI state(s)/pair(s) of TCI states could correspond to the TCI state(s)/pair(s) of TCI states indicated/provided in the latest or the most recent (received in time) beam indication/activation MAC CE, e.g., the Unified TCI States Activation/Deactivation MAC CE or Enhanced Unified TCI States Activation/Deactivation MAC CE, or the beam indication DCI (e.g., DCI format 1_1/1_2 with or without DL assignment) that is received before the first application time T1 or a second application time T2, or when/if the first application time T1 or a second application time T2 has been reached/passed (e.g., less than or equal to, or greater than or equal to the time t).

In yet another example, the indicated TCI state(s)/pair(s) of TCI states could correspond to the TCI state(s)/pair(s) of TCI states indicated/provided in the beam indication/activation MAC CE, e.g., the Unified TCI States Activation/Deactivation MAC CE or Enhanced Unified TCI States Activation/Deactivation MAC CE, or the beam indication DCI (e.g., DCI format 1_1/1_2 with or without DL assignment) that is received later in time and/or in the latest slot in which one or more CORESETs within the active BWP of the serving cell are monitored by the UE 116 and/or before the first application time T1 or a second application time T2, or when/if the first application time T1 or a second application time T2 has been reached/passed (e.g., less than or equal to, or greater than or equal to the time t).

In yet another example, the indicated TCI state(s)/pair(s) of TCI states could correspond to the TCI state(s)/pair(s) of TCI states indicated/provided in the second latest or the previous/prior beam indication/activation MAC CE, e.g., the Unified TCI States Activation/Deactivation MAC CE or Enhanced Unified TCI States Activation/Deactivation MAC CE, or the beam indication DCI (e.g., DCI format 1_1/1_2 with or without DL assignment) received in time.

In yet another example, the indicated TCI state(s)/pair(s) of TCI states could correspond to the TCI state(s)/pair(s) of TCI states indicated/provided in the beam indication/activation MAC CE, e.g., the Unified TCI States Activation/Deactivation MAC CE or Enhanced Unified TCI States Activation/Deactivation MAC CE, or the beam indication DCI (e.g., DCI format 1_1/1_2 with or without DL assignment) that is received earlier in time and/or in the latest slot in which one or more CORESETs within the active BWP of the serving cell are monitored by the UE 116.

In yet another example, the indicated TCI state(s)/pair(s) of TCI states could correspond to the TCI state(s)/pair(s) of TCI states indicated/provided in the second latest or the previous/prior (received in time) beam indication/activation MAC CE, e.g., the Unified TCI States Activation/Deactivation MAC CE or Enhanced Unified TCI States Activation/Deactivation MAC CE, or the beam indication DCI (e.g., DCI format 1_1/1_2 with or without DL assignment) that is received before the first application time T1 or a second application time T2, or when/if the first application time T1 or a second application time T2 has been reached/passed (e.g., less than or equal to, or greater than or equal to the time t).

In yet another example, the indicated TCI state(s)/pair(s) of TCI states could correspond to the TCI state(s)/pair(s) of TCI states indicated/provided in the beam indication/activation MAC CE, e.g., the Unified TCI States Activation/Deactivation MAC CE or Enhanced Unified TCI States Activation/Deactivation MAC CE, or the beam indication DCI (e.g., DCI format 1_1/1_2 with or without DL assignment) that is received earlier in time and/or in the latest slot in which one or more CORESETs within the active BWP of the serving cell are monitored by the UE 116 and/or before the first application time T1 or a second application time T2, or when/if the first application time T1 or a second application time T2 has been reached/passed (e.g., less than or equal to, or greater than or equal to the time t.

FIG. 19 illustrates a flowchart of an example procedure 1900 for determining which of the indicated TCI state(s) to use for PDSCH reception(s) according to embodiments of the present disclosure. For example, procedure 1900 could be performed by any of the UEs 111-116. This example is for illustration only and other embodiments can be used without departing from the scope of the present disclosure.

The procedure begins in step 1910, the UE 116 could follow the indicator/parameter provided in a DCI as specified herein to use/apply one or more of the indicated TCI states/pairs of TCI states to receive PDSCH(s). In step 1920, the UE 116 can have the indicator/parameter in the DCI absent/not configured and/or before an application time. If so, in step 1930, the UE 116 then could follow the indicator/parameter provided in PDSCH-Config/ControlResourceSet, the fixed rule(s), or the predefined rule(s) as specified herein to use/apply one or more of the indicated TCI states/pairs of TCI states to receive PDSCH(s). Otherwise, the procedure returns to step 1910.

Even after the first application time, i.e., when the UE 116 is able to apply the first association or the first TCI state(s)/pair(s) of TCI states for PDSCH reception(s), the UE 116 could still determine and apply the second association or the second (default) TCI state(s)/pair(s) of TCI states—e.g., follow one or more examples described herein—to receive PDSCH(s) according to one or more of the following conditions.

In one example, the DCI field indicator in a DCI (e.g., the scheduling DCI or the beam indication DCI with or without DL assignment) specified herein is absent/not configured or is set to 'disabled' or 'off' or invalid value(s).

In another example, the DCI field indicator in a DCI (e.g., the scheduling DCI or the beam indication DCI with or without DL assignment) specified herein is set to a particular value such as '0', '1', '00', '01', '10', '11' or 'reserved'.

In yet another example, a higher layer parameter, e.g., denoted by 'dynamicBeamAssociationPDSCH', provided in a higher layer RRC parameter, e.g., PDSCH-Config/PDCCH-Config/ControlResourceSet, is set to 'disabled' or 'off', or is not configured/present.

In yet another example, a higher layer parameter, e.g., denoted by 'defaultBeamAssociationPDSCH', provided in a higher layer RRC parameter, e.g., PDSCH-Config/PDCCH-Config/ControlResourceSet, is set to 'enabled' or 'on', or is configured/present.

In yet another example, the number of TCI states or configurations configured/provided in a first list of TCI states or configurations or a second list of TCI states or configurations is smaller/lower (or greater/higher) than a threshold, wherein the UE 116 can be configured with the first list of DLorJointTCIState configurations within the higher layer parameter PDSCH-Config for providing a reference signal for the quasi co-location for DM-RS of PDSCH and DM-RS of PDCCH in a CC, for CSI-RS, and to provide a reference, if applicable, for determining UL TX spatial filter for dynamic-grant and configured-grant based PUSCH and PUCCH resource in a CC, and SRS, and the second list of UL-TCIState configurations, to provide a reference, if applicable, for determining UL TX spatial filter for dynamic-grant and configured-grant based PUSCH and PUCCH resource in a CC, and SRS, wherein the UE 116 could be provided/configured/indicated by the network 130, e.g., via higher layer RRC signaling/parameter and/or MAC CE command and/or dynamic DCI based L1 signaling, the threshold.

In yet another example, the number of TCI codepoints activated by a beam indication/activation MAC CE, e.g., the Unified TCI States Activation/Deactivation MAC CE or Enhanced Unified TCI States Activation/Deactivation MAC CE, is smaller/lower (or greater/higher) than a threshold, wherein the UE 116 could be provided/configured/indicated by the network 130, e.g., via higher layer RRC signaling/parameter and/or MAC CE command and/or dynamic DCI based L1 signaling, the threshold.

In yet another example, the beam application time (BAT) provided by, e.g., BeamAppTime_r17, is smaller/lower (or greater/higher) than a threshold, wherein the UE 116 could be provided/configured/indicated by the network 130, e.g., via higher layer RRC signaling/parameter and/or MAC CE command and/or dynamic DCI based L1 signaling, the threshold. Furthermore, the beam application time is defined as follows. When the UE 116 would transmit the last symbol of a PUCCH with HARQ-ACK information corresponding to the DCI carrying the TCI State indication and without DL assignment or corresponding to the PDSCH scheduling by the DCI carrying the TCI State indication, and if the indicated TCI State is different from the previously indicated one, the indicated DLorJointTCIState or UL-TCIstate should be applied starting from the first slot that is at least BeamAppTime_r17 symbols after the last symbol of the PUCCH. The first slot and the BeamAppTime_r17 symbols are both determined on the carrier with the smallest SCS among the carrier(s) applying the beam indication.

In yet another example, the first application time as specified herein is smaller/lower (or greater/higher) than a threshold, wherein the UE 116 could be provided/configured/indicated by the network 130, e.g., via higher layer RRC signaling/parameter and/or MAC CE command and/or dynamic DCI based L1 signaling, the threshold.

In yet another example, the second application time as specified herein is smaller/lower (or greater/higher) than a threshold, wherein the UE 116 could be provided/configured/indicated by the network 130, e.g., via higher layer RRC signaling/parameter and/or MAC CE command and/or dynamic DCI based L1 signaling, the threshold.

In yet another example, a capability signaling/value, e.g., dynamicBeamAssociationPDSCH, to indicate to the network 130 that the UE 116 is capable of or able to use the DCI field indicator in the DCI (e.g., the scheduling DCI or the beam indication DCI with or without DL assignment) as specified herein—e.g., following one or more examples described herein, to determine the association between one or more of the indicated TCI states/pairs of TCI states and PDSCH reception(s), is not reported. Optionally, the UE 116 could be configured by the network 130, e.g., via higher layer RRC signaling/parameter (denoted by enableDynamicBeamAssociationPDSCH) and/or MAC CE command and/or dynamic DCI based L1 signaling, to use the DCI field indicator in the DCI (e.g., the scheduling DCI or the beam indication DCI with or without DL assignment) as specified herein—e.g., following one or more examples described herein, to determine the association between one or more of the indicated TCI states/pairs of TCI states and PDSCH reception(s).

In yet another example, a capability signaling/value, e.g., defaultBeamAssociationPDSCH, to indicate to the network 130 that the UE 116 is capable of or able to use the indicator/parameter provided in the higher layer parameter, e.g., PDSCH-Config, as specified herein—e.g., following one or more examples described herein, to determine the association between one or more of the indicated TCI states/pairs of TCI states and the PDSCH reception(s), is reported. Optionally, the UE 116 could be configured by the network 130, e.g., via higher layer RRC signaling/parameter (denoted by enableDefaultBeamAssociationPDSCH) and/or MAC CE command and/or dynamic DCI based L1 signaling, to use the indicator/parameter provided in the higher layer parameter, e.g., PDSCH-Config, as specified herein—e.g., following one or more examples described herein, to determine the association between one or more of the indicated TCI states/pairs of TCI states and the PDSCH reception(s).

In yet another example, a DCI (e.g., the scheduling DCI or the beam indication DCI with or without DL assignment) is received in a first CORESET, wherein the UE 116 could be provided/configured/indicated by the network 130, e.g., via higher layer RRC signaling/parameter and/or MAC CE command and/or dynamic DCI based L1 signaling, configuration information of the first CORESET.

For example, the first CORESET could correspond to a CORESET with UE specific search space (USS) or common search space (CSS).

For another example, the first CORESET could be configured/associated with an indicator set to '0' (or '1') in the corresponding ControlResourceSet that configures the first CORESET.

Yet for another example, the first CORESET could be comprised/included/contained in a CORESET group/pool with the corresponding CORESET group/pool index value set to '0' (or '1').

Here, the first association could be identical to/same as or different from the second association, and the first or second application time T1 or T2 could be determined according to one or more of: (1) T1=0 or T2=0, (2) fixed in the system specifications, e.g., T1=7 symbols, T1=3 ms, T2=7 symbols, T2=3 ms, etc., (3) selected/determined from a set of candidate values for application time, (4) provided/configured/indicated by the network 130 (e.g., from a set of candidate values for application time), e.g., via higher layer RRC signaling/parameter and/or MAC CE command and/or dynamic DCI based L1 signaling, (5) T1=timeDurationForQCL or T2=timeDurationForQCL, (6) T1=BeamAppTime_r17 or T2=BeamAppTime_r17, (7) T1 or T2 corresponds to the first slot that is at least BeamAppTime_r17 symbols after the last symbol of the PUCCH, and the first slot and the BeamAppTime_r17 symbols are both determined on the carrier with the smallest SCS among the carrier(s) applying the beam indication, (8) the maximum (max) or minimum (min) between T1 or T2 determined according to one or more of the examples specified herein (e.g., those specified in (1)-(7) herein) and a third application time T3, where T3 could be similarly determined according to one or more of the examples specified herein (e.g., those specified in (1)-(7) herein). In addition, the first TCI state(s)/pair(s) of TCI states could be identical to/same as or different from the second (default) TCI state(s)/pair(s) of TCI states.

For the embodiments described/specified herein, the UE 116 could follow the indicator/parameter provided in the higher layer parameter, e.g., PDSCH-Config, as specified herein—e.g., following one or more examples described herein, for determining an association between one or more of the indicated TCI states/pairs of TCI states and the PDSCH reception(s), or, equivalently, for determining one or more of the indicated TCI states/pairs of TCI states for PDSCH reception(s) according to/based on one or more events or one or more conditions discussed/specified herein.

In one example, the indicator/parameter provided in the higher layer parameter, e.g., PDSCH-Config, as specified herein—e.g., following one or more examples described herein, for determining an association between one or more of the indicated TCI states/pairs of TCI states and the PDSCH reception(s), or, equivalently, for determining one or more of the indicated TCI states/pairs of TCI states for PDSCH reception(s), is present or configured or set to 'enabled' or 'on'.

In another example, the indicator/parameter provided in the higher layer parameter, e.g., PDSCH-Config, as specified herein—e.g., following one or more examples described herein—is not set to 'none', wherein 'none' could indicate that none of the indicated TCI states/pairs of TCI states could be used/applied for PDSCH reception(s).

In yet another example, the indicator/parameter provided in the higher layer parameter, e.g., PDSCH-Config, as specified herein—e.g., following one or more examples described herein—is set to a predetermined value such as '0', '1', '00', '01', '10' or '11', wherein/when/if the predetermined value could indicate that one or more of the indicated TCI states/pairs of TCI states could be used/applied for PDSCH reception(s).

In yet another example, a higher layer parameter, e.g., denoted by 'defaultBeamPDSCHFix', provided in a higher layer RRC parameter, e.g., PDSCH-Config/PDCCH-Config/ControlResourceSet, is set to 'disabled' or 'off', or is not configured/present, wherein when/if the higher layer parameter 'defaultBeamPDSCHFix' is set to 'enabled' or 'on', or is configured/present, the UE 116 could follow the fixed rule(s) specified herein—e.g., following one or more examples described herein—to determine and apply an association between one or more of the indicated TCI states/pairs of TCI states and the PDSCH reception(s), or, equivalently, to determine and apply one or more of the indicated TCI states/pairs of TCI states for PDSCH reception(s).

In yet another example, a higher layer parameter, e.g., denoted by 'defaultBeamPDSCHPredefine', provided in a higher layer RRC parameter, e.g., PDSCH-Config/PDCCH-Config/ControlResourceSet, is set to 'disabled' or 'off', or is not configured/present, wherein when/if the higher layer parameter 'defaultBeamPDSCHPredefine' is set to 'enabled' or 'on', or is configured/present, the UE 116 could follow the predefined rule(s) specified herein—e.g., following one or more examples described herein, to determine and apply an association between one or more of the indicated TCI states/pairs of TCI states and the PDSCH reception(s), or, equivalently, to determine and apply one or more of the indicated TCI states/pairs of TCI states for PDSCH reception(s).

In yet another example, a higher layer parameter, e.g., denoted by 'defaultBeamPDSCHConfig', provided in a higher layer RRC parameter, e.g., PDSCH-Config/PDCCH-Config/ControlResourceSet, is set to 'enabled' or 'on', or is configured/present.

In yet another example, the number of TCI states or configurations configured/provided in a first list of TCI states or configurations or a second list of TCI states or configurations is smaller/lower (or greater/higher) than a threshold, wherein the UE 116 can be configured with the first list of DLorJointTCIState configurations within the higher layer parameter PDSCH-Config for providing a reference signal for the quasi co-location for DM-RS of PDSCH and DM-RS of PDCCH in a CC, for CSI-RS, and to provide a reference, if applicable, for determining UL TX spatial filter for dynamic-grant and configured-grant based PUSCH and PUCCH resource in a CC, and SRS, and the second list of UL-TCIState configurations, to provide a reference, if applicable, for determining UL TX spatial filter for dynamic-grant and configured-grant based PUSCH and PUCCH resource in a CC, and SRS, wherein the UE 116 could be provided/configured/indicated by the network 130, e.g., via higher layer RRC signaling/parameter and/or MAC CE command and/or dynamic DCI based L1 signaling, the threshold.

In yet another example, the number of TCI codepoints activated by a beam indication/activation MAC CE, e.g., the Unified TCI States Activation/Deactivation MAC CE or Enhanced Unified TCI States Activation/Deactivation MAC CE, is smaller/lower (or greater/higher) than a threshold, wherein the UE 116 could be provided/configured/indicated by the network 130, e.g., via higher layer RRC signaling/parameter and/or MAC CE command and/or dynamic DCI based L1 signaling, the threshold.

In yet another example, the number of TCI states/pairs of TCI states indicated by one or more TCI codepoints of one or more TCI fields in the beam indication DCI (e.g., DCI format 1_1 or 1_2 with or without DL assignment) is one.

In yet another example, the number of TCI states/pairs of TCI states indicated by one or more TCI codepoints of one or more TCI fields in the beam indication DCI (e.g., DCI format 1_1 or 1_2 with or without DL assignment) is more than one, e.g., 2.

In yet another example, the number of TCI states/pairs of TCI states indicated by one or more TCI codepoints of one or more TCI fields in the beam indication DCI (e.g., DCI format 1_1 or 1_2 with or without DL assignment) is more than two.

In yet another example, the beam application time (BAT) provided by, e.g., BeamAppTime_r17, is smaller/lower (or greater/higher) than a threshold, wherein the UE 116 could be provided/configured/indicated by the network 130, e.g., via higher layer RRC signaling/parameter and/or MAC CE command and/or dynamic DCI based L1 signaling, the threshold. Furthermore, the beam application time is defined as follows When the UE 116 would transmit the last symbol of a PUCCH with HARQ-ACK information corresponding to the DCI carrying the TCI State indication and without DL assignment or corresponding to the PDSCH scheduling by the DCI carrying the TCI State indication, and if the indicated TCI State is different from the previously indicated one, the indicated DLorJointTCIState or UL-TCIstate should be applied starting from the first slot that is at least BeamAppTime_r17 symbols after the last symbol of the PUCCH. The first slot and the BeamAppTime_r17 symbols are both determined on the carrier with the smallest SCS among the carrier(s) applying the beam indication.

In yet another example, a capability signaling/value, e.g., defaultBeamPDSCHFix, to indicate to the network 130 that the UE 116 is capable of or able to use the fixed rule(s) specified herein—e.g., following one or more examples described herein—to determine and apply an association between one or more of the indicated TCI states/pairs of TCI states and the PDSCH reception(s), or, equivalently, to determine and apply one or more of the indicated TCI states/pairs of TCI states for PDSCH reception(s), is not reported. Optionally, the UE 116 could be configured by the network 130, e.g., via higher layer RRC signaling/parameter (denoted by enableDefaultBeamPDSCHFix) and/or MAC CE command and/or dynamic DCI based L1 signaling, to use the fixed rule(s) specified herein—e.g., following one or more examples described herein—to determine and apply an association between one or more of the indicated TCI states/pairs of TCI states and the PDSCH reception(s), or, equivalently, to determine and apply one or more of the indicated TCI states/pairs of TCI states for PDSCH reception(s).

In yet another example, a capability signaling/value, e.g., defaultBeamPDSCHPredefine, to indicate to the network 130 that the UE 116 is capable of or able to use the predefined rule(s) specified herein—e.g., following one or more examples described herein, to determine and apply an association between one or more of the indicated TCI states/pairs of TCI states and the PDSCH reception(s), or, equivalently, to determine and apply one or more of the indicated TCI states/pairs of TCI states for PDSCH reception(s), is not reported. Optionally, the UE 116 could be configured by the network 130, e.g., via higher layer RRC signaling/parameter (denoted by enableDefaultBeamPDSCHPredefine) and/or MAC CE command and/or dynamic DCI based L1 signaling, to use the predefined rule(s) specified herein—e.g., following one or more examples described herein, to determine and apply an association between one or more of the indicated TCI states/pairs of TCI states and the PDSCH reception(s), or, equivalently, to determine and apply one or more of the indicated TCI states/pairs of TCI states for PDSCH reception(s).

In yet another example, a capability signaling/value, e.g., defaultBeamPDSCHConfig, to indicate to the network 130 that the UE 116 is capable of or able to use the indicator/parameter provided in the higher layer parameter, e.g., PDSCH-Config, as specified herein—e.g., following one or more examples described herein, to determine and apply an association between one or more of the indicated TCI states/pairs of TCI states and the PDSCH reception(s), or, equivalently, to determine and apply one or more of the indicated TCI states/pairs of TCI states for PDSCH reception(s), is reported. Optionally, the UE 116 could be configured by the network 130, e.g., via higher layer RRC signaling/parameter (denoted by enableDefaultBeamPDSCHConfig) and/or MAC CE command and/or dynamic DCI based L1 signaling, to use the indicator/parameter provided in the higher layer parameter, e.g., PDSCH-Config, as specified herein—e.g., following one or more examples described herein, to determine and apply an association between one or more of the indicated TCI states/pairs of TCI states and the PDSCH reception(s), or, equivalently, to determine and apply one or more of the indicated TCI states/pairs of TCI states for PDSCH reception(s).

In yet another example, a DCI (e.g., the scheduling DCI or the beam indication DCI with or without DL assignment) is received in a first CORESET, wherein the UE 116 could be provided/configured/indicated by the network 130, e.g., via higher layer RRC signaling/parameter and/or MAC CE command and/or dynamic DCI based L1 signaling, configuration information of the first CORESET.

For example, the first CORESET could correspond to a CORESET with UE specific search space (USS) or common search space (CSS).

For another example, the first CORESET could be configured/associated with an indicator set to '0' (or '1') in the corresponding ControlResourceSet that configures the first CORESET.

Yet for another example, the first CORESET could be comprised/included/contained in a CORESET group/pool with the corresponding CORESET group/pool index value set to '0' (or '1').

In yet another example, the UE 116 could be indicated/provided/configured by the network 130, e.g., via higher layer RRC signaling/parameter and/or MAC CE command and/or dynamic DCI based L1 signaling, an indicator/parameter associated with using the indicator/parameter provided in the higher layer parameter, e.g., PDSCH-Config, as specified herein—e.g., following one or more examples described herein, to determine and apply an association between one or more of the indicated TCI states/pairs of TCI states and the PDSCH reception(s), or, equivalently, to determine and apply one or more of the indicated TCI states/pairs of TCI states for PDSCH reception(s), set to 'enabled' or 'on' or 'present' or 'configured' or predetermined value(s).

In yet another example, the UE 116 could be indicated/provided/configured by the network 130, e.g., via higher layer RRC signaling/parameter and/or MAC CE command and/or dynamic DCI based L1 signaling, an indicator/parameter associated with using the predefined rule(s) specified herein—e.g., following one or more examples described herein, to determine and apply an association between one or more of the indicated TCI states/pairs of TCI states and the PDSCH reception(s), or, equivalently, to determine and apply one or more of the indicated TCI states/pairs of TCI states for PDSCH reception(s), set to 'disabled' or 'off' or 'absent/not present' or 'not configured' or predetermined value(s).

In yet another example, the UE 116 could be indicated/provided/configured by the network 130, e.g., via higher layer RRC signaling/parameter and/or MAC CE command and/or dynamic DCI based L1 signaling, an indicator/parameter associated with using the fixed rule(s) specified herein—e.g., following one or more examples described herein—to determine and apply an association between one or more of the indicated TCI states/pairs of TCI states and the PDSCH reception(s), or, equivalently, to determine and apply one or more of the indicated TCI states/pairs of TCI states for PDSCH reception(s), set to 'disabled' or 'off' or 'absent/not present' or 'not configured' or predetermined value(s).

For the embodiments described/specified herein, the UE 116 could follow the fixed rule(s) specified herein—e.g., following one or more examples described herein—to determine and apply an association between one or more of the indicated TCI states/pairs of TCI states and the PDSCH reception(s), or, equivalently, to determine and apply one or more of the indicated TCI states/pairs of TCI states for PDSCH reception(s) according to/based on one or more events or one or more conditions discussed/specified herein.

In one example, the indicator/parameter provided in the higher layer parameter, e.g., PDSCH-Config, as specified herein—e.g., following one or more examples described herein, for determining an association between one or more of the indicated TCI states/pairs of TCI states and the PDSCH reception(s), or, equivalently, for determining one or more of the indicated TCI states/pairs of TCI states for PDSCH reception(s), is not present or absent or not configured or set to 'disabled' or 'not enabled' or 'off'.

In another example, the indicator/parameter provided in the higher layer parameter, e.g., PDSCH-Config, as specified herein—e.g., following one or more examples described herein—is set to 'none', indicating that none of the indicated TCI states/pairs of TCI states could be used/applied for PDSCH reception(s).

In yet another example, the indicator/parameter provided in the higher layer parameter, e.g., PDSCH-Config, as specified herein—e.g., following one or more examples described herein—is set to a predetermined value such as '0', '1', '00', '01', '10' or '11', wherein/when/if the predetermined value could indicate that none of the indicated TCI states/pairs of TCI states could be used/applied for PDSCH reception(s).

In yet another example, a higher layer parameter, e.g., denoted by 'defaultBeamPDSCHConfig', provided in a higher layer RRC parameter, e.g., PDSCH-Config/PDCCH-Config/ControlResourceSet, is set to 'disabled' or 'off', or is not configured/present, wherein when/if the higher layer parameter 'defaultBeamPDSCHConfig' is set to 'enabled' or 'on', or is configured/present, the UE 116 could follow the indicator/parameter provided in the higher layer parameter, e.g., PDSCH-Config, as specified herein—e.g., following one or more examples described herein, to determine and apply an association between one or more of the indicated TCI states/pairs of TCI states and the PDSCH reception(s), or, equivalently, to determine and apply one or more of the indicated TCI states/pairs of TCI states for PDSCH reception(s).

In yet another example, a higher layer parameter, e.g., denoted by 'defaultBeamPDSCHPredefine', provided in a higher layer RRC parameter, e.g., PDSCH-Config/PDCCH-Config/ControlResourceSet, is set to 'disabled' or 'off', or is not configured/present, wherein when/if the higher layer parameter 'defaultBeamPDSCHPredefine' is set to 'enabled' or 'on', or is configured/present, the UE 116 could follow the predefined rule(s) specified herein—e.g., following one or more examples described herein, to determine and apply an association between one or more of the indicated TCI states/pairs of TCI states and the PDSCH reception(s), or, equivalently, to determine and apply one or more of the indicated TCI states/pairs of TCI states for PDSCH reception(s).

In yet another example, a higher layer parameter, e.g., denoted by 'defaultBeamPDSCHFix', provided in a higher layer RRC parameter, e.g., PDSCH-Config/PDCCH-Config/ControlResourceSet, is set to 'enabled' or 'on', or is configured/present.

In yet another example, the number of TCI states or configurations configured/provided in a first list of TCI states or configurations or a second list of TCI states or configurations is smaller/lower (or greater/higher) than a threshold, wherein the UE 116 can be configured with the first list of DLorJointTCIState configurations within the higher layer parameter PDSCH-Config for providing a reference signal for the quasi co-location for DM-RS of PDSCH and DM-RS of PDCCH in a CC, for CSI-RS, and to provide a reference, if applicable, for determining UL TX spatial filter for dynamic-grant and configured-grant based PUSCH and PUCCH resource in a CC, and SRS, and the second list of UL-TCIState configurations, to provide a reference, if applicable, for determining UL TX spatial filter for dynamic-grant and configured-grant based PUSCH and PUCCH resource in a CC, and SRS, wherein the UE 116 could be provided/configured/indicated by the network 130, e.g., via higher layer RRC signaling/parameter and/or MAC CE command and/or dynamic DCI based L1 signaling, the threshold.

In yet another example, the number of TCI codepoints activated by a beam indication/activation MAC CE, e.g., the Unified TCI States Activation/Deactivation MAC CE or Enhanced Unified TCI States Activation/Deactivation MAC CE, is smaller/lower (or greater/higher) than a threshold, wherein the UE 116 could be provided/configured/indicated by the network 130, e.g., via higher layer RRC signaling/parameter and/or MAC CE command and/or dynamic DCI based L1 signaling, the threshold.

In yet another example, the number of TCI states/pairs of TCI states indicated by one or more TCI codepoints of one or more TCI fields in the beam indication DCI (e.g., DCI format 1_1 or 1_2 with or without DL assignment) is one.

In yet another example, the number of TCI states/pairs of TCI states indicated by one or more TCI codepoints of one or more TCI fields in the beam indication DCI (e.g., DCI format 1_1 or 1_2 with or without DL assignment) is more than one, e.g., 2.

In yet another example, the number of TCI states/pairs of TCI states indicated by one or more TCI codepoints of one or more TCI fields in the beam indication DCI (e.g., DCI format 1_1 or 1_2 with or without DL assignment) is more than two.

In yet another example, the beam application time (BAT) provided by, e.g., BeamAppTime_r17, is smaller/lower (or greater/higher) than a threshold, wherein the UE 116 could be provided/configured/indicated by the network 130, e.g., via higher layer RRC signaling/parameter and/or MAC CE command and/or dynamic DCI based L1 signaling, the threshold. Furthermore, the beam application time is defined as follows When the UE 116 would transmit the last symbol of a PUCCH with HARQ-ACK information corresponding to the DCI carrying the TCI State indication and without DL assignment or corresponding to the PDSCH scheduling by the DCI carrying the TCI State indication, and if the indicated TCI State is different from the previously indicated one, the indicated DLorJointTCIState or UL-TCIstate should be applied starting from the first slot that is at least BeamAppTime_r17 symbols after the last symbol of the PUCCH. The first slot and the BeamAppTime_r17 symbols are both determined on the carrier with the smallest SCS among the carrier(s) applying the beam indication.

In yet another example, a capability signaling/value, e.g., defaultBeamPDSCHConfig, to indicate to the network 130 that the UE 116 is capable of or able to use the indicator/parameter provided in the higher layer parameter, e.g., PDSCH-Config, as specified herein—e.g., following one or more examples described herein, to determine and apply an association between one or more of the indicated TCI states/pairs of TCI states and the PDSCH reception(s), or, equivalently, to determine and apply one or more of the indicated TCI states/pairs of TCI states for PDSCH reception(s), is not reported. Optionally, the UE 116 could be configured by the network 130, e.g., via higher layer RRC signaling/parameter (denoted by enableDefaultBeamPDSCHConfig) and/or MAC CE command and/or dynamic DCI based L1 signaling, to use the indicator/parameter provided in the higher layer parameter, e.g., PDSCH-Config, as specified herein—e.g., following one or more examples described herein, to determine and apply an association between one or more of the indicated TCI states/pairs of TCI states and the PDSCH reception(s), or, equivalently, to determine and apply one or more of the indicated TCI states/pairs of TCI states for PDSCH reception(s).

In yet another example, a capability signaling/value, e.g., defaultBeamPDSCHPredefine, to indicate to the network 130 that the UE 116 is capable of or able to use the predefined rule(s) specified herein—e.g., following one or more examples described herein, to determine and apply an association between one or more of the indicated TCI states/pairs of TCI states and the PDSCH reception(s), or, equivalently, to determine and apply one or more of the indicated TCI states/pairs of TCI states for PDSCH reception(s), is not reported. Optionally, the UE 116 could be configured by the network 130, e.g., via higher layer RRC signaling/parameter (denoted by enableDefaultBeamPDSCHPredefine) and/or MAC CE command and/or dynamic DCI based L1 signaling, to use the predefined rule(s) specified herein—e.g., following one or more examples described herein, to determine and apply an association between one or more of the indicated TCI states/pairs of TCI states and the PDSCH reception(s), or, equivalently, to determine and apply one or more of the indicated TCI states/pairs of TCI states for PDSCH reception(s).

In yet another example, a capability signaling/value, e.g., defaultBeamPDSCHFix, to indicate to the network 130 that the UE 116 is capable of or able to use the fixed rule(s) specified herein—e.g., following one or more examples described herein—to determine and apply an association between one or more of the indicated TCI states/pairs of TCI states and the PDSCH reception(s), or, equivalently, to determine and apply one or more of the indicated TCI states/pairs of TCI states for PDSCH reception(s), is reported. Optionally, the UE 116 could be configured by the network 130, e.g., via higher layer RRC signaling/parameter (denoted by enableDefaultBeamPDSCHFix) and/or MAC CE command and/or dynamic DCI based L1 signaling, to use the fixed rule(s) specified herein—e.g., following one or more examples described herein—to determine and apply an association between one or more of the indicated TCI states/pairs of TCI states and the PDSCH reception(s), or, equivalently, to determine and apply one or more of the indicated TCI states/pairs of TCI states for PDSCH reception(s).

In yet another example, a DCI (e.g., the scheduling DCI or the beam indication DCI with or without DL assignment) is received in a first CORESET, wherein the UE 116 could be provided/configured/indicated by the network 130, e.g., via higher layer RRC signaling/parameter and/or MAC CE command and/or dynamic DCI based L1 signaling, configuration information of the first CORESET.

For example, the first CORESET could correspond to a CORESET with UE specific search space (USS) or common search space (CSS).

For another example, the first CORESET could be configured/associated with an indicator set to '0' (or '1') in the corresponding ControlResourceSet that configures the first CORESET.

Yet for another example, the first CORESET could be comprised/included/contained in a CORESET group/pool with the corresponding CORESET group/pool index value set to '0' (or '1').

In yet another example, the UE 116 could be indicated/provided/configured by the network 130, e.g., via higher layer RRC signaling/parameter and/or MAC CE command and/or dynamic DCI based L1 signaling, an indicator/parameter associated with using the indicator/parameter provided in the higher layer parameter, e.g., PDSCH-Config, as specified herein—e.g., following one or more examples described herein, to determine and apply an association between one or more of the indicated TCI states/pairs of TCI states and the PDSCH reception(s), or, equivalently, to determine and apply one or more of the indicated TCI states/pairs of TCI states for PDSCH reception(s), set to 'disabled' or 'off' or 'absent/not present' or 'not configured' or predetermined value(s).

In yet another example, the UE 116 could be indicated/provided/configured by the network 130, e.g., via higher layer RRC signaling/parameter and/or MAC CE command and/or dynamic DCI based L1 signaling, an indicator/parameter associated with using the predefined rule(s) specified herein—e.g., following one or more examples described herein, to determine and apply an association between one or more of the indicated TCI states/pairs of TCI states and the PDSCH reception(s), or, equivalently, to determine and apply one or more of the indicated TCI states/pairs of TCI states for PDSCH reception(s), set to 'disabled' or 'off' or 'absent/not present' or 'not configured' or predetermined value(s).

In yet another example, the UE 116 could be indicated/provided/configured by the network 130, e.g., via higher layer RRC signaling/parameter and/or MAC CE command and/or dynamic DCI based L1 signaling, an indicator/parameter associated with using the fixed rule(s) specified herein—e.g., following one or more examples described herein—to determine and apply an association between one or more of the indicated TCI states/pairs of TCI states and the PDSCH reception(s), or, equivalently, to determine and apply one or more of the indicated TCI states/pairs of TCI states for PDSCH reception(s), set to 'enabled' or 'on' or 'present' or 'configured' or predetermined value(s).

For the embodiments described/specified herein, the UE 116 could follow the predefined rule(s) specified herein—e.g., following one or more examples described herein, to determine and apply an association between one or more of the indicated TCI states/pairs of TCI states and the PDSCH reception(s), or, equivalently, to determine and apply one or more of the indicated TCI states/pairs of TCI states for PDSCH reception(s) according to/based on one or more events or one or more conditions discussed/specified herein.

In one example, the indicator/parameter provided in the higher layer parameter, e.g., PDSCH-Config, as specified herein—e.g., following one or more examples described herein, for determining an association between one or more of the indicated TCI states/pairs of TCI states and the PDSCH reception(s), or, equivalently, for determining one or more of the indicated TCI states/pairs of TCI states for PDSCH reception(s), is not present or absent or not configured or set to 'disabled' or 'not enabled' or 'off'.

In another example, the indicator/parameter provided in the higher layer parameter, e.g., PDSCH-Config, as specified herein—e.g., following one or more examples described herein—is set to 'none', indicating that none of the indicated TCI states/pairs of TCI states could be used/applied for PDSCH reception(s).

In yet another example, the indicator/parameter provided in the higher layer parameter, e.g., PDSCH-Config, as specified herein—e.g., following one or more examples described herein—is set to a predetermined value such as '0', '1', '00', '01', '10' or '11', wherein/when/if the predetermined value could indicate that none of the indicated TCI states/pairs of TCI states could be used/applied for PDSCH reception(s).

In yet another example, a higher layer parameter, e.g., denoted by 'defaultBeamPDSCHConfig', provided in a higher layer RRC parameter, e.g., PDSCH-Config/PDCCH-Config/ControlResourceSet, is set to 'disabled' or 'off', or is not configured/present, wherein when/if the higher layer parameter 'defaultBeamPDSCHConfig' is set to 'enabled' or 'on', or is configured/present, the UE 116 could follow the indicator/parameter provided in the higher layer parameter, e.g., PDSCH-Config, as specified herein—e.g., following one or more examples described herein, to determine and apply an association between one or more of the indicated TCI states/pairs of TCI states and the PDSCH reception(s), or, equivalently, to determine and apply one or more of the indicated TCI states/pairs of TCI states for PDSCH reception(s).

In yet another example, a higher layer parameter, e.g., denoted by 'defaultBeamPDSCHFix', provided in a higher layer RRC parameter, e.g., PDSCH-Config/PDCCH-Config/ControlResourceSet, is set to 'disabled' or 'off', or is not configured/present, wherein when/if the higher layer parameter 'defaultBeamPDSCHFix' is set to 'enabled' or 'on', or is configured/present, the UE 116 could follow the fixed rule(s) specified herein—e.g., following one or more examples described herein—to determine and apply an association between one or more of the indicated TCI states/pairs of TCI states and the PDSCH reception(s), or, equivalently, to determine and apply one or more of the indicated TCI states/pairs of TCI states for PDSCH reception(s).

In yet another example, a higher layer parameter, e.g., denoted by 'defaultBeamPDSCHPredefine', provided in a higher layer RRC parameter, e.g., PDSCH-Config/PDCCH-Config/ControlResourceSet, is set to 'enabled' or 'on', or is configured/present.

In yet another example, the number of TCI states or configurations configured/provided in a first list of TCI states or configurations or a second list of TCI states or configurations is smaller/lower (or greater/higher) than a threshold, wherein the UE 116 can be configured with the first list of DLorJointTCIState configurations within the higher layer parameter PDSCH-Config for providing a reference signal for the quasi co-location for DM-RS of PDSCH and DM-RS of PDCCH in a CC, for CSI-RS, and to provide a reference, if applicable, for determining UL TX spatial filter for dynamic-grant and configured-grant based PUSCH and PUCCH resource in a CC, and SRS, and the second list of UL-TCIState configurations, to provide a reference, if applicable, for determining UL TX spatial filter for dynamic-grant and configured-grant based PUSCH and PUCCH resource in a CC, and SRS, wherein the UE 116 could be provided/configured/indicated by the network 130, e.g., via higher layer RRC signaling/parameter and/or MAC CE command and/or dynamic DCI based L1 signaling, the threshold.

In yet another example, the number of TCI codepoints activated by a beam indication/activation MAC CE, e.g., the Unified TCI States Activation/Deactivation MAC CE or Enhanced Unified TCI States Activation/Deactivation MAC CE, is smaller/lower (or greater/higher) than a threshold, wherein the UE 116 could be provided/configured/indicated by the network 130, e.g., via higher layer RRC signaling/parameter and/or MAC CE command and/or dynamic DCI based L1 signaling, the threshold.

In yet another example, the number of TCI states/pairs of TCI states indicated by one or more TCI codepoints of one or more TCI fields in the beam indication DCI (e.g., DCI format 1_1 or 1_2 with or without DL assignment) is one.

In yet another example, the number of TCI states/pairs of TCI states indicated by one or more TCI codepoints of one or more TCI fields in the beam indication DCI (e.g., DCI format 1_1 or 1_2 with or without DL assignment) is more than one, e.g., 2.

In yet another example, the number of TCI states/pairs of TCI states indicated by one or more TCI codepoints of one or more TCI fields in the beam indication DCI (e.g., DCI format 1_1 or 1_2 with or without DL assignment) is more than two.

In yet another example, the beam application time (BAT) provided by, e.g., BeamAppTime_r17, is smaller/lower (or greater/higher) than a threshold, wherein the UE 116 could be provided/configured/indicated by the network 130, e.g., via higher layer RRC signaling/parameter and/or MAC CE command and/or dynamic DCI based L1 signaling, the threshold. Furthermore, the beam application time is defined as follows. When the UE 116 would transmit the last symbol of a PUCCH with HARQ-ACK information corresponding to the DCI carrying the TCI State indication and without DL assignment or corresponding to the PDSCH scheduling by the DCI carrying the TCI State indication, and if the indicated TCI State is different from the previously indicated one, the indicated DLorJointTCIState or UL-TCIstate should be applied starting from the first slot that is at least BeamAppTime_r17 symbols after the last symbol of the PUCCH. The first slot and the BeamAppTime_r17 symbols are both determined on the carrier with the smallest SCS among the carrier(s) applying the beam indication.

In yet another example, a capability signaling/value, e.g., defaultBeamPDSCHConfig, to indicate to the network 130 that the UE 116 is capable of or able to use the indicator/parameter provided in the higher layer parameter, e.g., PDSCH-Config, as specified herein—e.g., following one or more examples described herein, to determine and apply an association between one or more of the indicated TCI states/pairs of TCI states and the PDSCH reception(s), or, equivalently, to determine and apply one or more of the indicated TCI states/pairs of TCI states for PDSCH reception(s), is not reported. Optionally, the UE 116 could be configured by the network 130, e.g., via higher layer RRC signaling/parameter (denoted by enableDefaultBeamPDSCHConfig) and/or MAC CE command and/or dynamic DCI based L1 signaling, to use the indicator/parameter provided in the higher layer parameter, e.g., PDSCH-Config, as specified herein—e.g., following one or more examples described herein, to determine and apply an association between one or more of the indicated TCI states/pairs of TCI states and the PDSCH reception(s), or, equivalently, to determine and apply one or more of the indicated TCI states/pairs of TCI states for PDSCH reception(s).

In yet another example, a capability signaling/value, e.g., defaultBeamPDSCHFix, to indicate to the network 130 that the UE 116 is capable of or able to use the fixed rule(s) specified herein—e.g., following one or more examples described herein—to determine and apply an association between one or more of the indicated TCI states/pairs of TCI states and the PDSCH reception(s), or, equivalently, to determine and apply one or more of the indicated TCI states/pairs of TCI states for PDSCH reception(s), is not reported. Optionally, the UE 116 could be configured by the network 130, e.g., via higher layer RRC signaling/parameter (denoted by enableDefaultBeamPDSCHFix) and/or MAC CE command and/or dynamic DCI based L1 signaling, to use the fixed rule(s) specified herein—e.g., following one or more examples described herein—to determine and apply an association between one or more of the indicated TCI states/pairs of TCI states and the PDSCH reception(s), or, equivalently, to determine and apply one or more of the indicated TCI states/pairs of TCI states for PDSCH reception(s).

In yet another example, a capability signaling/value, e.g., defaultBeamPDSCHPredefine, to indicate to the network 130 that the UE 116 is capable of or able to use the predefined rule(s) specified herein—e.g., following one or more examples described herein, to determine and apply an association between one or more of the indicated TCI states/pairs of TCI states and the PDSCH reception(s), or, equivalently, to determine and apply one or more of the indicated TCI states/pairs of TCI states for PDSCH reception(s), is reported. Optionally, the UE 116 could be configured by the network 130, e.g., via higher layer RRC signaling/parameter (denoted by enableDefaultBeamPDSCHPredefine) and/or MAC CE command and/or dynamic DCI based L1 signaling, to use the predefined rule(s) specified herein—e.g., following one or more examples described herein, to determine and apply an association between one or more of the indicated TCI states/pairs of TCI states and the PDSCH reception(s), or, equivalently, to determine and apply one or more of the indicated TCI states/pairs of TCI states for PDSCH reception(s).

In yet another example, a DCI (e.g., the scheduling DCI or the beam indication DCI with or without DL assignment) is received in a first CORESET, wherein the UE 116 could be provided/configured/indicated by the network 130, e.g., via higher layer RRC signaling/parameter and/or MAC CE command and/or dynamic DCI based L1 signaling, configuration information of the first CORESET.

For example, the first CORESET could correspond to a CORESET with UE specific search space (USS) or common search space (CSS).

For another example, the first CORESET could be configured/associated with an indicator set to '0' (or '1') in the corresponding ControlResourceSet that configures the first CORESET.

Yet for another example, the first CORESET could be comprised/included/contained in a CORESET group/pool with the corresponding CORESET group/pool index value set to '0' (or '1').

In yet another example, the UE 116 could be indicated/provided/configured by the network 130, e.g., via higher layer RRC signaling/parameter and/or MAC CE command and/or dynamic DCI based L1 signaling, an indicator/parameter associated with using the indicator/parameter provided in the higher layer parameter, e.g., PDSCH-Config, as specified herein—e.g., following one or more examples described herein, to determine and apply an association between one or more of the indicated TCI states/pairs of TCI states and the PDSCH reception(s), or, equivalently, to determine and apply one or more of the indicated TCI states/pairs of TCI states for PDSCH reception(s), set to 'disabled' or 'off' or 'absent/not present' or 'not configured' or predetermined value(s).

In yet another example, the UE 116 could be indicated/provided/configured by the network 130, e.g., via higher layer RRC signaling/parameter and/or MAC CE command and/or dynamic DCI based L1 signaling, an indicator/parameter associated with using the fixed rule(s) specified herein—e.g., following one or more examples described herein—to determine and apply an association between one or more of the indicated TCI states/pairs of TCI states and the PDSCH reception(s), or, equivalently, to determine and apply one or more of the indicated TCI states/pairs of TCI states for PDSCH reception(s), set to 'disabled' or 'off' or 'absent/not present' or 'not configured' or predetermined value(s).

In yet another example, the UE 116 could be indicated/provided/configured by the network 130, e.g., via higher layer RRC signaling/parameter and/or MAC CE command and/or dynamic DCI based L1 signaling, an indicator/parameter associated with using the predefined rule(s) specified herein—e.g., following one or more examples described herein, to determine and apply an association between one or more of the indicated TCI states/pairs of TCI states and the PDSCH reception(s), or, equivalently, to determine and apply one or more of the indicated TCI states/pairs of TCI states for PDSCH reception(s), set to 'enabled' or 'on' or 'present' or 'configured' or predetermined value(s).

In the present disclosure, CORESET(s) associated/configured with the indicator/parameter in the corresponding ControlResourceSet set to '0' (or '1', '00', '01', '10' or '11')

could correspond to UE specific search space (USS) CORESET(s) or vice versa, and/or CORESET(s) associated/configured with the indicator/parameter in the corresponding ControlResourceSet set to '1' (or '0', '00', '01', '10' or '11') could correspond to common search space (CSS) CORESET(s) or vice versa. Furthermore, throughout the present disclosure, a scheduling DCI or a beam indication DCI could be a DCI format 1_0, 1_1, and/or 1_2. A beam indication DCI could be with or without DL assignment.

In the present disclosure, the UE 116 could be provided/configured/indicated by the network 130, in a higher layer parameter, e.g., ControlResourceSet, an indicator/parameter to indicate the association between one or more of the indicated TCI states/pairs of TCI states and the corresponding PDSCH reception(s). For this case, the UE 116 could follow the indicator/parameter provided/configured/indicated in ControlResourceSet that configures a CORESET to determine which one or more of the indicated TCI states/pairs of TCI states to use/apply to receive PDSCH(s), e.g., scheduled by PDCCH(s)/DCI(s) received in the CORESET. Furthermore, the UE 116 could follow one or more of the examples specified herein to determine which one or more of the indicated TCI states/pairs of TCI states to use/apply for PDSCH reception(s) by replacing the indicator/parameter provided/configured/indicated in PDSCH-Config with the indicator/parameter provided/configured/indicated in ControlResourceSet described herein.

In the present disclosure, the first PDCCH(s)/PDCCH candidate(s) and/or the second PDCCH(s)/PDCCH candidate(s) could correspond to or could be determined according to one or more examples described herein or a combination(s) of one or more examples.

In one example, the first PDCCH(s)/PDCCH candidate(s) and the second PDCCH(s)/PDCCH candidate(s) could be the same/identical. For this case, the first PDCCH(s)/PDCCH candidate(s) and the second PDCCH(s)/PDCCH candidate(s) could be received in the same CORESET associated/configured with more than one (e.g., two) active/activated TCI states/pairs of TCI states.

In another example, the first PDCCH(s)/PDCCH candidate(s) and the second PDCCH(s)/PDCCH candidate(s) could be received in search space sets/CORESETs that are higher layer linked, e.g., via a higher layer parameter SearchSpaceLinking.

In yet another example, the first (or second) PDCCH(s)/PDCCH candidate(s) could be received in a CORESET associated/configured with more than one (e.g., two) active/activated TCI states/pairs of TCI states and the second (or first) PDCCH(s)/PDCCH candidate(s) could be received in a search space set/CORESET higher layer configured with a higher layer parameter SearchSpaceLinking.

In the present disclosure, the first PDSCH(s) and/or the second PDSCH(s) could correspond to or could be determined according to one or more examples described herein or a combination(s) of one or more examples.

In one example, when a UE is configured/provided/indicated by the network 130 the higher layer parameter repetitionScheme set to 'fdmSchemeA', the UE 116 shall receive a single PDSCH transmission occasion of the transport block (TB) and may assume that precoding granularity is $P_{BWP}$ resource blocks in the frequency-domain, where $P_{BWP}$ can be equal to one of the values among {2, 4, wideband}. For N=2 or M=2, if $P_{BWP}$ is configured/determined as 'wideband', the first (or second) PDCCH(s) could correspond to the first $\lceil n_{PRB}/2 \rceil$ PRBs and the second (or first) PDSCH(s) could correspond to the remaining $\lfloor n_{PRB}/2 \rfloor$ PRBs, where $n_{PRB}$ is the total number of allocated PRBs for the UE 116. If $P_{BWP}$ is configured/determined as one of the values among {2, 4}, the first (or second) PDSCH(s) could correspond to even precoding resource block groups (PRGs) within the allocated frequency-domain resources and the second (or first) PDSCH(s) could correspond to odd PRGs within the allocated frequency-domain resources, wherein the PRGs are numbered continuously in increasing order with the first PRG index equal to 0.

In another example, when a UE is configured/provided/indicated by the network 130 the higher layer parameter repetitionScheme set to 'fdmSchemeB', the UE 116 shall receive two PDSCH transmission occasions of the same TB and may assume that precoding granularity is $P_{BWP}$ resource blocks in the frequency-domain, where $P_{BWP}$ can be equal to one of the values among {2, 4, wideband}. For N=2 or M=2, if $P_{BWP}$ is configured/determined as 'wideband', the first (or second) PDCCH(s) could correspond to the first $\lceil n_{PRB}/2 \rceil$PRBs and the second (or first) PDSCH(s) could correspond to the remaining $\lfloor n_{PRB}/2 \rfloor$ PRBs, where $n_{PRB}$ is the total number of allocated PRBs for the UE 116. If $P_{BWP}$ is configured/determined as one of the values among {2, 4}, the first (or second) PDSCH(s) could correspond to even precoding resource block groups (PRGs) within the allocated frequency-domain resources and the second (or first) PDSCH(s) could correspond to odd PRGs within the allocated frequency-domain resources, wherein the PRGs are numbered continuously in increasing order with the first PRG index equal to 0.

In yet another example, when a UE is configured/provided/indicated by the network 130 the higher layer parameter repetitionScheme set to 'tdmSchemeA', the UE 116 shall receive two PDSCH transmission occasions of the transport block (TB) within a given slot. For this case, the first (or second) PDSCH(s) could correspond to the first PDSCH transmission occasion and resource allocation in time-domain for the first PDSCH transmission occasion follows those described in document and standard [4]. The second (or first) PDSCH(s) could correspond to the second PDSCH transmission occasion and the second PDSCH transmission occasion shall have the same number of symbols as the first PDSCH transmission occasion.

In yet another example, when a UE is configured/provided by the network 130 the higher layer parameter repetitionNumber in PDSCH-TimeDomainResourceAllocation, the UE 116 may expect to receive multiple slot level PDSCH transmission occasions of the same TB in the repetitionNumber consecutive slots. When the value indicated by repetitionNumber in PDSCH-TimeDomainResourceAllocation equals two, the first (or second) PDSCH(s) could correspond to the first PDSCH transmission occasion and resource allocation in time-domain for the first PDSCH transmission occasion follows those described in document and standard [4] and the second (or first) PDSCH(s) could correspond to the second PDSCH transmission occasion. When the value of repetitionNumber in PDSCH-TimeDomainResourceAllocation is larger than two, the UE 116 may be further configured to enable cyclicMapping or sequentialMapping. When cyclicMapping is enabled, the first (or second) PDSCH(s) and the second (or first) PDSCH(s) could correspond to the first PDSCH transmission occasion and the second PDSCH transmission occasion, respectively, and the same mapping pattern continues to the remaining PDSCH transmission occasions. When sequentialMapping is enabled, the first (or second) PDSCH(s) could correspond to the first and second PDSCH transmission occasions, the second (or first) PDSCH(s) could correspond to the third and fourth PDSCH transmission occasions, and the same mapping pattern continues to the remaining PDSCH transmission occasions.

In the present disclosure, the following examples describe when/if the NCJT operation is configured/enabled (or the UE 116 identifies that the NCJT operation is configured/enabled) according to one or more examples described herein or when/if one or more of the repetition schemes are configured/enabled (or the UE 116 identifies that one or more of the repetition schemes are configured/enabled) according to one or more examples described herein.

In one example, the UE 116 could follow one or more design options/behaviors specified herein according to the indicator/parameter provided in the higher layer parameter, e.g., PDSCH-Config, as specified herein—e.g., following one or more examples described herein, to determine and apply an association between one or more of the indicated TCI states/pairs of TCI states (e.g., the first, second or both of the indicated TCI states/pairs of TCI states of a TCI codepoint) and the PDSCH reception(s).

In another example, the UE 116 could follow one or more design options/behaviors specified herein according to the fixed rule(s) specified herein—e.g., following one or more examples described herein, to determine and apply an association between one or more of the indicated TCI states/pairs of TCI states (e.g., the first, second or both of the indicated TCI states/pairs of TCI states of a TCI codepoint) and the PDSCH reception(s).

In yet another example, the UE 116 could follow one or more design options/behaviors specified herein according to the predefined rule(s) specified herein—e.g., following one or more examples described herein, to determine and apply an association between one or more of the indicated TCI states/pairs of TCI states (e.g., the first, second or both of the indicated TCI states/pairs of TCI states of a TCI codepoint) and the PDSCH reception(s).

In yet another example, the UE 116 could follow one or more design options/behaviors specified herein according to which CORESET(s) the beam indication DCI is received, as specified herein—e.g., following one or more examples described herein, to determine and apply an association between one or more of the indicated TCI states/pairs of TCI states (e.g., the first, second or both of the indicated TCI states/pairs of TCI states of a TCI codepoint) and the PDSCH reception(s).

In yet another example, the UE 116 could follow one or more design options/behaviors specified herein according to the indicated TCI state(s)/pair(s) of TCI states by one or more TCI codepoints in one or more TCI fields in the beam indication DCI (e.g., DCI 1_1/1_2 with or without DL assignment), as specified herein—e.g., following one or more examples described herein, to determine and apply an association between one or more of the indicated TCI states/pairs of TCI states (e.g., the first, second or both of the indicated TCI states/pairs of TCI states of a TCI codepoint) and the PDSCH reception(s).

In yet another example, the UE 116 could follow one or more design options/behaviors specified herein according to the DCI field indicator in the DCI (e.g., the scheduling DCI or the beam indication DCI with or without DL assignment) as specified herein—e.g., following one or more examples described herein, to determine and apply an association between one or more of the indicated TCI states/pairs of TCI states (e.g., the first, second or both of the indicated TCI states/pairs of TCI states of a TCI codepoint) and the PDSCH reception(s).

Otherwise, the following scenarios describe instances where the NCJT operation, as specified herein (for example, according to one or more examples described herein), is not configured or enabled, or when one or more repetition schemes, as specified herein (for example, as described in one or more examples herein), are not configured or enabled, and the UE 116 identifies these conditions.

In one example, the UE 116 could follow one or more design options/behaviors specified herein according to the indicator/parameter provided in the higher layer parameter, e.g., PDSCH-Config, as specified herein—e.g., following one or more examples described herein, to determine and apply an association between one or more of the indicated TCI states/pairs of TCI states (e.g., the first, second or both of the indicated TCI states/pairs of TCI states of a TCI codepoint) and the PDSCH reception(s).

In another example, the UE 116 could follow one or more design options/behaviors specified herein according to the fixed rule(s) specified herein—e.g., following one or more examples described herein, to determine and apply an association between one or more of the indicated TCI states/pairs of TCI states (e.g., the first, second or both of the indicated TCI states/pairs of TCI states of a TCI codepoint) and the PDSCH reception(s).

In yet another example, the UE 116 could follow one or more design options/behaviors specified herein according to the predefined rule(s) specified herein—e.g., following one or more examples described herein, to determine and apply an association between one or more of the indicated TCI states/pairs of TCI states (e.g., the first, second or both of the indicated TCI states/pairs of TCI states of a TCI codepoint) and the PDSCH reception(s).

In yet another example, the UE 116 could follow one or more design options/behaviors specified herein according to which CORESET(s) the beam indication DCI is received, as specified herein—e.g., following one or more examples described herein, to determine and apply an association between one or more of the indicated TCI states/pairs of TCI states (e.g., the first, second or both of the indicated TCI states/pairs of TCI states of a TCI codepoint) and the PDSCH reception(s).

In yet another example, the UE 116 could follow one or more design options/behaviors specified herein according to the indicated TCI state(s)/pair(s) of TCI states by one or more TCI codepoints in one or more TCI fields in the beam indication DCI (e.g., DCI 1_1/1_2 with or without DL assignment), as specified herein—e.g., following one or more examples described herein, to determine and apply an association between one or more of the indicated TCI states/pairs of TCI states (e.g., the first, second or both of the indicated TCI states/pairs of TCI states of a TCI codepoint) and the PDSCH reception(s).

In yet another example, the UE 116 could follow one or more design options/behaviors specified herein according to the DCI field indicator in the DCI (e.g., the scheduling DCI or the beam indication DCI with or without DL assignment) as specified herein—e.g., following one or more examples described herein, to determine and apply an association between one or more of the indicated TCI states/pairs of TCI states (e.g., the first, second or both of the indicated TCI states/pairs of TCI states of a TCI codepoint) and the PDSCH reception(s).

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Any of the above variation embodiments can be utilized independently or in combination with at least one other variation embodiment.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A user equipment (UE), comprising:

a transceiver configured to:

receive, in a first radio resource control (RRC) signaling, a list of transmission configuration indication (TCI) states comprising first and second TCI states;

receive, in a medium access control (MAC) control element (CE), one or more sets of TCI states each set associated with a first indicator and mapped to a respective TCI codepoint of a TCI field in a downlink control information (DCI); and receive, in the DCI, a TCI codepoint indicating a set of one or more first indicated TCI states or one or more second indicated TCI states; and a processor operably coupled with the transceiver, the processor configured to identify, based on the TCI codepoint in the DCI, a set of one or more first and second applicable TCI states, wherein the transceiver is further configured to transmit or receive a signal based on an applicable TCI state from the identified set of one or more first and second applicable TCI states, and wherein the processor is further configured to:

when the TCI codepoint in the DCI indicates the set of one or more first indicated TCI states, use the one or more first indicated TCI states as the one or more first applicable TCI states; and when the TCI codepoint in the DCI indicates the set of one or more second indicated TCI states, use the one or more second indicated TCI states as the one or more second applicable TCI states.

2. The UE of claim 1, wherein a set of the one or more TCI states in the MAC CE comprises one of:

one or two joint TCI states;

one or two downlink (DL) TCI states;

one or two uplink (UL) TCI states;

one DL TCI state and one UL TCI state;

one or two pairs of DL and UL TCI states;

a pair of DL and UL TCI states and a DL TCI state; or a pair of DL and UL TCI states and a UL TCI state.

3. The UE of claim 1, wherein, for a set of the one or more TCI states in the MAC CE, the associated first indicator indicates a number of TCI states in the set to be one, two, three, or four.

4. The UE of claim 1, wherein, for a set of the one or more TCI states in the MAC CE, the associated first indicator indicates at least one of:

the set of TCI states include the first or second TCI states; and the set of TCI states include both the first and second TCI states.

5. The UE of claim 1, wherein, for a set of the one or more TCI states in the MAC CE comprising at least one of a joint TCI state, a downlink (DL) TCI state, an uplink (UL) TCI state, and a pair of DL and UL TCI states, the associated first indicator indicates at least one of:

the joint TCI state corresponds to a first or second joint TCI state;

the DL TCI state corresponds to a first or second DL TCI state;

the UL TCI state corresponds to a first or second UL TCI state; and the pair of DL and UL TCI states corresponds to a first or second pair of DL and UL TCI states.

6. The UE of claim 5, wherein:

the set of TCI states are indicated by the TCI codepoint in the DCI, and at least one of:

the first or second joint TCI state corresponds to a first or second indicated joint TCI state indicated by the TCI codepoint;

the first or second TCI state corresponds to a first or second indicated DL TCI state indicated by the TCI codepoint;

the first or second UL TCI state corresponds to a first or second indicated UL TCI state indicated by the TCI codepoint; and the first or second pair of DL and UL TCI states corresponds to a first or second indicated pair of DL and UL TCI states indicated by the TCI codepoint.

7. The UE of claim 1, wherein:

the transceiver is further configured to receive, in a second RRC signaling, information about whether a second indicator is present or absent in the DCI; and the processor is further configured to identify, based on the second indicator, to use the one or more first applicable TCI states or the one or more second applicable TCI states for one or more physical downlink shared channel (PDSCH) receptions.

8. A base station comprising:

a transceiver configured to:

transmit, in a first radio resource control (RRC) signaling, a list of transmission configuration indication (TCI) states comprising first and second TCI states;

transmit, in a medium access control (MAC) control element (CE), one or more sets of TCI states each set associated with a first indicator and mapped to a respective TCI codepoint of a TCI field in a downlink control information (DCI); and transmit, in the DCI, a TCI codepoint indicating a set of one or more first indicated TCI states or one or more second indicated TCI states; and a processor operably coupled with the transceiver, the processor configured to identify, based on the TCI codepoint in the DCI, a set of one or more first and second applicable TCI states, wherein the transceiver is further configured to transmit or receive a signal based on an applicable TCI state from the identified set of one or more first and second applicable TCI states, and wherein:

when the TCI codepoint in the DCI indicates the set of one or more first indicated TCI states, the one or more first indicated TCI states are used as the one or more first applicable TCI states; and when the TCI codepoint in the DCI indicates the set of one or more second indicated TCI states, the one or more second indicated TCI states are used as the one or more second applicable TCI states.

9. The base station of claim 8, wherein a set of the one or more TCI states in the MAC CE comprises one of:

one or two joint TCI states;

one or two downlink (DL) TCI states;

one or two uplink (UL) TCI states;

one DL TCI state and one UL TCI state;

one or two pairs of DL and UL TCI states;

a pair of DL and UL TCI states and a DL TCI state; or a pair of DL and UL TCI states and a UL TCI state.

10. The base station of claim 8, wherein, for a set of the one or more TCI states in the MAC CE, the associated first indicator indicates a number of TCI states in the set to be one, two, three, or four.

11. The base station of claim 8, wherein, for a set of the one or more TCI states in the MAC CE, the associated first indicator indicates at least one of:

the set of TCI states include the first or second TCI states; and the set of TCI states include both the first and second TCI states.

12. The base station of claim 8, wherein, for a set of the one or more TCI states in the MAC CE comprising at least one of a joint TCI state, a downlink (DL) TCI state, an uplink (UL) TCI state, and a pair of DL and UL TCI states, the associated first indicator indicates at least one of:

the joint TCI state corresponds to a first or second joint TCI state;

the DL TCI state corresponds to a first or second DL TCI state;

the UL TCI state corresponds to a first or second UL TCI state; and the pair of DL and UL TCI states corresponds to a first or second pair of DL and UL TCI states.

13. The base station of claim 12, wherein:

the set of TCI states are indicated by the TCI codepoint in the DCI, and at least one of:

the first or second joint TCI state corresponds to a first or second indicated joint TCI state indicated by the TCI codepoint;

the first or second TCI state corresponds to a first or second indicated DL TCI state indicated by the TCI codepoint;

the first or second UL TCI state corresponds to a first or second indicated UL TCI state indicated by the TCI codepoint; and the first or second pair of DL and UL TCI states corresponds to a first or second indicated pair of DL and UL TCI states indicated by the TCI codepoint.

14. The base station of claim 8, wherein:

the transceiver is further configured to transmit, in a second RRC signaling, information about whether a second indicator is present or absent in the DCI; and the second indicator indicates to use the one or more first applicable TCI states or the one or more second applicable TCI states for one or more one or more physical downlink shared channel (PDSCH) receptions.

15. A method performed by a user equipment (UE), the method comprising:

receiving, in a first radio resource control (RRC) signaling, a list of transmission configuration indication (TCI) states comprising first and second TCI states;

receiving, in a medium access control (MAC) control element (CE), one or more sets of TCI states each set associated with a first indicator and mapped to a respective TCI codepoint of a TCI field in a downlink control information (DCI);

receiving, in the DCI, a TCI codepoint indicating a set of one or more first indicated TCI states or one or more second indicated TCI states;

identifying, based on the TCI codepoint in the DCI, a set of one or more first and second applicable TCI states; and transmitting or receiving a signal based on an applicable TCI state from the identified set of one or more first and second applicable TCI states, wherein:

when the TCI codepoint in the DCI indicates the set of one or more first indicated TCI states, the one or more first indicated TCI states are used as the one or more first applicable TCI states; and when the TCI codepoint in the DCI indicates the set of one or more second indicated TCI states, the one or more second indicated TCI states are used as the one or more second applicable TCI states.

16. The method of claim 15, wherein a set of the one or more TCI states in the MAC CE comprises one of:

one or two joint TCI states;

one or two downlink (DL) TCI states;

one or two uplink (UL) TCI states;

one DL TCI state and one UL TCI state;

one or two pairs of DL and UL TCI states;

a pair of DL and UL TCI states and a DL TCI state; or a pair of DL and UL TCI states and a UL TCI state.

17. The method of claim 15, wherein, for a set of the one or more TCI states in the MAC CE, the associated first indicator indicates a number of TCI states in the set to be one, two, three, or four.

18. The method of claim 15, wherein, for a set of the one or more TCI states in the MAC CE, the associated first indicator indicates at least one of:

the set of TCI states include the first or second TCI states; and the set of TCI states include both the first and second TCI states.

* * * * *